United States Patent [19]
Kayser et al.

[11] Patent Number: 6,089,453
[45] Date of Patent: Jul. 18, 2000

[54] ARTICLE-INFORMATION DISPLAY SYSTEM USING ELECTRONICALLY CONTROLLED TAGS

[75] Inventors: Kenneth W. Kayser, St. Charles; W. Richard Frederick, Mundelein, both of Ill.; Stanley J. Swartzel, Trotwood, Ohio

[73] Assignee: Display Edge Technology, Ltd., Troy, Ohio

[21] Appl. No.: 09/118,653

[22] Filed: Jul. 17, 1998

Related U.S. Application Data

[60] Provisional application No. 60/061,780, Oct. 10, 1997, and provisional application No. 60/067,336, Dec. 2, 1997.

[51] Int. Cl.[7] .................................................. G06K 15/00
[52] U.S. Cl. .......................... 235/383; 235/378; 235/385; 235/462.46
[58] Field of Search .................................... 235/383, 375, 235/378, 381, 385, 462.46

[56] References Cited

U.S. PATENT DOCUMENTS

| | | | |
|---|---|---|---|
| 5,198,644 | 9/1995 | Pfeiffer et al. ........................... | 235/383 |
| 5,448,226 | 9/1995 | Failing, Jr. et al. ................. | 235/383 X |
| 5,461,561 | 10/1995 | Ackerman et al. ................. | 235/383 X |
| 5,493,107 | 9/1995 | Gupta et al. ............................. | 235/383 |
| 5,704,049 | 12/1997 | Briechle ................................. | 395/326 |
| 5,850,187 | 12/1998 | Carrender et al. .................. | 340/825.54 |
| 5,984,182 | 11/1999 | Murrah et al. .......................... | 235/383 |

Primary Examiner—Michael G Lee
Attorney, Agent, or Firm—Thompson Hine & Flory LLP

[57] ABSTRACT

A product information display system has electronic display tags for displaying pricing and product information for products in stores or warehouses. The electronic display tags are electromagnetically coupled to a conductor. A control circuit is used to generate an information signal which contains a tag address and related data. A modulator circuit modulates an ac power signal with the information signal and applies it to the conductor for transmission to the display tags. Each of the display tags is equipped with a coil that is electromagnetically coupled to the conductor for picking up the signals carried by the conductor. A demodulator is used to demodulate the signal picked up by the coil to obtain the original information signal. Each of the display tags is provided with a manually operated switch for initializing the tags with initial addresses transmitted by the conductor. A microprocessor in the electronic tag then compares the address contained in subsequent information signals with the address stored in the tag's memory. If the addresses match, the microprocessor further processes the information signal for visual display or verification functions. An electrical power system supplies ac power to the display tags. A main power distribution loop is connected to the power supply and is magnetically coupled to multiple branch power distribution loops which extend along selected groups of display tags for supplying power to those display tags.

9 Claims, 149 Drawing Sheets

FIG. 15a
FIG. 15b
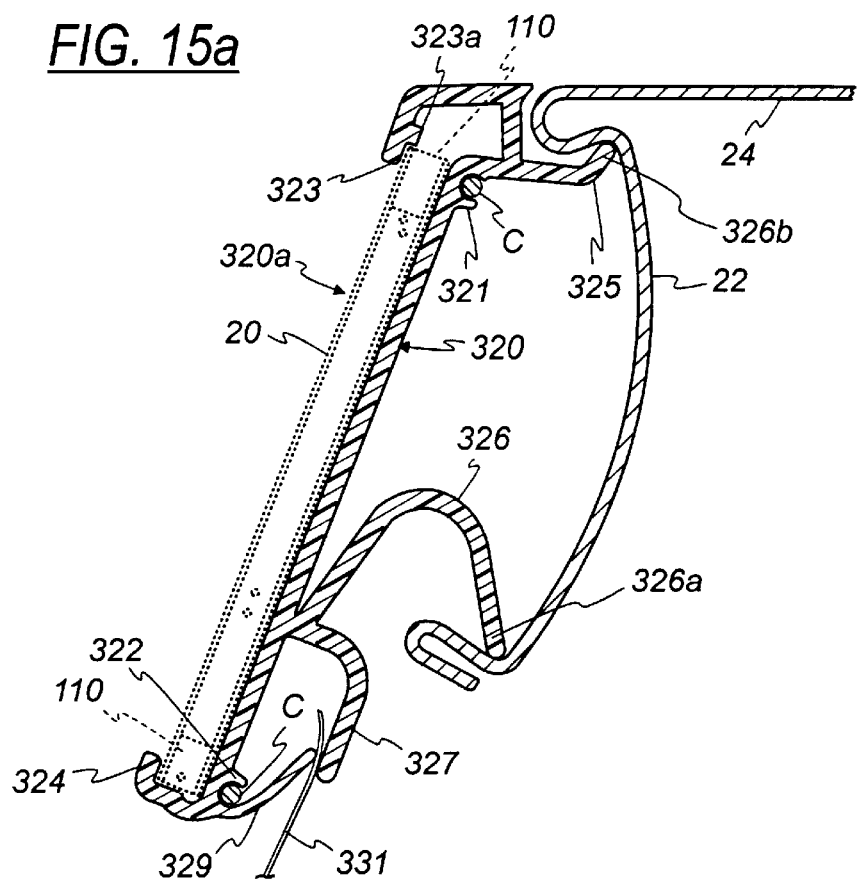
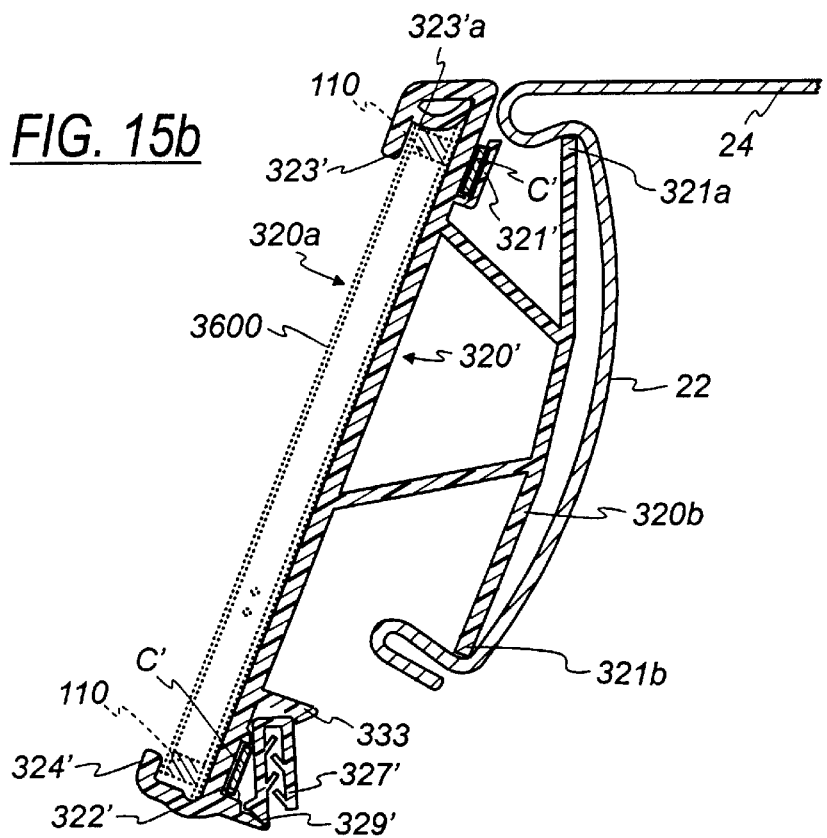

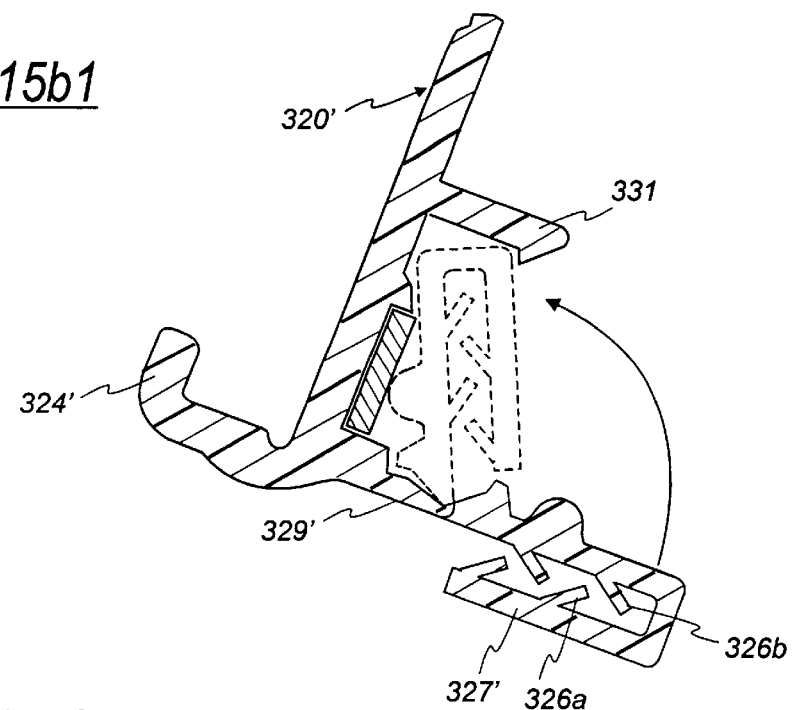
FIG. 15b1
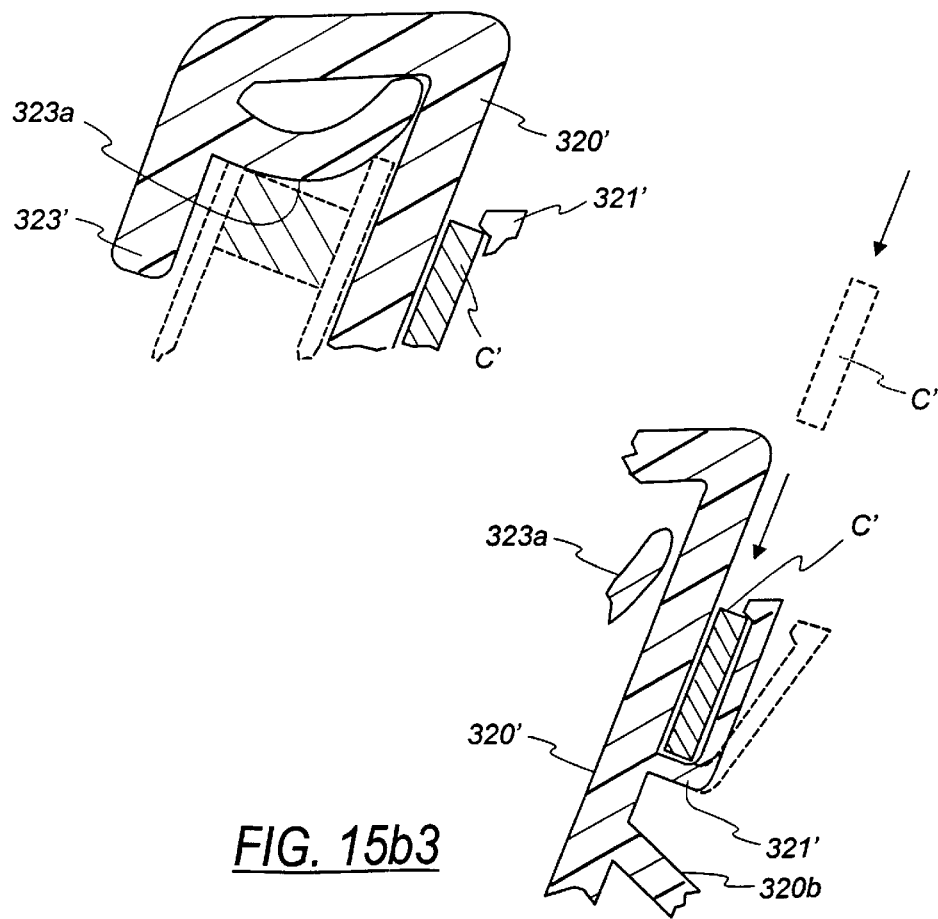
FIG. 15b2
FIG. 15b3

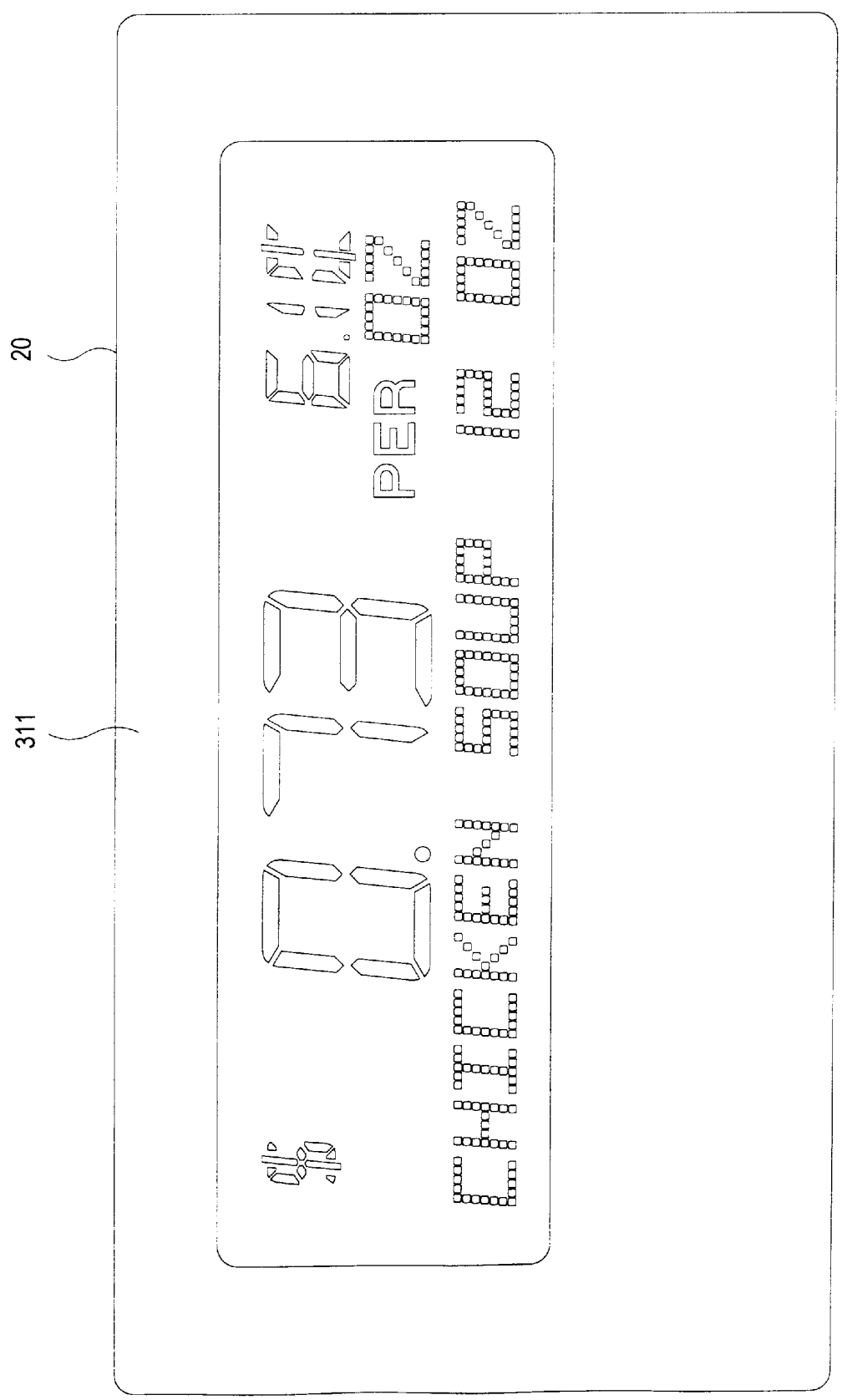

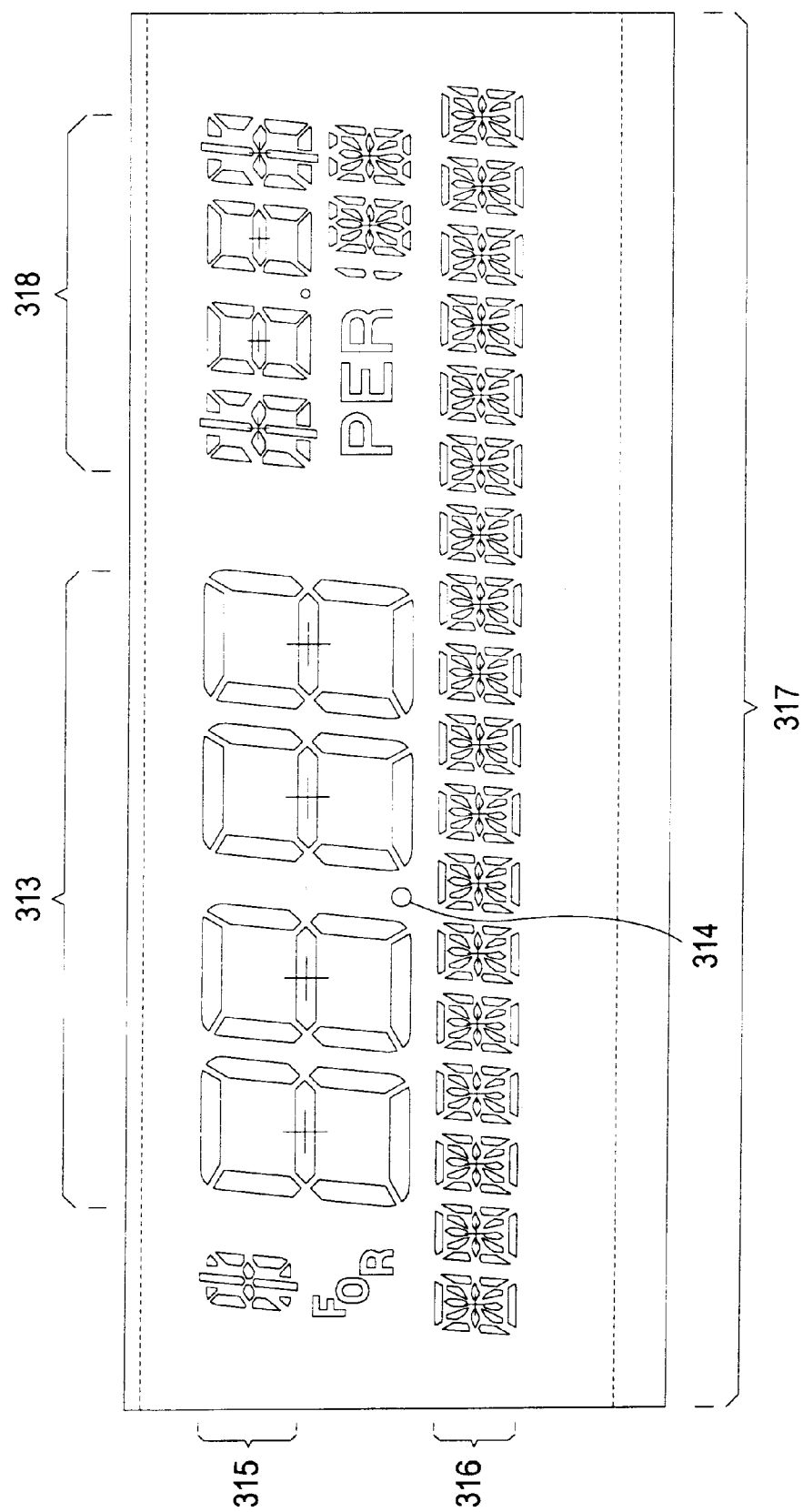

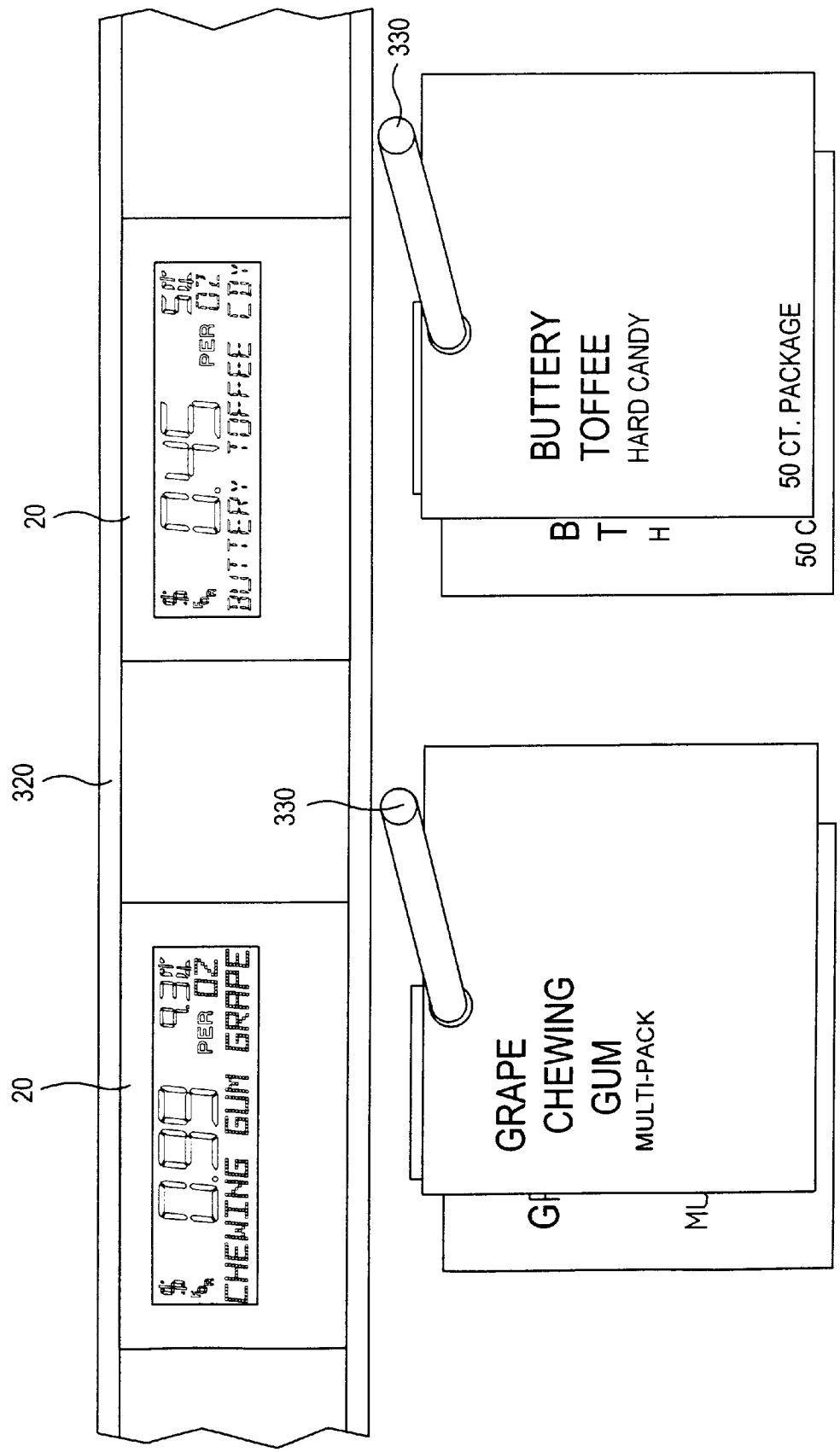

2680

| 2681 | 2682 | 2683 | 2684 |

VECTOR-1

| 2691 | 2692 | 2693 | 2694 |

VECTOR-2

2690

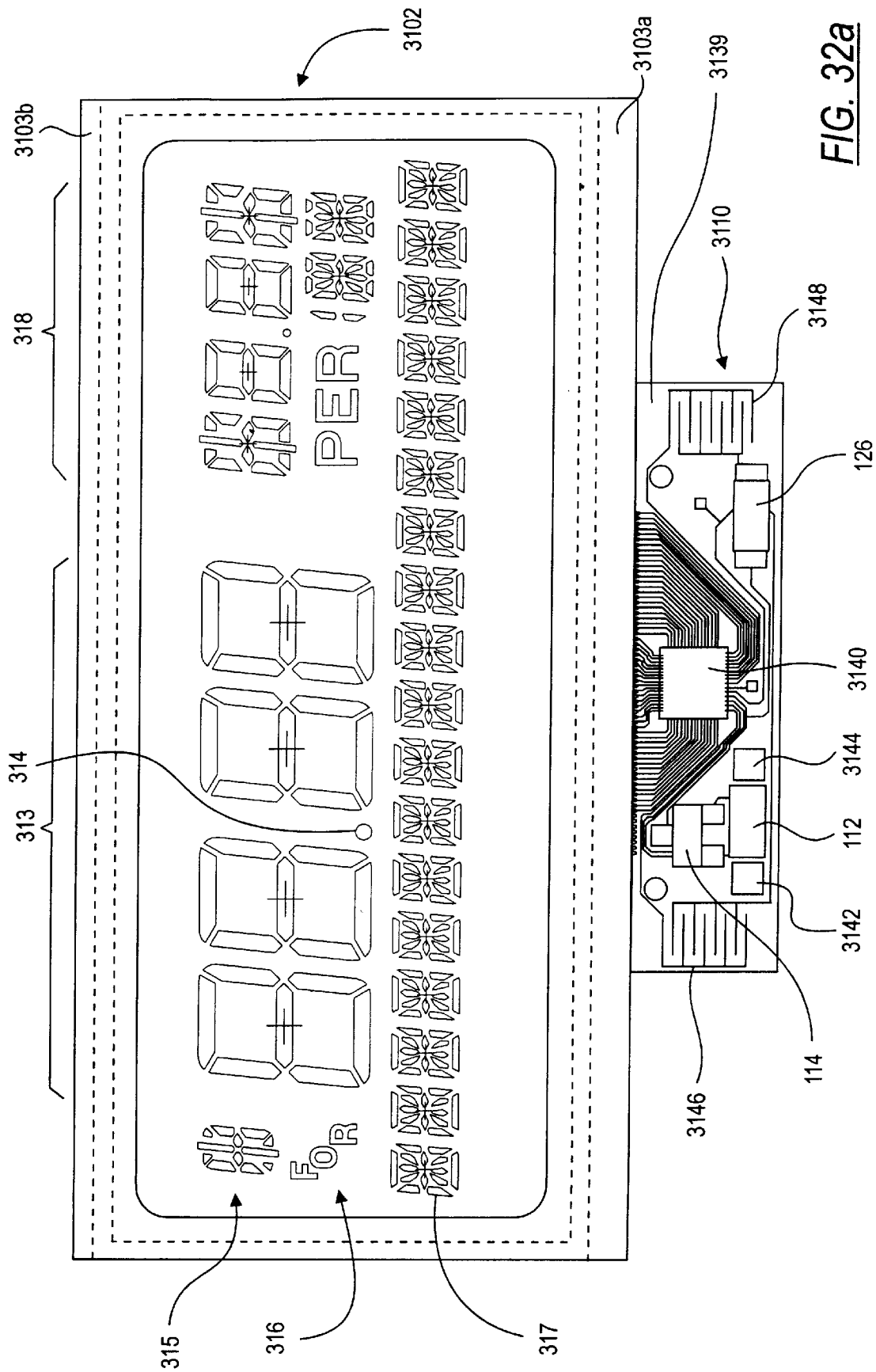

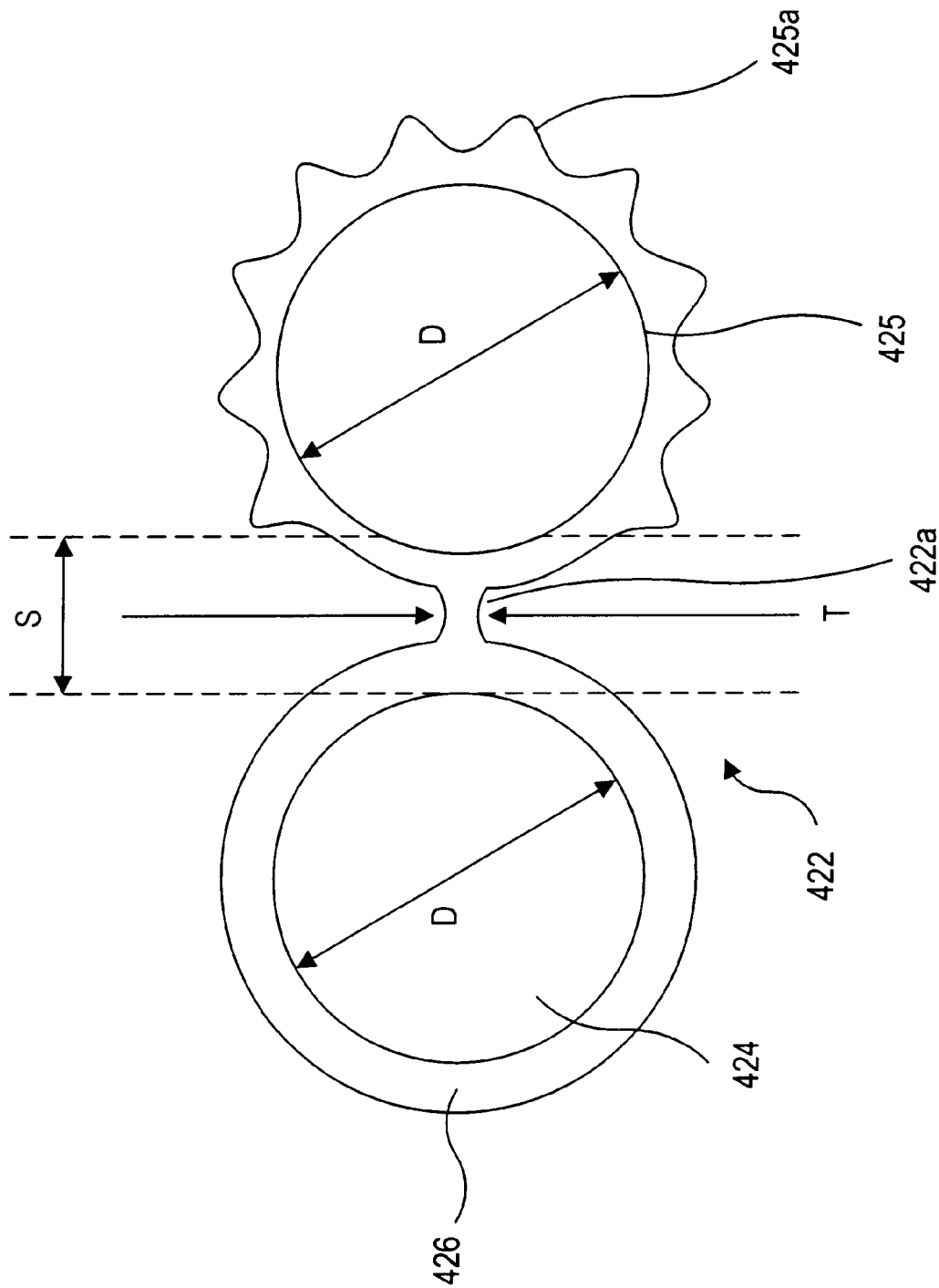

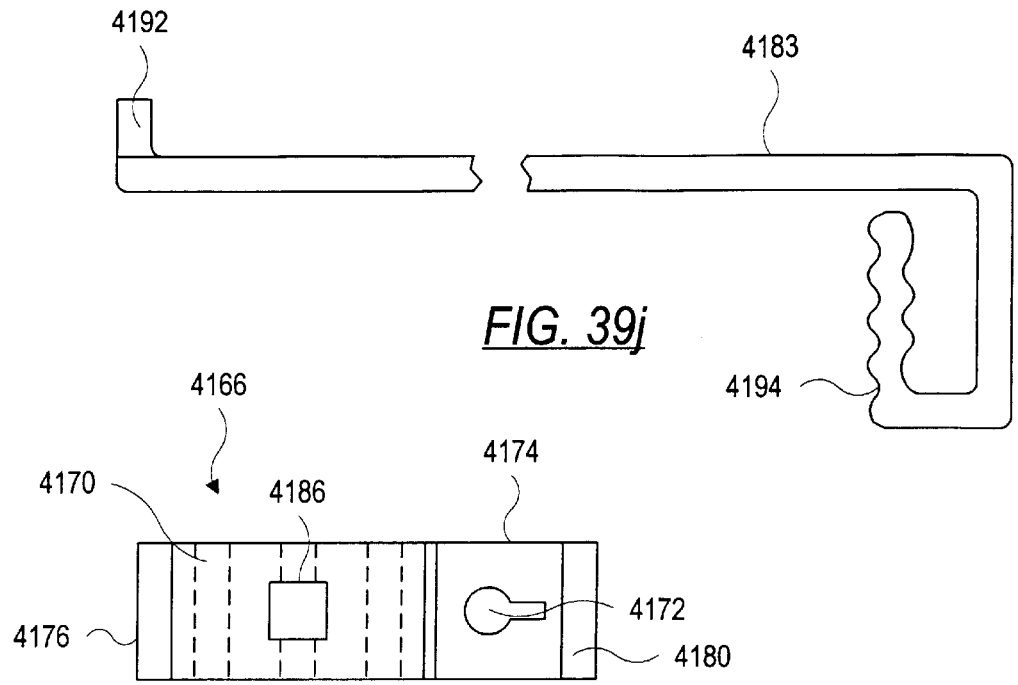
FIG. 39j
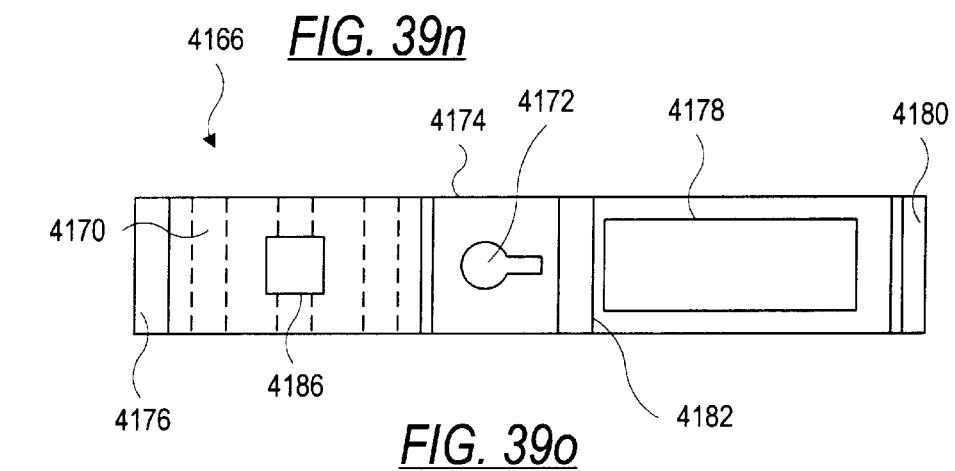
FIG. 39n
FIG. 39o
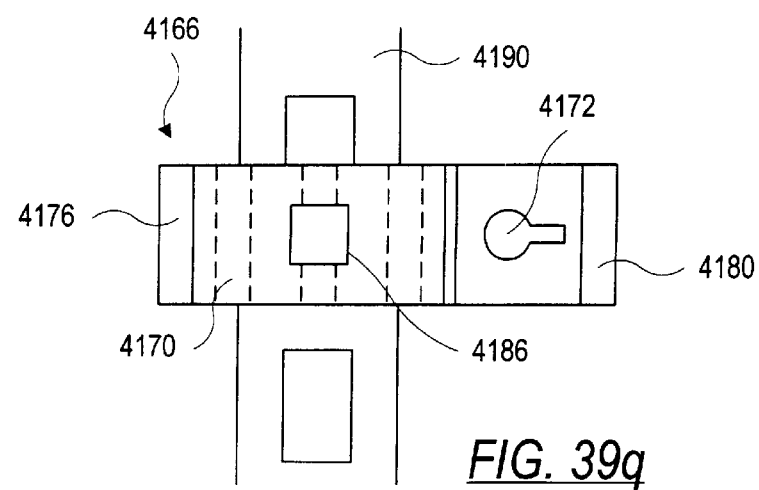
FIG. 39q

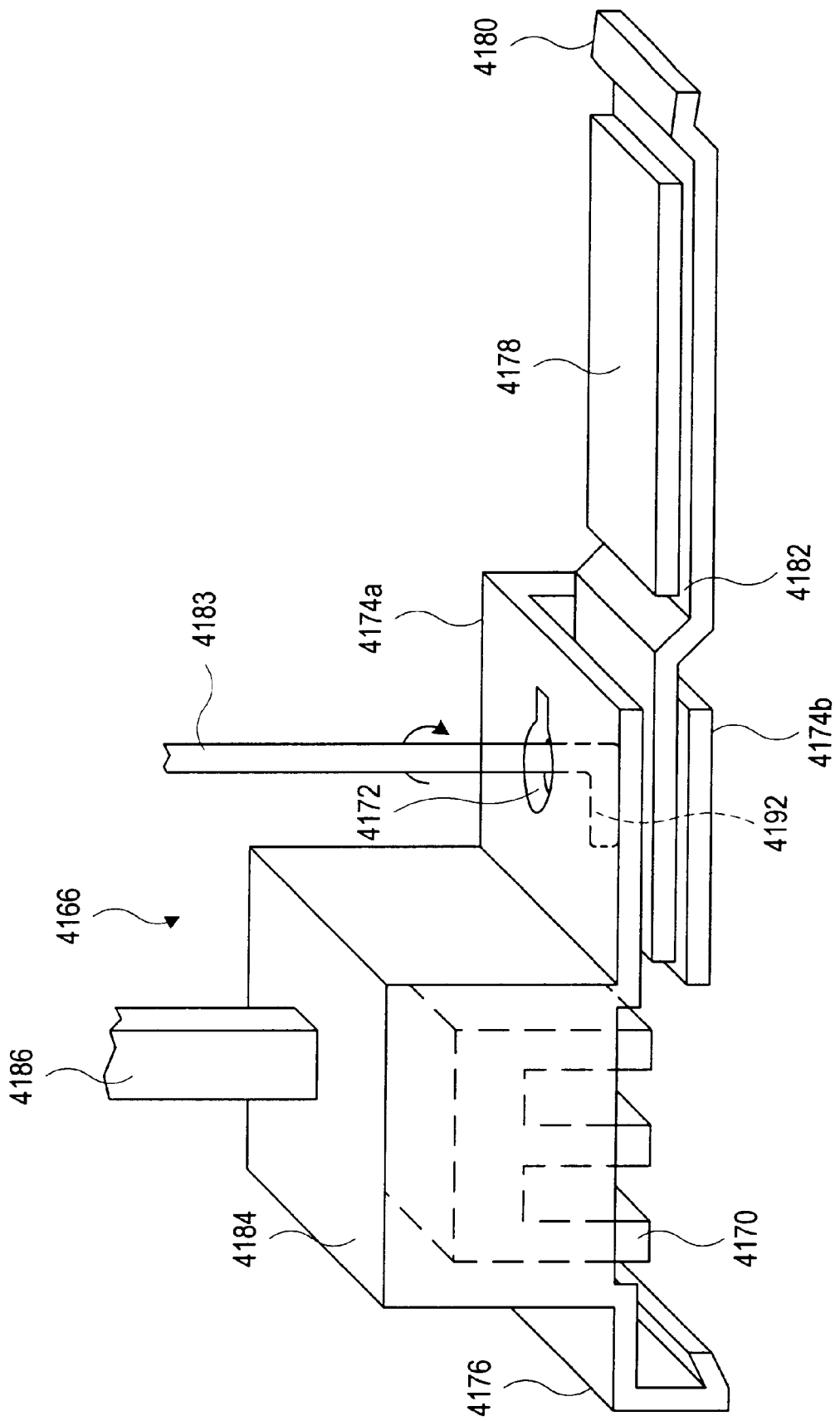

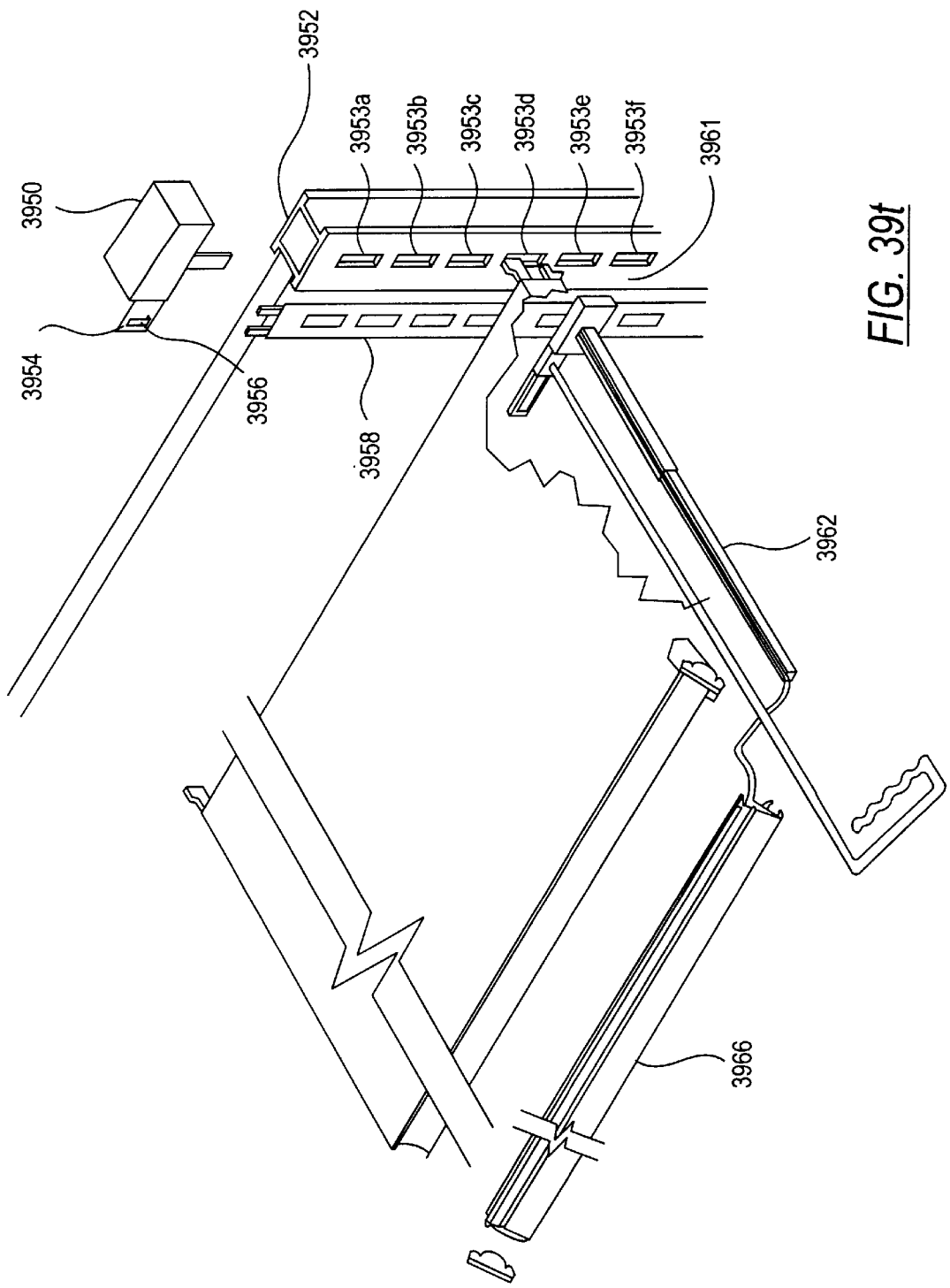

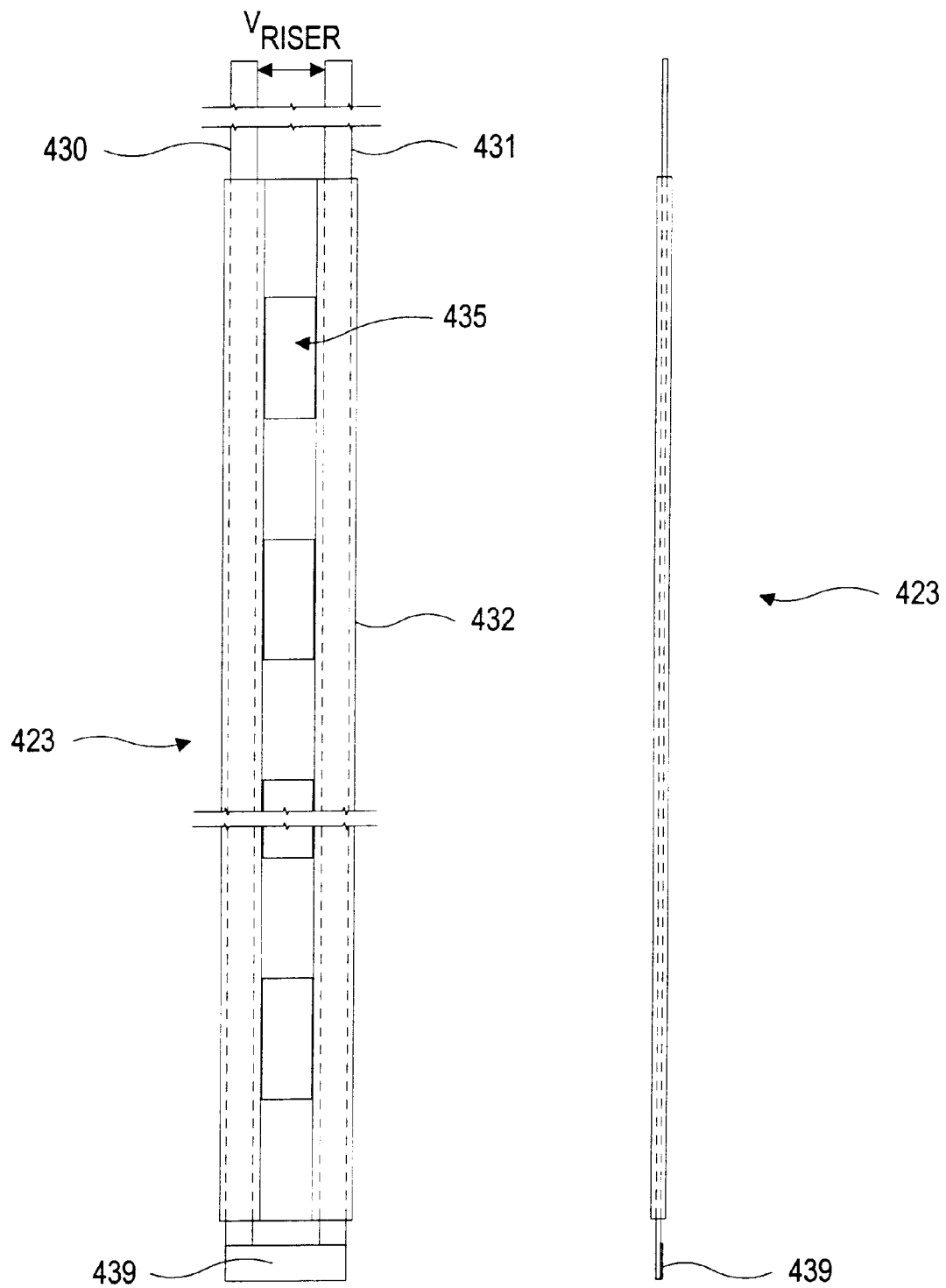
*FIG. 40g*  *FIG. 40g'*

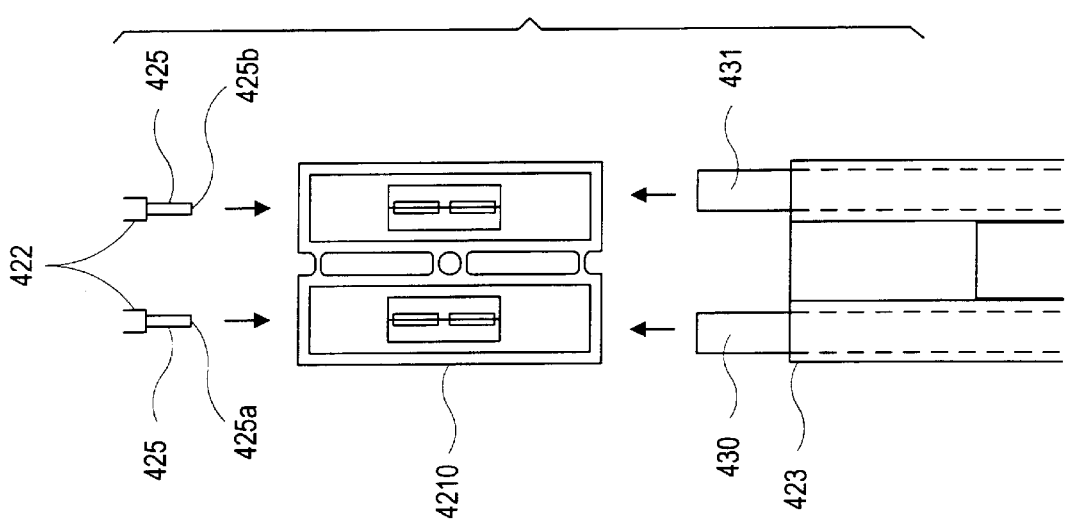
FIG. 41h
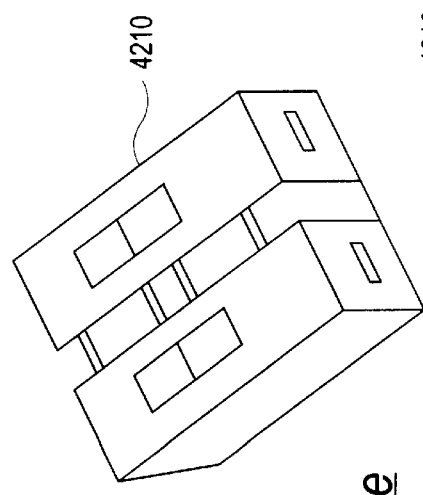
FIG. 41e
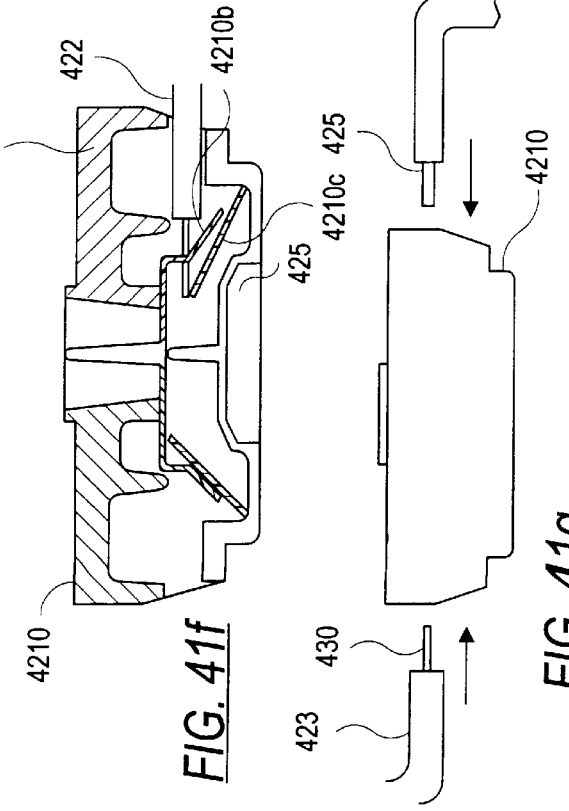
FIG. 41f
FIG. 41g

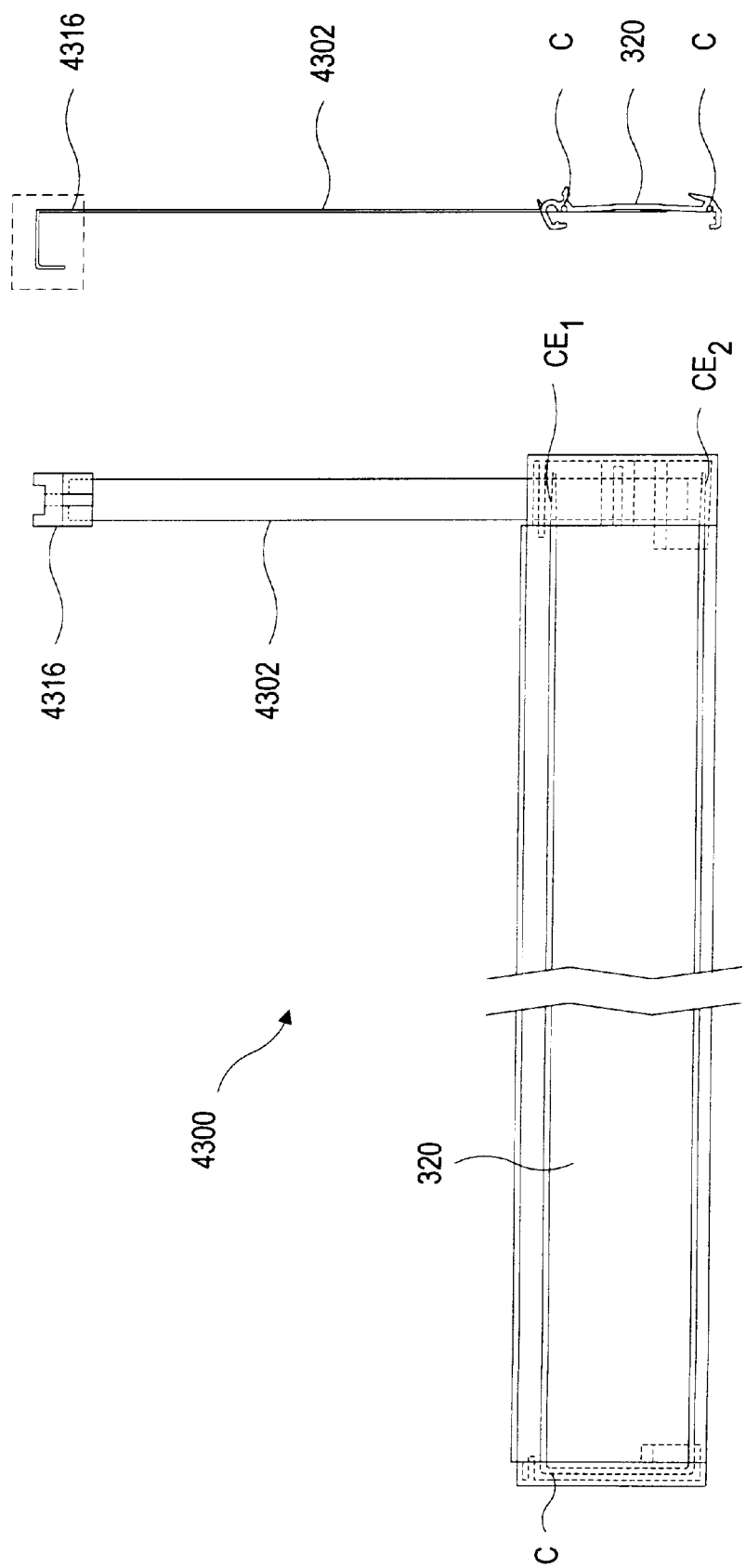

| OP COMMAND CODE DETAIL 00 - 0E |||||||
|---|---|---|---|---|---|
| HEX OP CODE | MNEMONIC | BYTES | FLAGS AFFECTED | DESCRIPTION | PC(I) |
| 00 | RES | 1 | CLR ALL | SET PC1 = 00  MODE = 0 | — |
| 01 | NOP | 1 | NONE | PC(I) = PC(I) + 1 | +1 |
| 02 | WAIT | 1 | I = 1 | WAIT FOR INTERRUPT | +1 |
| 03 | STOP | 1 | NONE | STOP OSCILLATOR | +1 |
| 04 | WATCH | 1 | NONE | RESTART WATCH DOG TIMER | +1 |
| 05 | EI | 1 | I = 1 | ENABLE INTERRUPTS | +1 |
| 06 | DI | 1 | I = 0 | DISABLE INTERRUPTS | +1 |
| 07 | RSF | 1 | Z, CY, GT, LT | Z = 0  CY = 0  GT = 0  LT = 0 | +1 |
| 08 | RET | 1 | M = 0 |  | +1 |
| 09 | EDP | 1 | D = 1 | ENABLE DISPLAY DRIVERS | +1 |
| 0A | DDP | 1 | D = 0 | DISABLE DISPLAY DRIVERS | +1 |
| 0B | EOSC | 1 | NONE | INCREMENT OSCILLATOR ADJUSTMENT | +1 |
| 0C | DOSC | 1 | NONE | DECREMENT OSCILLATOR ADJUSTMENT | +1 |
| 0D | DSPDL | 1 | NONE | SET DISPLAY SPEED LOW | +1 |
| 0E | DSPDH | 1 | NONE | SET DISPLAY SPEED HIGH | +1 |

*TABLE 1a*

| OP COMMAND CODE DETAIL 10 - 15 |||||||
|---|---|---|---|---|---|
| HEX OP CODE | MNEMONIC | BYTES | FLAGS AFFECTED | DESCRIPTION | PC(I) |
| 10 | JZ | 1 | NONE | if Z = 1, INCREMENT PC by 3, otherwise INCREMENT PC by 1 | +1 or +3 |
| 11 | JNZ | 1 | NONE | if Z = 0, INCREMENT PC by 3, otherwise INCREMENT PC by 1 | +1 or +3 |
| 12 | JC | 1 | NONE | if CY = 1, INCREMENT PC by 3, otherwise INCREMENT PC by 1 | +1 or +3 |
| 13 | JNC | 1 | NONE | if CY = 0, INCREMENT PC by 3, otherwise INCREMENT PC by 1 | +1 or +3 |
| 14 | JLT | 1 | NONE | if LT = 1, INCREMENT PC by 3, otherwise INCREMENT PC by 1 | +1 or +3 |
| 15 | JGT | 1 | NONE | if GT = 1, INCREMENT PC by 3, otherwise INCREMENT PC by 1 | +1 or +3 |

*TABLE 1b*

| OP COMMAND CODE DETAIL 20 - 2F ||||||
|---|---|---|---|---|---|
| HEX OP CODE | MNEMONIC | BYTES | FLAGS AFFECTED | DESCRIPTION | PC(I) |
| 20 | LDAL | 1 | NONE | LOAD 0 to AL(AL') | +1 |
| 21 | LDAL | 1 | NONE | LOAD 1 to AL(AL') | +1 |
| 22 | LDAL | 1 | NONE | LOAD 2 to AL(AL') | +1 |
| 23 | LDAL | 1 | NONE | LOAD 3 to AL(AL') | +1 |
| 24 | LDAL | 1 | NONE | LOAD 4 to AL(AL') | +1 |
| 25 | LDAL | 1 | NONE | LOAD 5 to AL(AL') | +1 |
| 26 | LDAL | 1 | NONE | LOAD 6 to AL(AL') | +1 |
| 27 | LDAL | 1 | NONE | LOAD 7 to AL(AL') | +1 |
| 28 | LDAL | 1 | NONE | LOAD 8 to AL(AL') | +1 |
| 29 | LDAL | 1 | NONE | LOAD 9 to AL(AL') | +1 |
| 2A | LDAL | 1 | NONE | LOAD A to AL(AL') | +1 |
| 2B | LDAL | 1 | NONE | LOAD B to AL(AL') | +1 |
| 2C | LDAL | 1 | NONE | LOAD C to AL(AL') | +1 |
| 2D | LDAL | 1 | NONE | LOAD D to AL(AL') | +1 |
| 2E | LDAL | 1 | NONE | LOAD E to AL(AL') | +1 |
| 2F | LDAL | 1 | NONE | LOAD F to AL(AL') | +1 |

TABLE 1c

| OP COMMAND CODE DETAIL 30 - 3F ||||||
|---|---|---|---|---|---|
| HEX OP CODE | MNEMONIC | BYTES | FLAGS AFFECTED | DESCRIPTION | PC(I) |
| 30 | LDAH | 1 | NONE | LOAD 0 to AH(AH') | +1 |
| 31 | LDAH | 1 | NONE | LOAD 1 to AH(AH') | +1 |
| 32 | LDAH | 1 | NONE | LOAD 2 to AH(AH') | +1 |
| 33 | LDAH | 1 | NONE | LOAD 3 to AH(AH') | +1 |
| 34 | LDAH | 1 | NONE | LOAD 4 to AH(AH') | +1 |
| 35 | LDAH | 1 | NONE | LOAD 5 to AH(AH') | +1 |
| 36 | LDAH | 1 | NONE | LOAD 6 to AH(AH') | +1 |
| 37 | LDAH | 1 | NONE | LOAD 7 to AH(AH') | +1 |
| 38 | LDAH | 1 | NONE | LOAD 8 to AH(AH') | +1 |
| 39 | LDAH | 1 | NONE | LOAD 9 to AH(AH') | +1 |
| 3A | LDAH | 1 | NONE | LOAD A to AH(AH') | +1 |
| 3B | LDAH | 1 | NONE | LOAD B to AH(AH') | +1 |
| 3C | LDAH | 1 | NONE | LOAD C to AH(AH') | +1 |
| 3D | LDAH | 1 | NONE | LOAD D to AH(AH') | +1 |
| 3E | LDAH | 1 | NONE | LOAD E to AH(AH') | +1 |
| 3F | LDAH | 1 | NONE | LOAD F to AH(AH') | +1 |

*TABLE 1d*

| OP COMMAND CODE DETAIL 40 - 4F ||||||
| HEX OP CODE | MNEMONIC | BYTES | FLAGS AFFECTED | DESCRIPTION | PC(I) |
| --- | --- | --- | --- | --- | --- |
| 40 | AND AL | 1 | Z | AL(AL') .AND. AL(AL') to AL(AL') | +1 |
| 41 | AND AH | 1 | Z | AL(AL') .AND. AH(AH') to AL(AL') | +1 |
| 42 | AND BL | 1 | Z | AL(AL').AND. BL(BL') to AL(AL') | +1 |
| 43 | AND BH | 1 | Z | AL(AL').AND. BH(BH') to AL(AL') | +1 |
| 44 | AND HL | 1 | Z | AL(AL') .AND. HL to AL(AL') | +1 |
| 45 | AND HM | 1 | Z | AL(AL').AND. HM to AL(AL') | +1 |
| 46 | AND HH | 1 | Z | AL(AL').AND. HH to AL(AL') | +1 |
| 47 | AND MEM | 1 | Z | AL(AL') .AND. [R(R')page0] to AL(AL') | +1 |
| 48 | OR AL | 1 | Z | AL(AL') .OR. AL(AL') to AL(AL') | +1 |
| 49 | OR AH | 1 | Z | AL(AL') .OR. AH(AH') to AL(AL') | +1 |
| 4A | OR BL | 1 | Z | AL(AL') .OR. BL(BL') to AL(AL') | +1 |
| 4B | OR BH | 1 | Z | AL(AL').OR. BH(BH') to AL(AL') | +1 |
| 4C | OR HL | 1 | Z | AL(AL').OR. HL to AL(AL') | +1 |
| 4D | OR HM | 1 | Z | AL(AL').OR. HM to AL(AL') | +1 |
| 4E | OR HH | 1 | Z | AL(AL').OR. HH to AL(AL') | +1 |
| 4F | OR MEM | 1 | Z | AL(AL') .OR. [R(R')page0] to AL(AL') | +1 |

*TABLE 1e*

| OP COMMAND CODE DETAIL 50 - 5F ||||||
|---|---|---|---|---|---|
| HEX OP CODE | MNEMONIC | BYTES | FLAGS AFFECTED | DESCRIPTION | PC(I) |
| 50 | CMP AL | 1 | Z, GT, LT | AL(AL') - AL(AL') | +1 |
| 51 | CMP AH | 1 | Z, GT, LT | AL(AL') - AH(AH') | +1 |
| 52 | CMP BL | 1 | Z, GT, LT | AL(AL')- BL(BL') | +1 |
| 53 | CMP BH | 1 | Z, GT, LT | AL(AL')- BH(BH') | +1 |
| 54 | CMP HL | 1 | Z, GT, LT | AL(AL') - HL | +1 |
| 55 | CMP HM | 1 | Z, GT, LT | AL(AL') - HM | +1 |
| 56 | CMP HH | 1 | Z, GT, LT | AL(AL') - HH | +1 |
| 57 | CMP MEM | 1 | Z, GT, LT | AL(AL') - [R(R')page0] | +1 |
| 58 | XOR AL | 1 | Z | AL(AL').XOR.AL(AL') to AL(AL') | +1 |
| 59 | XOR AH | 1 | Z | AL(AL').XOR.AH(AH') to AL(AL') | +1 |
| 5A | XOR BL | 1 | Z | AL(AL').XOR.BL(BL') to AL(AL') | +1 |
| 5B | XOR BH | 1 | Z | AL(AL').XOR.BH(BH') to AL(AL') | +1 |
| 5C | XOR HL | 1 | Z | AL(AL').XOR.HL to AL(AL') | +1 |
| 5D | XOR HM | 1 | Z | AL(AL').XOR.HM to AL(AL') | +1 |
| 5E | XOR HH | 1 | Z | AL(AL').XOR.HH to AL(AL') | +1 |
| 5F | XOR MEM 1 | 1 | Z | AL(AL').XOR.[R(R')page0] to AL(AL') | +1 |

*TABLE 1f*

| OP COMMAND CODES DETAIL 60 - 6F |||||||
|---|---|---|---|---|---|
| HEX OP CODE | MNEMONIC | BYTES | FLAGS AFFECTED | DESCRIPTION | PC(I) |
| 60 | ADC AL | 1 | Z, CY | AL(AL') + CY + AL(AL') to AL(AL') | +1 |
| 61 | ADC AH | 1 | Z, CY | AL(AL') + CY + AH(AH') to AL(AL') | +1 |
| 62 | ADC BL | 1 | Z, CY | AL(AL') + CY + BL(BL') to AL(AL') | +1 |
| 63 | ADC BH | 1 | Z, CY | AL(AL') + CY + BH(BH') to AL(AL') | +1 |
| 64 | ADC HL | 1 | Z, CY | AL(AL') + CY + HL to AL(AL') | +1 |
| 65 | ADC HM | 1 | Z, CY | AL(AL') + CY + HM to AL(AL') | +1 |
| 66 | ADC HH | 1 | Z, CY | AL(AL') + CY + HH to AL(AL') | +1 |
| 67 | ADC MEM | 1 | Z, CY | AL(AL') + CY + [R(R')page0] to AL(AL') | +1 |

TABLE 1g

| OP COMMAND CODE DETAIL 70 - 7F |||||||
|---|---|---|---|---|---|
| HEX OP CODE | MNEMONIC | BYTES | FLAGS AFFECTED | DESCRIPTION | PC(I) |
| 70 | INC AL | 1 | CY | AL(AL') = AL(AL') + 1 CY from b3 (4 bit) | +1 |
| 71 | INC R | 1 | NONE | R(R') = R(R') + 1 (8 bits) | +1 |
| 72 | INC I | 1 | Z | I = I + 1 CY from b7 (8 bits) | +1 |
| 73 | INC H | 1 | NONE | H = H + 1 (12 bits) | +1 |
| 74 | DEC AL | 1 | Z | AL(AL')=AL(AL') - 1 | +1 |
| 75 | DEC R | 1 | NONE | R(R') = R(R') -1 (8 bits) | +1 |
| 76 | DEC I | 1 | Z | I = I - 1 (8 bits) | +1 |
| 77 | DEC H | 1 | NONE | H = H -1 (12 bits) | +1 |
| 78 | NOT AL | 1 | NONE | AL(AL') = $\overline{AL(AL')}$ | +1 |

TABLE 1h

| OP COMMAND CODE DETAIL 80 - 8F |||||||
|---|---|---|---|---|---|
| HEX OP CODE | MNEMONIC | BYTES | FLAGS AFFECTED | DESCRIPTION | PC(I) |
| 80 | MOV AL AL | 1 | NONE | UNDEFINED | +1 |
| 81 | MOV AL AH | 1 | NONE | MOVE AH(AH') to AL(AL') | +1 |
| 82 | MOV AL BL | 1 | NONE | MOVE BL(BL') to AL(AL') | +1 |
| 83 | MOV AL BH | 1 | NONE | MOVE BH(BH') to AL(AL) | +1 |
| 84 | MOV AL HL | 1 | NONE | MOVE HL to AL(AL') | +1 |
| 85 | MOV AL HM | 1 | NONE | MOVE HM to AL(AL') | +1 |
| 86 | MOV AL HH | 1 | NONE | MOVE HH to AL(AL') | +1 |
| 87 | MOV AL MEM | 1 | NONE | MOVE [R(R')page0] to AL(AL') | +1 |
| 88 | MOV AH AL | 1 | NONE | MOVE AL(AL') to AH(AH') | +1 |
| 89 | MOV AH AH | 1 | NONE | UNDEFINED | +1 |
| 8A | MOV AH BL | 1 | NONE | MOVE BL(BL') to AH(AH') | +1 |
| 8B | MOV AH BH | 1 | NONE | MOVE BH(BH') to AH(AH') | +1 |
| 8C | MOV AH HL | 1 | NONE | MOVE HL to AH(AH') | +1 |
| 8D | MOV AH HM | 1 | NONE | MOVE HM to AH(AH') | +1 |
| 8E | MOV AH HH | 1 | NONE | MOVE HH to AH(AH') | +1 |
| 8F | MOVAH MEM | 1 | NONE | MOVE [R(R')page0] to AH(AH') | +1 |

*TABLE 1i*

| OP COMMAND CODE DETAIL 90 - 9F ||||||
| --- | --- | --- | --- | --- | --- |
| HEX OP CODE | MNEMONIC | BYTES | FLAGS AFFECTED | DESCRIPTION | PC(I) |
| 90 | MOV BL AL | 1 | NONE | MOVE AL(AL') to BL (BL') | +1 |
| 91 | MOV BL AH | 1 | NONE | MOVE AH(AH') to BL(BL') | +1 |
| 92 | MOV BL BL | 1 | NONE | UNDEFINED | +1 |
| 93 | MOV BL BH | 1 | NONE | MOVE BH(BH') to BL(BL') | +1 |
| 94 | MOV BL HL | 1 | NONE | MOVE HL to BL(BL') | +1 |
| 95 | MOV BL HM | 1 | NONE | MOVE HM to BL(BL') | +1 |
| 96 | MOV BL HH | 1 | NONE | MOVE HH to BL(BL') | +1 |
| 97 | MOV BL MEM | 1 | NONE | MOVE [R(R')page0] to | +1 |
| 98 | MOV BH AL | 1 | NONE | MOVE AL(AL') to BH(BH') | +1 |
| 99 | MOV BH AH | 1 | NONE | MOVE AH(AH') to BH(BH') | +1 |
| 9A | MOV BH BL | 1 | NONE | MOVE BL(BL') to BH(BH') | +1 |
| 9B | MOV BH BH | 1 | NONE | UNDEFINED | +1 |
| 9C | MOV BH HL | 1 | NONE | MOVE HL to BH(BH') | +1 |
| 9D | MOV BH HM | 1 | NONE | MOVE HM to BH(BH') | +1 |
| 9E | MOV BH HH | 1 | NONE | MOVE HH to BH(BH') | +1 |
| 9F | MOV BH MEM | 1 | NONE | MOVE [R(R')page0] to BH(BH') | +1 |

*TABLE 1j*

| OP COMMAND CODE DETAIL A0 - AF |||||||
|---|---|---|---|---|---|
| HEX OP CODE | MNEMONIC | BYTES | FLAGS AFFECTED | DESCRIPTION | PC(I) |
| A0 | MOV HL AL | 1 | NONE | MOVE AL(AL') to HL | +1 |
| A1 | MOV HL AH | 1 | NONE | MOVE AH(AH') to HL | +1 |
| A2 | MOV HL BL | 1 | NONE | MOVE BL(BL') to HL | +1 |
| A3 | MOV HL BH | 1 | NONE | MOVE BH(BH') to HL | +1 |
| A4 | MOV HL HL | 1 | NONE | UNDEFINED | +1 |
| A5 | MOV HL HM | 1 | NONE | MOVE HM to HL | +1 |
| A6 | MOV HL HH | 1 | NONE | MOVE HH to HL | +1 |
| A7 | MOV HL MEM | 1 | NONE | MOVE [R(R')page0] to | +1 |
| A8 | MOV HM AL | 1 | NONE | MOVE AL(AL') to HM | +1 |
| A9 | MOV HM AH | 1 | NONE | MOVE AH(AH') to HM | +1 |
| AA | MOV HM BL | 1 | NONE | MOVE BL(BL') to HM | +1 |
| AB | MOV HM BH | 1 | NONE | MOVE BH(BH') to HM | +1 |
| AC | MOV HM HL | 1 | NONE | MOVE HL to HM | +1 |
| AD | MOV HM HM | 1 | NONE | UNDEFINED | +1 |
| AE | MOV HM HH | 1 | NONE | MOVE HH to HM | +1 |
| AF | MOV HM MEM | 1 | NONE | MOVE [R(R')page0] to HM | +1 |

_TABLE 1k_

| OP COMMAND CODE DETAIL B0 - BF ||||||
|---|---|---|---|---|---|
| HEX OP CODE | MNEMONIC | BYTES | FLAGS AFFECTED | DESCRIPTION | PC(I) |
| B0 | MOV HH AL | 1 | NONE | MOVE AL(AL') to HH | +1 |
| B1 | MOV HH AH | 1 | NONE | MOVE AH(AH') to HH | +1 |
| B2 | MOV HH BL | 1 | NONE | MOVE BL(BL') to HH | +1 |
| B3 | MOV HH BH | 1 | NONE | MOVE BH(BH') to HH | +1 |
| B4 | MOV HH HL | 1 | NONE | MOVE HL to HH | +1 |
| B5 | MOV HH HM | 1 | NONE | MOVE HM to HH | +1 |
| B6 | MOV HH HH | 1 | NONE | UNDEFINED | +1 |
| B7 | MOV HH MEM | 1 | NONE | HMHOVE [R(R')page0] to | +1 |
| B8 | MOV MEM AL | 1 | NONE | MOVE AL(AL') to[R(R')page0] | +1 |
| B9 | MOV MEM AH | 1 | NONE | MOVE AH(AH') to[R(R')page0] | +1 |
| BA | MOV MEM BL | 1 | NONE | MOVE BL(BL') to[R(R')page0] | +1 |
| BB | MOV MEM BH | 1 | NONE | MOVE BH(BH') to[R(R')page0] | +1 |
| BC | MOV MEM HL | 1 | NONE | MOVE HL to[R(R')page0] | +1 |
| BD | MOV MEM HM | 1 | NONE | MOVE HM to [R(R')page0] | +1 |
| BE | MOV MEM HH | 1 | NONE | MOVE HH to [R(R')page0] | +1 |
| BF | MOV MEM ME | 1 | NONE | UNDEFINED | +1 |

*TABLE 1I*

| OP COMMAND CODE DETAIL C0 - CF ||||||
|---|---|---|---|---|---|
| HEX OP CODE | MNEMONIC | BYTES | FLAGS AFFECTED | DESCRIPTION | PC(I) |
| C0 | MEM1 | 1 | NONE | MOVE AL(AL') to[R(R')page1] | +1 |
| C1 | MEM2 | 1 | NONE | MOVE AL(AL') to[R(R')page2] | +1 |
| C2 | GMEM1 | 1 | NONE | MOVE FROM[R(R')page1] to AL(AL') | +1 |
| C3 | GMEM2 | 1 | NONE | MOVE FROM[R(R')page2] to AL(AL') | +1 |
| C4 | MOV R,H | 1 | NONE | MOVE HM, HL to R(R') (8 bits) | +1 |
| C5 | MOV H,R | 1 | NONE | MOVE R(R') to HM, HL(8 bits) | +1 |
| C6 | MOV PC,H | 1 | NONE | MOVE H to PC0(12 bits) | +1 |
| C7 | MOV PC1,H |  |  | MOVE H to PC1(12 bits) | +1 |
| C8 | MOV A,[H] | 1 | NONE | MOVE [H] to AH(AH'), AL(AL') (8 bits) | +1 |
| C9 | MOV R, [H] | 1 | NONE | MOVE [H] to R(R') (8 bits) | +1 |
| CA | MOV I,[H] ? |  |  |  |  |
| CC | SL A | 1 | NONE | shift left 8 bit AH(AH'), AL (AL'), b7 to CY | +1 |
| CD | SR A | 1 | NONE | shift right 8 bit AH(AH'), AL (AL'), b0 to CY | +1 |
| CE | ROTLA | 1 | CY | shift left 8 bit AH(AH'), AL (AL'), b7-b0 | +1 |

TABLE 1m

| OP COMMAND CODE DETAIL D0 - DF |||||||
|---|---|---|---|---|---|
| HEX OP CODE | MNEMONIC | BYTES | FLAGS AFFECTED | DESCRIPTION | PC(I) |
| D0 | LDR | 2 | NONE | MOVE [PC(I) + 1] to R(R') | +1 |
| D1 | LDI | 2 | NONE | MOVE [PC(I) + 1] to I (8 bits) | +1 |
| D2 | LDH | 2 | NONE | MOVE [PC(I) + 1] to HM, HL | +1 |
| D3 | LDHH | 2 | NONE | MOVE b3b2b1 b0 from [PC(I) + 1] to HH | +1 |

*TABLE 1n*

| OP COMMAND CODE DETAIL<br>E0 - EF ||||||
|---|---|---|---|---|
| HEX OP CODE | MNEMONIC | BYTES | FLAGS AFFECTED | DESCRIPTION |
| E0 | JMP | 2 | NONE | MOVE [PC(I)] b3b2b1b0 to PC(I) b11b10b9b8 |
| E1 | JMP | 2 | NONE | MOVE [PC(I) + 1] to PC(I) b7b6b5b4b3b2b1b0 |
| E2 | JMP | 2 | NONE | |

TABLE 1o

| Receive | Cmd_Code Buffer | Cmd_Data Buffer | Mode_Reg Buffer | Mode_Buff Buffer | Com_Buff Buffer |
|---|---|---|---|---|---|
| Activate: | | | | | |
| AVS | 1H | (XXX) | N/A | N/A | N/A |
| AVZ | 1H | (OOO) | N/A | N/A | N/A |
| AVA | 1H | (FFF) | N/A | N/A | N/A |
| Search: | | | | | |
| SRH | 2H | (X__) | N/A | N/A | N/A |
| SRM | 3H | (X__) | N/A | N/A | N/A |
| SRL | 4H | (X__) | N/A | N/A | N/A |
| Latch: | | | | | |
| LTH | 5H | (X__) | N/A | N/A | N/A |
| LTM | 6H | (X__) | N/A | N/A | N/A |
| Service: | | | | | |
| SIQ | 7H | N/A | N/A | N/A | N/A |
| Dump: | | | | | |
| DPS | 8H | N/A | N/A | N/A | N/A |
| DPC | 9H | N/A | N/A | N/A | N/A |
| DPH | AH | N/A | N/A | N/A | N/A |
| Load: | | | | | |
| LOD_COM | BH | N/A | N/A | (XX) | (X=<32) |
| LOD_ALT | CH | N/A | N/A | N/A | N/A |
| Action: | | | | | |
| ACT_CRB | DH | (00_) | N/A | N/A | N/A |
| ACT_CRD | DH | (11_) | N/A | N/A | N/A |
| ACT_CRV | DH | (22_) | N/A | N/A | N/A |
| ACT_VCB | DH | (33_) | N/A | N/A | N/A |
| ACT_VWD | DH | (44_) | N/A | N/A | N/A |
| ACT_VST | DH | (55_) | N/A | N/A | N/A |
| ACT_SFT | DH | (66_) | N/A | N/A | N/A |
| ACT_PRG | DH | (77_) | N/A | N/A | N/A |
| ACT_UPC | DH | (88_) | N/A | N/A | N/A |
| ACT_DSP | DH | (99_) | N/A | N/A | N/A |
| ACT_MOD | DH | (AA_) | (XX) | N/A | N/A |
| ACT_SWP | DH | (BB_) | N/A | N/A | N/A |
| ACT_CLB | DH | (CC_) | N/A | N/A | (-0-) |
| ACT_CLS | DH | (DD_) | N/A | N/A | N/A |
| ACT_RST | DH | (EE_) | N/A | N/A | N/A |
| ACT_HRD | DH | (FF_) | N/A | N/A | N/A |
| Vdump: | EH | N/A | N/A | N/A | N/A |
| Vload: | FH | N/A | N/A | N/A | N/A |

*TABLE 2*

| TAG MEMORY MAP | | |
|---|---|---|
| PAGE0_RAM | | |
| MfgCode_Msn | BYTESIZE | 00H |
| MFGMsn | nibble | DH |
| MfgCode_Lsn | BYTESIZE | 01H |
| NFGLsn | nibble | EH |
| Firmware_Rev | BYTESIZE | 02H |
| FWRev | nibble | 2 |
| Assembly_Rev | BYTESIZE | 03H |
| ASSYRev | nibble | BH |
| Lcd_Rev | BYTESIZE | 04H |
| LCDRev | nibble | 0 |
| | | |
| Vector1_Ram | BYTESIZE | 05H |
| Vect1Page | BYTESIZE | 05H |
| Vect1Addr_High | BYTESIZE | 06H |
| Vect1Addr_Low | BYTESIZE | 07H |
| Vect1Seg_High | BYTESIZE | 08H |
| Vect1Seg_Low | BYTESIZE | 09H |
| Vector2_Ram | BYTESIZE | 0AH |
| Vect2Page | BYTESIZE | 0AH |
| Vect2Addr_High | BYTESIZE | 0BH |
| Vect2Addr_Low | BYTESIZE | 0CH |
| Vect2Seq_High | BYTESIZE | 0DH |
| Vect2Seq_Low | BYTESIZE | 0EH |
| | | |
| Osc_Adj_Buff | BYTESIZE | 0FH |
| Sync_Buff_Low | BYTESIZE | I0H |
| Sync_Buff_High | BYTESIZE | 11H |
| Disp_Buff_Low | BYTESIZE | 12H |
| Disp_Buff_High | BYTESIZE | 13H |
| | | |
| Button_Input | BYTESIZE | 14H |
| Button_Flags | BYTESIZE | 15H |

*TABLE 3a*

| | | |
|---|---|---|
| Mode1_Flags | BYTESIZE | 16H |
| freq_mode | nibble | 1 |
| disp_mode | nibble | 2 |
| lcd_mode | nibble | 4 |
| upc_mode | nibble | 8 |
| Mode2_Flags | BYTESIZE | 17H |
| setup_mode | nibble | 1 |
| entry_mode | nibble | 2 |
| dspack_mode | nibble | 4 |
| vector_mode | nibble | 8 |
| Soft_Buff_High | BYTESIZE | 18H |
| Soft_Buff_Mid | BYTESIZE | l9H |
| Soft_Buff_Low | BYTESIZE | 1AH |
| | | |
| CRC_Buff_High | BYTESIZE | 1BH |
| CRC_Buff_Mid | BYTESIZE | 1CH |
| CRC_Buff_Low | BYTESIZE | 1DH |
| | | |
| Rxd_Txd_Buff | BYTESIZE | 1EH |
| Proc_Page | BYTESIZE | 1FH |
| Dump_Index | BYTESIZE | 20H |
| SeqIndex1_Low | BYTESIZE | 21H |
| SeqIndex1_High | BYTESIZE | 22H |
| SeqIndex2_Low | BYTESIZE | 23H |
| SeqIndex2_High | BYTESIZE | 24H |
| | | |
| Cmd_Code_Buff | BYTESIZE | 25H |
| Cmd_Data1 | BYTESIZE | 26H |
| Cmd_Data2 | BYTESIZE | 27H |
| Cmd_Data3 | BYTESIZE | 28H |
| | | |
| Proc1_Flags | BYTESIZE | 29H |
| active proc | nibble | 1 |
| activate_proc | nibble | 2 |
| TBD4_proc | nibble | 4 |
| TBD8 proc | nibble | 8 |
| Proc2_Flags | BYTESIZE | 2AH |
| ack_proc | nibble | 1 |
| dump proc | nibble | 2 |
| action proc | nibble | 4 |
| start proc | nibble | 8 |

*TABLE 3b*

| | | |
|---|---|---|
| Status_Flags | BYTESIZE | 2BH |
| reset_stat | nibble | 1 |
| button_stat | nibble | 2 |
| fail_stat | nibble | 4 |
| watch_stat | nibble | 8 |
| | | |
| But_Code_Buff | BYTESIZE | 2CH |
| Button_Index | BYTESIZE | 2DH |
| | | |
| Model_Buff | BYTESIZE | 2EH |
| Mode2_Buff | BYTESIZE | 2FH |
| Com_Buff_Start | BYTESIZE | 30H |
| USER_RAM | BYTESIZE | 50H |
| Upc_Ram_Start | BYTESIZE | 60H |
| PAGE1_RAM | BYTESIZE | 00H |
| Alt_Ram_Start | BYTESIZE | 00H |
| | | |
| PAGE2_RAM | BYTESIZE | 80H |
| Disp_Ram_Start | BYTBSIZE | |

*TABLE 3c*

| PAGE 0 RAM MAP |||||
|---|---|---|---|---|
| HEX ADD | DECODE b7--b4 | DECODE b3--b0 | R/W | DESCRIPTION |
| 00 - 4F | | | R/W | Scratch Pad |
| 60 - 7F | | | R/W | Scan Ram |
| use 81 | 1 0 0 0 | X X X 1 | W | Programable Timer b3 - - - b0 |
| use 82 | 1 0 0 0 | X X 1 X | W | Programable Timer b7 - - - b4 |
| use 84 | 1 0 0 0 | X 1 X X | W | Programable Timer s3 - - - s0 |
| | | | | s3 = 0 : divide by N mode<br>s3 + 1 : count down & stop mode<br>s2 + 1 : select disp clk as input, run<br>s1 + 1 : select sync clk as input, run<br>s0 = 1 : select carrier as input, run |
| use 91 | 1 0 0 1 | X X X 1 | W | Display Counter b3 - - - b0 |
| use 92 | 1 0 0 1 | X X 1 X | W | Display Counter X X b5 b4 |
| use A1 | 1 0 1 0 | X X X 1 | W | Sync Counter b3 - - - b0 |
| use A2 | 1 0 1 0 | X X 1 X | W | Sync Counter X X b5 b4 |
| use B0 | 1 0 1 1 | X X X X | W | Monostable Counter b4 - - - b1 (b0 = 0) |
| use C0 | 1 1 0 0 | X X X X | W | Comm Counter s3 b2 b1 b0 |
| | | | | s3 = 0 : sync clk input<br>s3 = 1 : 2 X carrier input |
| use D0 | 1 1 0 1 | X 0 0 0 | R/W | Serial No Register b3 - - - b0 |
| use D1 | 1 1 0 1 | X 0 0 1 | R/W | Serial No Register b7 - - - b4 |
| use D2 | 1 1 0 1 | X 0 1 0 | R/W | Serial No Register b11 - - - b8 |
| use D3 | 1 1 0 1 | X 0 1 1 | R/W | Serial No Register b15 - - - b12 |
| use D4 | 1 1 0 1 | X 1 X X | R/W | Serial No Register b 19 - - - b16 |
| use E0 | 1 1 1 0 | X X X X | R/W | Interupt Mask b3 - - - b0 |
| | | | | b3 = scan, b2 = prog, b1 = disp clk, b0 - mono |
| use F0 | 1 1 1 1 | X X X X | R/W | I / O Port |
| | | | | b3 = sw1 input, b2 = sw2 input, b1 = comm output,<br>b0 = comm input |

TABLE 4

ARTICLE-INFORMATION DISPLAY SYSTEM USING ELECTRONICALLY CONTROLLED TAGS

CROSS-REFERENCE TO RELATED APPLICATIONS

This application claims the benefit of copending Provisional Patent Application Ser. Nos. 60/061,780 filed Oct. 10, 1997 and 60/067,336 filed Dec. 2, 1997.

FIELD OF THE INVENTION

The present invention relates generally to an easily installed, modular article information-display system (which can include two-way communication) for use in facilities having a multitude of different articles, the system being controlable from a central location, and having three modes of operation. The three modes all the display of three types of information: information visible to the naked eye displayed electronically; paper tags; and information which is inperceptible to the human eye. The system provides power and displays information for the individual articles and the displays can be updated from a central location. Where the facility is a store, for example, the invention is useful for displaying the price and name of each product on electronic display tags adjacent the respective products. The system also audits the information to ensure accuracy and allows for central office control of the tags. The system can be installed easily without removing articles from the shelves of a store using a telescoping part to carry wire.

BACKGROUND OF THE INVENTION

There have been a number of proposals to automate retail price displays by the use of electronic price tags. To the extent such systems replace printed price tags, these systems are appealing to store owners because they reduce or eliminate the need to reprint and replace item price tags each time the price of an item is changed. This benefits the retailer by reducing or eliminating: the labor required to replace the price tags; the possibility of human error in replacing the price tags; the time lag involved in changing prices; and the difficulty in changing a large number of prices at once. Perhaps most importantly, such systems have the ability to overcome price discrepancies between the tag and the checkout scanners. The system allows for control from a central location.as well as auditing of information on the tags from a central location.

Problems have been encountered, however, in providing the requisite information and power to the electronic tags at a reasonable cost. Also, some systems still require, but do not provide, printed product description labels on the tags to supplement the electronic tags and thus do not eliminate the problems they were intended to solve. In systems in which the electronic tags are hard wired, installation and removal of the electronic tags and of the shelves, gondolas or other display or storage structures on which the tags are located is expensive and impractical. Systems which use exposed wires and connectors can subject the system to damage from physical contact with objects and from electrostatic discharges, spillage and surface oxides. Other systems lack the ability to adequately verify the accuracy of the displays and the proper functioning of the electronic tags while the system is in operation.

A number of wireless display systems have been proposed which rely on infrared, acoustic, or radio frequency broadcast for transmission of product information to the display tags. These wireless tags require a battery for powering each tag. Adding a battery to the tag increases the cost of each tag and can make the overall system unaffordable for many applications. Moreover, since a single retail establishment often contains as many as 20,000 to 50,000 display tags, replacement of the batteries and reprogramming such a large number of tags is time-consuming and costly. The radiated signals can also be shielded, for example, by steel freezer cases, causing communication "dead spots" in a store. Moreover, disposing of batteries has an adverse environmental impact. If there are just 50,000 installations with 20,000 tags each, that is a billion batteries that have to be disposed of on a routine basis, and the labor involved in replacing the batteries and reprogramming at each battery change is costly as well. Effective use of such systems requires a battery management system so that the batteries can be replaced before failure, or before the quality of the tag's display diminishes to an unacceptable level. Further, because the tags in a wireless system generally do not communicate problems to the computer, the tags have to be visually monitored to identify problems such as bad or faint tags.

Another problem in most previously proposed electronic display tag systems is that the tags have been relatively thick, causing them to protrude from the shelf rails on which they are mounted. Protruding tags are subject to damage by shopping carts, and they can impede the movement of store customers within the aisles. Further, the protrusion of the tags into the aisle invites tampering and can result in theft of the electronic tags.

Previous systems do not allow the system to display multiple layers of information. That is, previous systems could not display two types of information whereby the display of the first mode of information does not diminish the display of the second mode.

SUMMARY OF THE INVENTION

It is an important object of the present invention to provide a novel and improved electronically controlled display tag system which can be assembled, installed and maintained by relatively unskilled workers.

Another important object of the present invention to provide an improved electronically controlled display tag system in which the tags do not require hard wired connections, as a result of which the tags can be economically installed, moved, produced and maintained with a high degree of reliability.

It is another object of this invention to provide an improved electronically controlled display tag system which is extremely energy-efficient and which can both operate and sustain the informational content of display tags during prolonged power outages by using hard addresses to sustain operation.

Another important object of this invention is to provide an improved electronically controlled display tag system in which each tag is a sealed unit having such that it is less susceptible to being damaged by the spillage of products stored adjacent the tags, and so that there are no exposed electrical contacts subject to corrosion or ESD.

A further important object of this invention is to provide an improved electronically controlled display tag system which permits the display of a variety of different types of product information such as prices, product descriptions, unit prices, multilingual information and the like in the form of electronically displayed visual information, paper tags, and information displayed electronically which is inperceptible to the human eye.

It is another important object of this invention to provide such an improved electronically controlled display tag system having a wiring system which facilitates and simplifies the installation of the many feet of wire utilized in such a system. In this connection, a related object of the invention is to provide such an improved wiring system which also facilitates and simplifies re-location of gondolas or of the shelves within a gondola.

It is yet another object of the invention to provide a low-cost method using factory-produced standard modules that are easily fitted together.

It is a further important object of the present invention to provide redundant power to a plurality of tags so that upon failure of a conductor, power will still be distributed to the tags.

A further object of this invention is to provide an improved electronic display tag system which provides two-way communication between the display tags and a controller or controllers for the tags.

A related object is to provide such an improved display tag system which permits continual verification of the accuracy of the displays and the proper functioning of the various display tags.

Yet another object of this invention is to provide an improved electronically controlled display tag system which does not rely on radio frequency (RF) signals or infrared signals to communicate with the tags and thus is not susceptible to problems from blockage or shielding of such signals or interference from other equipment using similar frequencies.

A still further object of the invention is to provide an improved electronically controlled display tag system which permits the display tags to be located essentially at any desired position along the lengths of the shelves on which the products are located.

Another object of this invention is to provide an improved electronically controlled display tag system which does not emit an objectionable level of electromagnetic energy.

Still another object of this invention is to provide an improved electronically controlled display tag system which can be easily and efficiently initialized.

It is also an object of this invention to provide an improved electronically controlled display tag system which uses a method of mounting the functional elements which deters tampering and reduces the possibility of damage.

Another object is to provide an improved electronically controlled display tag system which is extremely reliable and has a relatively small number of parts so as to provide a high MTBF (Mean Time Between Failure).

A further object is to provide an improved electronically controlled display tag system which does not involve any significant waste disposal problems.

It is a further object of the present invention to provide an improved electronically controlled display tag wiring system which limits the need for electrical contacts in the numerous operational connections among the various components of the system, and particularly in the operative connections to the tags.

A further object of this invention is to provide an improved electronically controlled display tag wiring system which significantly reduces the cost of installing and maintaining the system by using modular parts.

Yet another object of this invention is to provide such an improved electronically controlled display tag wiring system which virtually eliminates malfunctions due to electrostatic discharges.

A still further object of this invention is to provide an improved electronically controlled display tag wiring system which greatly reduces the need for periodic replacement of corroded parts.

Yet another object of the invention is to provide a thin, narrow, and visually pleasing elecctronic display tag that blends into its surroundings and does not draw unneccesary attention to itself.

Still another object of the present invention is to provide a telecoping tube carrying wire which connects the rail to the stringer and coupler, these parts connectable without removing articles on shelves using an easy-to-use tool.

Yet another object of the present invention is to provide a system where shelves can be removed without disconnecting other system components.

Still another object of the invention is to provide a system where all coupling is done magetically, instead of being hard-wired.

Yet another object of the invention is to provide a tag loader which can easilly load tags onto the rail.

Other objects and advantages of the invention will be apparent from the following detailed description and the accompanying drawings.

In accordance with one aspect of the present invention, there is provided an electronic display tag system which includes a multiplicity of electronic display tags, an electrical power supply for supplying ac power for the multiplicity of the display tags, a controller circuit for providing information signals for the multiplicity of the display tags, a modulator receiving the power signal and the information signals for modulating the power signal with the information signals, multiple branch distribution loops each of which extends along a selected group of the display tags for supplying power and control signals to the display tags, and a main distribution loop connected to the power supply and control signal source and magnetically coupled to the branch loops for supplying power and control signals to the branch loops, a pick-up coil within each display tag and inductively coupled to the conductor for receiving the modulated power signal, a demodulator within each display tag for demodulating the modulated power signal, and a display circuit within each display tag for generating a display in response to the information signals derived from the demodulated signal.

In accordance with another aspect of the invention, there is provided an electronically controlled display tag comprising a housing; an ASIC mounted in said housing; display means mounted in said housing; said ASIC including memory means for storing information, and display driver means coupled to said display and to said memory means for receiving information from said memory means and for displaying information on said display means.

In accordance with another aspect of the invention there is provided an article information display system associated with an establishment having multiple article display and/or storage areas comprising a plurality of electronically controllable information display tags mounted adjacent said article display or storage areas; a controller for providing operating power and information to said electronically controllable display tags; a distribution loop coupled to said controller for carrying the information and power to said tags; said distribution loop including a plurality of branch distribution loops inductively coupled to said tags for supplying the information and power to said tags; each of said tags including a pick up coil for inductively coupling said tag to one of said branch distribution loops for receiving the information and power; and power consumption limiting means for delivering operating power to said tags while limiting the voltage levels induced across said tags to a predetermined safe extra low voltage level.

In accordance with another aspect of the invention there is provided an article information display system associated with an establishment having multiple article display and/or storage areas comprising a plurality of electronically controlled information and display tags mounted adjacent said article display or storage areas; a controller for providing a carrier signal for supplying power and information signals to said electronically controllable display tags; a distribution loop coupled to said controller circuit for carrying the power and information signals to said tags; and redundant distribution means for providing at least one additional path for said power and information signals from the system controller.

In accordance with another aspect of the invention there is provided a communication system for an article display system associated with an establishment having multiple article storage and display areas and including a plurality of electronically controlled display tags located at said article storage and display areas, said communication system comprising a controller for providing information signals for said display tags; and a communication network for carrying said information signals from said controller to said tags; wherein said controller includes means for establishing a sequential series of time frames, each time frame including a plurality of sequentially occurring periods; means for assigning a sequential designation to the periods in each frame; means for transmitting a start bit in a first of said periods in each frame; and means for transmitting a plurality of command/data bits in a plurality of periods in each frame following said first period and means for indicating whether the command/data bits represent a command or data.

In accordance with another aspect of the invention there is provided a method for operating a random access memory (RAM) as a dual port memory comprising the steps of providing a RAM; outputting from said RAM groups of N data bits to data buffers for application to column drivers of an LCD display until a group of M bits is output, M being greater than N; and applying said M bits to said column drivers when all of said M bits have been sent to said data buffers.

In accordance with another aspect of the invention there is provided an oscillator for generating a clock signal for driving circuitry on an application specific integrated circuit (ASIC) comprising a plurality of inverters serially connected, said plurality including a first inverter and a last inverter, the output of said last inverter connected to the input of said first inverter; power driver means coupled to said signal generation means for supplying power to said inverters; and level shifting means coupled to said signal generation means for shifting the output level of said signal.

BRIEF DESCRIPTION OF THE DRAWINGS

FIG. 3 is a block diagram of an area controller and branch distribution loops of the system of FIGS. 1 and 2a;

FIG. 15a is a side sectional view of an implementation of the display tag mounted in an auxiliary rail which is in turn mounted to a shelf rail;

FIG. 15b is a side elevation of an auxiliary rail of FIG. 14;

FIG. 15b,1, 15b,2, and 15b,3 show further details of the rail of FIG. 15b;

FIGS. 16a–16b is an enlarged front view of an implementation of a display tag for use in the system of FIGS. 1 and 2;

FIGS. 17a–17b is an enlarged front view of the liquid crystal display used in the tag of FIG. 16

FIG. 18a is a front elevation of a display tag arrangement for display racks of the type used to display products in blister packs;

FIG. 32a is an enlarged front elevation of a display and flexible circuit which form a portion of the display tag of FIGS. 31a, b, c;

FIG. 33b is an enlarged partial elevation illustrating a portion of the bottom surface of the switchplate of FIG. 33a FIG. 33c is an elevation depicting the step of attaching the switchplate of FIGS. 33a, b to the TAB circuit of FIG. 32a;

FIG. 34 is an elevation depicting the step of attaching coil leads to the TAB circuit of FIG. 32a;

FIG. 35a is a perspective view of an end cap which forms a portion of the display tag of FIGS. 31a, b, c;

FIG. 35f is a top view of the outer surface of the end cap of FIG. 35a;

FIG. 38a is an enlarged section of a stringer taken generally along line 38a—38a in FIG. 37;

FIG. 39j shows an insertion tool;

FIG. 39l shows the insertion of a tag by a magazine loader;

FIG. 39n is a front view of the E-core and I-core coupler arrangement as shipped from the factory;

FIG. 39o is a front view of the E-core and I-core coupler arrangement when turned into the open position;

FIG. 39p is a perspective view of the E-core and I-core coupler arrangement when turned into the open position;

FIG. 39q is a front view of the E-core and I-core coupler arrangement when turned into the closed position;

FIG. 39t shows a one-end embodiment of the shelving system with the telescoping conduit;

FIG. 40b is a cross-section of the riser taken generally along line 40b—40b in FIG. 40a;

FIG. 40c is a section of the riser taken generally along line 40c—40c in FIG. 40a;

FIG. 40d is a front view and FIG. 40e is an end view of a capacitor used in the riser shown in FIG. 40a;

FIG. 40f illustrates an alternate placement of the capacitor of FIG. 40d to that shown in FIG. 40a;

FIG. 40g is a front view and FIG. 40g' is a side view of another embodiment of a riser;

FIG. 41e is a perspective view of a connector box;

FIG. 41f is a side cross-sectional view of the connector box;

FIG. 41g is a side view and FIG. 41h is a top view illustrating the connection of a riser and a stringer via the connector box;

FIG. 43a is a top view and FIG. 43b is a side view of a shelf and rail loop in an unbent condition comprising a shelf conductor and a rail conductor;

FIG. 43c is a cross-sectional view of the shelf conductor illustrated in FIG. 43a;

FIG. 44 illustrates alternate embodiments of the module;

FIGS. 44c–44g illustrate alternate embodiments of the module of FIG. 44a;

FIG. 45b depicts the drive voltage waveform that is needed to generate the current waveform depicted in FIG. 45a;

FIG. 46b depicts the drive voltage waveform that is needed to generate the current waveform depicted in FIG. 46a;

FIG. 50 is a perspective view of the coupler and conductor of FIG. 49 shown in the open position;

FIG. 51 is an exploded, perspective view of the coupler and conductor of FIG. 49;

FIG. 52 is a perspective view of the lattice of the coupler of FIG. 49;

FIG. 53 is the perspective view of the coupler and conductor of FIG. 50, shown with a rail member; and FIG. 54 is a perspective view of the magnetic coupler of FIG. 49, shown with a pair of wire loops.

Figure 1:
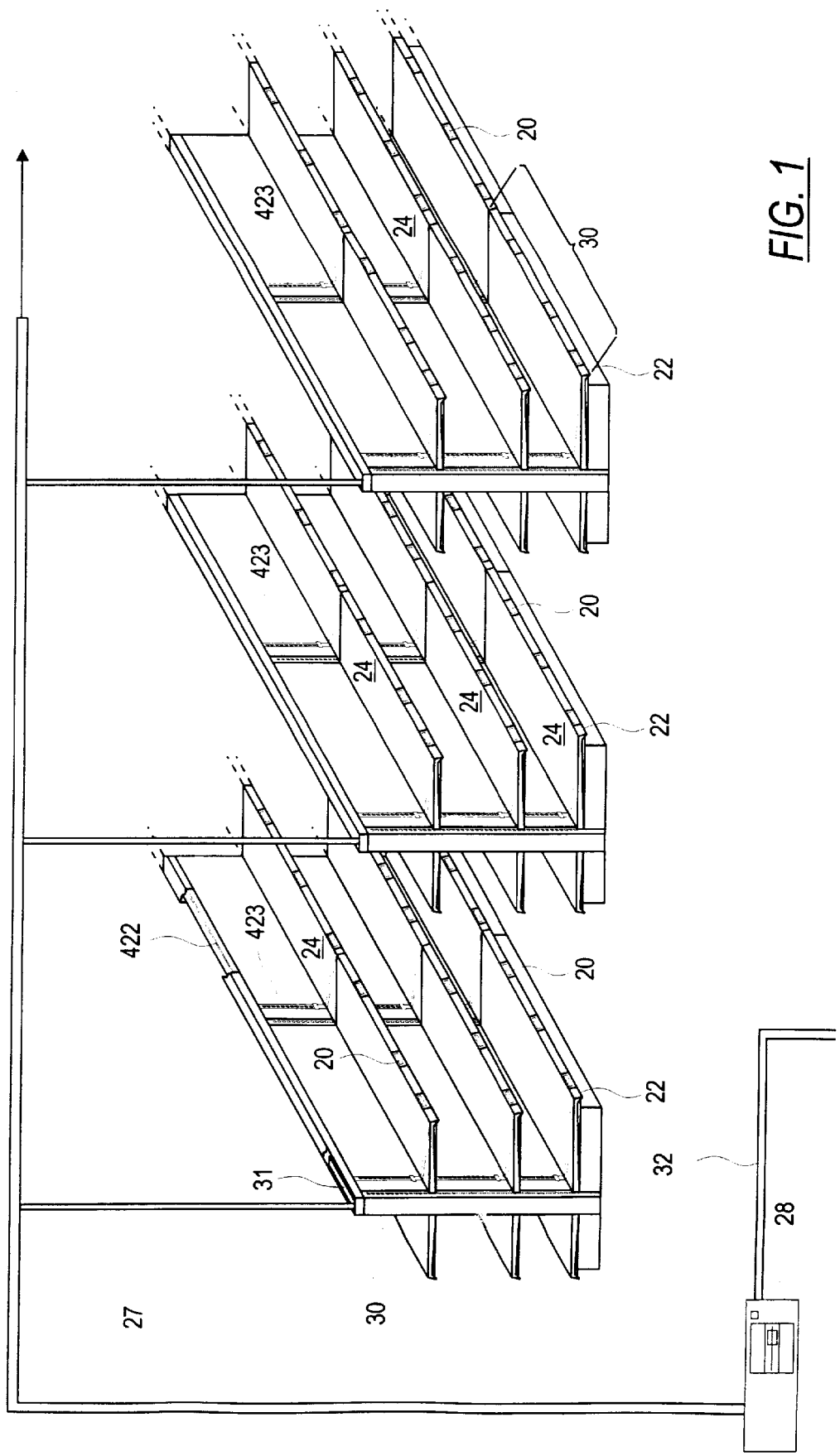
FIG. 1 is a perspective view of a typical layout of part of a retail store equipped with a product information display system embodying the present invention.

TABLES 1, 1a–1o, is a table of the opcodes used to create the system firmware according to principles of the present invention;

TABLE 2 is a table of TAG commands according to principles of the present invention;

TABLES 3, 3a–3c, is a memory map of the scratch pad RAM showing the buffers and flag registers according to principles of the present invention and TABLE 4 is a memory map of the scratch pad RAM showing the counter section according to principles of the present invention.

DETAILED DESCRIPTION OF THE PREFERRED EMBODIMENTS

Introduction

The present invention has application in a variety of article-information display environments. These environments include, among others, grocery stores, hardware stores, auto-parts stores, warehouses, and other establishments where variable article information is displayed at remote locations. The present invention is particularly advantageous when it is used in a large store where there may be as many as 50,000 different items of merchandise placed on shelves throughout the store, and thousands of prices may change each week. Such an environment is typical in a retail grocery store, and it is this context that the present invention will be described. This invention is also particularly useful in warehouses containing numerous bins of small parts that are coded or marked with other types of identifications which are difficult to read.

The present invention allows information to be displayed in a variety of ways. Information visible to the naked eye is displayed electronically. Also, paper tags can be used. Finally, information which is imperceptible to the human eye can be "displayed."

The present invention provides a system with built-in redundancy. For example, three power supplies are used in the system controller, battery backup is undertaken, daisy chaining with switching is implemented, and two reverse communication frequencies are provided.

The present invention also provides for modularity. For example, one type of rail, riser, and stringer are used. These elements are factory-manufactured and are designed to be used together. A user can custom-tailor a system to meet their particular requirements.

The present invention allows for the easy installation and changing of system components. For example, wiring can be installed using a variety of methods. For example, wires can be taped to the top of shelves. Alternatively, wires can be placed in telescoping conduits and easily installed (without removing articles from shelves) using a simple tool. In this arrangement, components are simply "snapped and clicked" into place. Also, shelves can also be removed easilly without disconnecting other components of the system. Additionally, a central office can also control tags which are located at any geographic location. Furthermore, a simple tool can be used to easily install tags.

The invention also provides for a high MTBF which results from the low part count on the tag. The invention is factory-produced and uses odd harmonics for low noise. The present invention also consumes low amounts of power. For example, CMOS components are used for the ASIC design.

The invention additionally uses low-cost, standard parts to provide for a low-cost system. For example, there is no crystal oscillator. Standard parts are used throughout the many aspects of the invention and reverse communication is provided with a transceiver.

Finally, the invention provides voltage management. For example, capacitors are used to provide resonant circuits. Coupling efficiency is improved, loop-size and inductance reduction is provided for, field cancellation is used, large, low resistance wire is used, flat conductors are used, and low ESR resonant capacitors are used. Eddy currents are used to cancel fields. Low leakage conductance elements are used to short magnetic path lengths, and transformer voltages are altered.

Overview of the Entire System

FIG. 1 depicts part of a retail store including a product information display system arranged according to a preferred embodiment of the present invention. The system includes a plurality of display tags 20 disposed along the front rails 22 of the store's multiple display shelves 24. The prices, descriptions and/or special information for all the products can be electronically displayed on the front edges of the shelves, near the respective products. Typically, there is a one-to-one correspondence between each display tag 20 and a particular item of merchandise. Although certain applications may require a display tag 20 to display product-related information regarding multiple products, e.g, the respective products above and below the display tag 20, preferably each display tag 20 displays information for only one product. The tags may also include sensing circuity which detects the presence or movement of people in the vicinity of the tag. Information regarding movement can be used to alert store personnel to certain adverse situations. For example, the lack of movement of a person about a tag can alert the store personnel to possible shoplifting.

The information to be displayed at each display tag 20 is provided by a system controller (TSC) 28. A communication network is defined, in which the system controller 28 communicates with the display tags 20 through an area controller 31 using multiple conductors $C_1, C_2 \ldots C_n$ (see FIG. 2), each of which forms a loop to communicate with a large number of display tags 20 in a prescribed area. Typically a single area controller (TAC) 31 services at least a thousand tags, and each loop services several hundred tags. Preferably, there is one area controller per aisle; however, in an altenate embodiment one TAC exists for the entire store. Each area controller 31 is contained in an enclosed housing.

The system controller 28 regularly communicates with the display tags for monitoring and reporting display tag accuracy and/or failures to the system user and for identifying service inquiries and updating the display information, e.g., with price changes. The display tags serviced by any one of the wire loops are usually located on a number of different shelves.

Figure 2:
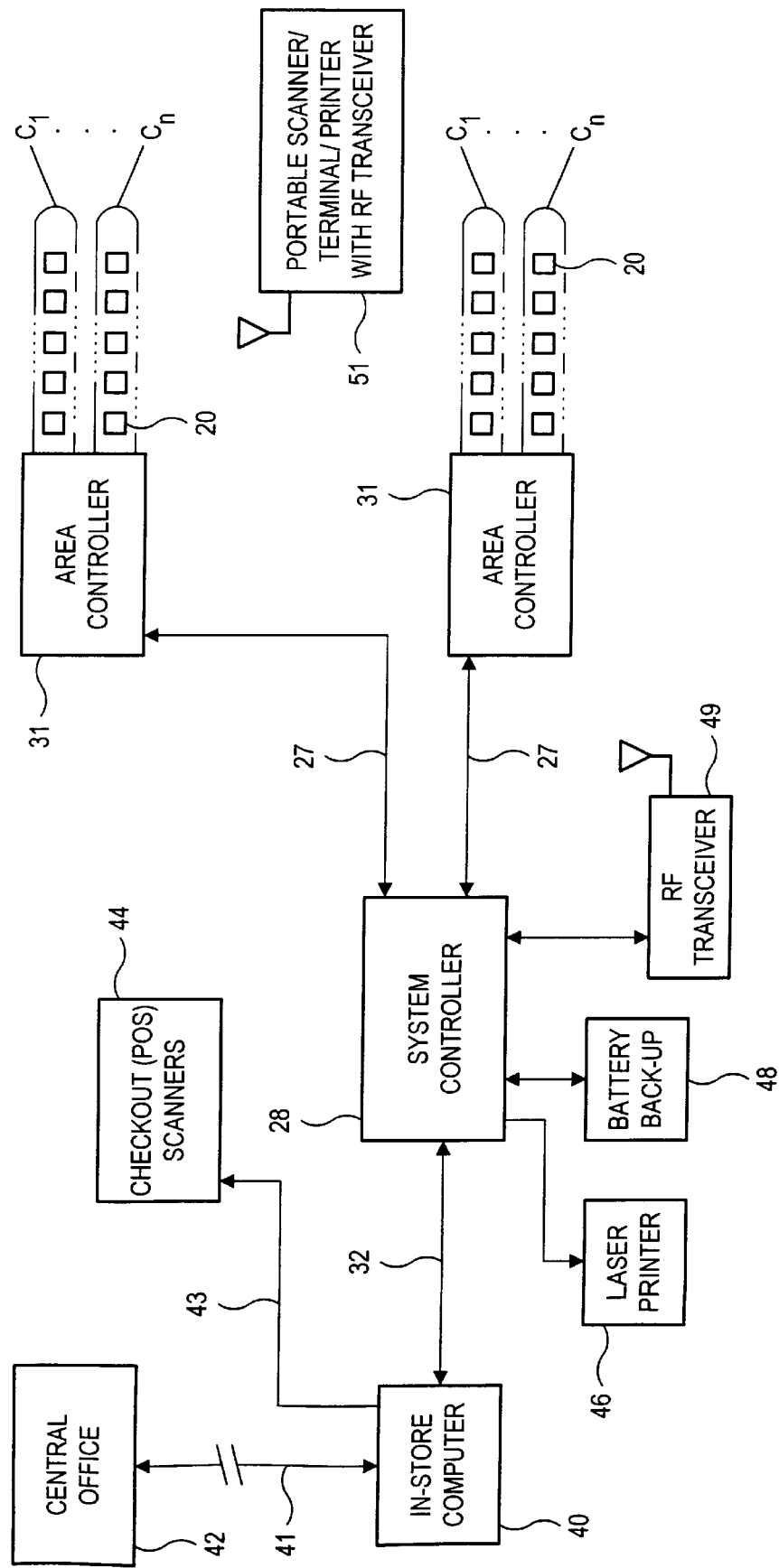
FIG. 2 is a block diagram of a product information display system, also in accordance with the present invention.

FIG. 1 also illustrates a communication link 32 between the system controller 28 and an in-store computer 40 (see FIG. 2). This link 32 is also used by the system controller to receive update price information from the store computer 40 (FIG. 2). The same computer supplies data to both the tags and the scanners so that a new price for a particular product is updated in the display tag 20 at the same time the price is sent to the check-out scanners, thereby ensuring that the price displayed on the display tag 20 for the product is the same as the price displayed for and charged to the customer at the check-out scanner.

The system allows for central office control of the display tags. Employees at a central location can program all tags at all locations. Specifically, it is possible for one tag or one group of tags at one store to be changed from the central office. Additionally, when the system audits tags, the audit information is conveyed to the central office.

Figure 3:
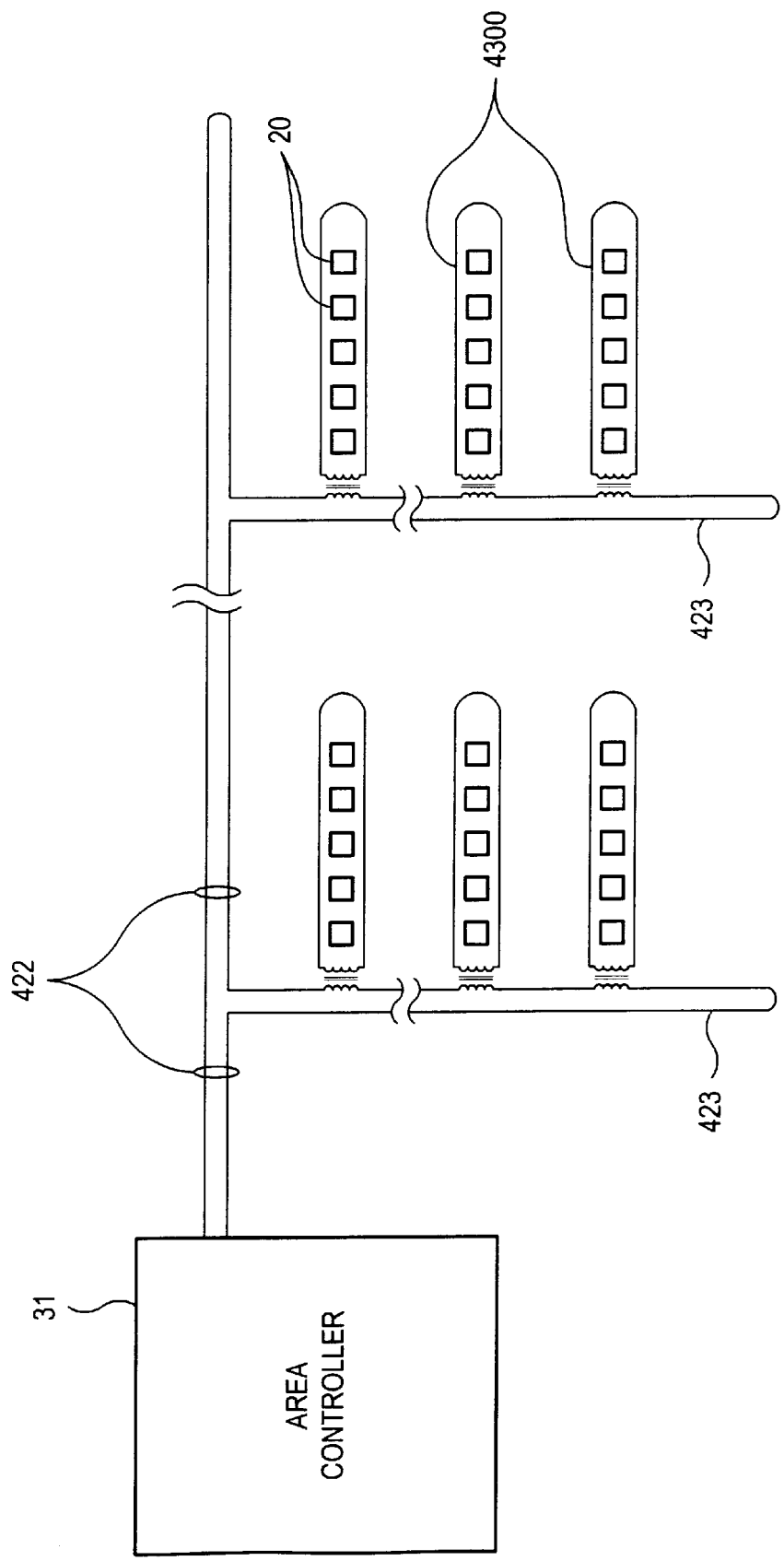

FIG. 2 illustrates the product information display system of FIG. 1 in block form. The system includes a plurality of area controllers 31 coupling the system controller 28 to various sets of display tags 20. Each set of display tags 20 is associated with one of the multiple wire loops $C_1$–$C_n$ connected to each area controller 31. According to one embodiment, each of the loops $C_1$–$C_n$ is a single loop of wire. According to another embodiment as depicted in FIG. 3, each "loop" is constructed from a number of modular components including a stringer 422, risers 423, and shelf and rail distribution loops 4300. This arrangement will be described in more detail below, for example, in connection with FIGS. 37–44b. Seies loads are created allowing for the uniform distribution of power.

Referring again to FIG. 2, the area controllers 31 communicate with the tags 20 using the "loop" communication scheme described below. Alternatively, this communication can be undertaken using a conventional modulation protocol such as amplitude-shift-keying (ASK), which is a binary form of amplitude modulation. Other communication schemes, such as frequency shift keying (FSK) or phase modulation, can be used instead of ASK if desired.

Communication between the area controllers 31 and the system controller 28 is effected using a conventional serial two-way communication protocol, such as a network interface compatible with the RS422 or RS485 standard. Other protocols may be used without departing from the invention. The system controller 28 is connected to the area controllers 31 using communication network lines 27.

Preferably communication between the system controller and the area controllers 31 is accomplished using a Safe Extra Low Voltage (SELV) which is designated by UL 1950 as typically being a voltage typically below 30 RMS volts, 42.4 volts peak, 60 V DC. Reference to UL 1950 is invited for a more complete description of SELV. By designing the system to be compatible with SELV requirements, the communications network lines 27 may be simply telephone cable. Use of a SELV and telephone wires is desirable because it reduces the cost of wiring and installation and simplifies reconfiguration of the network such as when one or more gondolas are moved within a store. One reason installation and reconfiguration costs are reduced that is electricians and 120 VAC rated elements such as conduit, junction boxes and the like need not be employed as would be the case in most non-SELV applications. Finally, compliance with UL 1950 also provides a level of safety for users of the system in the event of any damage to the system (e.g., wires accidentally severed by store employees or equipment) and meets many local building codes.

Each of the area controllers 31 is powered by a dc power supply within the system controller 28. Transmitting dc power between the system controller and the area controllers is advantageous because it reduces the amount of potentially interfering radiation which would otherwise be produced if ac power were employed. The scope of this benefit become evident when it is realized that there are a substantial number of communication lines between the system controller and the area controllers running throughout the ceiling of a store and from the ceiling down to each area controller. The use of dc power also conforms to standard off-the shelf interfaces which contributes to a lower cost, more reliable system.

The system of FIG. 2 also includes an in-store computer 40 which communicates with a remotely located central office 42 using a modem or other type of communication link and with in-store check-out scanners 44. The in-store computer 40 provides a database of information, received from the central office 42 (or from a scanner controller), for all the merchandise in the store. The database is used to link each product with a physical-location address, an alphanumeric (or UPC) description, a price, and a unit cost and general inventory information. The database may be accessed for the check-out scanners 44 as well as the system controller 28. Changes in the database of the in-store computer 40 are generally initiated by updates received from the central office, but database changes producing display changes can also be made directly at the in-store computer 40.

After receiving the product data from the in-store computer 40, the system controller 28 selects the desired display information and associated display tag address, and converts this display information into a data stream for transmission to the appropriate area controller 31. The area controller 31 then forwards this information to its associated one of the wire loops $C_1-C_n$ i.e., the wire loop associated with the designated tag 20.

Also associated with the system controller 28 is a printer 46 and a battery back-up unit 48. The printer 46 may be used to make hard copies of the desired displays, for example on regular or transparent paper, for insertion into a shelf rail at any locations not covered by the electronic tags 20. The printer can also be used to generate store or system reports. These printed reports can be used to audit pricing strategy all the way down to individual shelves and tags. The battery back-up unit 48 is used to maintain system integrity during periods of power interruption.

Advantageously, in operation, in the system described above, the system controller can perform additional functions. For example, when actual price changes or other data are not being sent to the tags 20, the system controller can poll the tags to check on the integrity and correctness of the price and other information stored in the individual tags. As it will be described more fully herein below, each of the tags 20 is provided with suitable memory capacity for retaining the necessary product and pricing information. Importantly, although the system controller is polling the individual tags to check this information, it can also poll the in-store computer 40 to compare the information on the tags with the pricing information for the corresponding items which has been sent by the in-store computer to respective point of sale (POS) or checkout scanners 44, for example at checkout counters or the like. Thus, the system controller when not engaged in other tasks preferably compares the data in the tags with the data being sent to the point of sale scanners to ensure that the two coincide, and to audit and update the information to the tags or to report any discrepancy in the event different information has been conveyed to the point of sale scanners. The system controller also performs CRCs on the data in the tags.

To facilitate installation of tags 20, an RF transceiver 49 coupled with the system controller may communicate with a portable scanner or terminal/printer with RF transceiver 51, such as a Telxon PTC 960, carried by a worker in an aisle or other storage/display area. However, the RF transceiver 49 may already be provided with the in-store computer 56, as indicated by the dashed line, in which case, a separate RF transceiver need not be provided for the system controller 31. The installation and initialization of a tag 20 using these elements is further described below with reference to FIG. 28.

FIG. 3 illustrates in greater detail the connection of an area controller 31 via a stringer loop 422 and respective riser loops 423 to a number of branch or shelf and rail distribution loops 4300 and the associated tags 20. It will be noted that the riser loops are inductively coupled to the respective branch loops 4300 and moreover, the branch loops 4300 are inductively coupled to the tags 20.

By controlling the display tags 20 through the area controllers 31, several advantages are realized. For instance, the communication speed between the system controller 28 and the display tags 20 is increased (because it is not necessary for the system to talk to each tag), the processing power required in the system controller 28 is decreased, and a level of modularity is provided for expanding use of the display tags 20. Further, use of the area controllers 31 significantly reduces the cost of the system by avoiding the need for an RS485 type interface at each tag.

Both the tags and the area controllers store data and with their interactive communications cooperate as part of the auditing and failure identification system. There is redundant power back-up with a battery in the system controller. The cost of individual tags is reduced because certain of the electronics in the area controller does not have to be duplicated in thousands of tags, and there is more flexibility for special display messages.

Figure 4:
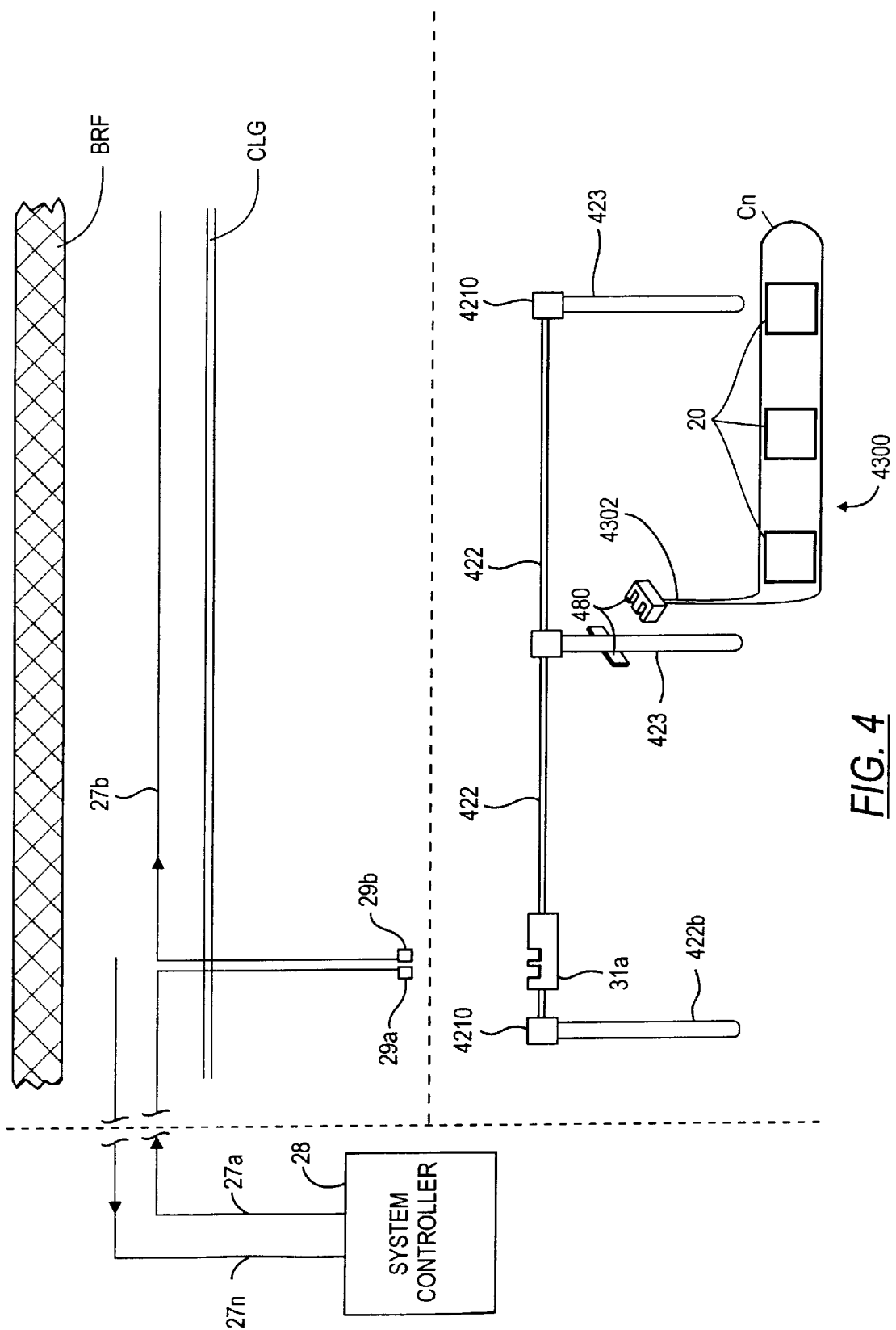
FIG. 4 is an elevation, in diagrammatic form, showing part of an installation of the system of the invention in an article display or storage area.

Referring to FIG. 4, an elevation of the system of the invention as typically installed in a store or other building is shown in somewhat diagrammatic form. As indicated in the elevation, the wires or cables 27 from the system controller (TSC) 28 (located in a computer room or the like which is separated from the storage or display area) may run above a drop ceiling CLG of the building, that is, below the building roof B RF but otherwise above the storage or display area of the building. The wiring from the system controller 28 (SC) to the area controllers 31 (TAC) is in a daisy chain configuration. Thus, a first segment 27a of the cable 27 runs to a first area controller 31a while a last segment 27n runs from the last area controller (not shown in FIG. 4) back to the system controller 28. As mentioned above, the use of an SELV compliant system means that the cables 27 may be ordinary telephone type cables or wiring. Consequently, a simplified type of construction can be facilitated wherein telephone connectors such as RJ 11 jacks and plugs as indicated at 29 can be used to interconnect the wire segments 27 to the respective area controllers 31. Thus, the first area controller 31a receives the wire 27a at an RJ 11 connector 29a while a second RJ 11 connector 29b connects to a succeeding wire segment 27b which runs to another area controller (e.g. in another aisle), etc. More than one area controller may be used along an aisle, if necessitated by the length of the aisle and the number of tags 20 to be serviced, i.e. dividing the aisle up into various sections or segments of stringer, riser, loops and shelf tags, each section or segment being serviced by an area controller.

The area controllers 31 are preferably mounted at the top portions of respective sections of shelving or gondolas as previously indicated and described above with respect to FIG. 1. The TAC 31 may be mounted near the end of a gondola or aisle as shown in FIG. 4, or nearer the middle. This choice will determine the relative length of each section of stringer 422 (described below). The shelves and gondolas have not been shown in FIG. 4 in order to more clearly show the elements of the system of the invention. The area controllers are coupled to stringer cables or wires 422 which will be more fully described later and which generally run vertically and preferably along the top portion of each section of shelving or each gondola. As also described more fully herein below, in order to minimize inductance and signal losses, the areas within loops formed by the stringers and risers, as well as the shelf loops are kept as small as possible, consistent with the length of each loop necessary to reach its subsequent connections in the system and the need to transfer power between loops and from shelf loops to tags. Thus, for example the respective pairs or wires which form the stringers 422 and risers 423 are run close together, and the wires in the shelf/rail loops 4300 one separated by no more than the height of the pickup coil (described later) in the tag 20 to which they are inductively coupled.

The stringer 422 connects at connector elements 4210 (to be described more fully below) to riser wires 423 (also described more fully below) which run generally vertically on the section of shelving or gondola. These risers 423 in turn couple with shelf and rail distribution loops 4300 at magnetic couplers 480 as will be more fully described below. In this regard, the shelf loops 4300 may consist of a shelf conductor 4302 and a rail conductor C as will be more fully described below. An additional end loop section 422b of the stringer 422 may feed additional risers and shelf loops (not shown) which service an end cap unit of shelving, that is, a unit of shelving which runs across the end of an aisle.

In order to simplify installation and control costs, an 8-conductor telephone wire or cable may be used as cable 27, with at least two conductors for carrying the RS 485 data from the system controller 28 to the area controller 31, as well as conductors carrying positive and negative dc voltage supplies for the area controllers 31 and suitable dc voltage returns. However, protocols other than RS 485 and conductors other than telephone cable may be used without departing from the invention. Inexpensive off-the-shelf parts can be used to reduce cost.

The System Controller

Figure 5A:
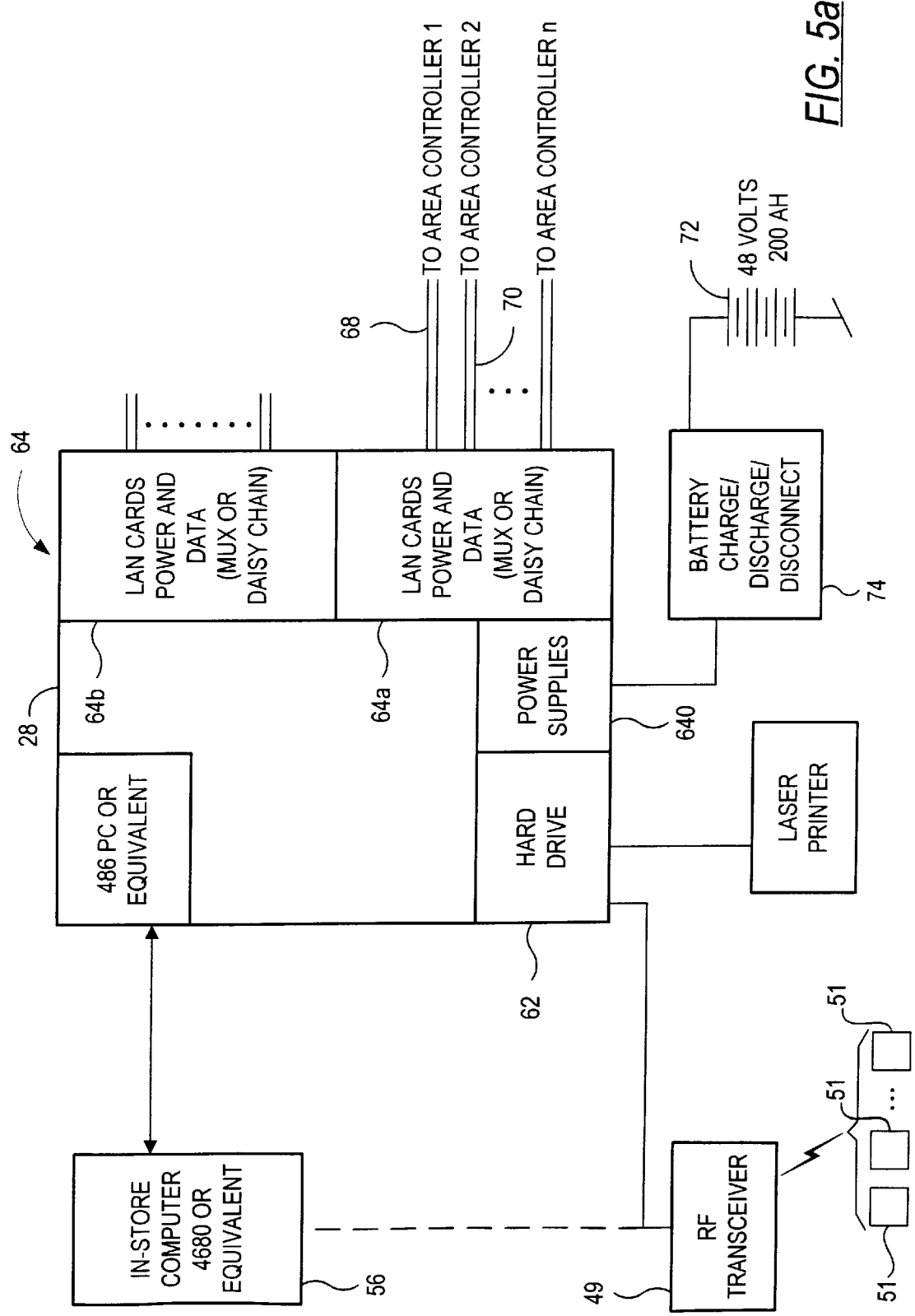
FIG. 5 is a block diagram of the system controller shown in FIGS. 1 and 2.

As mentioned above, the system controller provides each tag with the information to be displayed. Referring now to FIG. 5, the system controller 28 is implemented using personal computer hardware 28, (such as a 486 system or equivalent). The system controller is accessed through the in-store computer 40, if desired, and therefore need not have its own CRT, keyboard and/or mouse. The system controller 31 also contains a number of network boards configured for serial two-way communication with the area controllers 31. Alternatively, communication can be accomplished with conventional RS422/RS485 interfaces or equivalent. The system controller 28 also contains a conventional hard-drive 62 for programs, protocols, addresses and storage, and power and data distribution circuits (such as LAN cards for R5485 communications) 64a, 64b, etc. for all the area controllers 31 in the system. Each distribution circuit 64 transmits and receives serial data over one set of lines 68 and sends dc power over another set of lines 70. A rechargeable 48-volt dc battery 72 is used as the power source for the area controllers 31, with an ac-powered battery charge/discharge/disconnect circuit 74 activated as necessary to maintain an adequate charge on the battery 72. The battery 72 is the primary power source for the area controllers 31, and emergency power for the system is also provided from this battery.

As discussed above, the system controller 28 is primarily responsible for receiving pricing information (as well as other product information) from the store computer 40 and for causing the information to be displayed by the proper display tag 20. The system controller 28 is also configured to perform several other high-level functions. The system controller maintains the integrity of all product and display tag information by performing data validation checks. Many of these validation checks are performed automatically in the background. For example, the system controller regularly initiates background audits for validating the data contained on each of the display tags 20, and also regularly audits the display tag data against point of sale ("POS") information. Preferably, the background audits are performed whenever the system controller is not otherwise involved in a task, such as display tag initialization.

The system controller 28 facilitates at least two types of graphical user interfaces ("GUI"): a user console/terminal GUI and a portable RF terminal GUI. The user console/terminal GUI may operate on the store computer 40 or may operate on a separate computer terminal coupled directly to the system controller 28. The portable RF terminal GUI operates through the RF transceiver 49 for controlling the operation of the individual portable (hand-held) RF terminal units 51. As will be discussed in detail below, the portable RF terminal units 51 allow for store personnel to install new display tags, to verify display tag data, and to find lost or misplaced display tags.

Among other functions provided by the system controller 28, the system controller 28 collects and tracks significant system events and prepares formatted reports of these events and the system controller facilitates system recovery upon power outages or system failure.

Figure 5B:
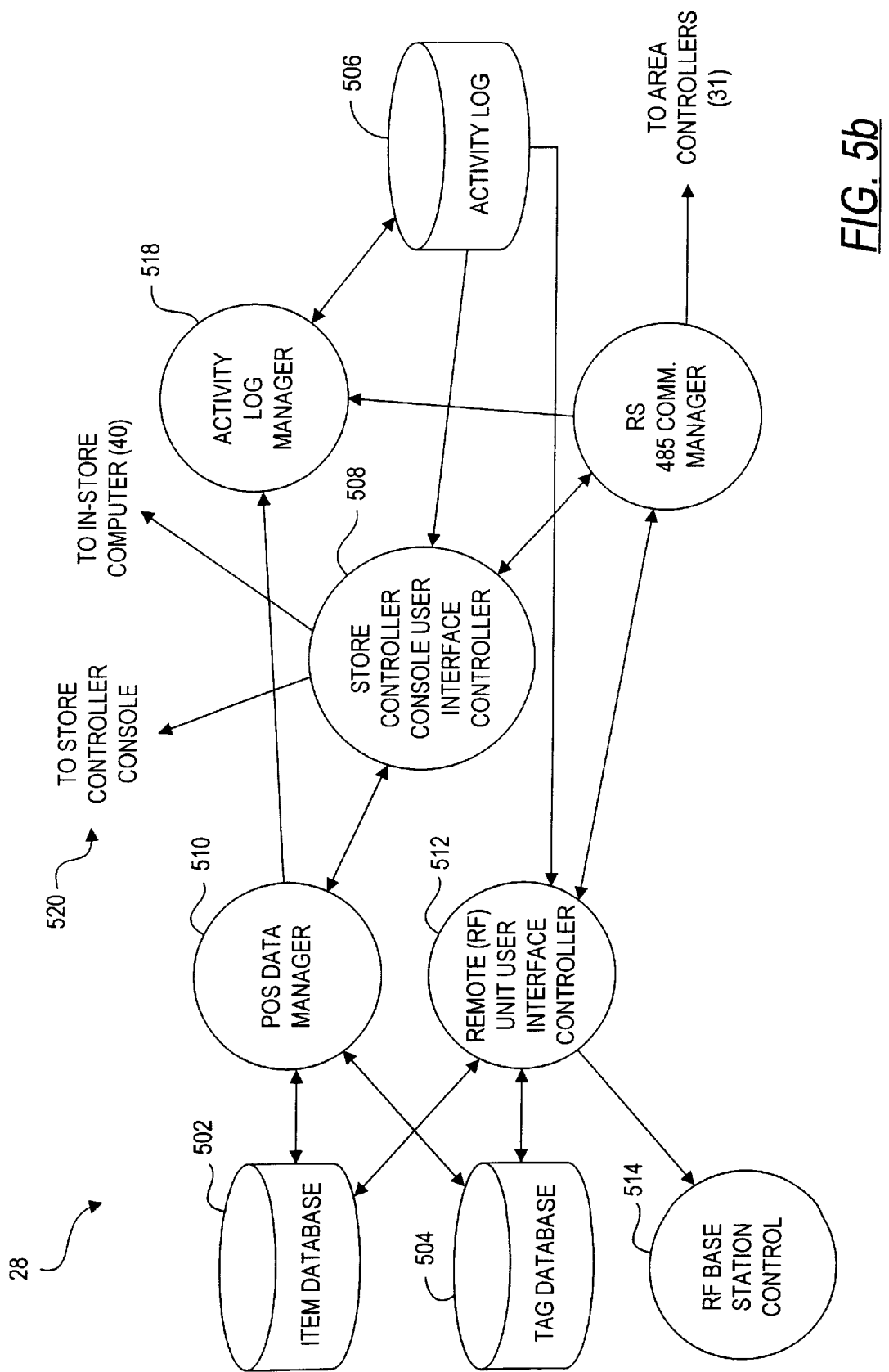

As shown in FIG. 5b the system controller 28 contains an item database 502, a tag database 504 and an activity log 506. The item database 502 contains necessary information concerning the various items or products carried on the store shelves, such as a description of the product, the price of the product, UPC code information for the product, and the like. The tag database 504 contains information relating to the location of each display tag, which product the display tag is linked to, the display data downloaded to the display tag, and the like. The activity log 506 contains a record of all important events occurring in the system from a particular point in time.

The system controller software program includes a store controller console GUI controller module 508, a point of sale data manager module 510, a portable RF terminal GUI controller module 512, an RF base station controller module 514, an RS/485 communication manager module 516 and an activity log manager module 518. The store controller console GUI controller module 508 generally provides the graphical user interface for the store controller console 520 or for the console coupled to the in-store computer 40. The portable RF terminal GUI controller module 512, likewise, provides the graphical user interface for the (hand-held) portable RF terminal units 51. The store controller console 520 and the portable RF units are primarily used by store personnel for installation, maintenance, service and monitoring/diagnostics. The installation procedures and some diagnostic procedures will be described in greater detail below. Significant events occurring in the store controller console GUI controller module 512, the RF base station controller module 514 and the portable RF terminal GUI controller module 512 are sent to the activity log manager module 518 for recordation.

The activity log manager module 518 processes and records the various events occurring in the system. Such events are stored in the activity log 506 in a text string, which contains inscription of the event, the time when the event occurred, and severity code indicating the severity of the event. The severity code is used by the store controller console user interface controller 508 or the remote unit user interface controller 512 to filter certain types of event in the preparation of diagnostic reports.

The point of sale data manager module 510 is responsible, in part, for comparing point of sale data with the data in the internal item database 502 to determine if the point of sale information matches the information in the item database 502. If the point of sale data manager 510 finds a discrepancy, the item database is updated and the relevant area controllers 31 are notified so that the area controllers can update the tag displays. Of course, when the display tag displays are changed, the tag database 504 will be updated in turn. Significant events occurring in the point of sale data manager 510 are sent to the activity log manager for recordation. The point of sale data manager module 5 10 also performs background maintenance and audits.

The Area Controllers As described above, the present invention comprises an area controller or area controllers which are coupled to the system controller and the tags. The area controller serves several important functions. First, the area controller speeds communication to each tag because the system controller 28 does not directly address each display tag. Instead, the area controller receives data from the system controller 28 and translates the data into an information/power signal that is applied to a conductor for transmission to a display tag. Second, the system of area controllers and display tags is modular, allowing for ease of expansion to support more display tags. Additional tags may be added to a current area controller by placing a tag along a shelf loop coupled to an existing area controller. Also, an additional area controller may be added to a system controller 28 to connect another shelf loop. Finally, the overall cost of the system may be reduced by including certain electronics in the area controller. By including the elections in the area controller, the cost of the individual tags is reduced because the circuitry does not have to be duplicated in thousands of display tags.

Operation of the area controller 31 and communication between an area controller 31 and its tags is accomplished using a Safe Extra Low Voltage (SELV) as defined by Underwriters Laboratories ("UL") Product Safety Standard 1950, "Safety for Information Technology, Including Electrical Business Equipment." According to one embodiment, the area controller applies a maximum voltage of 42.4 volts peak across the ends of the wire loop formed by the shelf loop conductor. The advantages of using the 1950 standard have been described previously.

Figure 10A:
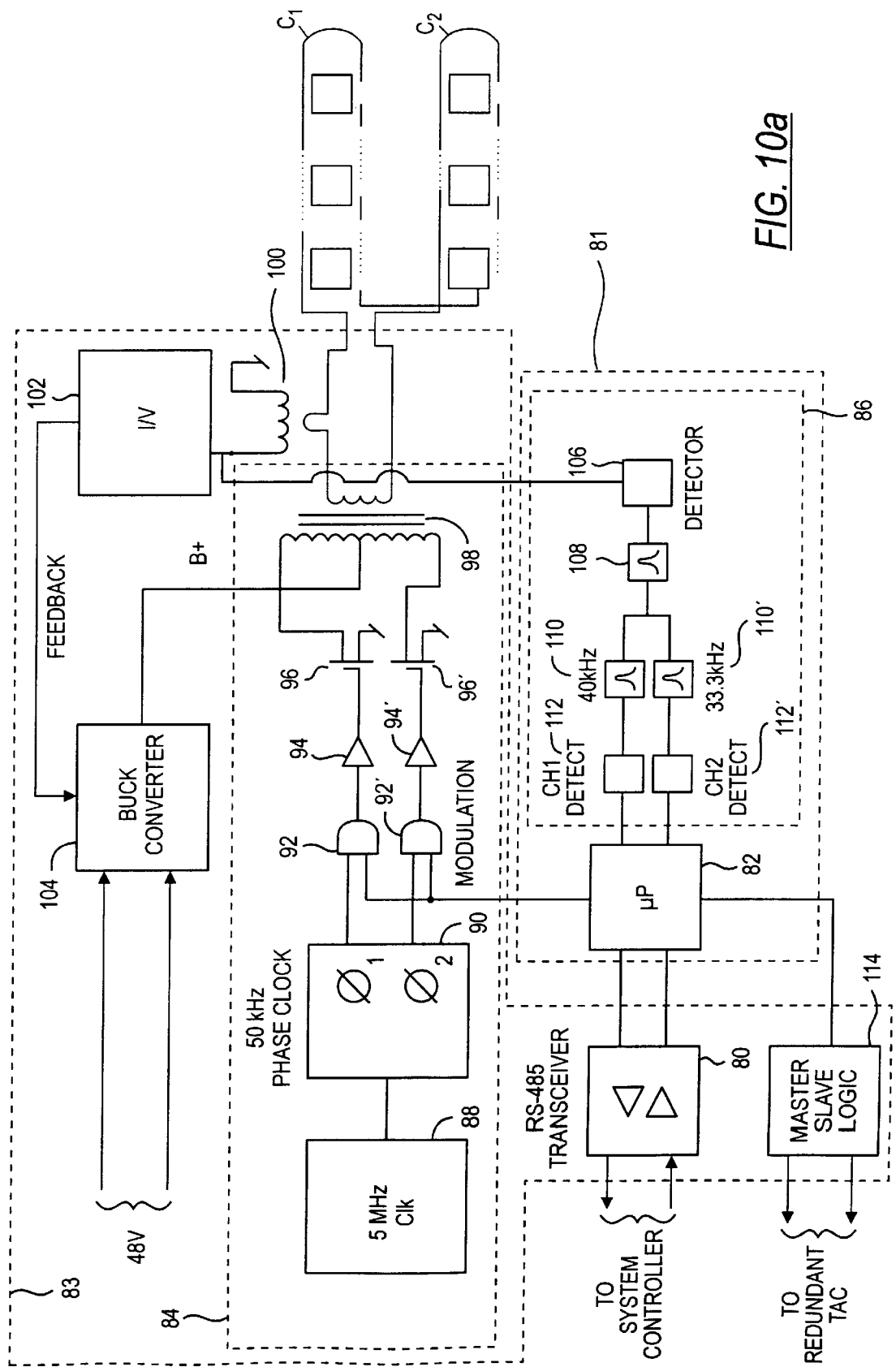
FIG. 10a is a block diagram of one of the area controllers shown in the system of FIG. 2

External radiation may sometimes become a concern and a method for minimizing such radiation's effect on the system is now discussed. Referring now to FIG. 10a, one of the area controllers 31 is shown in a functional block diagram form. Each area controller 31 receives data from the outputs of the network boards of the system controller 28 and translates the data into an information/power signal that is applied to a shelf loop conductor C for transmission to the display tags. The shelf loop conductor may include several shelves or sections. Each shelf loop conductor C may be installed so as to minimize the electromagnetic interference created by the current in the shelf loop. For example, adjacent shelf loop conductors (shown as $C_1$ and $C_2$ in FIG. 10a) may be configured so that the current in adjacent shelf loops flows in the same direction. Thus, by the right hand rule, the radiated signals from the loops on adjacent shelves tender to cancel so as to reduce (e.g. EMI) radiation emission (e.g. EMI). EMI can also be reduced by using low power (e.g., SELV) and by minimizing one size of the loops C, consistent with the need for inductive coupling with the tags 20, that is the height of the loops C is approximately the same as the height of pick up "coils (described elsewhere herein) in the tags 20. This configuration also reduces the cross-talk between adjacent conductors and reduces the susceptibility of the system to radiation from other sources.

Figure 10B:
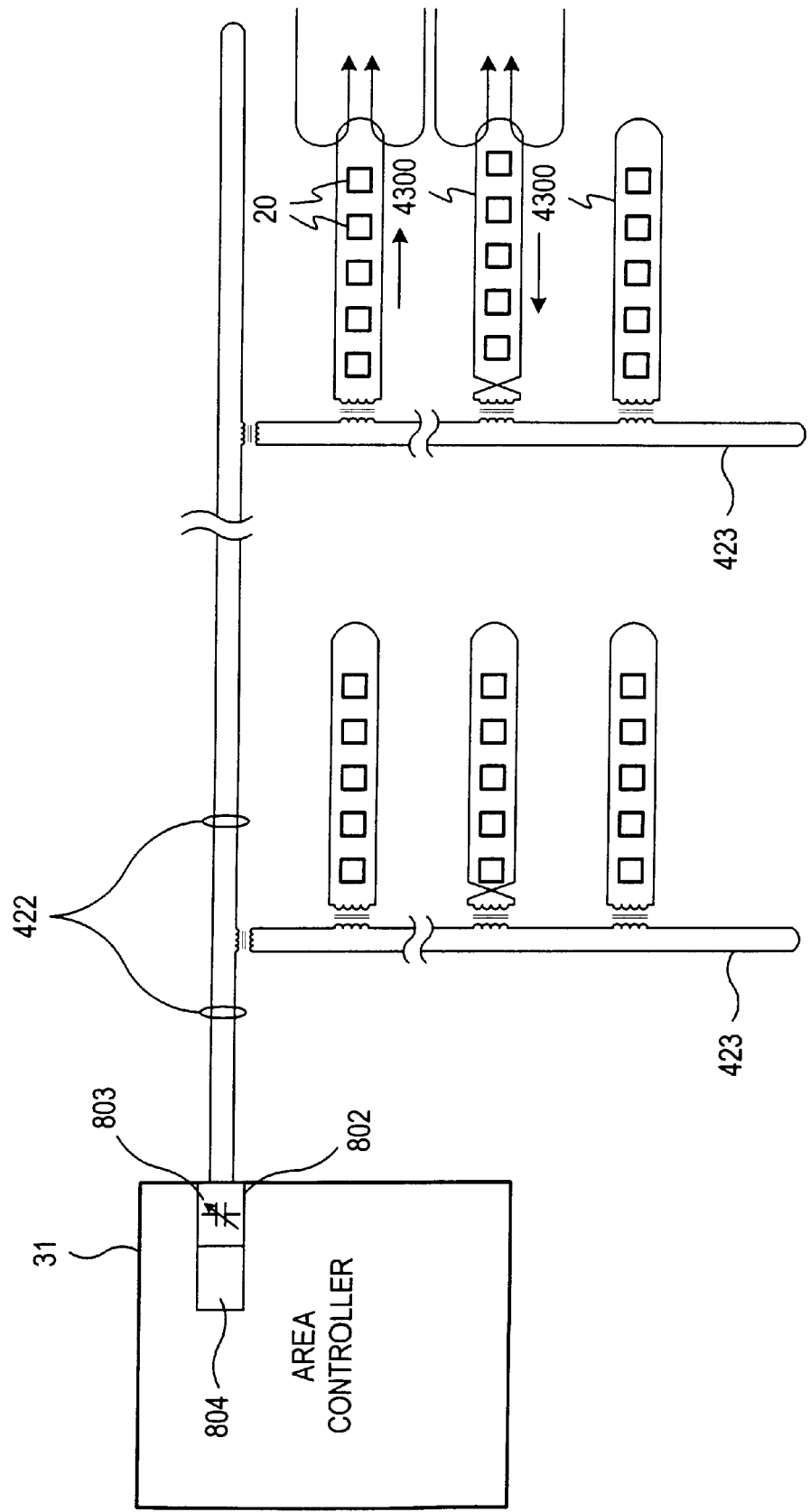
FIG. 10b is illustrates an alternate embodiment in which adjacent shelves include separate shelf and rail distribution loops.

FIG. 10b illustrates an alternate embodiment of an area controller in which adjacent shelves include separate shelf and rail distribution loops 4300. Each shelf and rail distribution loop 4300 communicates with a plurality of shelf tags 20. The area controller 31 shelf communicates with the rail distribution loops via a stringer 422 and a riser 423. As with the embodiment illustrated in FIG. 10a, adjacent shelf and rail distribution loops 4300 may be configured so that the current n adjacent conductors of nearby shelf loops flows in the same direction in order to reduce radiation emission problems. A more complete description of the shelf and rail distribution loop 4300, the stringer 422, and riser 423 is given elsewhere herein with reference to FIGS. 3 and 37–44. Also, magnetic coupling may be used throughout the system, for example, in connection with the stringers.

Referring now to the embodiment shown in FIG. 10a, the area controller 31 communicates with the system controller 28 through a network interface circuit such as an RS-485 transceiver circuit 80. The RS-485 transceiver circuit permits multiple area controllers to be daisy-chained to the system controller 28. The network interface circuit receives data from the system controller and communicates with microprocessor 82. The microprocessor 82 then generates an information signal for modulating an ac power signal supplied to the selected conductor so that the information signal will be conveyed to the desired display tag 20. Any suitable form of modulation may be used to transmit information. In an embodiment, a "loop" communication scheme is used wherein the nominal frequency of the power signal carried by the shelf loop conductor is 50 kHz and data is sent by modulating the 50 kHz signal. Further, the microprocessor used in the present implementation is a Phillips processor, part number P87C528EBLCA. However, a person of ordinary skill in the art would understand that any suitable microprocessor may be used in the present invention without departing from the scope of the claimed invention.

The area controller comprises two boards: a power driver board 83 and a receiver board 81. The power driver board includes the data/power transmitter 84, a current-to-voltage converter 102, a buck converter 104, and the network interface circuit 80. The receiver board handles communications from the display tags and includes the microprocessor 82 and the receiver 86. Alternatively, as is known in the art, the area controller can comprise any number of boards.

The data/power transmission circuitry 84 on the power driver board 83 of the area controller 31 includes a 5 MHz clock 88 for driving the power/information signal from the area controller 31. The 5 MHz clock 88 is provided by a standard 5 MHz crystal oscillator. In an embodiment of the invention, the crystal oscillator is an SG615P oscillator manufactured by Epson America.

The 5 MHz signal is provided to block 90, wherein the signal is divided down and shifted in phase. The output of block 90 provides two 180-degree phase shifted 50 kHz clocks. In an embodiment of the present invention, the signal is divided down using standard D flip-flops.

The first signal, referred to as the phase 1 signal, is input to an AND gate 92. The other input to the AND gate 92 comes from the microprocessor 82. Similarly, the second signal, referred to as the phase 2 signal, is input to AND gate 92'. The other input to the AND gate 92' also comes from the microprocessor 82. The signal from the microprocessor serves two purposes. First, it acts as an inhibit signal that prevents the transmission of data to the display tags during transmission of a signal from a display tag. In operation, the microprocessor 82 determines when data is being received at receiver 86. When data is being received, microprocessor 82 provides a logic "0" signal to the AND gates 92 and 92'. Therefore, these AND gate prevents the 50 kHz signal from being transmitted to the shelf loop. By inhibiting the area controller transmitter, the area controller receiver can better receive communications from display tags because the reverse communication channel is free from the 50 kHz signal.

The phase 1 signal from the microprocessor also provides the data to be transmitted to the display tags. The microprocessor provides a stream of logic "0" and "1" signals representing the data to be transmitted to the display tags. In operation, a logic "0" from the microprocessor operates to stop transmission of the 50 kHz signal to the shelf tag. A logic "1" from the microprocessor allows the transmission of the 50 kHz signal to the shelf tag. Therefore, the display tags detect the stream of data bits based on the presence (or absence) of the 50 kHz signal during specific time intervals within a frame as more fully described hereinbelow with reference to FIGS. 23a–d.

The outputs of the AND gates 92 and 92' are input to buffers 94 and 94'. The outputs of buffers 94 and 94' drive two MOSFETS 96 and 96'. These MOSFETS alternate being on and drive transformer 98. The result is a push/pull transformer, which outputs a square wave at the shelf loop conductor that swings between a positive and negative value at a 50% duty cycle (referred to as "B" for bus voltage).

The present invention contemplates maintaining a constant current to the display tags no matter how many tags are coupled to a shelf loop conductor. Such a system permits display tags or shelves to be added or removed from a shelf loop without having to rewire or adjust power supplies. Thus, the voltage "B" required to produce a constant current will change depending on the load out on the system. Thus, as a user adds more tags and shelves, the AC and DC impedance will change, and the voltage required to maintain the same sinusoidal current waveform will change. In this manner, the current is maintained at the value required to operate the system without overdriving the system and wasting energy. In an embodiment of the invention, the shelf loop conductor maintains a constant current of approximately 2.2 amps, peak amplitude. The voltage required to maintain this constant current varies between 4 and 48 volts.

A constant current is maintained by using a current sense transformer 100, a current-to-voltage converter 102, and a buck converter 104. A signal from a display tag is communicated using the communication protocol described elsewhere herein and the impedance modulation technique described elsewhere herein. The area controller receives the signal at the current sense transformer 100. The received signal is divided down by a factor of 100 based on a transformer turn ratio of 1:100. The received signal is then passed onto the receiver board for further processing as discussed below. In addition, the received signal is used in conjunction with the current sense transformer 100, current-to-voltage converter 102, and buck converter 104 to maintain a constant current in the shelf loop.

In operation, the signal received at the current sense transformer 100 is converted to a voltage by current-to-voltage converter (I/V) 102. In the described embodiment of the invention, the current-to-voltage converter 102 is implemented with a pair of resistors through which a current passes to develop a voltage drop. That voltage is fed back to buck converter 104. The buck converter 104 is part number LT1076 from Linear Technology. Once again, it should be understood that the use of this particular device is merely exemplary. Other equivalent devices may be used without departing from the spirit and scope of the claimed invention.

As illustrated, the buck converter 104 operates with a nominal input voltage of 48 volts. The buck converter 104 outputs a voltage B+, ranging from 4 volts to 48 volts. Based on the feedback voltage, the buck converter varies the output voltage, B+, based on the feedback voltage. In this manner, the buck converter modifies its output voltage, B+, in an effort to maintain a constant feedback voltage. For the LT1076, the feedback voltage should be maintained at approximately 2.35 volts, which corresponds to a constant current of 2.2 amps at the shelf loop.

For example, when an additional tag is added to a shelf (or an additional shelf or section is added), the load on the shelf loop will increase and current will decrease in the shelf loop. The current sense transformer 100 will sense the decreased current and the current-to-voltage converter 102 will feedback a decreased voltage. The buck converter 104 will sense the decreased voltage and increase the output voltage B+ in an attempt to maintain a constant current on the shelf loop. Similarly, when a tag is removed from a shelf, the load on the shelf will decrease, and current will increase in the shelf loop. The current sense transformer 100 will sense the increased current and the current-to-voltage converter 102 will feedback an increased voltage. The buck converter 104 will sense the increased voltage and decrease the output voltage B+, thereby maintaining a constant current on the shelf loop.

As previously discussed, the current sense transformer 100 also sends the received signal from the display tags to detector 106 on the receiver board 81. The detector 106 detects the current from the current sense transformer 100 and the signal is then passed to band pass filter 108, in which any noise or any portion of the 50 kHz transmitted signal is filtered. From the filter 108, the filtered signal is passed to two tone decoders, 109 and 109'. Communication from the display tags is received by the area controller 31 at either 33.3 kHz or 40 kHz carrier frequencies as described elsewhere herein. The first tone decoder is for the communication signals at the 40 kHz carrier. The second tone decoder is for communication signals at the 33.3 kHz carrier. The information carried on the 33.3 kHz or 40 kHz signals is respectively demodulated or detected at respective detectors 111, 111'. These received signals are then converted to digital signals and sent to microprocessor 82. The microprocessor 82 may be configured to receive data on channel 1 (40 kHz) or on channel 2 (33.3 kHz). If any signals are being received from the display tags, the microprocessor 82 may temporarily disable the 50 kHz transmission of power/data as previously described.

Redundancy using Two Communication Channels and Impedance Modulation

According to one embodiment of the present invention, all tags associated with a particular area controller are instructed to communicate with the area controller using one of the two channels. Then, if one tag malfunctions by continuously transmitting on that channel, all the other tags associated with the same area controller are instructed to switch their reverse communication channel to thereby begin communicating using the other of the two channels. The area controller can instruct the tags to continue to utilize the other channel until the defective tag is replaced. After the defective tag is replaced, the area controller can then instruct all tags to revert to the original channel or, alternatively, reverse communication can be continued using the other channel.

According to another method, tags may communicate with an area controller using either of the two channels. Accordingly, one tag using the first channel can communicate with an area controller simultaneously with another tag communicating with the area controller using the second channel. As described above, in the event a tag malfunctions by continuously transmitting on one of the channels, the area controller can then instruct all other tags to communicate using the other channel.

Figure 19A:
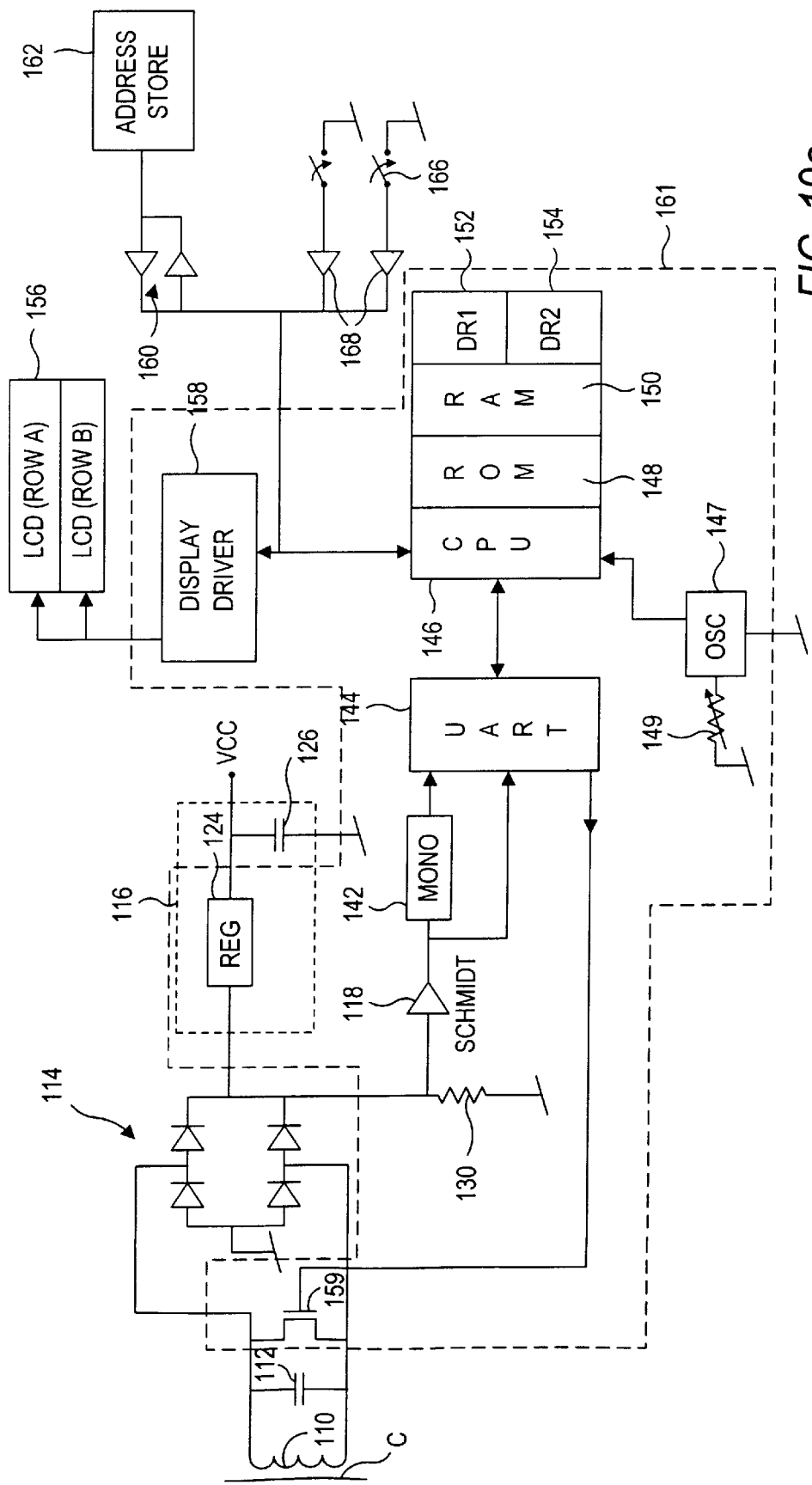
FIG. 19a is a schematic diagram of an implementation for the electronic display tag shown in the systems of FIGS. 1 and 2
Figure 19B:
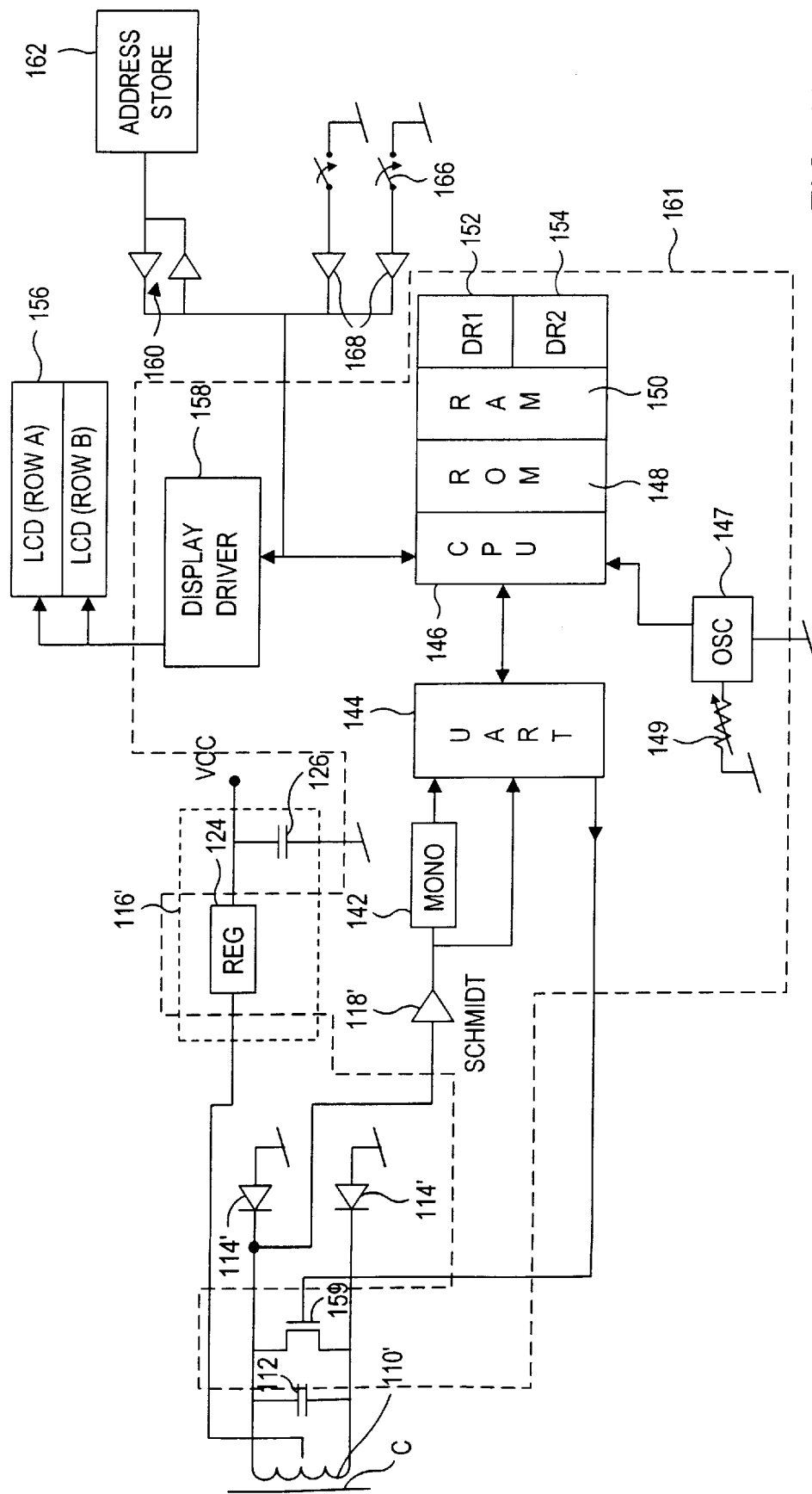
FIG. 19b is a schematic diagram of an alternative implementation for the electronic display tag shown in the systems of FIGS. 1 and 2

The display tag 20 can transmit signals to the area controller 31 by an impedance modulation scheme which changes the impedance of the tag circuit that is inductively coupled to the conductor C, thereby changing the impedance of the loop formed by the conductor C. This impedance change is detected by the current sense transformer 100 in the area controller 31. Turning to FIGS. 19a and 19b, to initiate such an impedance change in a display tag, the UART 144 turns on a JFET 159 connected in parallel with the resonant circuit 110, 112. The conduction of the JFET 159 shorts the capacitor 112, thereby changing the impedance of the circuit coupled to the conductor C. Thus, by modulating the impedance of the tag circuit by successively turning the JFET 159 on and off, a signal may be induced in the conductor C at a frequency which is a sub-harmonic of the ac power signal which serves as the carrier signal. Described in another way, by successively turning the JFET 159 on and off, the tag modulates the current load in the conductor C.

To avoid naturally generated noise, the sub-harmonics are preferably generated by rendering the JFET 159 conductive every odd number of cycles of the ac power signal in the wire loop. For example, if the JFET 159 is turned on during only one cycle out of three successive cycles of the ac power signal in the wire loop, the frequency of the signal induced in the loop by the tag is $2/3$ the frequency of the ac power (carrier) signal. Naturally occurring sub-harmonics do not occur at odd fractions of the primary frequency and thus will not interfere with the signal artificially generated by the impedance modulation. By using this approach the area controller can detect communications from the tags by monitoring and amplifying by a large factor its carrier at the chosen reverse communication frequencies. By choosing a reverse communication frequency so as to avoid naturally occurring sub-harmonics, the signal can be sufficiently amplified while avoiding the interference of noise. As an example, where the current on the conductor C is about 4 milli-amps, the tag causes a current modulation measured in micro-amps.

The frequency of the induced signal is $F_c - F_c/N$, where $F_c$ is the carrier frequency and N is a positive odd integer. When the FET is turned on every third half cycle, for example, N is 3 and the sub-harmonic is $2/3$ $F_c$. According to one embodiment, where the carrier frequency is 50 kHz, the FET is turned on and off at a frequency of 16.66 kHz ($F_c/N = 50$ kHz/3), signals are induced in the carrier at 50 kHz±16.66 kHz (33.33 kHz and 66.66 kHz). The area controller is designed to detect the signal modulated at 33.33 kHz which may designated, for example, as a first channel. Likewise when N is 5, and the carrier frequency is 50 kHz, the FET is turned on and off at a frequency of 10 kHz ($F_c/N = 50$ kHz/5), signals are induced in the carrier at 50 kHz±10 kHz (40 kHz and 60 kHz). The area controller is designed to detect the signal modulated at 40 kHz which may designated, for example, as a second channel.

According to one method of implementation of the impedance modulation scheme, a bit of data is represented by a burst of one or more cycles of the artificially generated sub-harmonic signal. Successive bursts, of course, must be separated by periods of no impedance modulation to enable each separate burst to be detected as a separate bit of data.

According to another implementation method, each tag can transmit data back to an area controller 31 using either of two channels, one at $2/3$rds the carrier frequency and one at $4/5$ths the carrier frequency. "1"s are represented by the presence or absence of modulation during a given period while "0"s are represented by the absence or presence, respectively, of modulation. According to one embodiment, the carrier frequency for signals sent by the area controller 31 to the tags 20 is 50 kHz. Accordingly, one feedback channel is at 33.3 kHz and a second feedback channel is at 40.0 kHz.

As described above, the provision of two channels provides a means of redundancy which can be used to overcome problems associated with the malfunction of a tag.

This impedance modulation technique is a way of transmitting data from the tag to the area controller in a manner which is virtually powerless. The only consumed power is that needed to turn the JFET on and off. Thus it is clear that a tag does not generate its own carrier for reverse communication to the area controller but rather modifies the carrier generated by the area controller in a manner that can be detected by the area controller.

Signals induced in the wire loop by impedance modulation in a tag are detected in the current sense voltage transformer 100 of the area controller 31. See FIG. 8. The area controller's microprocessor 82 then decodes this information and determines which tag is the source of this signal. The area controller then processes this data for functions controlled by the area controller such as check sums for price verification or passes information onto the system controller 28.

In another embodiment of the present invention, another means of redundancy is provided that can be used to overcome malfunctions in an area controller. Each area controller is coupled to a redundant area controller through master/slave logic 115. The redundant area controller (not shown) is identical to the area controller 31 and may be contained in the same unit. Under control of the microprocessor 82, the redundant area controller 31 may be inhibited until such time as the area controller 31 fails. The two area controllers are connected in a daisy chain to maintain the continuity of the RS-485 communication.

Area Controller Operation and Communication with Tags

Figure 12:
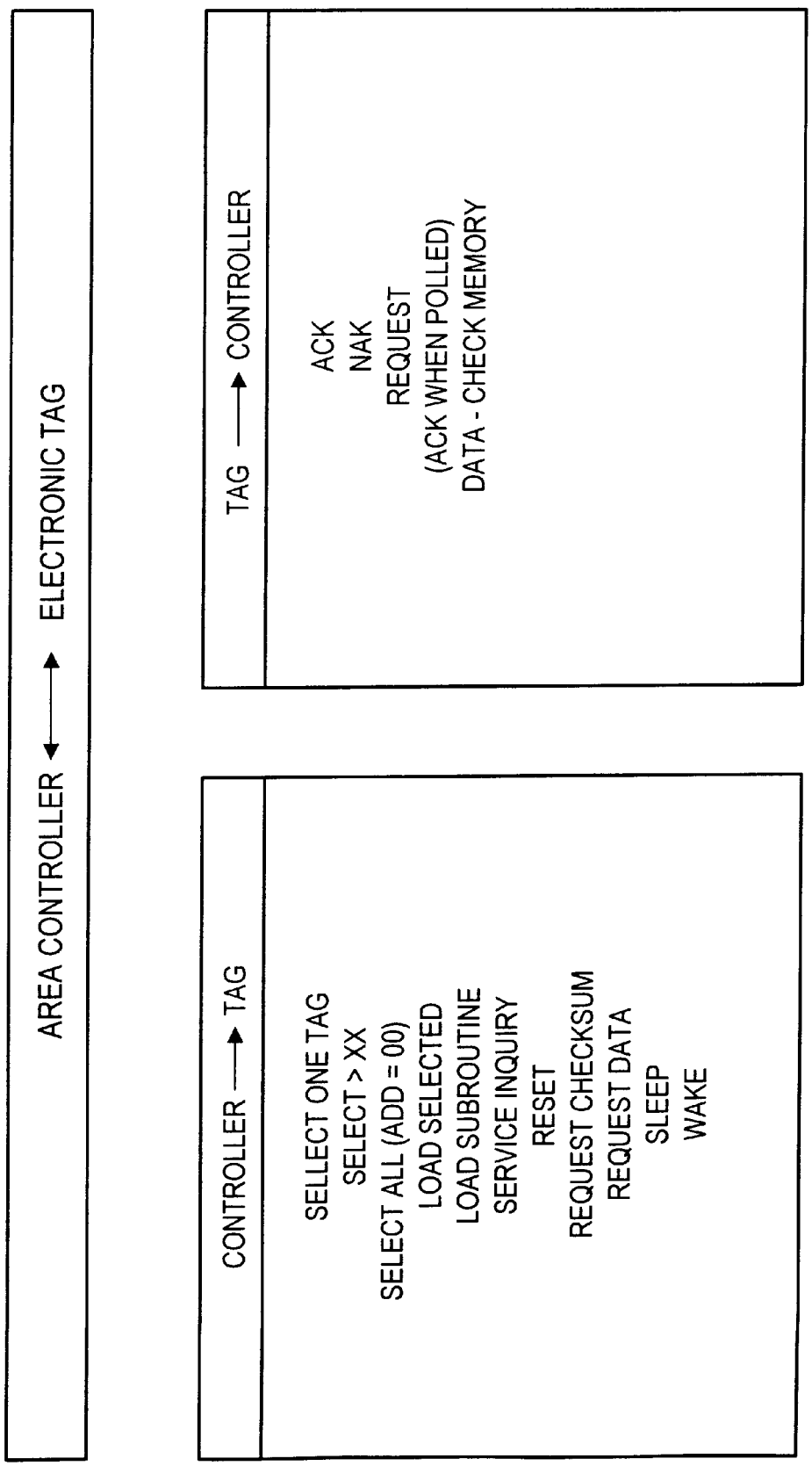
FIG. 12 is a listing of the commands used for communication between the area controller and one of the electronic display tags according to an embodiment of the present invention.

As described previously, area controllers and display tags communicate with each other using a set of predefined commands. These elements exchange both addresses and data. Specifically, as illustrated in FIG. 12, the serial data sent from the area controller to the display tags may include a tag address ("select one tag") or a selected group of tags, an "all tag" command to which all tags respond when they recognize a special address, a "load selected" command which includes a particular tag address, a "load subroutine" command which loads a set of data in the unused portion of a particular tag's memory, a "service inquiry" command to query whether any tags need to communicate with the area controller, a "reset" command for resetting a particular tag, a "request checksum" command which is responded to by a tag sending a checksum corresponding to its down-loaded data (this is a price verification routine), a "request data" command which invites a tag to send selected data to the area controller, or "sleep" or "wake-up" commands which respectively remove and apply on-board power to certain circuits for each tag.

The serial data sent from the display tag to the area controller includes requests and responses. An "Ack" response means that the tag received the communication from the area controller, and a "Nak" response means that the communication failed. A "Request" is an affirmative response to a service invitation to send data to the area controller, and "Data" is the data sent in response to the area controller requesting the data.

The area controller 31 communicates to both the system controller 28 and a plurality display tags 20 utilizing a conventional interrupt handling scheme, where incoming and outgoing messages to both the system controller 28 and the plurality of display tags 20 are buffered in respective input and output message queues. The microprocessor 82 is interrupted upon receiving an incoming message from either the system controller or one of the display tags, and interrupt handling routines buffer the incoming messages in corresponding input message queues.

Figure 13A:
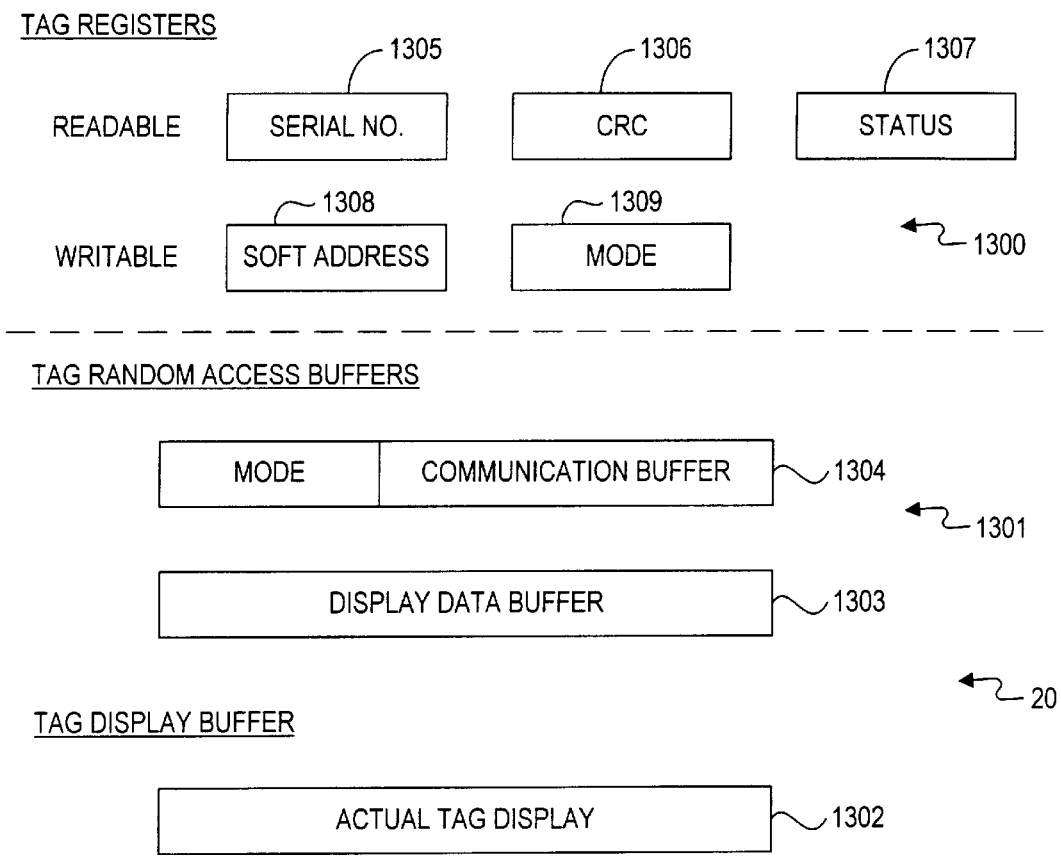
FIGS. 13a and 13b show portions of an electronic display tag.

As shown in FIG. 13a each display tag 20 includes a plurality of tag registers 1300, a pair of access buffers 1301 and an actual display buffer 1302. The actual display buffer 1302 is the buffer that contains the actual bit map data that the display tag is presently displaying. The access buffers 1301 include a display data buffer 1303 and a mode/communication buffer 1304. The display data buffer 1303 is an access buffer that is updated by the area controller 31. Thereafter, the data in the display data buffer 1303 will be swapped into the actual display buffer when commanded to by the area controller. The mode/communication buffer 1304 is updated and accessible by the area controller, and is used by the area controller for transmitting and receiving commands and other information to and from the display tag.

The internal tag registers 1300 include a readable register 1305 for storing the display tag's Serial Number or "hard address," a readable register 1306 for storing a result of a CRC calculation performed by the display tag, a readable register 1307 for storing a code corresponding to the display tag's status, a writeable register 1308 for holding the display tag's soft address as set by the area controller, and a writeable register 1309 for holding a code corresponding to the display tag's mode of operation as set by the area controller. Each display tag has a Serial Number that is distinct from all other display tag's Serial Numbers in the system. The area controller is responsible for generating the display tag's soft address and for updating the soft address register 1308. All of the above tag registers and buffers are situated in the scratchpad RAM of the tag, a complete memory map of which is given in TABLES 3a–3c.

Figure 13B:
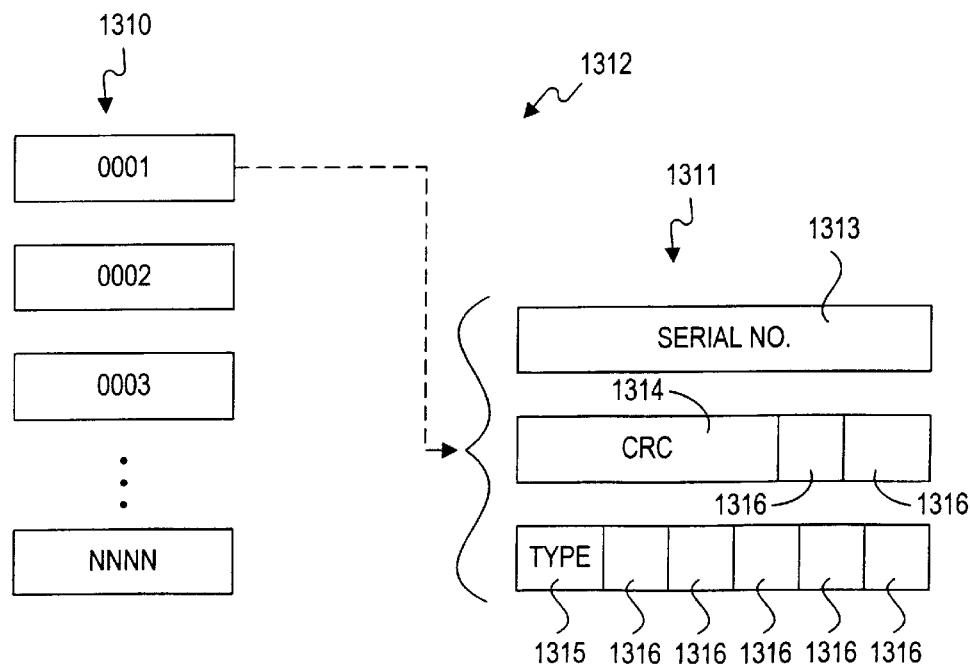

As shown in FIG. 13b, each soft address corresponds to an index 1310 into a display tag array or database 1312, maintained by the area controller, which contains a data record 1311 for each known or initialized display tag. When new display tags are added to the system, they will automatically power up with a soft address of zero. As will be described below, the area controller will therefore be able to communicate with the new or uninitialized tags by activating tags having a soft address of zero. Each database record 1311 also preferably includes the Serial Number 1313 of the display tag in which the present soft address 1310 is assigned, a value 1314 of a CRC calculation performed on the bit map data which is to appear on the corresponding display tag's display, a code 1315 representing the "type" of display tag in which the present soft address is assigned, and a plurality of state codes and/or status flags 1316 used by the area controller maintain the present status of the display tag in which the present soft address is assigned.

Referring again to FIG. 13a, during regular operation, the area controller will utilize several "action" commands that will instruct a particular display tag 20 to perform a particular operation. Several of such action commands are listed as follows:

1. CRC Mode/Communication Buffer.

This commands the particular display tag to perform an internal CRC calculation on the mode/communication buffer 1304 and to deposit the results in the CRC register 1306.

2. CRC Tag Display.

This command directs the display tag to perform a CRC calculation on the tag display buffer 1302 and to deposit the results in the CRC register 1306.

3. Sets Soft Address from Buffer.

This command directs the display tag to load the soft address register 1308 with information taken from the mode/communication buffer 1304.

4. Set Mode Register.

This command directs the display tag to load the mode register 1309 with information taken from the mode/communication buffer 1304.

5. Swap Display RAM.

This command directs the display tag to load the information from the display data buffer 1303 into the actual tag display buffer 1302.

6. Clear Communication Buffer.

This command directs the display tag to clear the mode/communication buffer 1304.

7. Clear Status Register.

This command directs the display tag to clear the information in the status register 1307.

Because the display tags 20 communicate with the area controller 31 utilizing the novel impedance modulation technique as described elsewhere herein, it is important that only one display tag be permitted to communicate with the area controller at a time. Therefore, even though each display tag receives all messages sent by the area controller, unless a display tag is "activated" by the area controller, the display tag will not process or respond to the command received. Accordingly, the area controller is responsible for sending an "activate" command to the particular display tag that the area controller chooses to communicate with at a particular time. The area controller can activate a display tag by sending an activation message to the tags which specifies the particular display tag's soft or hard address. Each display tag will receive the activation command, but if its internal soft or hard address does not match the soft or hard address designated in the activation command, the display tag will not be activated. Furthermore, the area controller also has the capability of activating all display tags by transmitting the activation command that specifies an "all tags" address.

If an active tag receives the activation command that specifies a different soft or hard address, then that display tag will subsequently deactivate itself. Furthermore, each active display tag is configured to be able to deactivate itself in response to receiving a "LATCH" command from the area controller. A LATCH command will direct an activated tag to deactivate itself only if certain criteria sent with the LATCH command is not met. If the tag meets the criteria sent with the LATCH command, it will remain active. Accordingly, the area controller can activate a particular block of tags by first activating all display tags using the "all tags" address, and then by using the LATCH command to deactivate the display tags not part of the desired block.

Figure 13C:
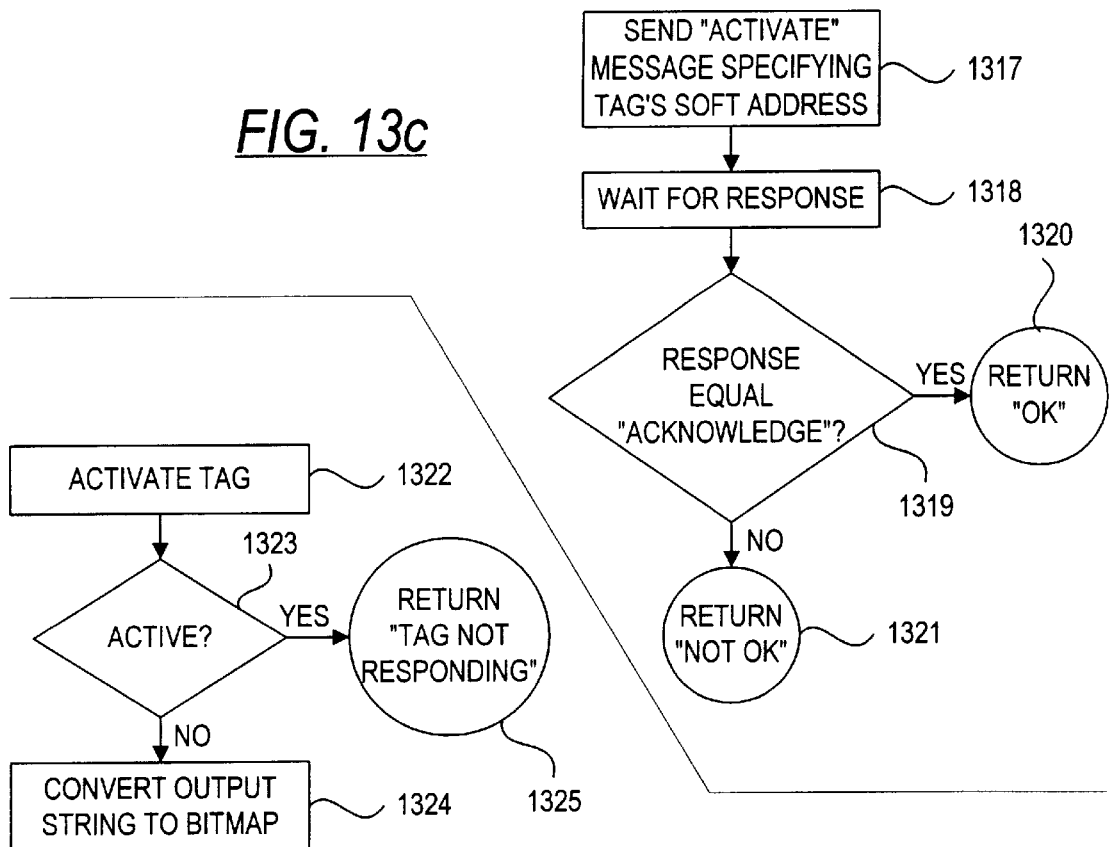
FIGS. 13c–13j illustrate a flow chart aspect of display tag operation.

FIG. 13c illustrates a flow diagram of a display tag activation process where the area controller specifies the display tag's soft address. As indicated by functional block 1317, the area controller will first transmit an "activate" message to the display tags, specifying the soft address of the display tag that the area controller wishes to activate. As indicated in block 1318, the area controller will then wait for a response back from one of the display tags; and, as indicated in block 1319, when a response is received, the area controller will determine if the response is an "Ack" (acknowledge) response. If the activate command is acknowledged, the area controller will advance to block 1320 indicating that the particular display tag was successfully activated; and if not, the area controller will advance to block 1321, indicating that the particular display tag did not successfully activate. As mentioned above, when an active display tag receives an activate command that specifies a different soft address than the active display tag's soft address in register 1308, that display tag will subsequently deactivate itself.

As discussed above (FIG. 8), the area controller includes two different communication channels, channel 1 and channel 2 for receiving communications from the display tags. One advantage for having two communication channels, is that the area controller can switch to one channel if the other is found to be excessively noisy. It has been found that the area controller can determine if one of the channels is noisy by sending an activation message over the shelf loop conductor, specifying a "dummy" soft address, which the area controller knows none of the display tags should respond to. If the area controller receives an "Ack" response, or any other response from one or more of the display tags following this "dummy" activation command, the area controller will know that the particular channel is a noisy channel and will attempt to communicate on the other available channel.

Figure 13D:
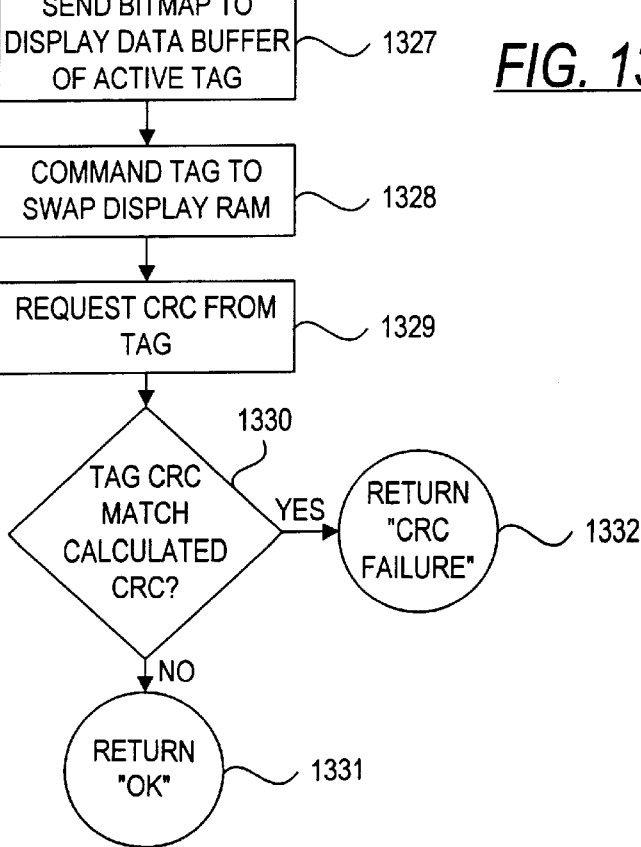

FIG. 13d illustrates a flow diagram of the area controller's process of updating a display tag's display. Once a single display tag is activated, the area controller is then able to communicate exclusively with that display tag so that the area controller can audit the information stored on the display tag or update information contained in the display tag, such as the display tag's bit map display data. For example, to update the display tags display, as shown in functional block 1322 the area controller will first activate the particular display tag as described above. As shown in block 1323, the area controller will then check to see if the particular display tag activated successfully. If the activation is successful, the area controller will advance to block 1324; and if not successful, the area controller will advance to block 1325. In block 1325 the area controller will abort the particular attempt to update the display and will report the failure in the database record of the particular display tag. If the display tag is not responding, the display tag may have been removed from the conductor strip along the front of the shelf or the display tag may be malfunctioning. Upon advancing to block 1324 (the display tag successfully activated) the area controller will then convert the output string to be displayed into bit map data. This conversion process will be described in greater detail below. The area controller will then advance to block 1326, where it will perform a CRC calculation on the bit map. Next, the area controller will advance to block 1327 where it will transmit the bit map to the particular display data buffer 1303 of the active display tag. In block 1328, the area controller will command the display tag to swap the data from the display data buffer 1303 into the actual display tag display buffer 1302. In block 1329, the area controller will command the display tag to perform a CRC calculation on the data contained in the display tag display buffer and will then ask the display tag to report the CRC calculation information back to the area controller. Upon receiving this CRC calculation from the display tag, as shown in block 1330, the area controller will determine if this CRC calculation reported back from the display tag matches the CRC calculation that the area controller performed in block 1326. If the CRC matches, the area controller will advance to block 1331, where it will report that the display tag display has been successfully updated. If the CRC check failed, the area controller will advance to block 1332 where the area controller will report that the CRC check failed.

The present system has the capability of supporting numerous types of display tags, each of which may have a different size of display screen. As shown in FIG. 13b, the code corresponding to the particular type of display tag will be stored in the database in "type" block 1315. As indicated in functional block 1324 of FIG. 13d, the area controller will translate the ASCII string into a bit map before transmitting the bit map to the particular display tag. Accordingly, because different types of display tags are available in the system, an ASCII string will be translated differently depending upon the type of display tag that the bit map is to be displayed on. Therefore, the area controller includes a look-up table or a translation table stored in non-volatile memory, and the display tag "type" code 1315 corresponds to an index into the look-up table. Each data entry in the look-up table corresponds to a particular translation code, which manages the translation of an ASCII string into the actual bit map data corresponding to the size and dimensions of the particular display tag display. Accordingly, if a new display tag type is to be added to the system, rather than having to completely reprogram the area controller software, only the non-volatile memory will need to be modified or updated. For example if the non-volatile memory is an EPROM chip, a new chip that includes the new look-up table entry will be installed in the area controller; or if the non-volatile memory is a flash memory, the new look-up table entry can be downloaded from the system controller without having to replace any devices on the area controller itself.

Figure 13E:
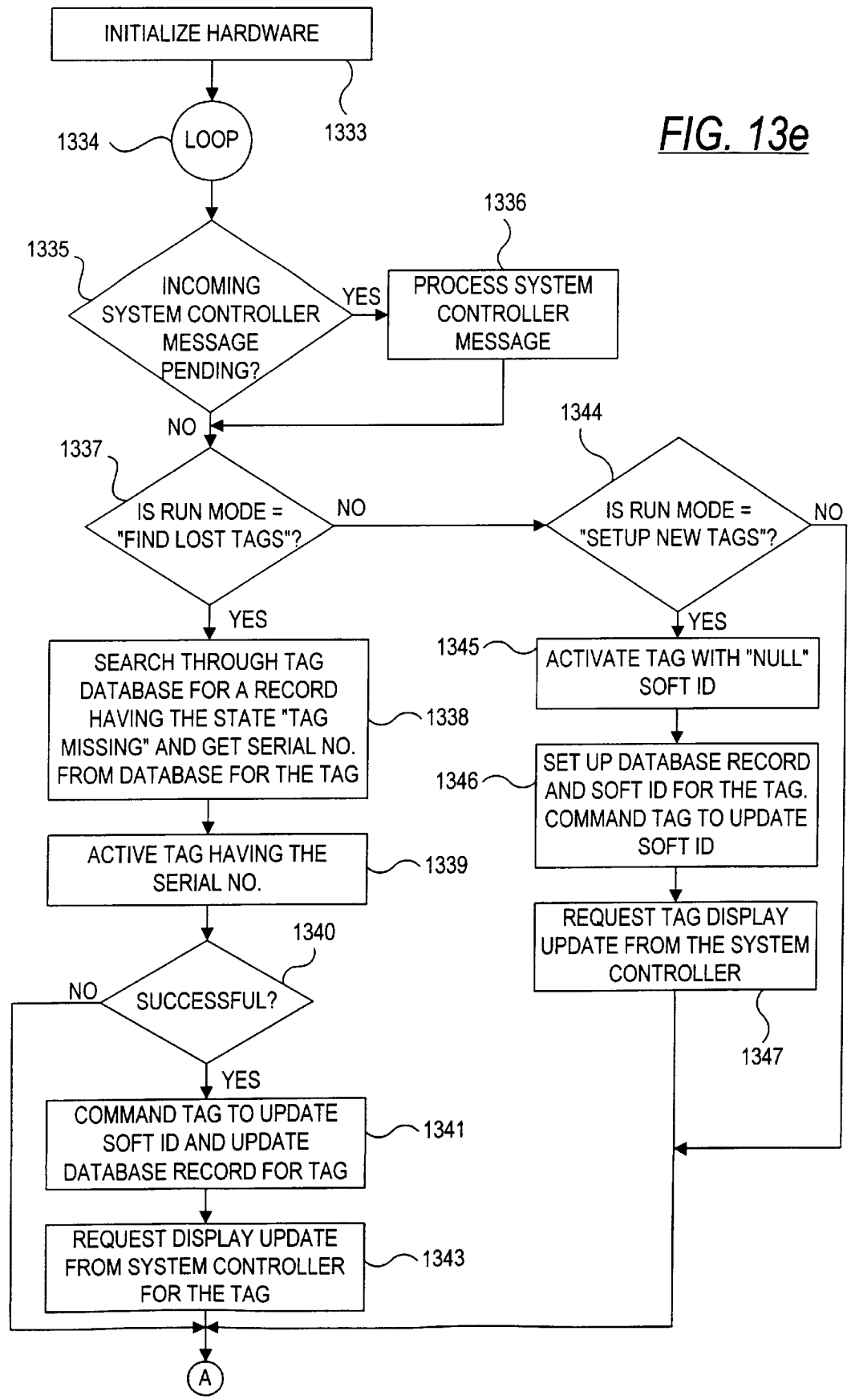
Figure 13F:
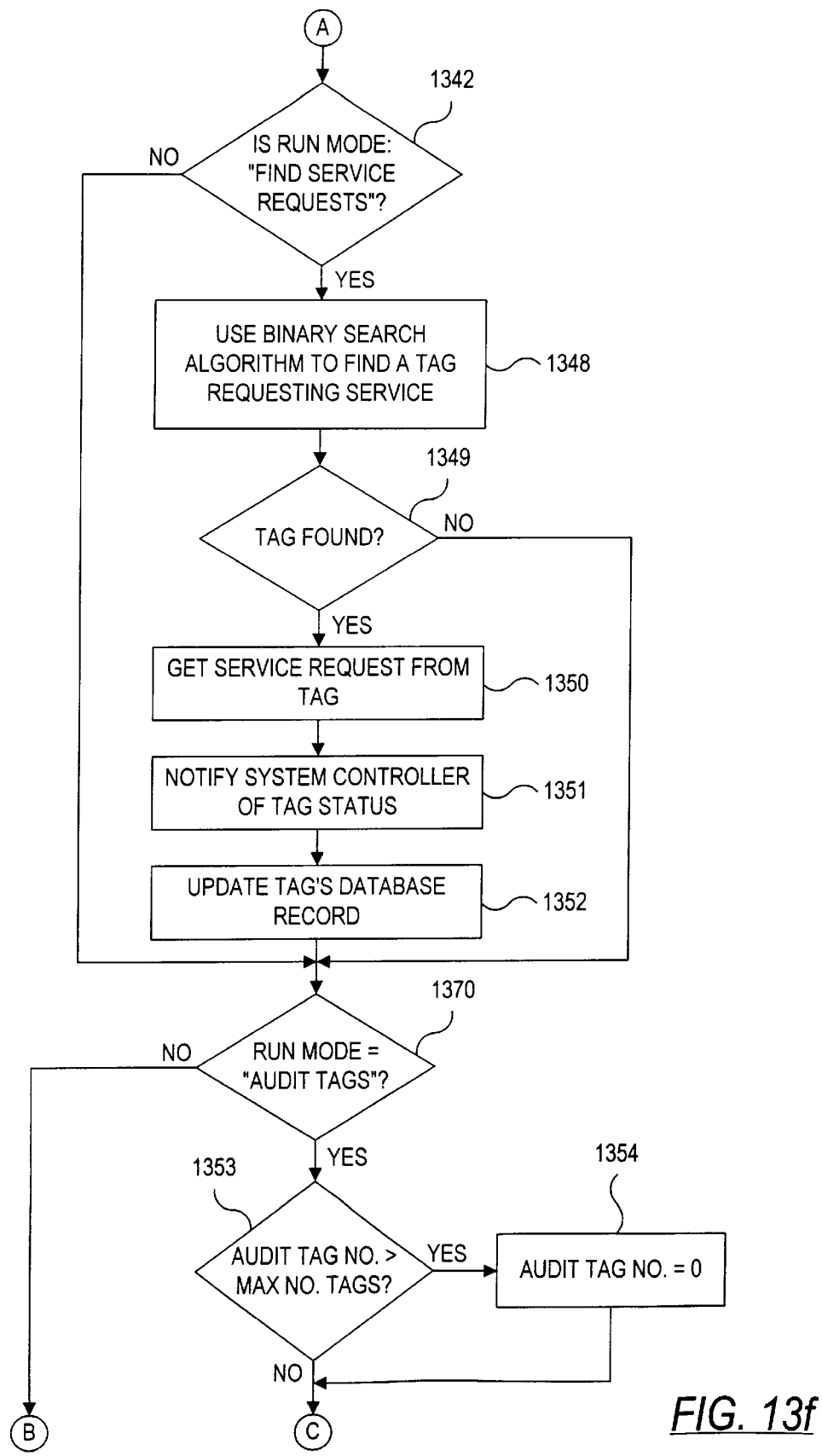

The general operation of the area controller is depicted in a flow diagram as shown in FIGS. 13e and 13f. Upon start-up, the area controller first performs hardware and software initialization as indicated by functional block 1333. From block 1333 the area controller software advances block 1334 to begin the executive loop. As indicated in block 1335, the first operation performed by the area controller in the executive loop, is to determine whether an incoming system controller message is pending. If an incoming system controller message is pending the area controller advances to block 1336 to process the system controller message; and if no system controller message is pending the area controller advances to block 1337. As described elsewhere herein, the system controller is responsible for controlling the run-mode, or operating mode, of the area controller. The four primary run-modes for the area controller are: an audit mode, a setup-new-display-tags mode, a find-service-requests mode, and a find-lost-display-tags mode. The audit mode, in which the area controller sequentially audits the contents of each display tag, will preferably be the default mode of operation. The find-lost-display-tags mode and the setup-new-display-tag modes are the modes that will be requested by the system controller when the system is being first set up, or when new display tags are added to the system.

Referring back to FIG. 13e, upon entering functional block 1337, the area controller will determine if the run mode established by the system controller is the find-lost-display-tags mode. If so, the area controller will advance to block 1338 where it will perform a search through the database 1312 for a display tag record having a status code which indicates that the display tag is missing. Once such a record 1311 has been found, the area controller will retrieve the serial number 1313 from the present database record. Thereafter, the area controller advances to block 1339, where the area controller will attempt to activate the particular display tag having the serial number retrieved in block 1338. In block 1340 the area controller determines if the activation attempt was successful. If successful, the area controller advances to block 1341; and if unsuccessful, advances to block 1342. In block 1341, the area controller commands the activated display tag to update its soft address register 1308 with the database record index number corresponding to the database record found in block 1338. The area controller then advances to block 1343, where it requests the system controller to update the activated display tag's display.

If, back in functional block 1337, the area controller determined that the present run-mode was not the find-lost-display-tags mode, then the area controller advances to block 1344, where it determines whether the present run-mode is the setup-new-display-tags mode. If the present run-mode is determined block 1344 to be the setup-new-display-tags mode then the area controller advances to block 1345; and if not, the area controller advances to block 1342. In block 1345, the area controller will activate the display tags having a soft address of zero (corresponding to an uninitialized soft address). As described above, each new display tag added to the system will initiate itself to have a zero soft address. If an uninitialized tag activates successfully, the area controller advances to block 1346 where it establishes a new database record for the activated display tag. Once established, the area controller commands the display tag to update its soft address register 1308 with the index into the database corresponding to the new database record. Thereafter, the area controller advances to block 1347 where it requests the system controller to update the new display tag's display.

If, in block 1342, the area controller determines the present run-mode is the find-service-requests mode, then the area controller advances to block 1348; and if not, the area controller advances to block 1370. In block 1348, the area controller uses a binary search algorithm to find a display tag requesting service. This binary search algorithm will be described in greater detail below. Next, the area controller advances to block 1349 to determine whether a display tag requesting services has been found. If found, the area controller advances to block 1350; and if not found, the area controller advances to block 1370. In block 1350, the area controller retrieves the service request from the display tag. A display tag will request a service request when it has just been powered up, when there is a synchronization problem between the area controller and the display tag, when the display tag fails its power up self-test, or when a button is pushed on the display tag. Once the service request is retrieved from the display tag, the area controller advances to block 1351, where it notifies the system controller of the display tag's status. After notifying the system controller of the display tag's status, the area controller advances to block 1352 where it updates the display tag's database record. Thereafter, the area controller advances to block (where it determines whether the present run-mode is the audit-display-tags mode.

As described above, the area controller will default to the audit mode unless directed otherwise by the system controller. In the audit mode the area controller will progress from display tag to display tag to determine whether the tags' display and other information matches the corresponding information contained in the database 1312. If, in block 1370, the area controller determines that the run mode is the audit mode, then the area controller advances to block 1353; otherwise the area controller advances to block 1369, where it returns to the beginning of the executive loop 1334. The area controller utilizes a global variable, Audit_Tag_No, which holds the soft address of the last display tag that was audited. In block 1353 the area controller determines whether the Audit_Tag_No equals the maximum number of display tags. If so, the area controller advances to block 1354, where the area controller sets the Audit_Tag_No back to 0 and then advances to block 1355, so that the next display tag audited will have a soft address of 1, corresponding to the first entry in the database. If, in block 1353, the area controller determines that the Audit_Tag_No does not equal the maximum number of display tags, the area controller advances to block 1355 where it increments the Audit_Tag_No to audit the next display tag in the database. In block 1356, the area controller retrieves the database record corresponding to the Audit_Tag_No. In block 1357 the area controller determines from the database record whether the display tag is indicated as "okay." If the database record indicates that the display tag is okay, then the area controller advances to block 1358; and if not okay, the area controller advances to block 1359. In block 1359, the area controller will attempt to activate the display tag to determine whether the display tag is still present. After activating the display tag the area controller will advance to block 1360 to determine whether the display tag responds to the activation. If the display tag responds, the area controller advances to block 1361 to update the database record and if it does not respond, the area controller advances to block 1362 to change the status of the display tag as "display tag missing." Once the status of the display tag record has been changed in block 1362 the area controller advances to block 1361 to update the database record for the particular display tag.

If in block 1357, the area controller determines that the display tag was "okay" then the area controller advance to block 1358 to command the display tag to perform a CRC calculation on its display data buffer 1302, and to request the display tag to report the results of its CRC calculation back to the area controller. This CRC calculation received from the display tag is compared with the expected CRC value 1314 in the database 1312. Next, the area controller advances to block 1363 to determine whether the CRC from the display tag matches the expected CRC value from the database. If the CRCs match, the area controller advances to block 1364 to indicate that the audit has passed; and if the CRCs do not match, the area controller advances to block 1365 to indicate in the database record that the display tag's display is presently "empty," and then commands the display tag to blank its own display. From block 1365 the area controller advances to block 1366 to indicate that the audit has failed.

From block 1364 and block 1366 the area controller advances to block 1367 where it determines whether the audit has passed. If the audit failed, the area controller advances to block 1368 to report the failure to the system controller. If the audit passed, the area controller advances to block 1361 to update the display tag's database record. In block 1368, after reporting the failure to system controller, the area controller advances to block 1361 to update the database record. After updating the database record in block 1361, the area controller advances to block 1369 where it returns to the beginning of the executive loop 1334.

Figure 13G:
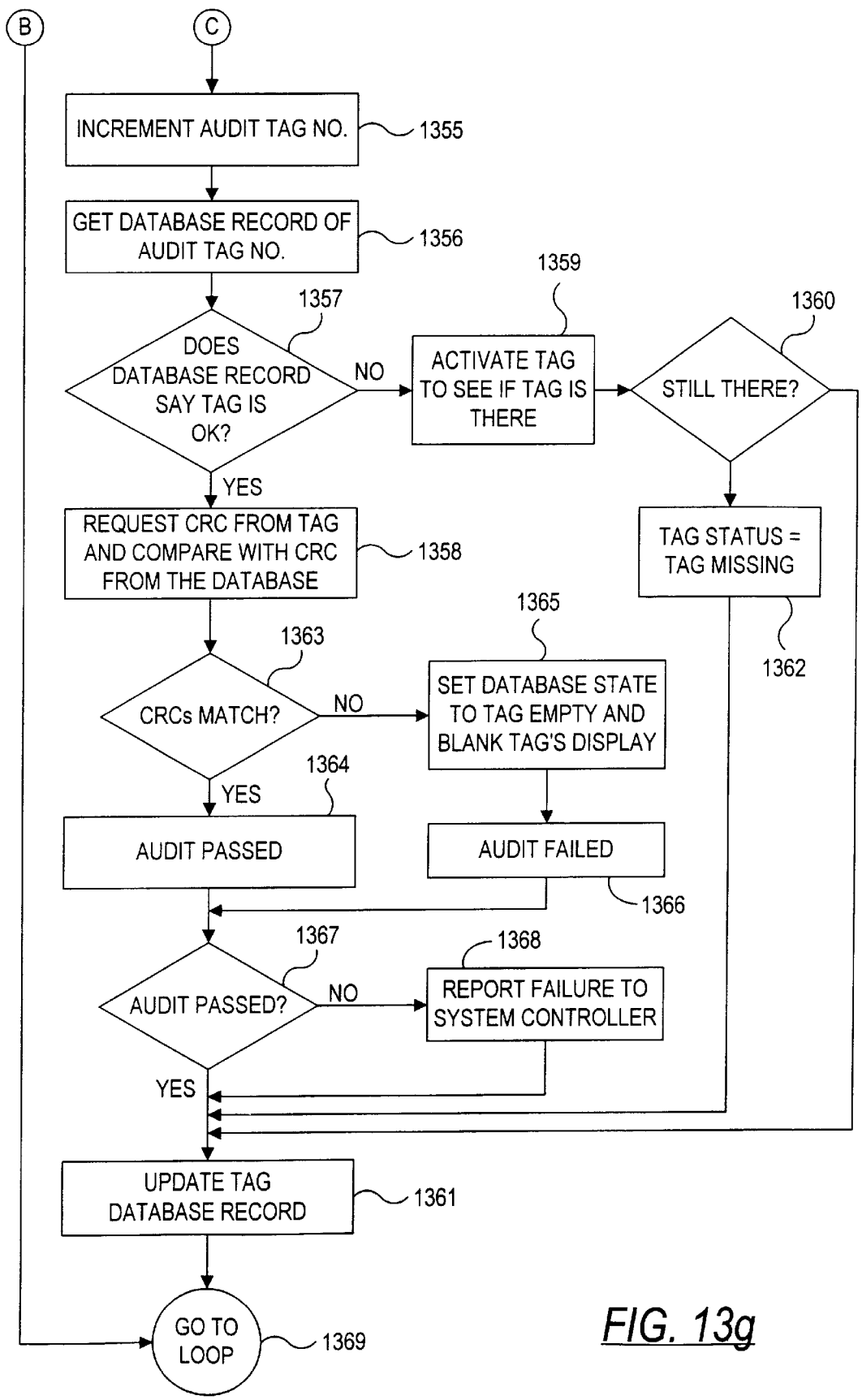
Figure 13H:
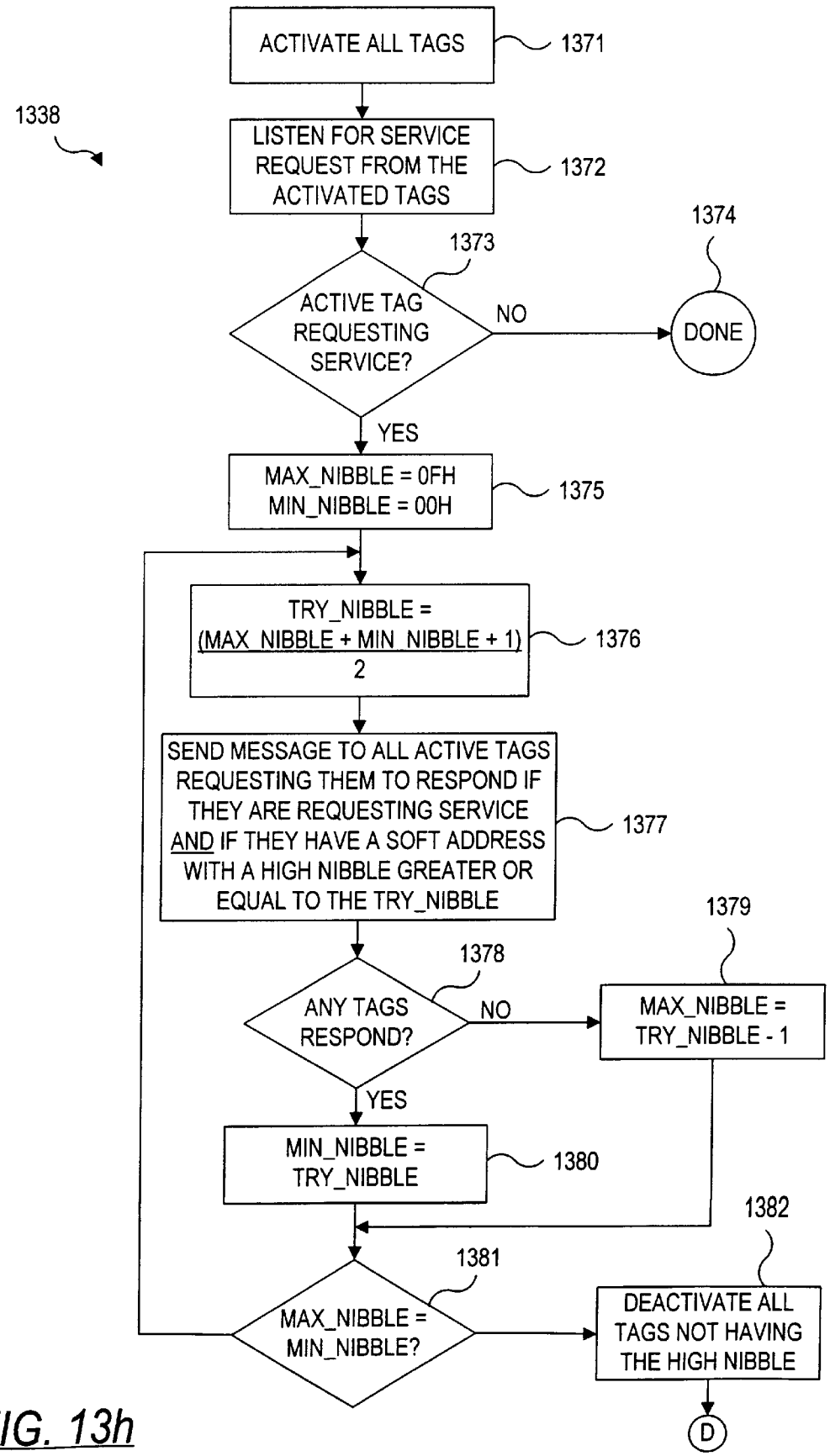
Figure 13I:
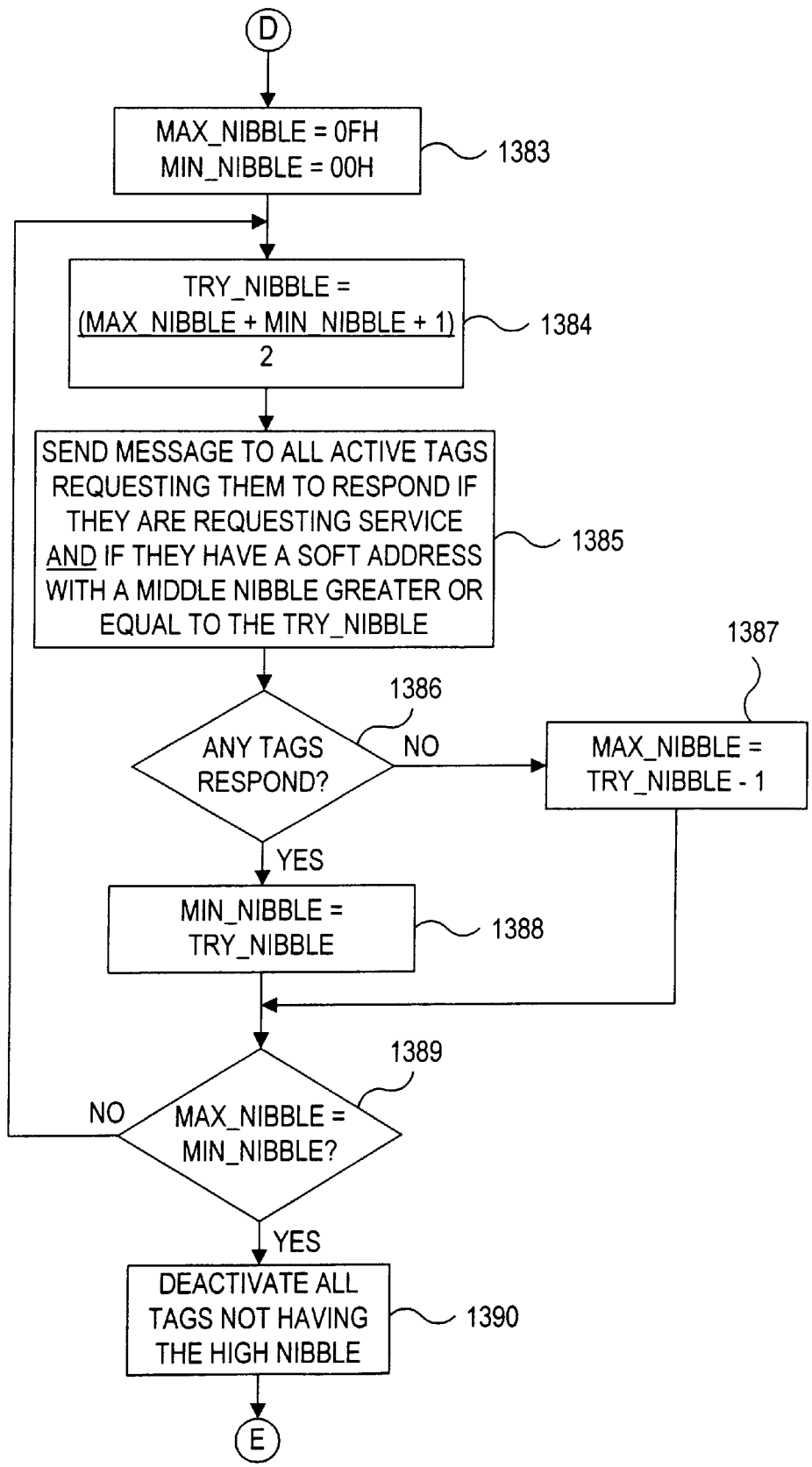
Figure 13J:
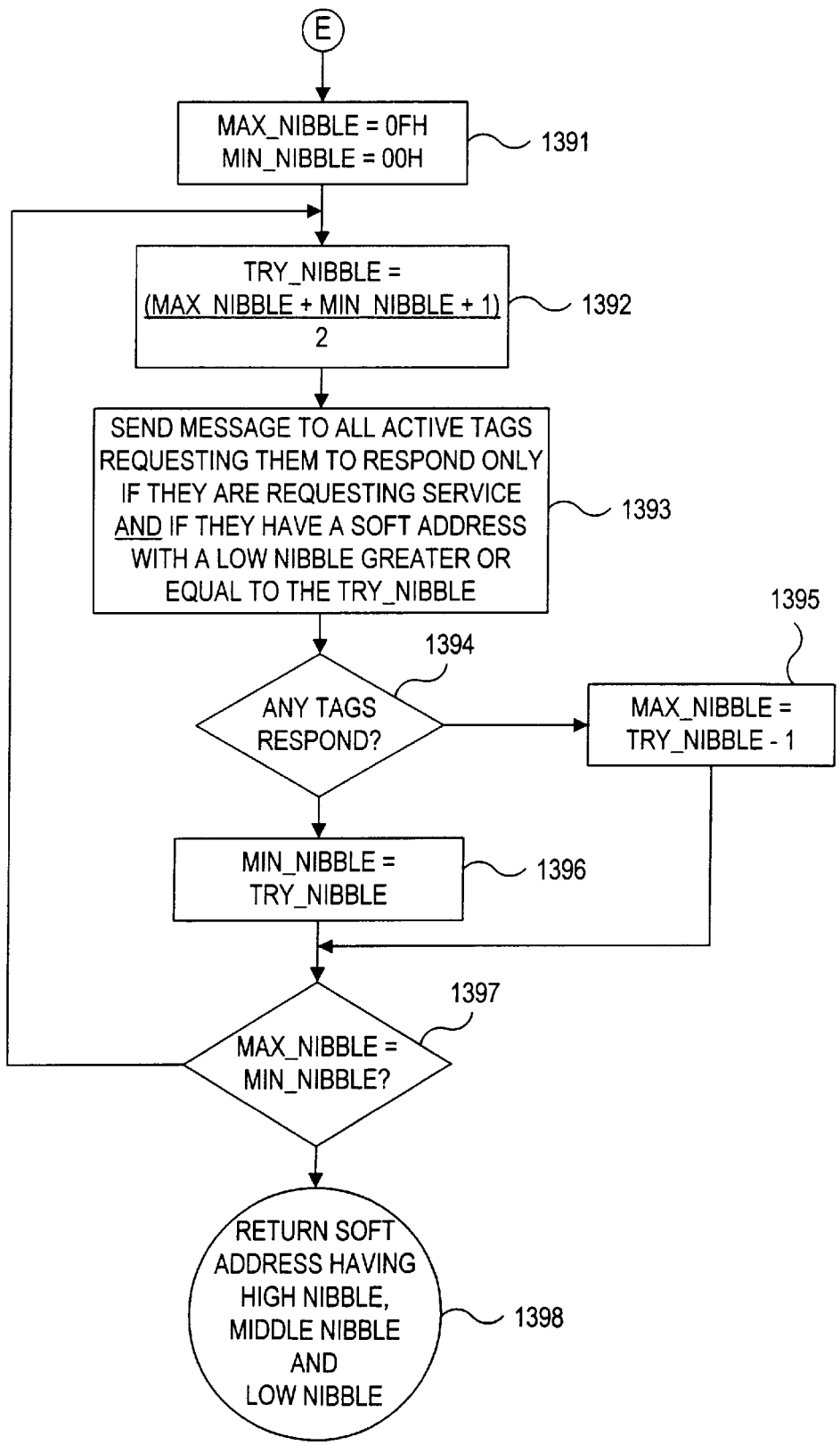

As discussed above, in block 1338, the area controller will perform a binary search through the display tags to determine which of the display tags are requesting service. In the present embodiment, the soft address will encompass twelve bits of data, and correspondingly, three nibbles of data: a high nibble, a middle nibble and a low nibble. Generally, the binary search will function as follows: the area controller will first activate all the display tags and will then broadcast a command to the active tags, requesting them to respond if they are requesting service; if any of the display tags respond, the area controller will conduct three binary searches, one for each nibble, to determine the precise soft address of the display tag requesting service. First the area controller will determine the value of the high nibble using a binary search. Basically, to conduct the binary search, the area controller uses a SEARCH command, which requests a tag to respond if certain criteria are met. The criteria used in the binary search process, requires a tag to respond if it requesting service and if a particular nibble of its soft address is greater or equal to a test value sent with the SEARCH command. After narrowing down a high nibble of the soft address using the binary search, the area controller will use the LATCH command, described above, to instruct all active display tags not having a soft address with the same high nibble to deactivate. Then, the area controller will then sequentially perform the above steps on the middle and low nibbles to respectively isolate the exact values of the middle and low nibbles. This nibble by nibble binary search procedure is shown as a flow diagram in FIGS. 13g and 13h.

As shown in block 1371, the area controller will first activate all of the display tags using the "broadcast" address. The area controller will then advance to block 1372 where it will request all the activated display tags to indicate whether they are requesting service, and in block 1373 it will determine if any of the display tags responded to the request. If one of the display tags is requesting service, the area controller will advance to block 1375; and if none of the display tags are requesting service the area controller will advance to block 1374 to exit the binary search routine.

At block 1375 the area controller will first determine the high nibble of the display tag's soft address. First, the area controller will set the variables Max_Nibble and Min_Nibble to 0FH and 00H respectively. Next, the area controller will advance to block 1376 where it will calculate the variable Try_Nibble to be equal to the following equation:

$$\text{Try\_Nibble} = (\text{Max\_Nibble} + \text{Min\_Nibble})/2$$

Next, in block 1377, the area controller will broadcast a SEARCH command to all active display tags, requesting the display tags to respond if they are requesting a service request and if they have a soft address with a high nibble greater than or equal to the value of Try_Nibble. In block 1378, the area controller will determine if any of the display tags responded to this message. If none responded, the area controller will know that the display tag requesting service has an address with a high nibble that is lower than the value of Try_Nibble and will advance to block 1379; if one of the display tags did respond to the SEARCH command sent in block 1377, then the area controller will know that the display tag requesting service has a soft address with a high nibble that is either higher than or equal to the value of Try_Nibble, and will thus advance to block 1380. In block 1379, where the display tag requesting service has a soft address with a high nibble that is lower than the value of Try_Nibble, the area controller will set the value of Max_Nibble to be equal to the value of Try_Nibble-1. In block 1380, where the area controller knows that the display tag requesting service has a soft address with a high nibble that is higher than or equal to the value of Try_Nibble, it will set the value of Min_Nibble to equal Try_Nibble. From blocks 1379 and 1380 the area controller advances to block 1381, where it determines whether the variables Max_Nibble and Min_Nibble equal each other. If they equal each other then the binary search for this nibble is complete and the high nibble of the soft address has been found. If the Max_Nibble and Min_Nibble do not equal each other, then the area controller returns to block 1376 to calculate the next Try_Nibble. Blocks 1376 through 1381 will be repeated until the value of the high nibble of the soft address of the display tag requesting service has been found. Once the high nibble of the soft address of the display tag requesting service has been found, in block 1381, the area controller advances to block 1382 where it sends a LATCH command to all active display tags, instructing the display tags to deactivate if they do not have a soft address with the high nibble equal to the value found above in block 1381.

From block 1382, the area controller advances to function block 1383 to determine the middle nibble of the display tag's soft address. First, the area controller will set the variables Max_Nibble and Min_Nibble back to 0FH and 00H respectively. Next, the area controller will advance to block 1384 where it will calculate the variable Try_Nibble to be equal to the following equation:

$$\text{Try\_Nibble} = (\text{Max\_Nibble} + \text{Min\_Nibble})/2$$

Next, in block 1385, the area controller will broadcast a SEARCH command to all active display tags, requesting the display tags to respond if they are requesting a service request and if they have a soft address with a middle nibble greater than or equal to the value of Try_Nibble. In block 1386, the area controller will determine if any of the display tags responded to this message. If none responded, the area controller will know that the display tag requesting service has an address with a middle nibble that is lower than the value of Try_Nibble and will advance to block 1387; if one of the display tags did respond to the SEARCH command sent in block 1385, then the area controller will know that the display tag requesting service has a soft address with a middle nibble that is either higher than or equal to the value of Try_Nibble, and will thus advance to block 1388. In block 1387, where the display tag requesting service has a soft address with a middle nibble that is lower than the value of Try_Nibble, the area controller will set the value of Max_Nibble to be equal to the value of Try_Nibble-1. In block 1388, where the area controller knows that the display tag requesting service has a soft address with a middle nibble that is higher than or equal to the value of Try_Nibble, it will set the value of Min_Nibble to equal Try_Nibble. From blocks 1387 and 1388 the area controller advances to block 1389, where it determines whether the variables Max_Nibble and Min_Nibble equal each other. If they equal each other then the binary search for this nibble is complete and the middle nibble of the soft address has been found. If the Max_Nibble and Min_Nibble do not equal each other, then the area controller returns to block 1384 to calculate the next Try_Nibble. Blocks 1384 through 1389 will be repeated until the value of the middle nibble of the soft address of the display tag requesting service has been found. Once the middle nibble of the soft address of the display tag requesting service has been found, in block 1389, the area controller advances to block 1390 where it sends a LATCH command to all active display tags, instructing the display tags to deactivate if they do not have a soft address with the middle nibble equal to the value found above in block 1389.

From block 1390, the area controller advances to function block 1391 to determine the low nibble of the display tag's soft address. First, the area controller will set the variables Max_Nibble and Min_Nibble back to 0FH and 00H respectively. Next, the area controller will advance to block 1392 where it will calculate the variable Try_Nibble to be equal to the following equation:

$$\text{Try\_Nibble} = (\text{Max\_Nibble} + \text{Min\_Nibble})/2$$

Next, in block 1393, the area controller will broadcast a SEARCH command to all active display tags, requesting the display tags to respond if they are requesting a service request and if they have a soft address with a low nibble greater than or equal to the value of Try_Nibble. In block 1394, the area controller will determine if any of the display tags responded to this message. If none responded, the area controller will know that the display tag requesting service has an address with a low nibble that is lower than the value of Try_Nibble and will advance to block 1395; if one of the display tags did respond to the SEARCH command sent in block 1393, then the area controller will know that the display tag requesting service has a soft address with a low nibble that is either higher than or equal to the value of Try_Nibble, and will thus advance to block 1396 In block 1395, where the display tag requesting service has a soft address with a low nibble that is lower than the value of Try_Nibble, the area controller will set the value of Max_Nibble to be equal to the value of Try_Nibble-1. In block 1396, where the area controller knows that the display tag requesting service has a soft address with a low nibble that is higher than or equal to the value of Try_Nibble, it will set the value of Min_Nibble to equal Try_Nibble. From blocks 1395 and 1396 the area controller advances to block 1397, where it determines whether the variables Max_Nibble and Min_Nibble equal each other. If they equal each other then the binary search for this nibble is complete and the low nibble of the soft address has been found. If the Max_Nibble and Min_Nibble do not equal each other, then the area controller returns to block 1392 to calculate the next Try_Nibble. Blocks 1392 through 1397 will be repeated until the value of the low nibble of the soft address of the display tag requesting service has been found. Once the low nibble of the soft address of the display tag requesting service has been found, in block 1397, the area controller advances to block 1398 where returns the entire soft address of the display tag requesting service.

Alternate Embodiment of the Operation of the Area Controller

Figure 11A:
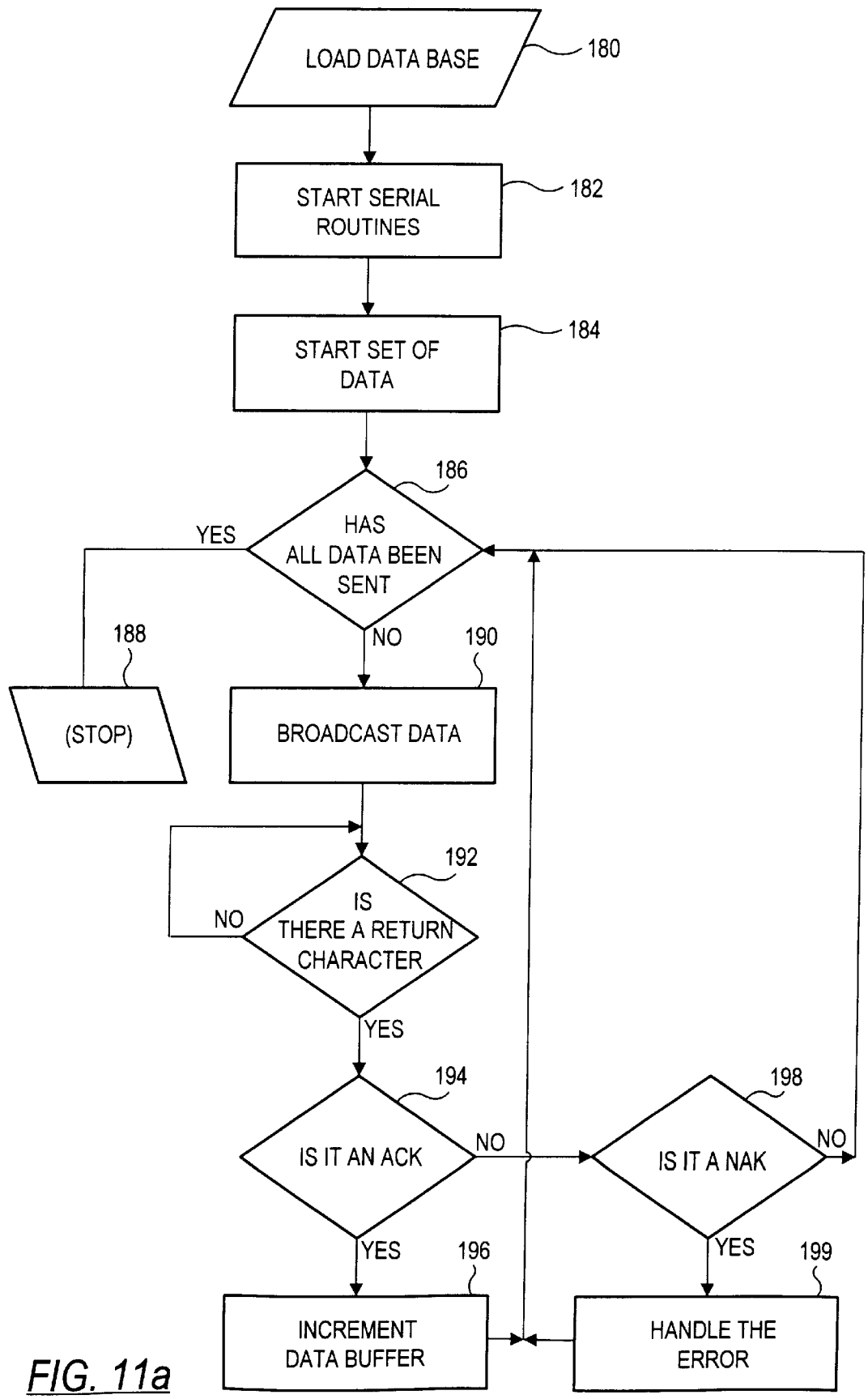
FIGS. 11a, 11b and 11c are flow charts showing how the area controller of the systems of FIGS. 1 and 2 can be operated.

An alternate embodiment the area controller operation is now described. As shown in the flow chart of FIG. 11a, for communication between an area controller 31 and its tags, the data base for the tags associated with the area controller is first loaded via the system controller. Block 180 of FIG. 11a depicts this first step. After initiating the serial communication routines (block 182) and sending the product data for initializing the first tag (block 184), the MPU in the area controller determines if all tags on the system have been initialized (block 186). If the data has been sent for all the tags, the step of down-loading is complete and this routine ends, as depicted at block 188. The initial pass through block 186, however, will lead to the step of block 190 in which the MPU broadcasts the information for the next tag associated with the area controller. At block 192, the MPU waits for one of the tags to respond. If the response is an "Ack" (block 194), flow proceeds to block 196 where the MPU increments the data buffer for initializing the address for the next tag and then proceeds back to block 186. If the response is not an "Ack" (block 194), flow proceeds to block 198 where the MPU determines whether a tag has responded with a "Nak". A "Nak" indicates an error which is handled in block 199, and then flow returns to block 188. If it is neither an "Ack" nor a "Nak", the system tries to load the tag again until it times out. It then reports the error and proceeds to the next tag. This continues until all the tags are initialized with the appropriate address and product information.

Figure 11B:
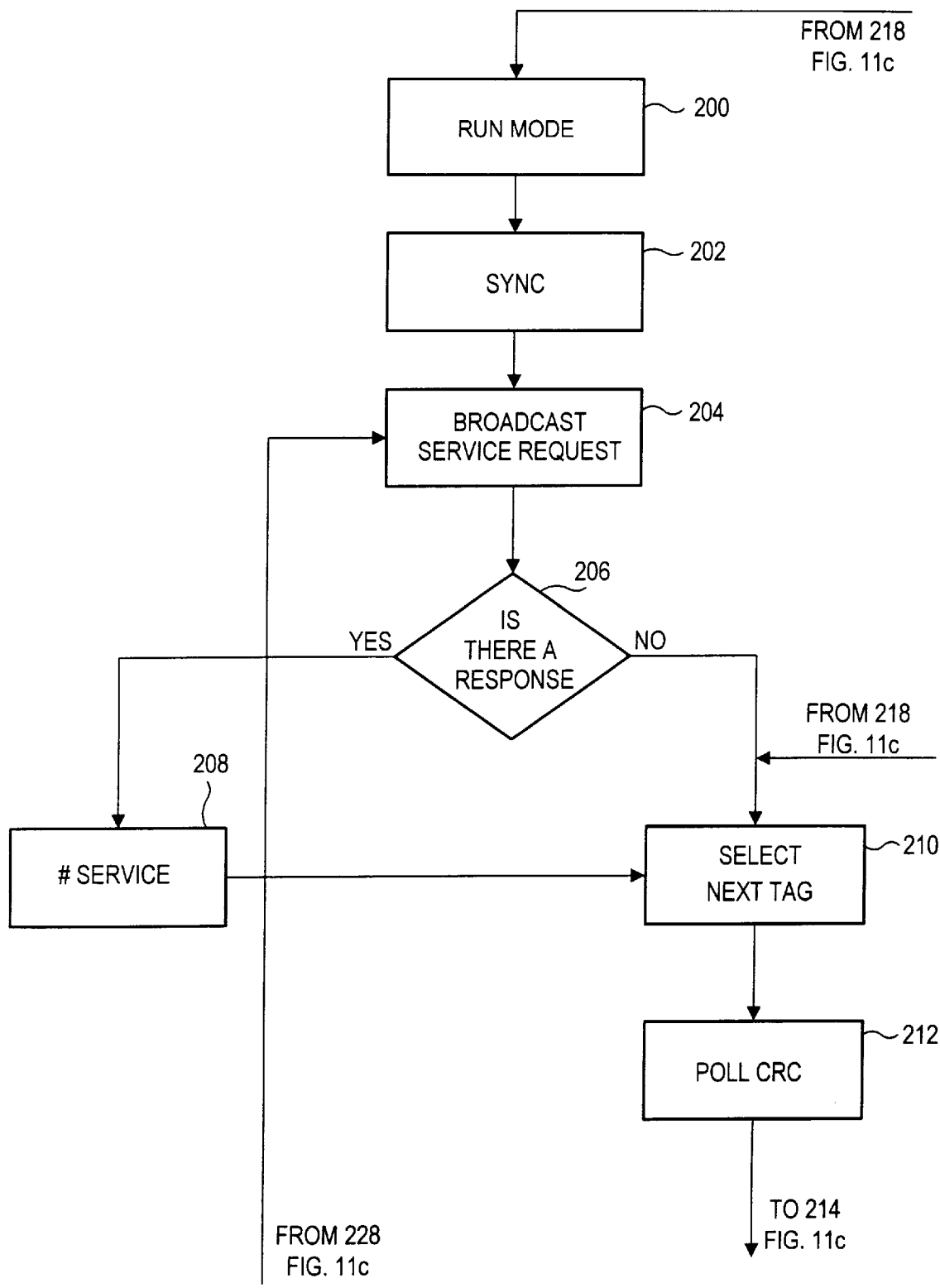
Figure 11C:
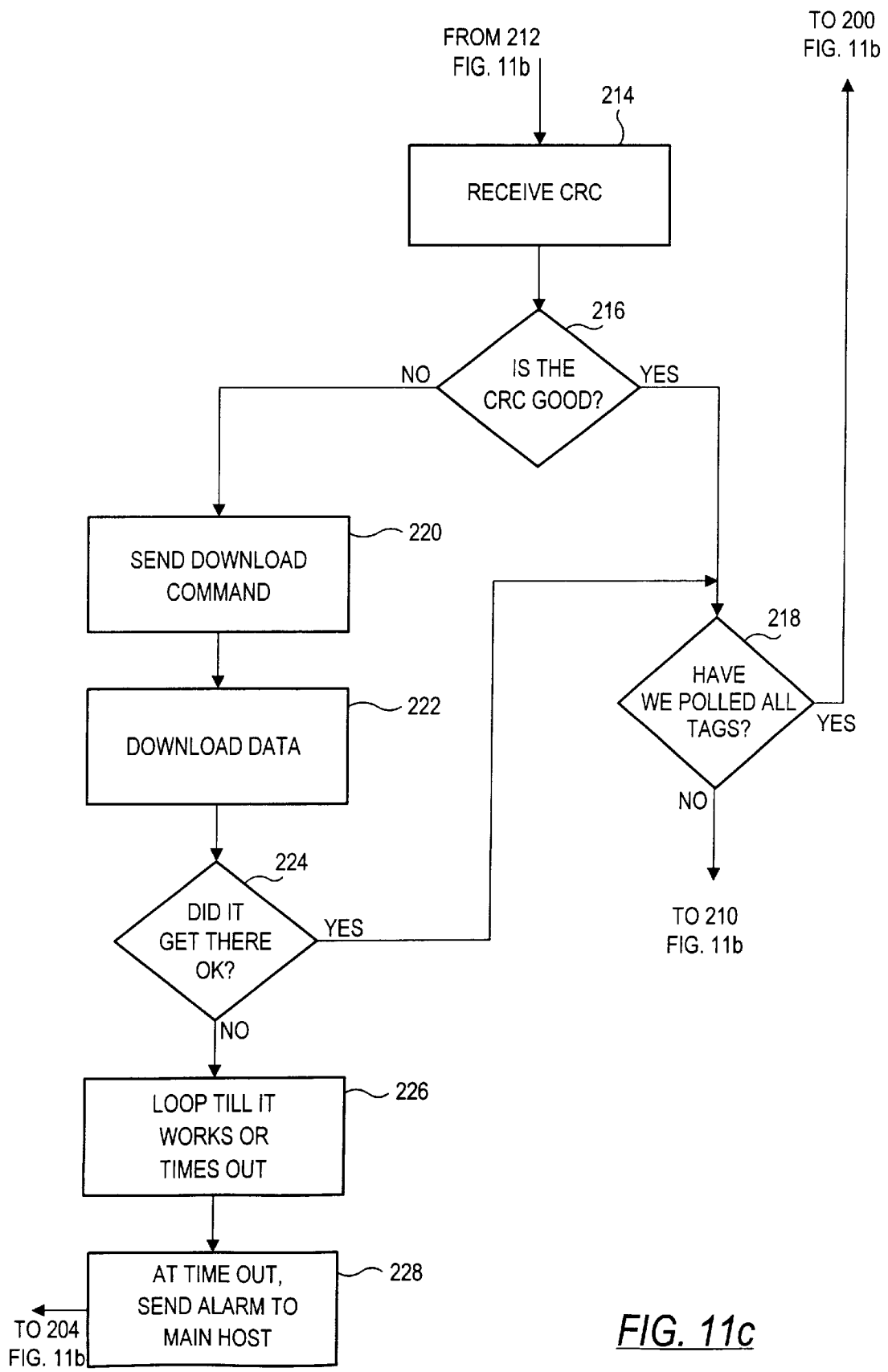

FIGS. 11b–11c illustrates how each area controller operates once the step of down-loading is complete. Blocks 200, 202 and 204 respectively depict starting the normal operation program, phase locking to the 50 kHz power signal and broadcasting to the tags for a service request.

At block 206, the area controller determines if one of the tags has responded to the service request. If there is a response, the request for service is handled as shown at block 208. If there is not a response, the area controller determines that there is no tag requesting service and flow proceeds to block 210 where a communication check for each tag in the system is begun. At block 210, the next tag is selected. At blocks 212, 214 and 216, a cyclic redundancy code (CRC) is requested from this next tag, returned by the tag and analyzed by the area controller's MPU to ensure that the tag data is correct and the tag is properly communicating. To ensure the integrity of the communication, the MPU preferably uses the "Load Subroutine" command to send data to the tag changing the loaded database. This forces the tag to send back a new CRC, which the area controller checks and verifies.

If proper communication is intact for the selected tag, flow proceeds to block 218 where the MPU determines whether all the tags have been serviced. If not flow returns to block 210 for servicing the next tag. If all the tags have been serviced, flow returns to the beginning of the program at block 200.

If the CRC is not intact for the selected tag, flow proceeds from block 216 to blocks 220 and 222 where the area controller's MPU sends a down-load command and downloads the initialization data for the tag that is not properly communicating. From block 222, flow proceeds to block 224 where the MPU executes another CRC poll, as described above, to ensure that the data was properly received by the tag and that the integrity is still intact. If the data was properly received, flow proceeds to block 218 to determine if all the tags have been serviced. If the data was not properly received, flow proceeds to blocks 226 and 228 where the MPU continues to attempt to get the data to the tag for a period of time and then reports the malfunction to the system controller. From block 228, flow returns to block 204 where another broadcast service request is made and the process repeats.

Redundant Power Supply Feature for the Area Controllers

The present invention includes a redundant power and communication scheme to provide power from the system controller 28 to the area controllers 31 even when particular power conductors have been cut or otherwise disabled. The purpose of this scheme is to provide substantially continuous power to all area controllers 31 connected to the system controller 28, thus providing uninterrupted price display and system integrity. By providing substantially continuous power, the system avoids the time involved in reinitializing each area controller 31 and tag 20 upon a "cut conductor" power loss condition. Substantially continuous power will permit the tags to retain the last pricing information forwarded to it. That is, even if there is damage to the wire resulting in a loss of power due to a cut conductor, the nonvolatile memory of the tags 20 is retained, and the tags continue to provide an uninterrupted price display. Further, upon the loss of data communication to one or more area controllers 31, the system controller 28 will instruct any attached scanners 44 to lock out any new price information, as such information may not be capable of being forwarded to the tags 20 to indicate an updated price. This guarantees price accuracy (integrity) between the tags 20 and the scanners 44. Thus, so long as a data communication problem exists, no new price information for products having tags associated with the disrupted communication line will be accepted by scanners 44.

Figure 6:
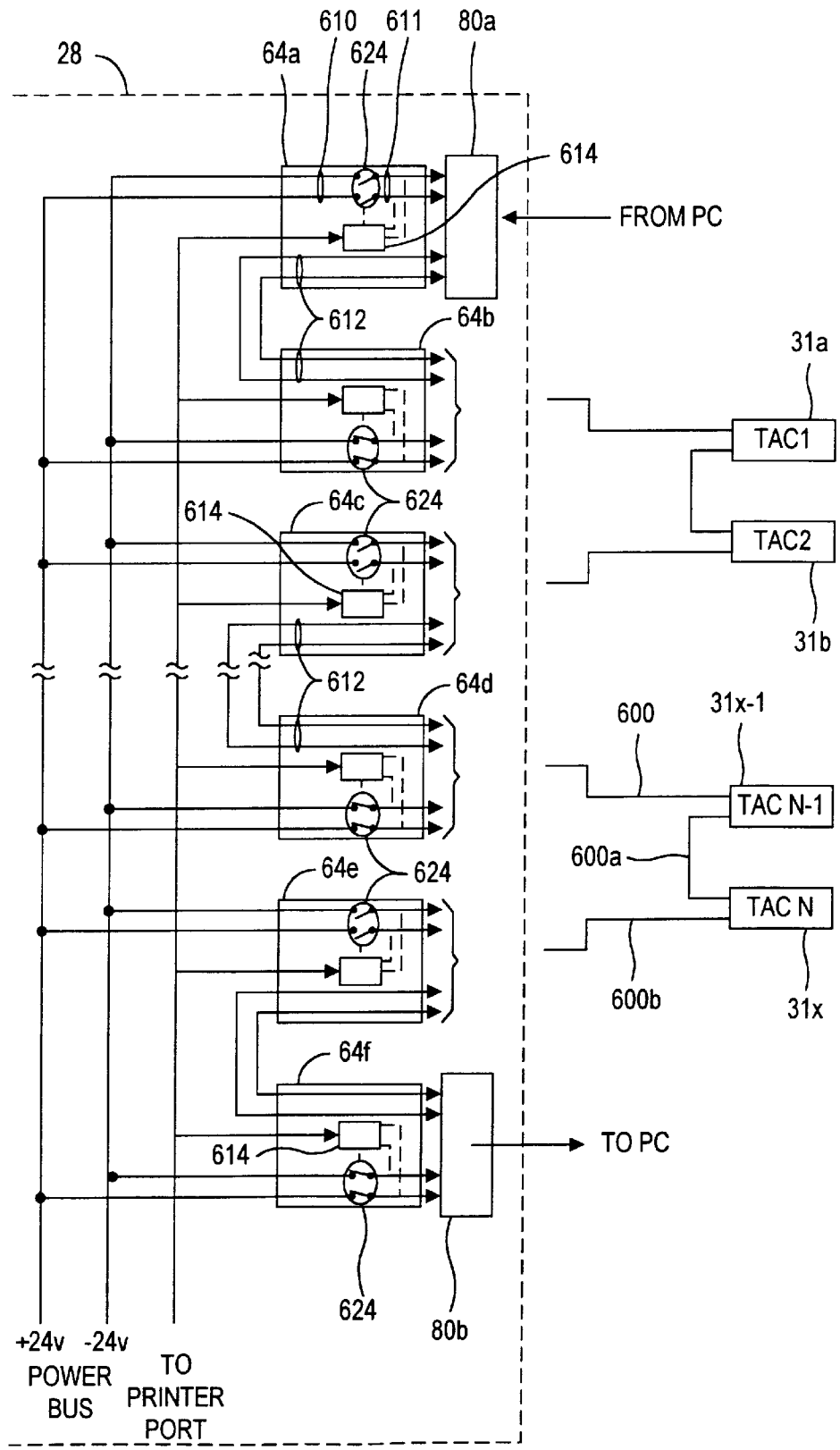
FIG. 6 is a block diagram of the redundant power feature in accordance with the present invention.

FIG. 6 is a block diagram illustrating the redundant power and communication scheme of the present invention. The redundant feature of the present invention permits power to travel to and from the area controllers 31 even if a set of conductors leading from the system controller 28 to the area controllers 31 has been cut or otherwise disabled.

FIG. 6 shows a portion of system controller 28 having a plurality of the power and data distribution circuits 64 mentioned above with reference to FIG. 3. As shown, the top and bottom power and data distribution cards 64a and 64f may each be connected to a network interface circuit 80a and 80b, respectively. Power and data distribution circuit 64a receives serial data from a network interface circuit 80a (send card) which may be a RS485 transceiver circuit. The network interface circuit 80a receives the data signal from the computer (PC) of the system controller 28. Power and data distribution card 64f transmits serial data to a network interface circuit 80b (receive card), which provides the data to the PC of the system controller 28. All of the power and data distribution cards 64, the network interface circuits 80a and 80b, and the connected area controllers 31 are connected in a daisy chain fashion to provide a wired loop, such that two-way serial communication may occur between the system controller 28 and individual area controllers 31.

Accordingly, the power and data distribution circuit 64a transmits the received data to power and data distribution circuit 64b. In an exemplary embodiment, the circuits 64a and 64b may be connected via a backplane in which the circuit cards are electrically connected via printed circuit traces which, in an exemplary embodiment, may comprise a 72-pin connector. From power and data distribution card 64b, the data lines are transmitted out of the system controller 28 and to a plurality of daisy chained area controllers 31 (shown in FIG. 6 as TAC1 [31a] and TAC2 [31b]). Data signals are then sent from area controller 31b to power and data distribution card 64c, which then forwards the data lines to power and data distribution card 64d, etc. As shown in FIG. 6, each pair of intervening power and data distribution circuits 64b, 64c, 64d, and 64e may be connected to a plurality of area controllers 31. In an exemplary embodiment, there may be at least four power and data distribution cards 64, depending on the number of area controllers 31 desired to be connected to the system.

As shown in FIG. 6, each power and data distribution circuit 64 includes two power lines 610 and two communication lines 612. The communication lines 612 are the unswitched lines, and the power lines 610 are the switched lines. For the purposes of this discussion, as shown in FIG. 6, after the switches 624 the power lines are designated with reference numeral 611 to prevent confusion. The power lines 610 and the communication lines 612 are representative, as each power and data distribution circuit 64 may include eight channels, each of which includes two power lines 610 and two communication lines 612. The power lines 610 (comprising a +24 volt line and a −24 volt line) are provided by the power supply module (see FIG. 7) of the system controller 28.

Each power and data distribution circuit 64 also includes a plurality of control circuits 614, each of which receives inputs from the printer (serial) port of the PC of the system controller 28. The control circuit 614 has three distinct functions. First, the control circuit 614 operates to address the desired channel (presently one (1) through eight (8), although it is envisioned that more channels per card may be accommodated) of the power and data distribution circuit 64 to be selected. Second, the control circuit 614 senses the voltage on the power lines 611, represented by the dashed lines extending from control circuit 614 to the power lines. The control circuit 614 thus determines the voltage on the outgoing power lines 611. Upon power on or under other control from the PC (e.g., if an adjoining card's power line breaks or no voltage is otherwise sensed), the control circuit 614 will determine that no voltage is present and the power lines 611 will be turned on by closing the switches 624.

The control circuit 614 provides for an electronic circuit breaker (626, see FIG. 8) to prevent an overcurrent condition from occurring. If the circuit determines that a current greater than approximately three (3) A is present, the control circuit 614 will cause the power line 611 to operate in a very narrow pulse width modulation mode. Power is provided to area controllers 31 via the power lines 611, but when the control circuit 614 determines that the current is greater than the desired limit, it will open the switches and turn off the power line voltage. The pulsewidth modulation period for control of an overcurrent condition is between approximately twenty (20) milliseconds to approximately thirty (30) milliseconds. Such a duty cycle prevents damage to the circuitry. Additionally, as a final protection measure, the control circuit 614 includes a fuse, which in an exemplary embodiment may have a rating of four (4) Amps. If a fault condition in determined requiring a shorting out of power to the area controllers, the tags can be lit by having the tags pulsed with power occasionally.

The power and communication lines 610, 612 between system controller 28 and area controllers 31 may be carried by a cable 600 comprising a plurality of conductors. This cable may have a number of segments 600a, 600b, etc. which form or comprise a loop between the system controller 28 and the plurality of area controllers 31, which may be known as a "wired loop." The wired loop may comprise a bundle of conductors (i.e., a phone line or the like) and may include both power and communication lines. In an exemplary embodiment, there may be eight individual conductors making up the wired loop. In such an embodiment, two communication lines (provided at positive and negative voltage) and two power lines (provided at +24 volts and −24 volts) may be transmitted from each channel of the power and data distribution circuit 64 (one representative channel per power and distribution circuit 64 is shown in FIG. 6). The voltage is provided on two lines at +24 volts and −24 volts to prevent an excessive voltage drop. It is envisioned that power and data may be provided on fewer than eight conductors. If one of the 24 volt lines is cut, the other will supply the needed voltage.

Because of the loop design, a power line may be cut in any place, and power will still be delivered to the area controllers 31 from system controller 28 because at least one point of connection to the area controllers 31 still exists due to the redundant power and daisy chain design. If however a data line is cut, serial communication with certain area controllers 31 may be severed. The lack of data being received by the PC of the system controller 28 will inform the system controller 28 that RS485 communication is missing within the system, and accordingly prevent price update information from being entered into scanners attached to the system.

Figure 7:
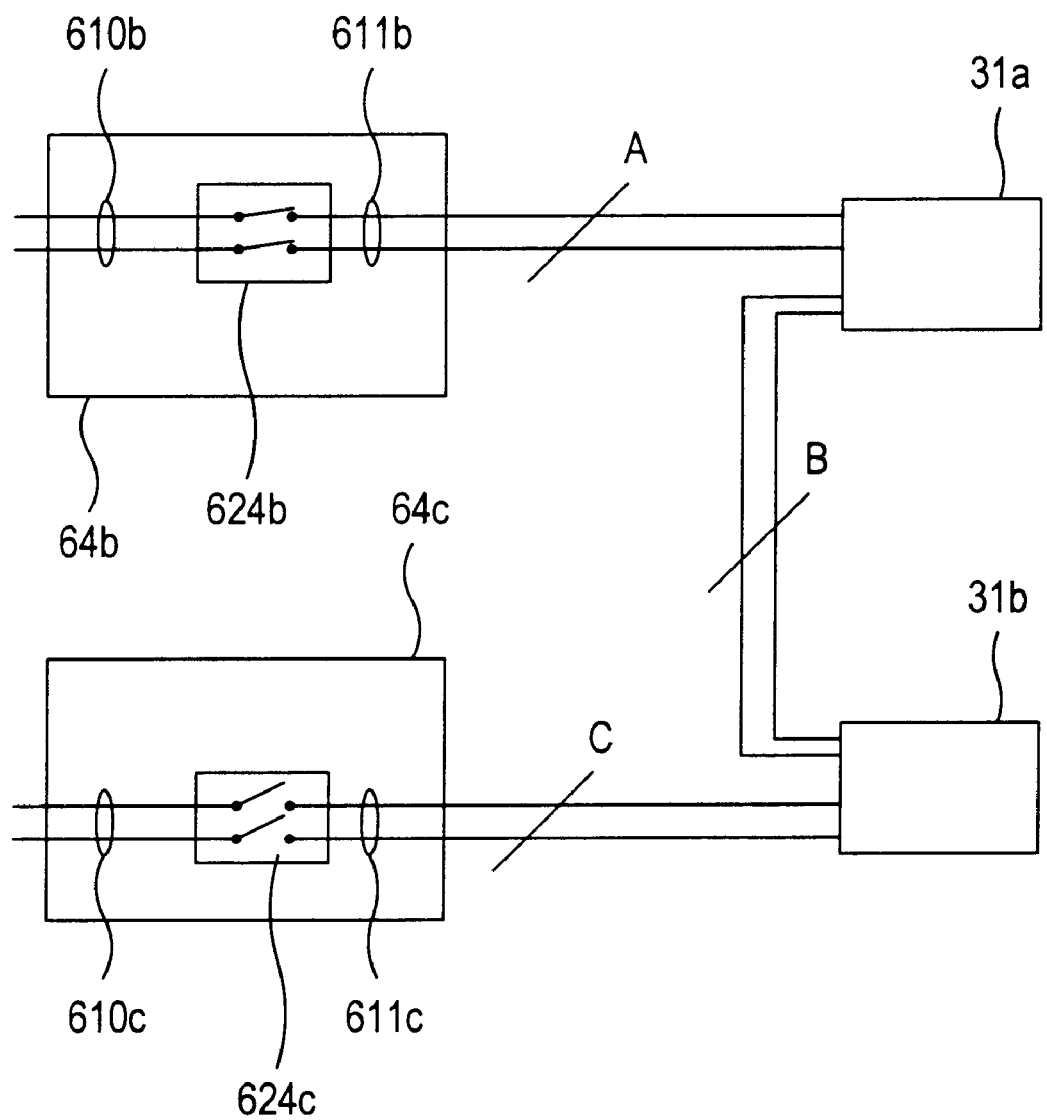
FIG. 7 is a block diagram of the operation of the redundant power feature in accordance with the present invention.

FIG. 7 is a simplified block diagram of two power and data distribution circuits 64b and 64c and two area controllers 31a and 31b connected thereto. For example, as shown, the switches 624b of power and data distribution circuit 64b are normally closed (and the switches 624c of power and data distribution circuit 64c are normally opened) so that power will be provided via power lines 611b to area controllers 31a and 31b. If the cable is cut at point "A", the switches 624c of power and data distribution circuit 64c are closed by the action of the respective control circuits 614, and power is backfed through the power and data distribution circuit 64c to area controller 31b and area controller 31a. If the cable is cut at point "B", the control circuits 614 will operate such that each area controller will receive power from the power and data distribution circuit 64 to which it is connected (i.e., the switches 624a and 624b on both cards will be closed). If instead, the cable is cut at point "C", the control circuits 614 will operate such that both area controllers will receive power from power and data distribution circuit 64b.

Figure 8:
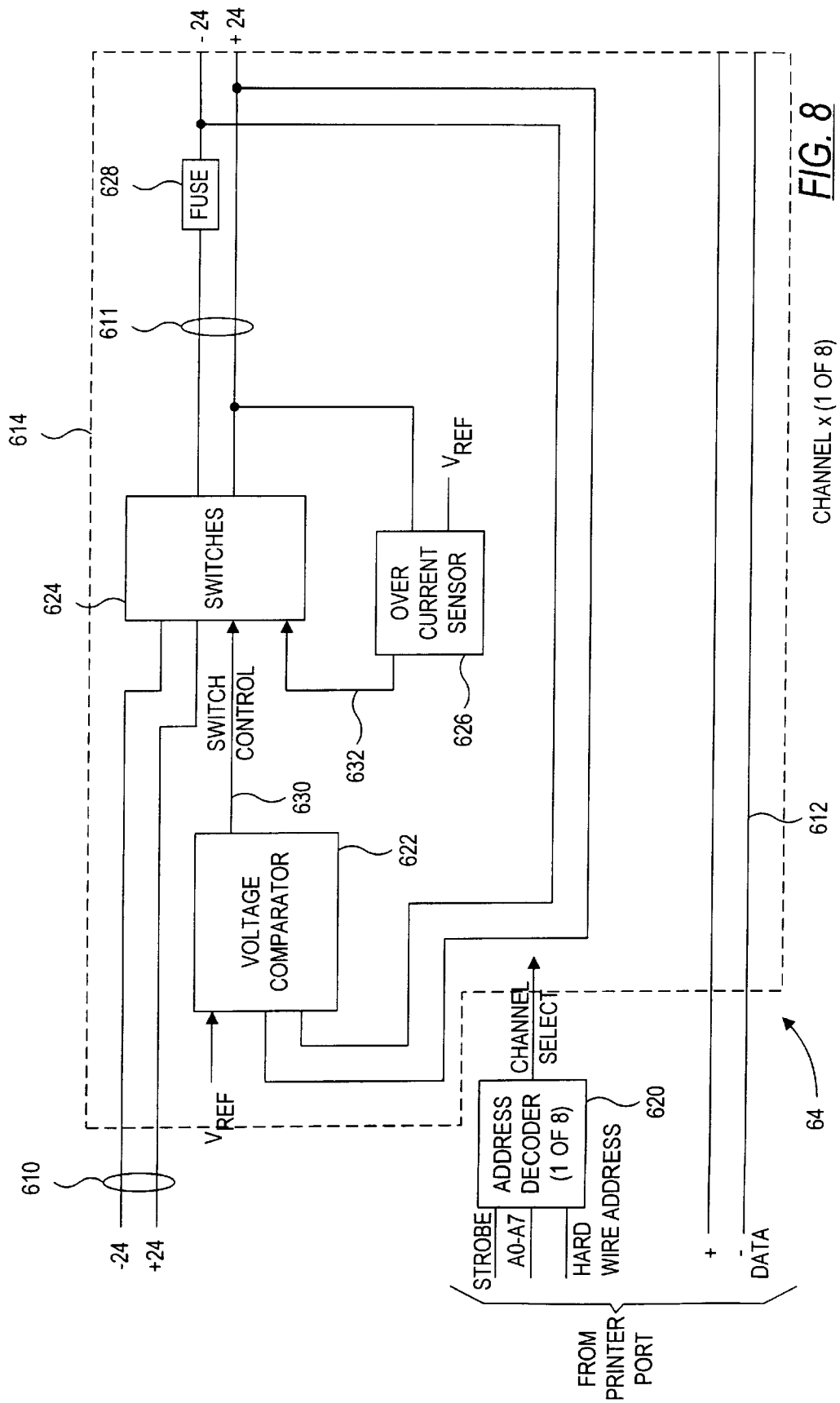
FIG. 8 is a block diagram of a power and data distribution circuit in accordance with the present invention.

FIG. 8 is a block diagram of some of the functional areas of a power and data distribution circuit 64. As shown, power and data distribution circuit 64 includes an address decoder 620 and eight (8) channels, each of which provides power lines 611 and data lines 612 to a different set of area controllers 31. Each pair of power and data distribution circuits 64 (only one shown in FIG. 8) may provide power and data to sixteen (16) area controllers 31, as each channel may be connected in a wired loop with two area controllers 31. Thus, each power and data distribution circuit 64 may include eight (8) channels, each containing a control circuit 614. It is envisioned that more or less than eight (8) channels may be included in a power and data distribution circuit, and it is also envisioned that the channels may be connected to more or less than 16 area controllers.

The circuit 64 receives inputs from the printer port of the PC of the system controller 28 (as shown in FIG. 6). These inputs include a strobe signal and address data used to select the desired card to access the desired channel as each circuit 64 includes, in an exemplary embodiment, eight (8) channels, each having power and data lines for communication to one or more area controllers 31. This data may also include an ACK or BUSY status signal to be forwarded back to the PC. The inputs enter address decoder 620 to determine the desired channel of the power and data distribution card 64 to be selected. Additionally, power lines 610 provide voltage at +24 and −24 volts to the circuit 64. These voltages pass through switches 624 and out of the circuit 64 as power lines 611, with the −24 volts passing through fuse 628. The fuse 628 is used to deactivate the −24 volt power line 611 in case of an overcurrent condition and failure of the overcurrent sensor 626. After passing the switches 624 and fuse 628, the power lines 611 are fed to a voltage comparator 622 and are compared to a reference voltage to determine whether the proper voltage exists on the line. If the comparator 622 determines that no voltage is present on the power lines 611, a control signal 630 is passed to switches 624, thereby providing power to the connected area controller 31.

As mentioned above, circuit 64 includes an overcurrent sensor 626 to measure the current on the +24 volt power line 611 to determine whether an overcurrent condition exists. As discussed above, if the current on the line is greater than approximately three (3) A, the current sensor 626 will send a pulsed signal 632 approximately every twenty (20) to thirty (30) milliseconds to alternately enable and disable the switches 624 so long as an overcurrent condition is detected.

The data lines 612 are provided to the power and data distribution circuit 64 and pass undisturbed through the selected channel and are output from the card 64. Power distribution and data circuit 64 may also include other circuitry to create reference voltages from the +24 volt and −24 volt lines so that logic circuits may operate at five (5) volts. These circuits include level shifters and the like.

Figure 9:
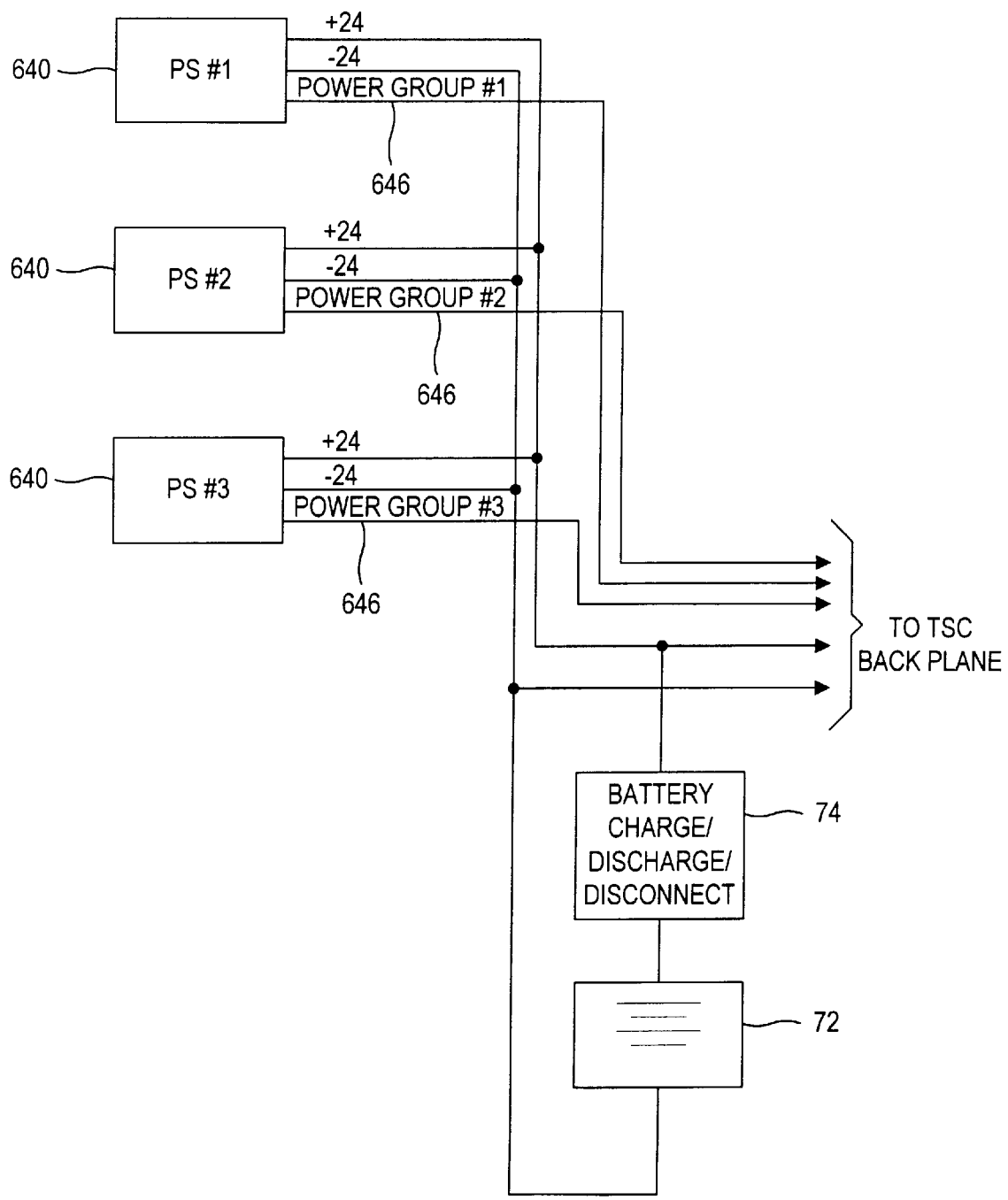
FIG. 9 is a block diagram of the power supply system of the system controller of the present invention.

FIG. 9 is a block diagram of the power supply module for the system controller 28. The module includes a plurality of individual power supplies 640. As shown, there may be three individual power supplies and each power supply 640 may be rated for 500 watts of output power. Power to the system may be adequately supplied by two out of the three power supplies 640. The third power supply may be used as a backup in case one of the two primary supplies fails. Additionally, the third power supply 640 may be used to charge the battery 72, which is connected between the −24 volt line and a battery charge/discharge/disconnect circuit 74 to the +24 volt line. Each power supply 640 also transmits a power good signal 646 to the PC of the system controller 28 via the printer port line, which indicates whether a supply is valid or has failed.

Physical Description of TAGs

Figure 31A:
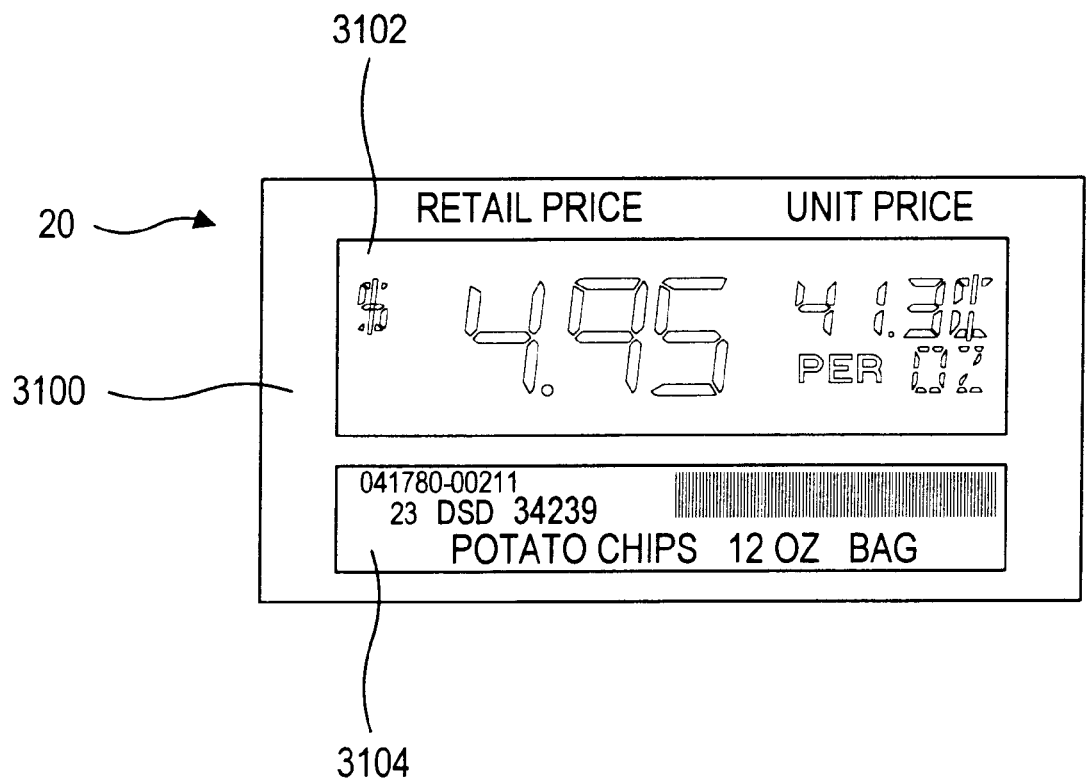
FIG. 31a is a front elevation view of a display tag which may be used in the system of FIG. 1.

As described previously, tags are used in the present invention to display various types of information. Turning now to FIG. 31a, there is shown a display tag 20 which may be used in the system of FIGS. 1 and 2 according to one embodiment of the present invention. In this embodiment, the display tag 20 is generally rectangular in shape with a length, width and thickness of about 2.9 inches, 1.5 inches and 0.1 inches, respectively, so that it may fit within an auxiliary rail of corresponding dimensions, as described in relation to FIG. 15a. A protective overlay 3100 holds together the internal components of display tag 20 and seals the display tag 20 to protect it from damage due to electrostatic discharge (ESD) and/or spillage of adjacent products. A display 3102 is visible through a clear portion of protective overlay 3100. In the illustrated embodiment, display 3102 has a length and width of about 2.5 inches and 0.9 inches, respectively, equating to an area of about 2.25 square inches. The ratio of display 3102 area to display tag 20 area in this embodiment is approximately 52%, offering the ability to display more information per tag than other devices known in the art. It will be appreciated, however, that the present invention may be implemented with alternative sizes of display 3102 or display tag 20, and with alternative ratios of display area to tag area, as needed or desired by the user.

Other than the clear portion covering display 3102, protective overlay 3100 is generally opaque, so as to conceal the majority of internal components and structure of the display tag 20 and to enhance the visual appearance of the display tag 20. In one embodiment, the color of the opaque portion is white, but it will be appreciated that other colors would be equally suitable. The opaque portion of protective overlay 3100 may be imprinted with textual and graphic information, or labels may be applied thereto, to supplement the information provided on display 3102. For example, in the illustrated embodiment, the terms "RETAIL PRICE" and "UNIT PRICE" are printed on portions of overlay 3100 overlying display 3102, indicating that adjacent areas of display 3102 are adapted to display the retail price and unit price of a store item. If desired, a paper label 3104 can be applied over a lower portion of overlay 3100 to show additional product information such as, for example, manufacturer and/or product name, reorder codes, and the like. For example, in the embodiment shown in FIG. 31a, label 3104 includes the product designation "POTATO CHIPS 12 OZ" and various product codes including a UPC reorder symbol.

Alternatively or additionally, product codes, reorder codes and the like may be conveyed by "flickering" display 3102 in a manner which would convey such information to an operator equipped with a modified optical scanner or the equivalent. For example, the display 3102 may be adapted to flicker at designated intensities and/or at designated time intervals which are readable by a hand-held optical scanner. Preferably, in this embodiment, the flickering of display 3102 will be accomplished in a manner which is generally undetectable by persons (e.g., store customers) not equipped with an optical scanner.

Protective overlay 3100 is manufactured according to one embodiment from a 0.002 inch thick sheet of clear polyester, by first applying a 0.001 inch thick overcoat of clear hardcoat laminate on the outer (front) surface of the sheet of polyester. A 0.001 inch thick coating of pressure sensitive acrylic adhesive is then applied to the back surface of the sheet. Next, the front surface of the sheet is printed, first with a white opaque background color, then with a blue color for printing textual and graphic information. In one embodiment, the foregoing steps are performed on multiple overlays formed on a continuous sheet or roll. After completion of the steps, the overlays are die cut from the sheet or roll to form individual overlays. However, it will be appreciated that any of the foregoing operations may be accomplished on individual overlays rather than on multiple overlays.

Figure 31B:
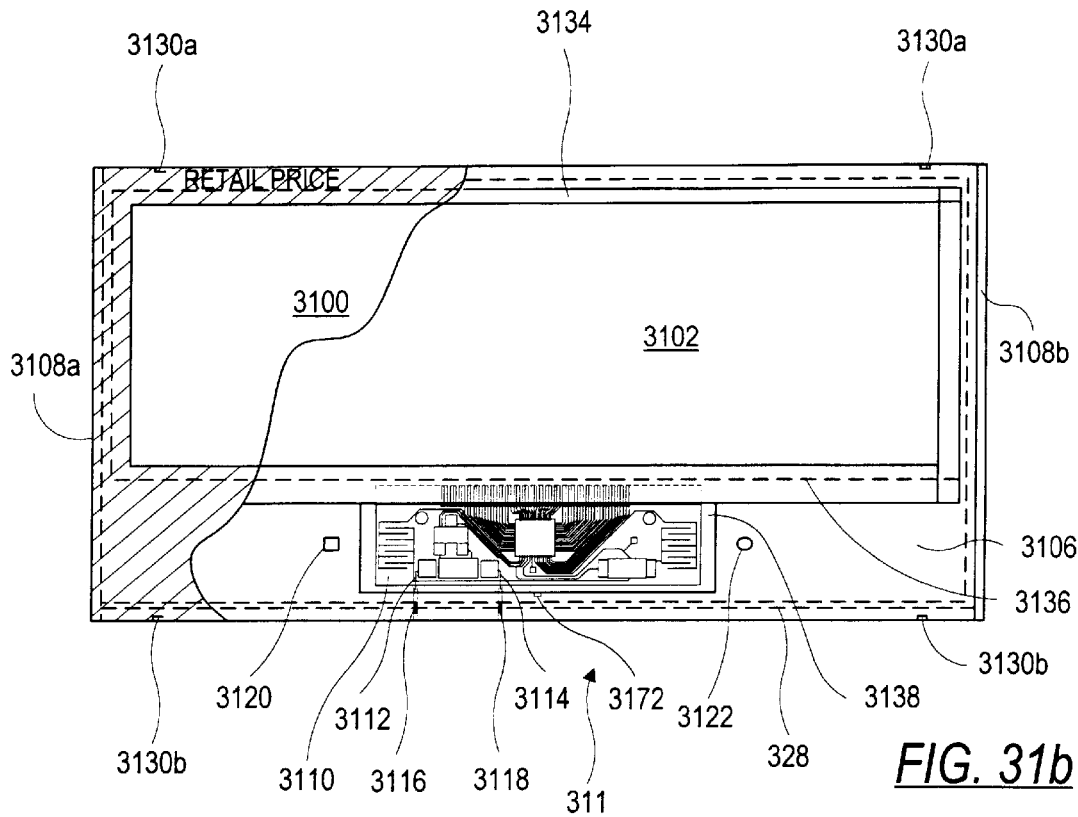
FIG. 31b is an enlarged elevation of the front surface of the display tag of FIG. 31a, with portions cut away to reveal internal structure.
Figure 31C:
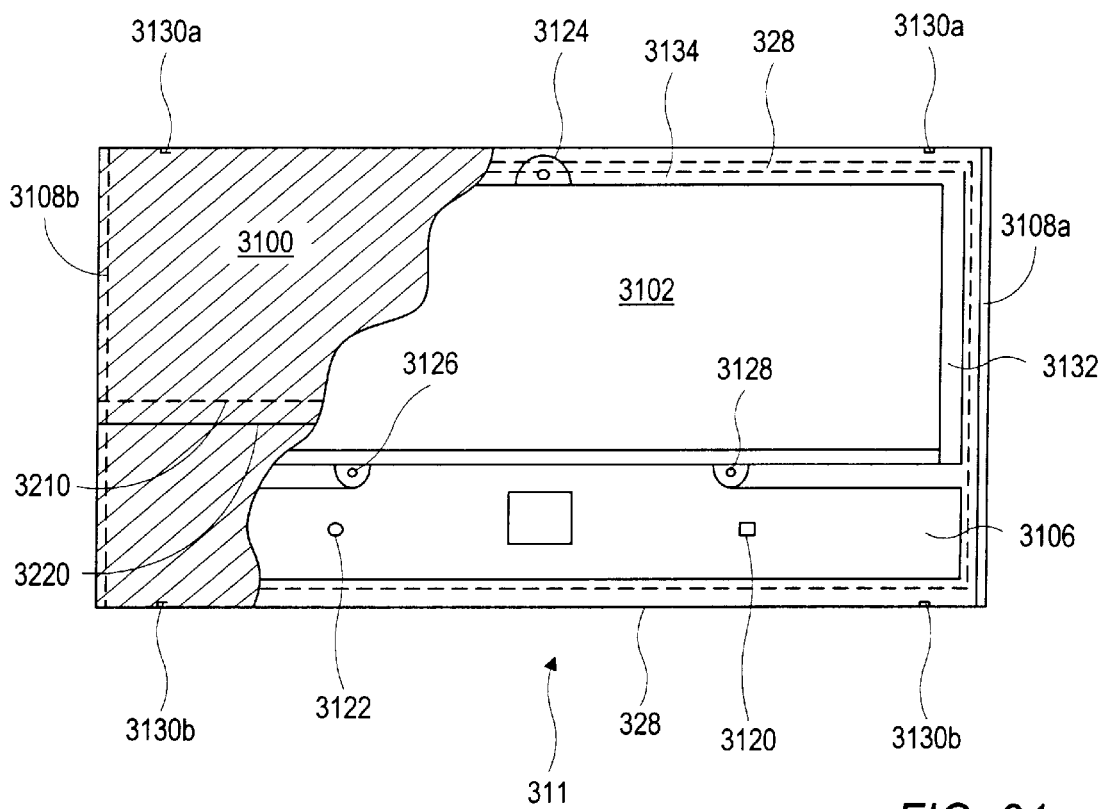
FIG. 31c is an enlarged elevation of the rear surface of the display tag of FIG. 31a, with portions cut away to reveal internal structure.

FIGS. 31b and 31c show enlarged front and rear views of the display tag of FIG. 31a, with portions cut away to reveal internal structure. As best shown in FIG. 31b, the display tag 20 consists of a three-piece housing 311, including a bobbin 3106 and two endcaps 3108a, 3108b molded from a synthetic polymer, for accommodating a pick-up coil 110 (FIG. 15a), a display 3102, a circuit 3110 and switchplate (not shown), covered by protective overlay 3100. The bobbin 3106 includes an outer channel 328 formed entirely around its periphery for receiving the pick-up coil 110. The outer channel 328 in one embodiment has a depth and width of about 0.1 inches, with pick-up coil 110 (not visible in FIGS. 31a and 31b) constructed of 64 turns of #32 gauge insulated copper magnet (double bond) wire. It will be appreciated, however, that the configuration of outer channel 328 and composition of pick-up coil 110 may be varied to suit the needs of the user. For example, pick-up coil 110 may be constructed with different gauge or composition of wire, with fewer or greater turns according to the level of skill in the art.

Two coil leads 3112, 3114 extend through respective gaps 3116, 3118 formed in the outer channel 328 to connect the pick-up coil 110 to the circuit 3110. Endcaps 3108a,b are connected to the left and right sides of the bobbin 3106, over the pick-up coil 110, as will be described in detail in relation to FIGS. 35a–35e. Tooling holes 3120, 3122 extend through the bobbin 3106 to facilitate assembly of the display tag 20 in an assembly nest (not shown). The respective square and round tooling holes 3120, 3122 provide for secure attachment and alignment of the display tag 20 in the assembly nest through interconnection of alignment posts (not shown) in the assembly nest to the respective tooling holes 3120, 3122. Heat stakes 3124, 3126, 3128 on the back of the bobbin 3106 (FIG. 31b) also facilitate assembly of the display tag 20, by expanding upon application of heat and pressure to more closely engage display 3102 within bobbin 3106. The endcaps 3108a,b attach to the bobbin 3106 through engagement with respective top and bottom notches 3130a, 3130b.

Figure 34:
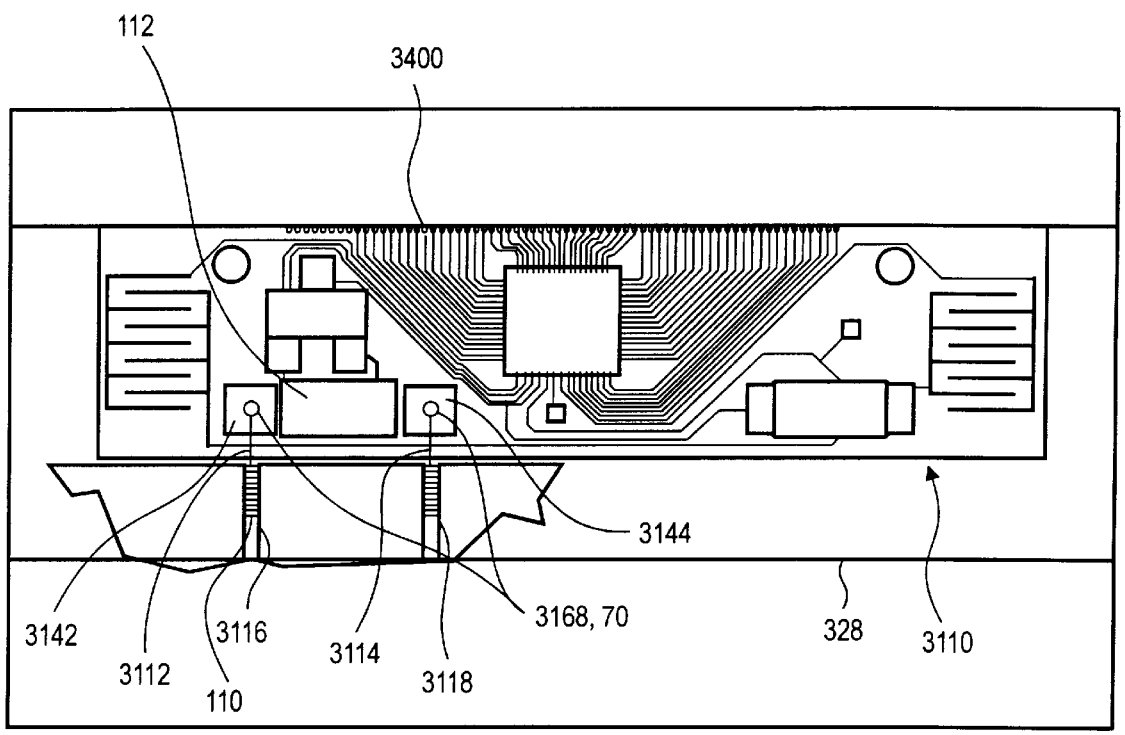

The display 3102 is disposed within a large rectangular aperture 3132 formed within the bobbin 3106. The display 3102 is positioned within the aperture 3132 such that it rests atop upper and lower steps 3134, 3136 of the bobbin 3106, with its upper surface being substantially flush with the upper surface of bobbin 3106. The circuit 3110 is disposed within a recess 3138 formed in the lower middle portion of bobbin 3106 and underneath the display 3102. The circuit is preferably a flexible circuit formed on a fine pitch flex circuit base material, such as a TAB (tape automated bonding) or MEDUSA™ or other comparable material. The term "TAB circuit" is used hereinbelow to designate the circuit 3110 as a flexible circuit formed by tape automated bonding. Alternatively, the circuit 3110 may comprise a flip chip on a flex circuit, or any other type of flexible circuit known in the art. The circuit 3110 may also be constructed on a rigid board with an LCD connector. The switchplate, which will be described in detail in relation to FIGS. 34a, 34b and 35b, is not shown in FIG. 31b because it is positioned between the circuit 3110 and protective overlay 3100 and would thereby conceal a large portion of the circuit 3110. Preferably the circuit 3110 is coupled to the LCD 3102 by thermal bonding. The flexible construction of the circuit 3110 and the thermal bonding to LCD 3106 facilitates good electrical connections between edge contacts 3400 (see FIG. 34) of the circuit 3110 and corresponding edge contacts 3180 (see FIG. 31e) of the LCD 3102.

Figure 31D:
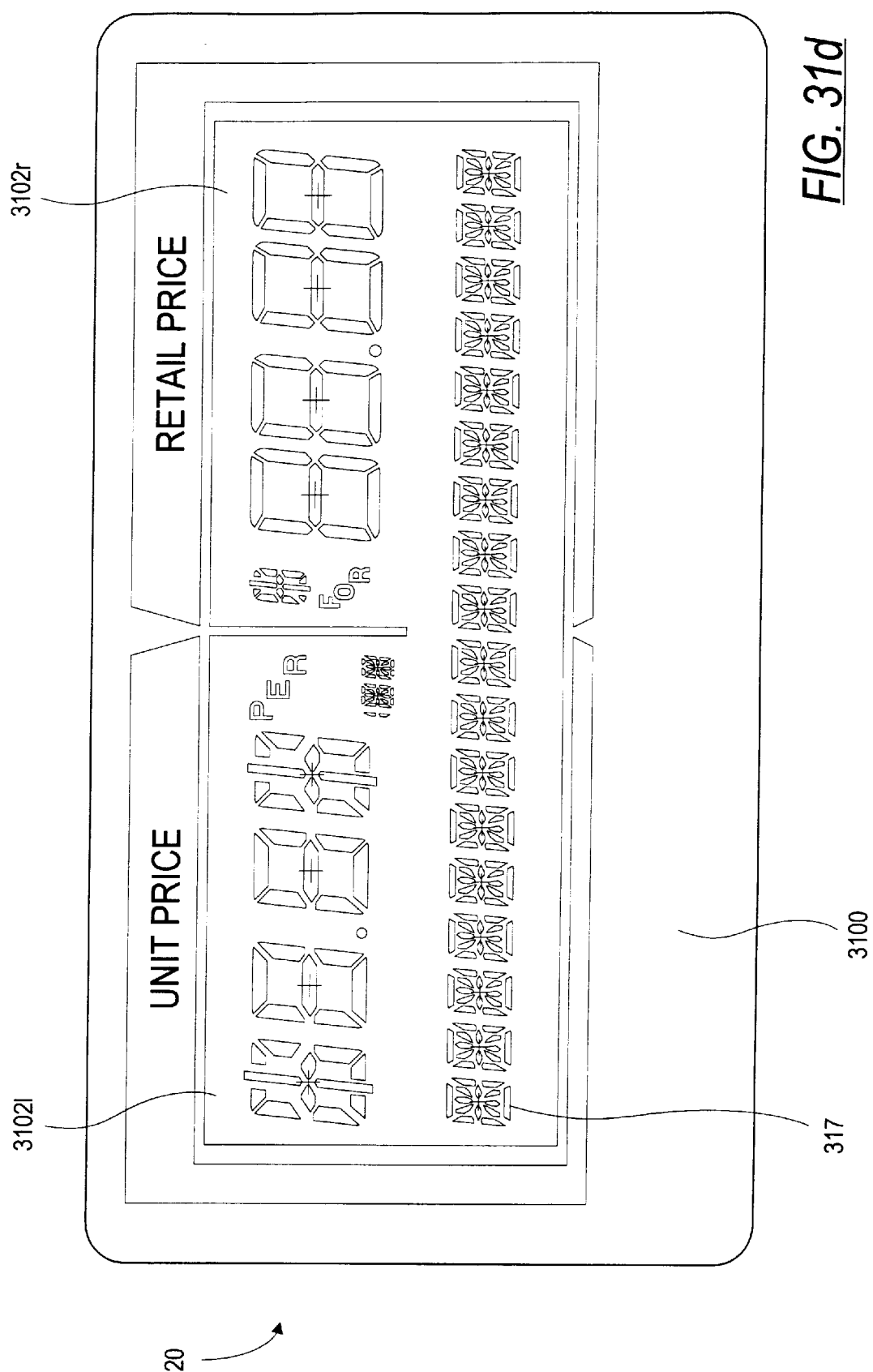
FIG. 31d is a front elevation of an alternative display tag which may be used in the system of FIG. 1.

FIG. 31d shows a display tag 20 which may be used in the system of FIGS. 1 and 2 according to an alternative embodiment of the present invention. Similar to the embodiment of FIG. 31a, b, c, the display tag 20 includes a display 3102 visible through a clear portion of protective overlay 3100, with the remaining components of the display tag 20 being concealed by an opaque portion of protective overlay 3100. The components of the display tag 20 which are concealed in FIG. 31d, including housing, pick-up coil, circuit 3110 and switchplate, are generally identical to the components heretofore described in relation to FIGS. 31a, b and c. The present embodiment differs from that of FIGS. 31a, b and c primarily in the configuration, size and appearance of display 3102 and corresponding portions of protective overlay 3100. More specifically, in the present embodiment, display 3102 is comprised of price-designation sections 3102l (left) and 3102r (right) and an 18-character alphanumeric display 317. As shown in FIG. 31d, left section 3102l displays the unit price of an associated product and right section 3102r displays the retail price of the product. It will be appreciated, however, that respective left and right sections 3102l and 3102r may be utilized in alternative embodiments to display different items or types of information related to a product.

Similar to the embodiment of FIG. 31a, the opaque portion of protective overlay 3100 in FIG. 31d may be imprinted with textual and graphic information to supplement the information provided on display 3102, and may be printed in any of several colors. For example, in the illustrated embodiment, the term "UNIT PRICE" is printed on the portion of overlay 3100 overlying left section 3102l of display 3102 and the term "RETAIL PRICE" is printed on the portion of overlay 3100 overlying right section 3102r of display 3102. Paper labels, "flickering" displays or other suitable means may also be utilized to convey desired product codes and/or information. The color of protective overlay may be selected from among a variety of available colors or combination of colors. In one embodiment, for example, protective overlay 3100 is printed in two colors, with one side of protective overlay 3100 being blue and the other side of protective overlay 3100 being orange. It will be appreciated, however, that other colors or combinations thereof may be selected as needed or desired by the user.

Figure 31E:
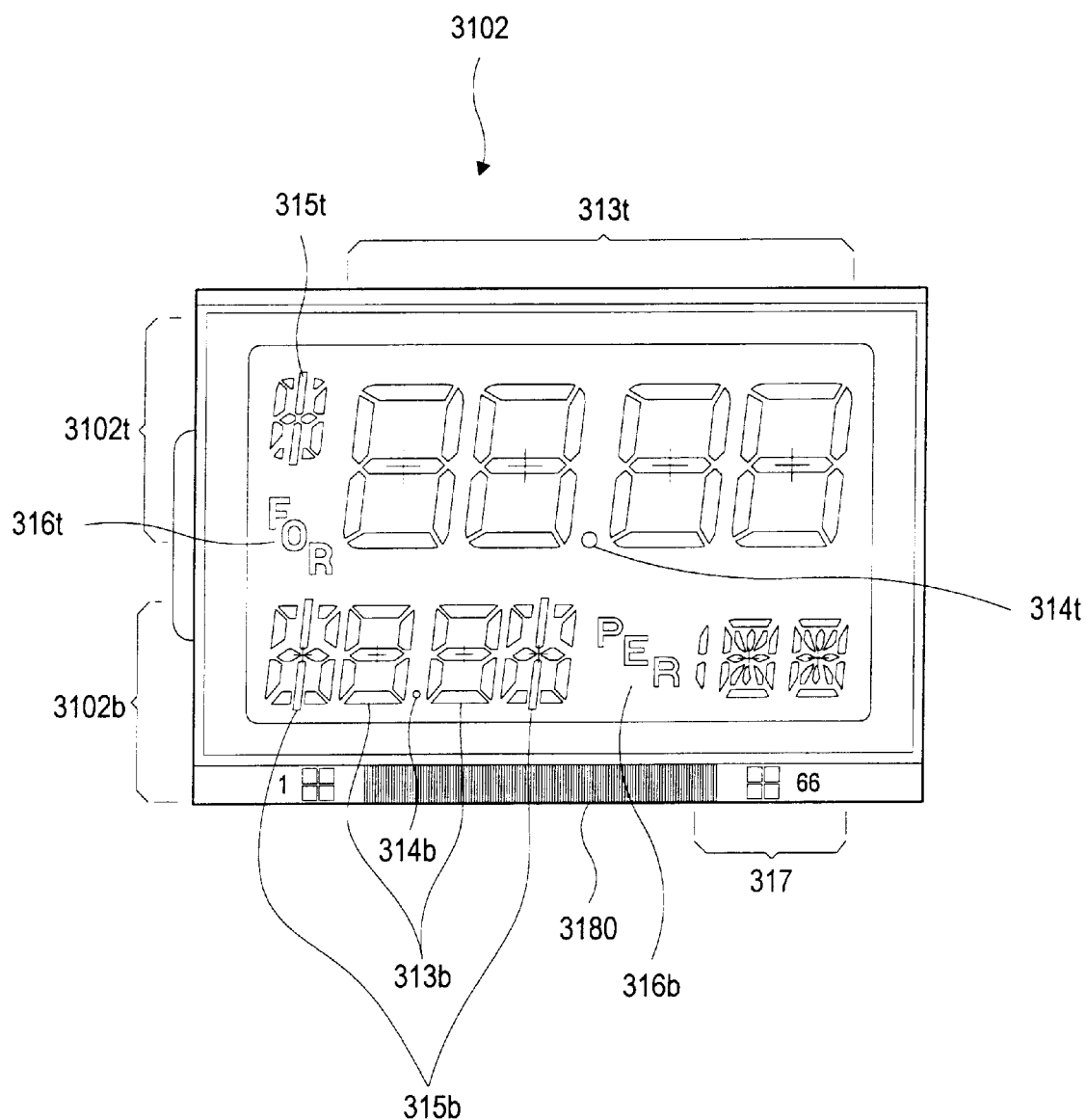
FIG. 31e is a front elevation of another display which may be used in the system of FIG. 1.

FIG. 31e shows an alternate (smaller) form of display 3102 which may be used according to principles of the present invention. The display 3102 is adapted to be connected to a circuit 3110 (not shown) and form a portion of a display tag 20, in the manner heretofore described in relation to FIGS. 31a through 31d. In the embodiment of FIG. 31e, display 3102 is comprised of price-designation sections 3102t (top) and 3102b (bottom). Top section 3102t includes four seven-segment characters 313t, a decimal point 314t, a units identifier 315t and a "for" enunciator 316t. Bottom section 3102b includes two seven-segment characters 313b, a decimal point 314b, two units identifiers 315b, a "per" enunciator 316a and a combination of alphanumeric character indicators 317b. The respective top and bottom sections of display 3102 may be used in combination to display any of several types of product information such as, for example, unit price, retail price and the like. Protective overlay 3100, paper labels, "flickering" displays or other means heretofore described may also be utilized to supplement the information provided on display 3102. As is more fully described with reference to FIGS. 14 and 15, an auxiliary rail adapted to mount the tags, may also include means for displaying additional printed labels or signs.

One of the advantageous features of the display 3102 shown in FIG. 31e is that it is generally narrower than the displays heretofore shown, thereby permitting construction of a narrower display tag 20 than those heretofore shown. In one embodiment, for example, the display 3102 has a width of about 2 inches, which is about 30% narrower than the display tag shown in FIG. 31a. The relatively narrow width of display 3102 provides a store operator the opportunity to space the display tags (and associated products) more closely together on the store shelves, as needed or desired to efficiently utilize the available shelf space for a particular product or category of products. Health and beauty aids, for example, represent one category of products in which adjacent products are typically spaced closely together and in which the display 3102 shown in FIG. 31e may be advantageously employed.

FIG. 32a illustrates in greater detail the display 3102 and the circuit 3110 which form a portion of the display tag 20 of FIGS. 31a, b, c. As shown in FIG. 32a, the display 3102 includes four seven-segment characters 313, a decimal point 314, a units identifier 315, a "for" enunciator 316, an eighteen-character alphanumeric display 317 and a display zone 318 with a combination of characters. The display 3102 may be used to display virtually any type of information desired by the user such as, for example, product description, price information and the like. In this embodiment, the display 3102, and in particular the eighteen-character display 317, may also be used to display sales or marketing messages such as, for example, "ON SALE TODAY. . . . " In one embodiment, the display 3102 is further adapted to "flicker" in the manner described in relation to FIGS. 29b and 31a, to convey selected information such as prices, product information, reorder codes, etc. to an operator equipped with an optical scanner or the equivalent. Protective overlay 3100 and/or paper labels may also be utilized to supplement the information provided by display 3102.

As shown in FIG. 32a, the circuit 3110 is attached to a lower middle portion 3139 of display 3102 by thermal bonding using a standard anisotropic adhesive. It will be appreciated, however, that the circuit 3110 may be unattached, attached to other portions of display 3102, or attached using other suitable means known in the art. The circuit 3110 includes an ASIC 3140 (preferably the ASIC 2001 described above with reference to FIGS. 20a and 20b) which includes substantially all of the electronics associated with the display tag 20, which are described in detail in relation to FIGS. 19a and 19b. By combining several components into ASIC 3140, circuit 3110 does not need to accommodate a large number of discrete components, as do corresponding structures (e.g., PC boards) known in the prior art. Other than ASIC 3140, circuit 3110 includes only capacitor 112, diode 114, and capacitor 126, the functions of which have heretofore been described in relation to FIG. 19a and 19b. In an alternative embodiment (not shown), diode 114 is removed from circuit 3110 and incorporated into ASIC 3140. Contacts 3142,3144 are positioned on opposing sides of capacitor 112 for electrically connecting with lead wires of the pick-up coil 110 (not shown in FIG. 32a). The TAB circuit further includes interleaved "E" shaped contacts 3146 and 3148, the functions of which will be described further herein below.

Because the circuit 3110 contains fewer electronic components than prior art structures (e.g. PC boards) and may be assembled in fewer steps, it is generally less expensive to manufacture and supports a higher mean time between failure (MTBF) than prior art structures. In addition, it is less vulnerable to failure of individual components (e.g., due to shock, vibration and the like). Moreover, the few components enable the circuit 3110 to be generally smaller in size than competing display tag structures, supporting the ability to construct a display tag 20 with a larger relative display size than heretofore attainable.

Figure 32B:
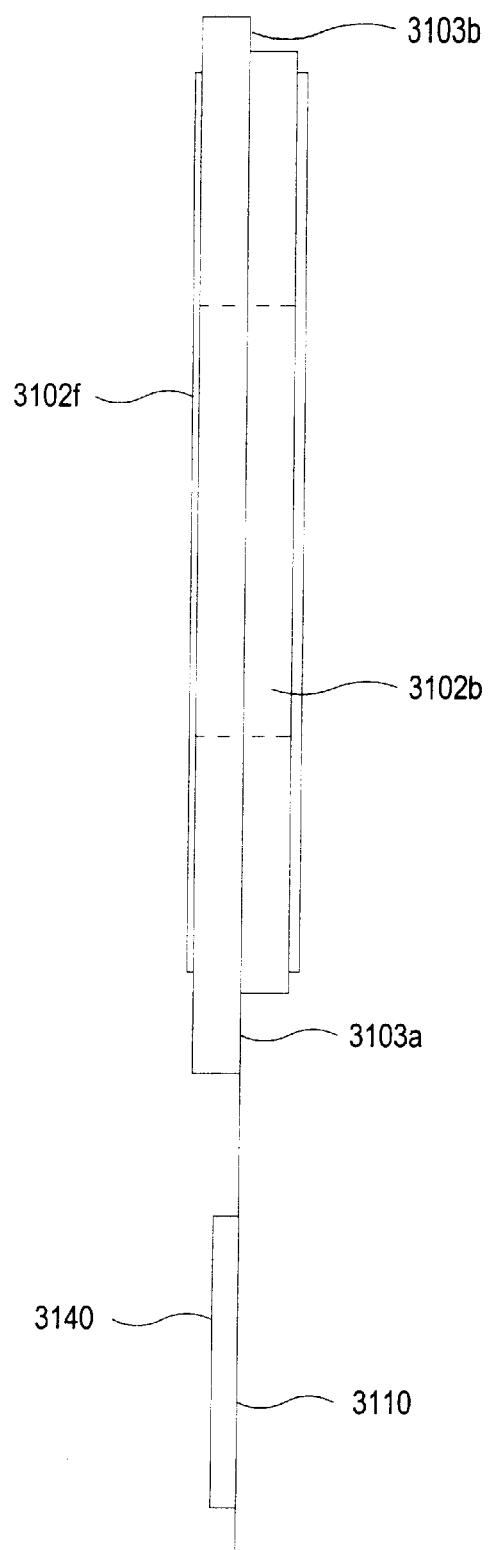
FIG. 32b is a side sectional view of the display and flexible circuit of FIG. 32a FIG. 33a is a perspective view of a switchplate which forms a portion of the display tag of FIGS. 31a, b, c.

FIG. 32b is a side sectional view of the display 3102 and the circuit 3110 of FIG. 32a. As shown in FIG. 32b, the display 3102 is comprised of two sections, a front portion 3102f and a back portion 3102b. The front portion 3102f has a larger transverse dimension than the back portion 3102b and is oriented so as to define respective support panes 3103a, b on opposing bottom and top edges of the display 3102. When display 3102 is installed within bobbin 3106 (FIG. 31b), support pane 3103b rests on upper step 3134 and support pane 3103a rests on lower step 3136 of bobbin 3106, with the upper surface of display 3102 being substantially flush with the upper surface of bobbin 3106. As best observed in FIG. 32b, because the circuit 3110 is thinner than display 3102, the thickness of display tag 20 is determined primarily by the thickness of the display 3102 rather than the thickness of the circuit 3110. For example, one embodiment of display tag 20 according to the present invention has a thickness of about 0.1 inches, corresponding to a display 3102 thickness of 0.1 inches and the circuit 3110 thickness (including components mounted thereon) of about 0.03 inches. It will be appreciated that the thickness of the display tag 20 may be reduced even further by utilizing a thinner display 3102. In contrast, prior art display tag structures are known to have thicknesses of about 0.3 inches or greater.

Figure 33A:
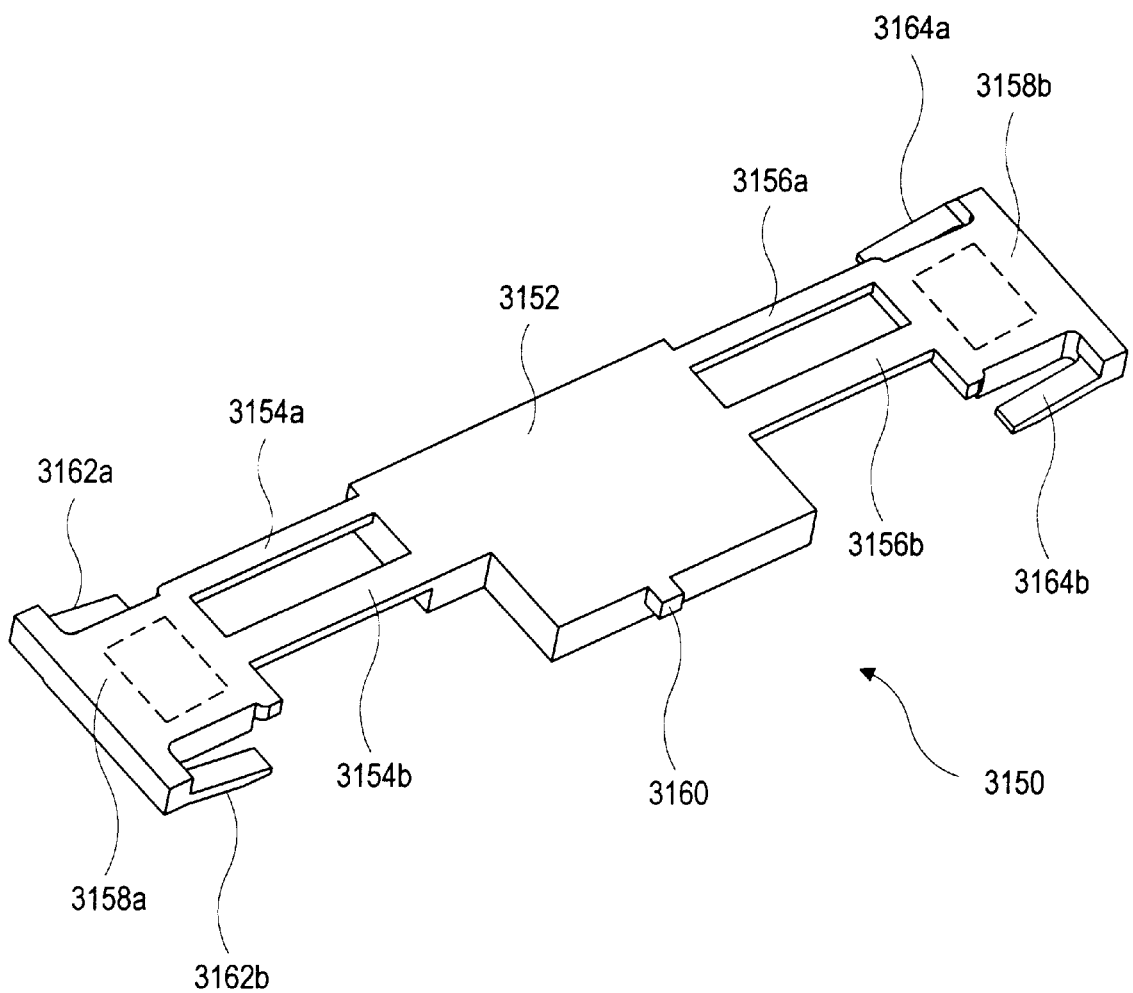

Now turning to FIG. 33a, there is shown a perspective view of a switchplate 3150 which forms a portion of the display tag 20. The switchplate 3150 is comprised of a center section 3152 and two pairs of rails 3154a, b and 3156a, b connecting the center section 3152 to respective contact pads 3158a,b. The switchplate 3150 is adapted for installation within the display tag 20 on top of circuit 3110 (FIG. 32a). An alignment tab 3160 protrudes from the bottom edge of center section 3152 to facilitate alignment of the switchplate 3150 when it is assembled within the display tag 20. The switchplate 3150 in one embodiment has a thickness of no greater than about 0.05 inches so as to easily fit above the circuit 3110 within the compact housing 311, with its upper surface being substantially coextensive with the front wall of the housing 311 so as to minimally impact the thickness of display tag 20.

Figure 33B:
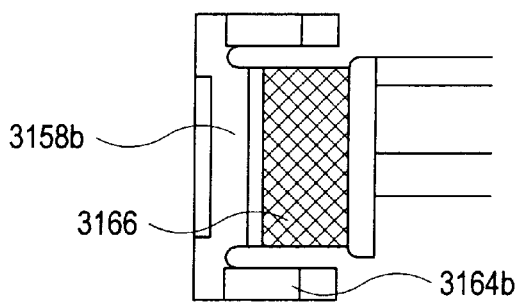

Resilient support prongs 3162a,b and 3164a,b extend downwardly from contact pads 3158a,b toward the underlying the circuit 3110 (not shown in FIG. 33a). The downward turn of support prongs 3162a,b and 3164a,b bias the contact pads 3158a,b into a normally elevated position relative to the circuit 3110. The lower (back) surface of each of contact pads 3158a,b are provided with a patch of conductive ink. FIG. 33b, for example, shows contact pad 3158b with a patch 3166 of conductive ink on its back surface. The back surface of contact pad 3158a is not shown, but includes a substantially similar patch of conductive ink. In the illustrated embodiment, the patch 3166 of conductive ink is rectangular in shape and covers a substantial portion of the lower surface of conductive pad 3158a, but it will be appreciated that the conductive portion 3166 of either of contact pads 3158a,b may comprise conductive materials other than ink, may cover different areas, and may have a non-rectangular shape. When downward pressure is applied to either of contact pads 3158a,b, the support prongs 3162a,b or 3164a,b flex so as to permit movement of the contact pads 3158a,b from their normally elevated position to a depressed position in which the conductive area 3166 contacts corresponding portions of the underlying circuit 3110. Upon removal of the downward pressure, the resilient support prongs 3162a,b or 3164a,b flex back to their initial position, causing respective contact pad(s) 3158a or 3158b to part from contact with the circuit 3110 and return to their normally elevated position.

Figure 33C:
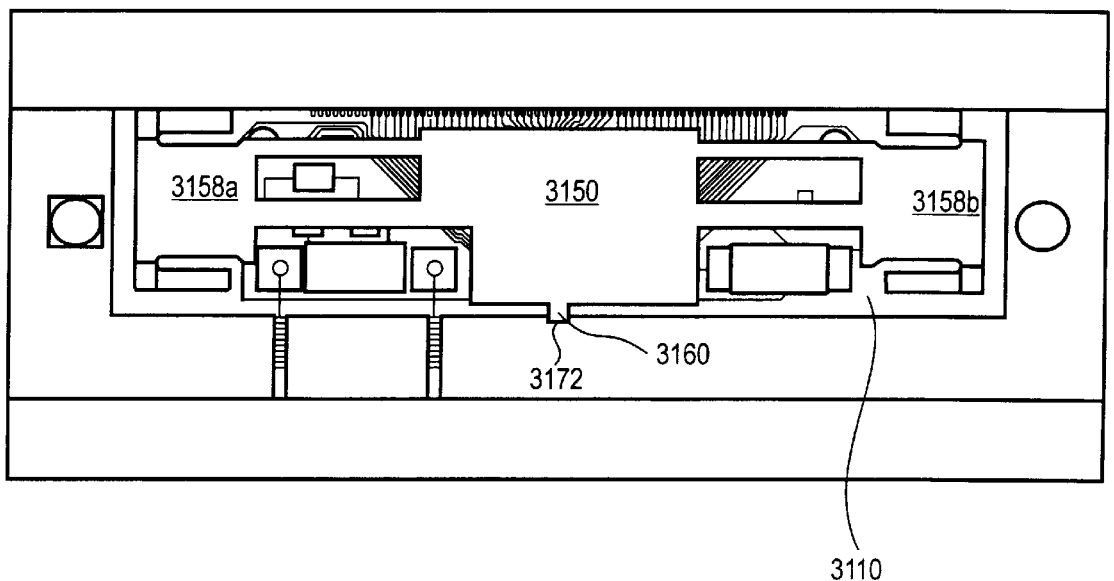

FIG. 33c depicts the step of attaching the switchplate 3150 to the circuit 3110 (FIG. 32a). The switchplate 3150 is installed on top of the circuit 3110 face-down, with the contact pads 3158a,b in the switchplate residing in their normally elevated position, above corresponding contacts 3146,3148 (FIG. 32a) on the circuit 3 110. The alignment tab 3160 protruding from the switchplate 3150 is received within a corresponding keyway 3172 at the center of the bottom inside edge of the bobbin 3106. In one embodiment, the switchplate 3150 is not adhered to the circuit 3110, but is held in position above the circuit 3110 by the protective overlay 3100. It will be appreciated, however, that the switchplate 3150 may be held in position above the circuit 3110 by any suitable means known in the art. When downward pressure is applied to either of contact pads 3158a,b (e.g., by a user physically depressing the switchplate 3150), the contact pad(s) move from their normally elevated position to a depressed position, thereby contacting and shorting the interleaved "E" patterns 3146 or 3148. The ASIC circuit 3140, which is electrically connected to the "E" shaped contacts 3146,3148, senses the shorting of contacts and activates a debounce routine (as described in relation to FIGS. 24c–d) to establish communications with an associated area controller.

Several of the assembly steps involved in constructing display tag 20 according to one embodiment of the present invention will hereinafter be described in relation to FIG. 34 and FIGS. 35a through 35e. FIG. 34 depicts the step of attaching coil leads to the circuit 3110. Lead wires 3112, 3114 from pick-up coil 110 are attached to respective contacts 3142,3144 in the circuit 3110. Two parallel channels 3116, 3118 molded in the lower edge of bobbin 3106 and aligned with respective contacts 3142,3144. To connect the pick-up coil 110 to the circuit 3110, the ends of lead wires 3112,3114 are threaded from the outer channel 328 through the channels 3116,3118, then soldered to the contacts 3142,3144 at respective solder points 3168,3170. It will be appreciated that the lead wires 3112,3114 may be connected by any suitable means known in the art, including hot shoe welding, needle soldering or ultrasonic welding.

Figures 35A, 35F:
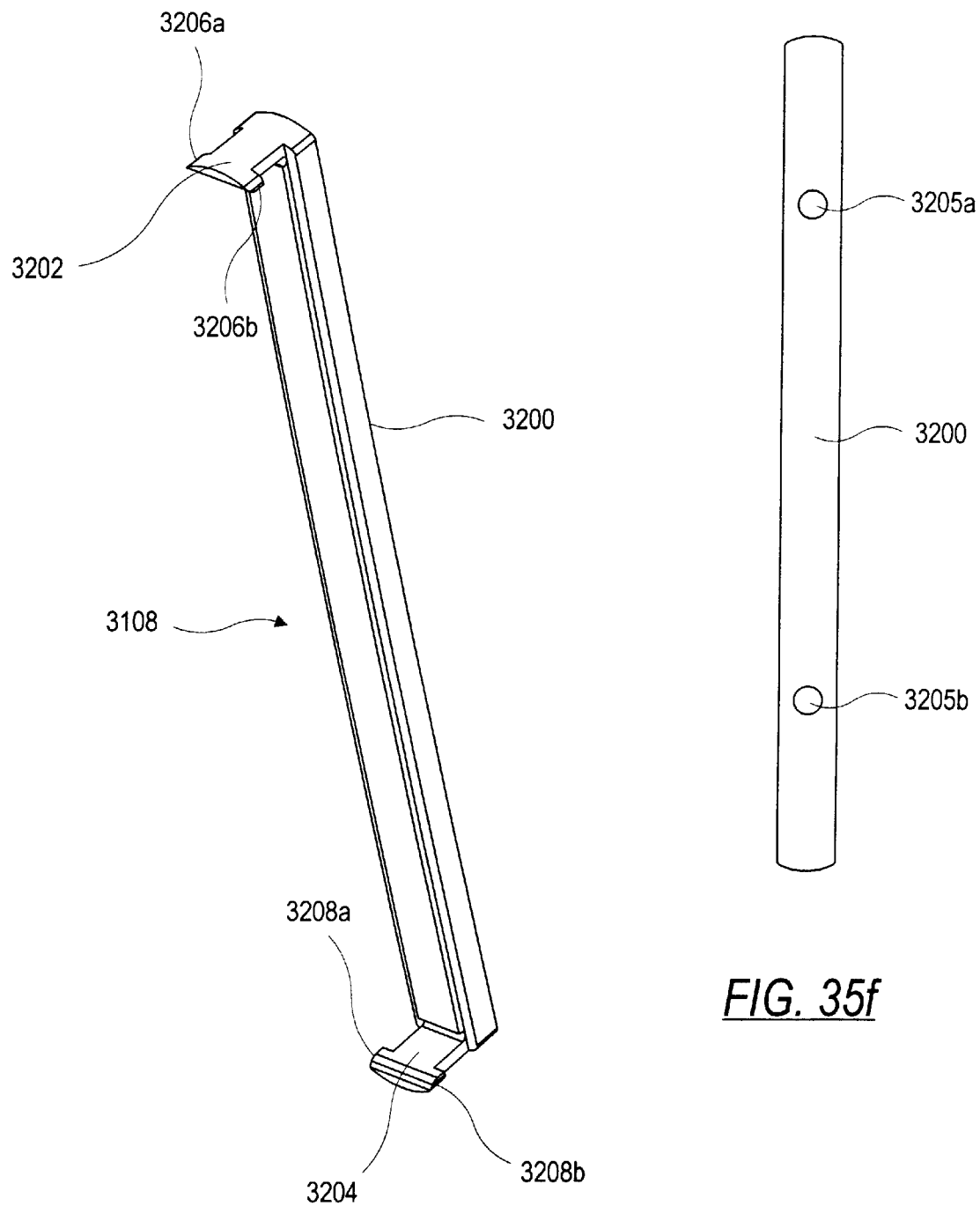
Figure 35B:
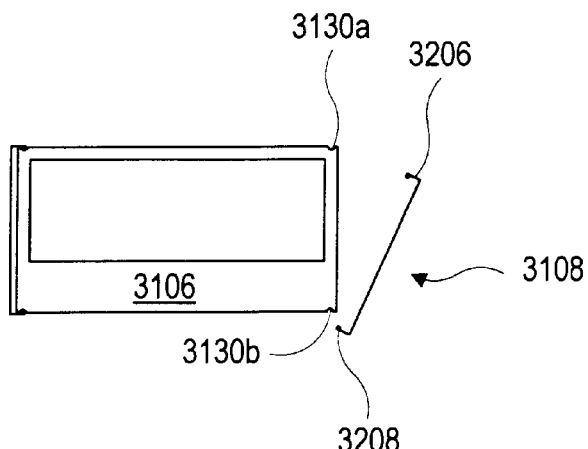
FIGS. 35b–35e are side elevation views depicting the step of attaching the end cap of FIG. 33a to the display tag of FIGS. 31a, b, c.

FIG. 35a shows an enlarged perspective view of an endcap 3108 which according to one embodiment comprises a portion of display tag 20. A top view of the outer surface of endcap 3108 is shown in FIG. 35f. Endcap 3108 may be connected to either the left or right side of display tag 20, by connection to respective top and bottom notches 3130a, 3130b of the bobbin 3106 (FIG. 31b,c). The endcap 3108 consists generally of a rail 3200 integrally attached to top and bottom connecting tees 3202,3204. The respective connecting tees 3202,3204 each extend inwardly from the top and bottom of the rail 3200 toward the respective top and bottom notches 3130a,b in the bobbin 3106. Horns 3206a,b and 3208a,b extend laterally outwardly from the ends of the respective connecting tees 3202,3204 and become engaged within the respective top and bottom notches 3130a, 3130b of the bobbin 3176.

Indents 3205a,b on the outer surface of rail 3200 define a socket for receiving a post-shaped key or head of an assembly tool, mechanical arm or the like, to facilitate installation of the display tag 20. In the illustrated embodiment, for example, indents 3205a,b comprise sockets having circular cross-sections which are adapted to receive corresponding keys of an installation tool (not shown), wherein the keys become frictionally engaged within the socket and permit the installation tool to grasp and manipulate the endcap 3108 during installation. It will be appreciated that either the indents 3205a,b or the keys (not shown) may have other than circular cross-sections. For example, one or more of indents 3205a,b and keys may be provided with hexagonal cross-sections.

Figure 35C:
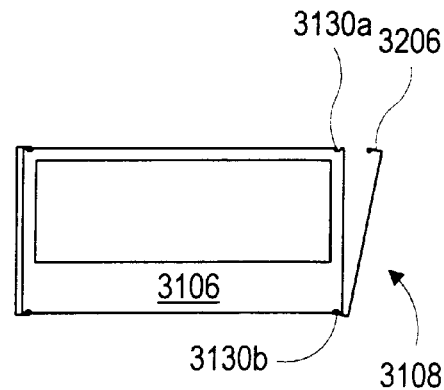
Figure 35D:
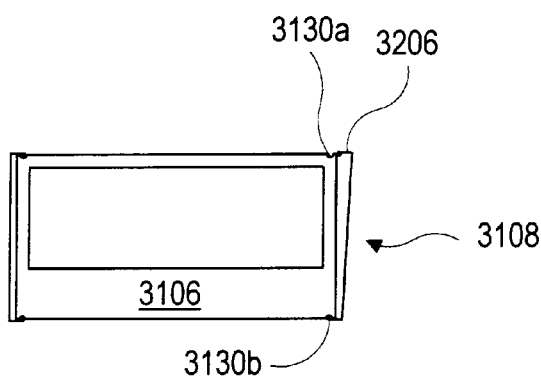
Figure 35E:
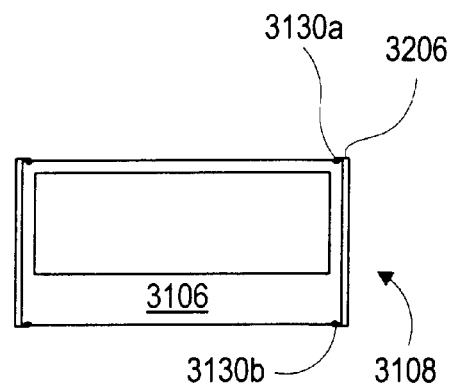

One method of attaching endcaps 3108 to the display tag 20 will hereinafter be described in relation to FIGS. 35b–35e. After the pick-up coil 110 has been wound around the bobbin 3106 and within the outer channel 328, an endcap 3108 is positioned adjacent to the side of the bobbin to which it is to be attached, angled to facilitate insertion of horns 3206a,b or 3208a,b into the respective top or bottom notches 3130a, 3130b of the bobbin 3106. For example, in FIG. 35b, endcap 3108 is positioned adjacent to the right side of bobbin 3106, angled to facilitate insertion of horns 3208a,b into bottom notch 3130b. Then, as shown in FIG. 35c, the horns 3208a,b are inserted into bottom notch 3130b and the rail 3200 rotated in a counterclockwise direction such that horns 3206a,b become positioned adjacent to top notch 3130*a*. As the rail 3200 is moved closer to the right edge of the bobbin 3106, the horns 3206*a,b* are pressed inward toward the top notch 3178*a*. As they are pressed inward, the horns 3206*a,b* initially contact a beveled corner of the bobbin 3106 (FIG. 35*d*), then slide inward over the top surface of the bobbin 3106 until they snap into engagement with the top notch 3130*a* (FIG. 35*e*). The second endcap 3108 is installed on the left side of the bobbin 3106 in substantially the manner described above. The endcaps 3108 are properly installed when they are flush against the side edges of the bobbin 3106.

After completion of the preceding assembly steps, protective overlay 3100 is wrapped around and adhered to the housing 311. In one embodiment, this is accomplished by coating an inner surface of overlay 3100 with an acrylic or rubber adhesive prior to wrapping the overlay 3100 around the housing 311. In this embodiment, it is preferred that backing paper be placed over the adhesive substance until just before the overlay 3100 is applied to the housing 311, as is known in the art, so that dust and other materials do not accumulate on the adhesive substance, and so that the overlay 3100 is not adhered to undesired surfaces. It will nevertheless be appreciated that the overlay 3100 may be fastened to the housing 311 by any other means known in the art, or by any other suitable adhesive substance. Of course, the overlay 3100 should be placed so as to not interfere with the available viewing area of the display 3102 and so as to properly position its text in relation to the display 3102. The overlay should be applied by a method which avoids entrapment of air pockets, especially in the viewing area of display 3102, because such air pockets may obstruct portions of the display 3102 and impair the appearance of the display tag 20. In one embodiment, application of the overlay 3100 is accomplished by a custom label machine (not shown) so that the position of the overlay 3100 is held to close manufacturing tolerances. It will be appreciated, however, that application of the overlay 3100 to the housing 311 may accomplished by any means known in the art, including hand application.

As best observed in FIGS. 31*b* and 31*c*, application of the overlay 3100 is accomplished in one embodiment with the initial step of adhering a first edge of the overlay 3100 against the back side of the bobbin 3106. The position of the first edge relative to the back side of the bobbin 3106 is illustrated by the dashed line 3210 in FIG. 31*c*. Then, the overlay 3100 is wrapped around the lower edge of the bobbin 3106 to the front side of the bobbin 3106 and over the face of the display 3102. Then, continuing around the top edge of the bobbin 3106, the overlay 3100 is wrapped part-way around the back side of the bobbin 3106 so that it overlaps its starting position (e.g., dashed line 3210) and terminates approximately at line 3220.

Figure 36A:
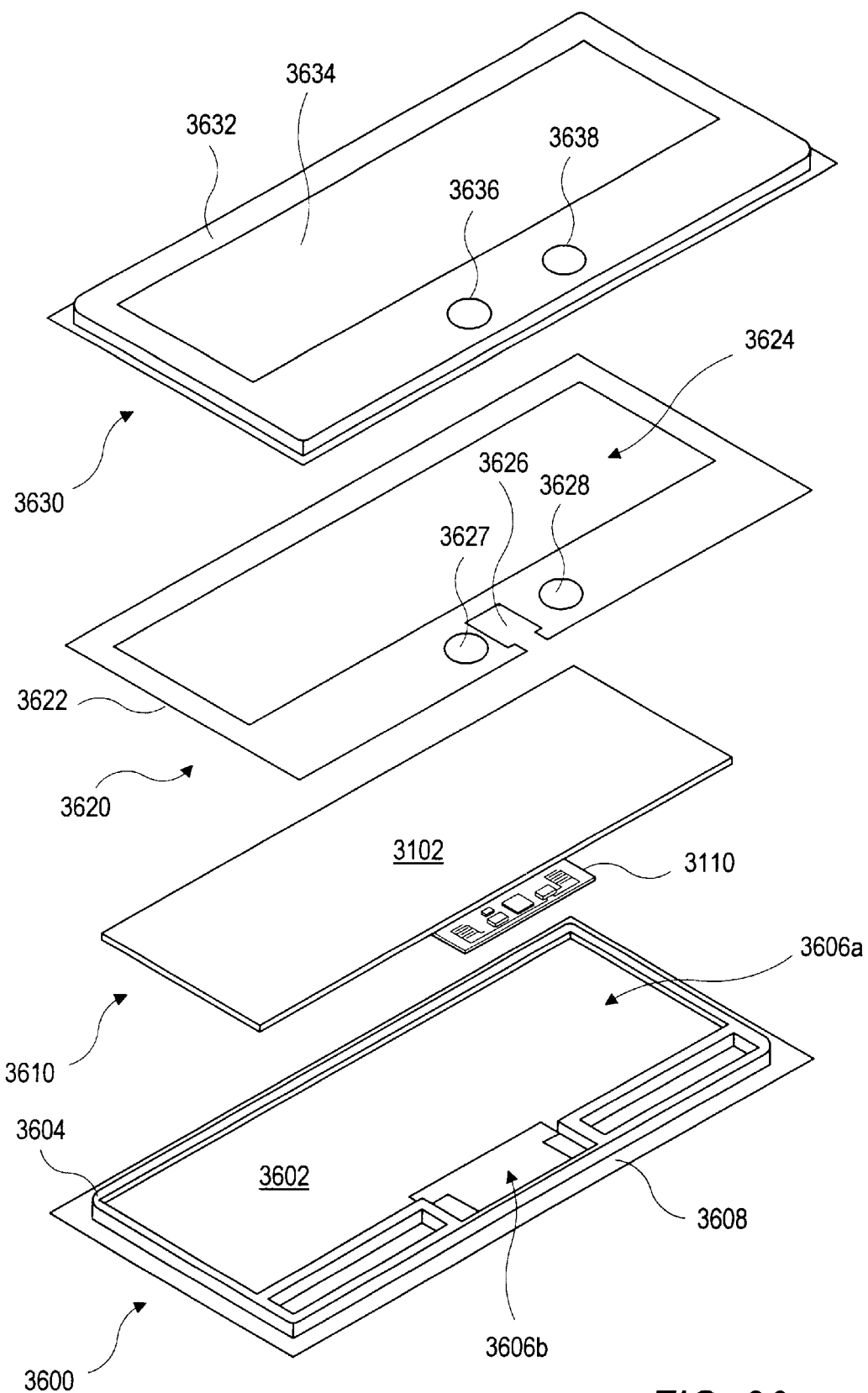
FIG. 36a is an exploded view of a thermoformed embodiment of a display tag which may be used in the system of FIG. 1.

FIG. 36*a* is an exploded view of a thermoformed embodiment of a display tag 20 which may be used in the system of FIG. 1. In this embodiment, the display tag 20 consists of a base component 3600, an insert 3610 comprising a display 3102 and circuit 3110, a window frame 3620 and front cover 3630. The display 3102 and circuit 3110 are generally identical to the corresponding display 3102 and circuit 3110 in the embodiment of FIGS. 31. The base component 3600 and front cover 3630 are dimensioned so that the display tag may be mounted to an auxiliary rail on the front of a store shelf, as described in relation to FIG. 15*a*. In one embodiment, the base component 3600 and front cover 3630 are formed using conventional thermoforming techniques, from a continuous sheet of polyvinyl chloride (PVC) rollstock material heated and drawn into appropriately shaped mold cavities so as to form a "web" of multiple components. Window frame 3620 may similarly be formed using conventional thermoforming techniques. It will be appreciated that operations involving these or any other thermoformed components may be accomplished on multiple components in the web or on individual components detached from the web. It will further be appreciated that other rollstock materials known in the art, such as oriented polystyrene (OPS), polypropylene and the like, may be utilized to form the base component 3600 and front cover 3630.

The base component 3600 consists of a base plane 3602 and rim 3604 extending upwardly from the base plane 3602 so as to define a two-part receiving tray 3606*a,b* inside of rim 3604 and a ledge 3608 outside of rim 3604. Receiving tray portions 3606*a,b* are dimensioned, respectively, to receive the display 3102 and circuit 3110 of insert 3610, with the rim 3604 being coextensive with or extending slightly above the insert 3610. In one embodiment, after placing the insert 3610 into receiving tray 3606*a,b*, window frame 3620 is adhered to the rim 3604 of base component 3600 by radio frequency (RF) weld, ultrasonic weld or other suitable means so as to enclose the insert 3610. Window frame 3620 consists of a generally rectangular frame body 3622 defining a window 3624 and respective cutouts 3626, 3627,3628. In one embodiment, window frame 3620 is constructed by die cutting a sheet of PVC into the configuration shown in FIG. 36*a*. It will be appreciated, however, that window frame 3620 may be constructed from any suitable material known in the art, using any suitable process known in the art.

Window frame body 3622 has external dimensions generally corresponding to ledge 3608, and exceeding those of the rim 3604, so as to define a bobbin structure with an outer channel when window frame 3620 is adhered to the base component 3600. The outer channel, which is formed entirely around the outer periphery of the bobbin structure between the outer edges of base plane 3602 and window frame 3622, is adapted receive a pick-up coil similar to that described in relation to FIGS. 31*b,c*. It is desirable that the walls of the bobbin structure be relatively thin so as to maximize the coupling efficiency between the pick-up coil in the tag and an external coil mounted within the shelf rail, yet thick enough to maintain adequate wall strength for winding the pick-up coil. According to one embodiment, these goals are achieved by manufacturing each of base plane 3602 and window frame 3622 at a thickness of 0.012 inches. The insert 3610 is enclosed within the bobbin structure, with the display 3102 visible through window 3624. Lead wires of the pick-up coil (not shown) are threaded through cutout 3626 of window frame 3620, over rim 3604 of base component 3600, then attached to the circuit 3110 by soldering the lead wires to respective contact pads 3402,3404, as described in relation to FIG. 34.

After connection of the lead wires to the circuit 3110, it is preferred that the partially assembled display tag 20 is tested to assure proper electrical connection between the pick-up coil and circuit 3110, to ensure proper inductance of the pick-up coil and to ensure proper operation of the ASIC circuit 3140. Next, the front cover 3630 is attached, by radio frequency (RF) weld, ultrasonic weld or any other suitable means, and excess plastic is trimmed to form a fully-assembled display tag 20 which is ready to be installed within the rail of a store shelf. The front cover 3630 generally includes an opaque portion 3632, a clear window portion 3634 and touch-pads 3636,3638. The opaque portion 3632 conceals a majority of the internal components and structure associated with the display tag 20 and enhances the visual appearance of the display tag 20, whereas the clear window portion 3634 provides viewing access to the display 3102. Touch-pads 3636,3638 are coated with conductive ink on their lower surface and serve generally the same function as the contact pads 3158a,b in the display tag embodiment described in relation to FIGS. 33a and 33b.

After the front cover 3630 has been attached to the bobbin assembly, the touch-pads 3636,3638 reside in a normally elevated position above corresponding contacts 3146 and 3148 (FIG. 32a) on the circuit 3110, spaced apart from contacts 3146,3148 by window frame 3620. In this position, the conductive bottom surface of touch-pads 3636,3638 does not contact either of contacts 3146,3148. Cutouts 3627,3628 in window frame 3620 define respective switch structures between touch pads 3636,3638 and contacts 3146, 3148 such that, when respective touch pads 3636,3638 are physically depressed by a user, shorting contacts are formed with respective contacts 3146,3148. In one embodiment, raised ridges of material are positioned around cutouts 3627,3628 to provide tactile feel for a user depressing the respective touch pads 3636,3638. Tactile feel may also be achieved by provided touch-pads 3636,3638 with a raised or domed upper surface. In one embodiment, this is accomplished coincident to the initial thermoforming of the cover 3630, prior to assembly of the display tag 20. The ASIC circuit 3140 on circuit 3110 senses the shorting of contacts and activates a "bounce" routine to establish communications with an associated area controller, in the manner heretofore described.

Figure 36B:
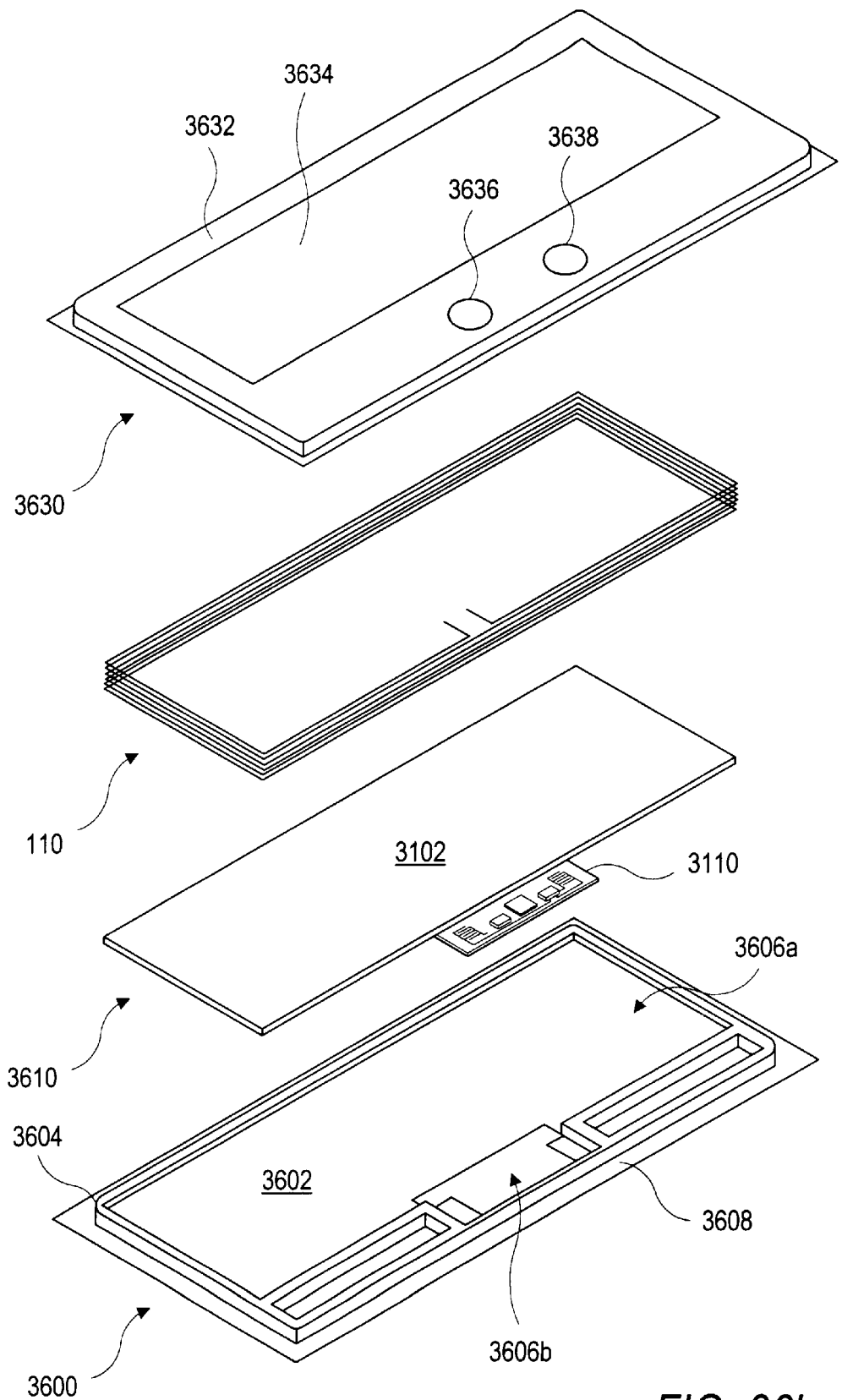
FIG. 36b is an exploded view of an alternative thermoformed embodiment of a display tag which may be used in the system of FIG. 1.
Figure 36C:
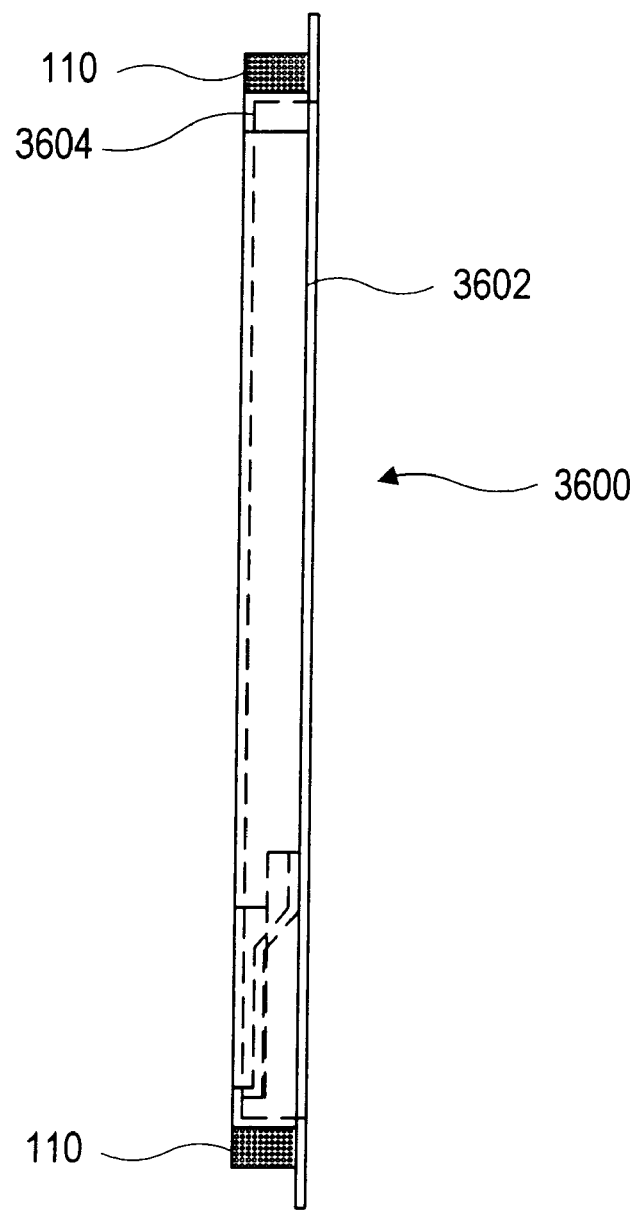
FIG. 36c is a side sectional view of a base component of FIG. 36b with pick-up coil attached.

FIG. 36b is an exploded view of an alternative thermoformed embodiment of a display tag 20, consisting of a base component 3600, an insert 3610 and front cover 3630 substantially as described in relation to FIG. 36a, but in which window frame 3620 is eliminated and pick-up coil 110 is pre-wound and bonded, then fitted around rim 3604 directly. FIG. 36c is a side view of base component 3600 after pick-up coil 110 has been fitted around rim 3604. Pick-up coil 110 in one embodiment is constructed of 64 turns of #32 gauge copper wire, held together by a chemically- or thermally-activated coating. It will be appreciated, however, that pick-up coil 110 may be constructed with different gauge or composition of wire, with fewer or greater turns, or held together by other means known in the art. One of the advantageous features of the display tag 20 according to the present embodiment is that it may be manufactured with fewer steps than the embodiment of FIG. 36a. More specifically, the present embodiment eliminates the steps of forming the window frame component 3620, attaching window frame 3620 to base component 3600 to form a bobbin structure, and winding pick-up coil 110 around the bobbin structure. The remaining assembly steps are more or less the same as heretofore described in relation to FIG. 36a. Touch-pads 3636,3638 are provided with a raised or domed upper surface, to define a normally elevated position above contacts 3146,3148 and to provide tactile feel for a user depressing the respective touch pads 3636,3638.

Alternate TAG embodiment

Figure 16A:
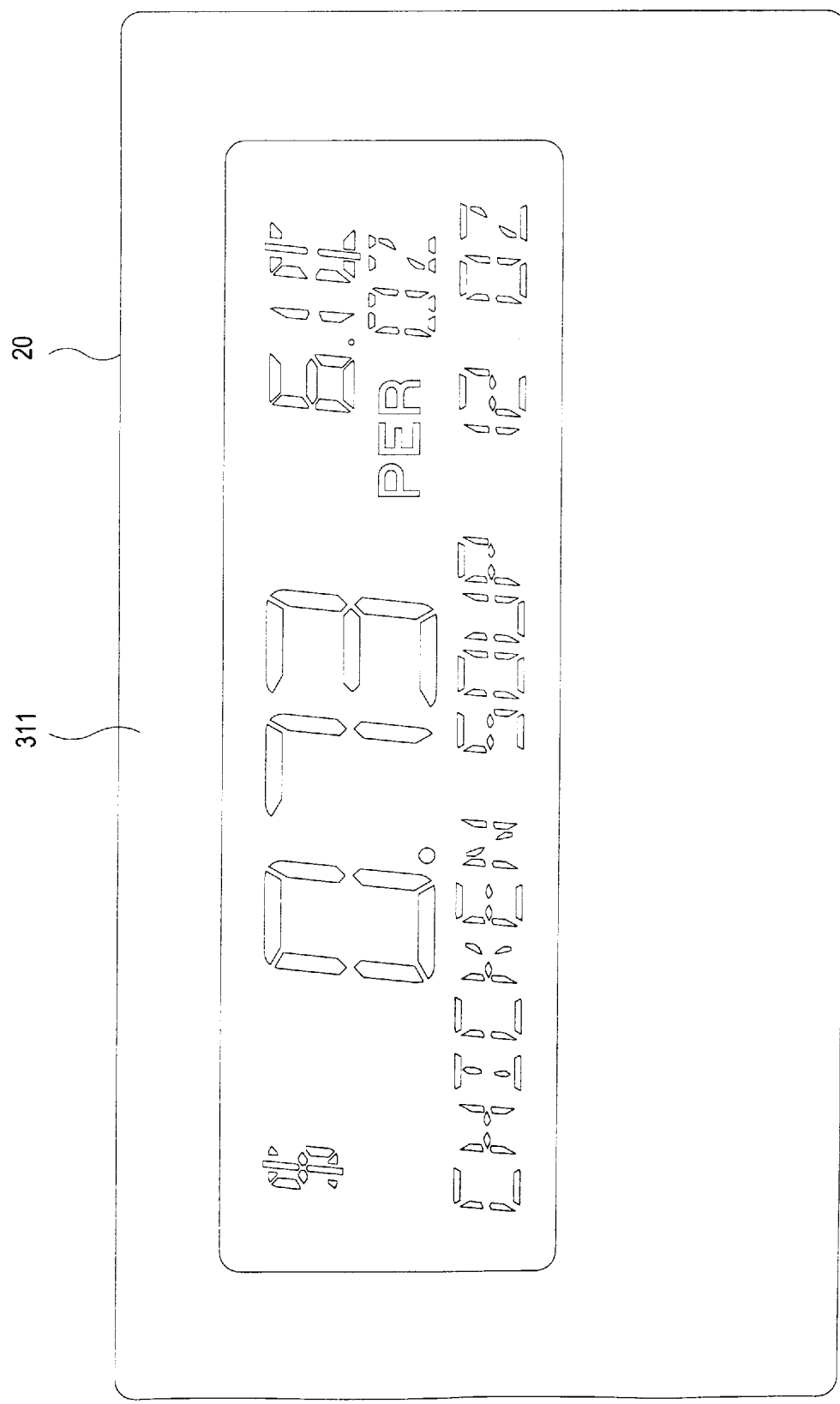
Figure 17B:
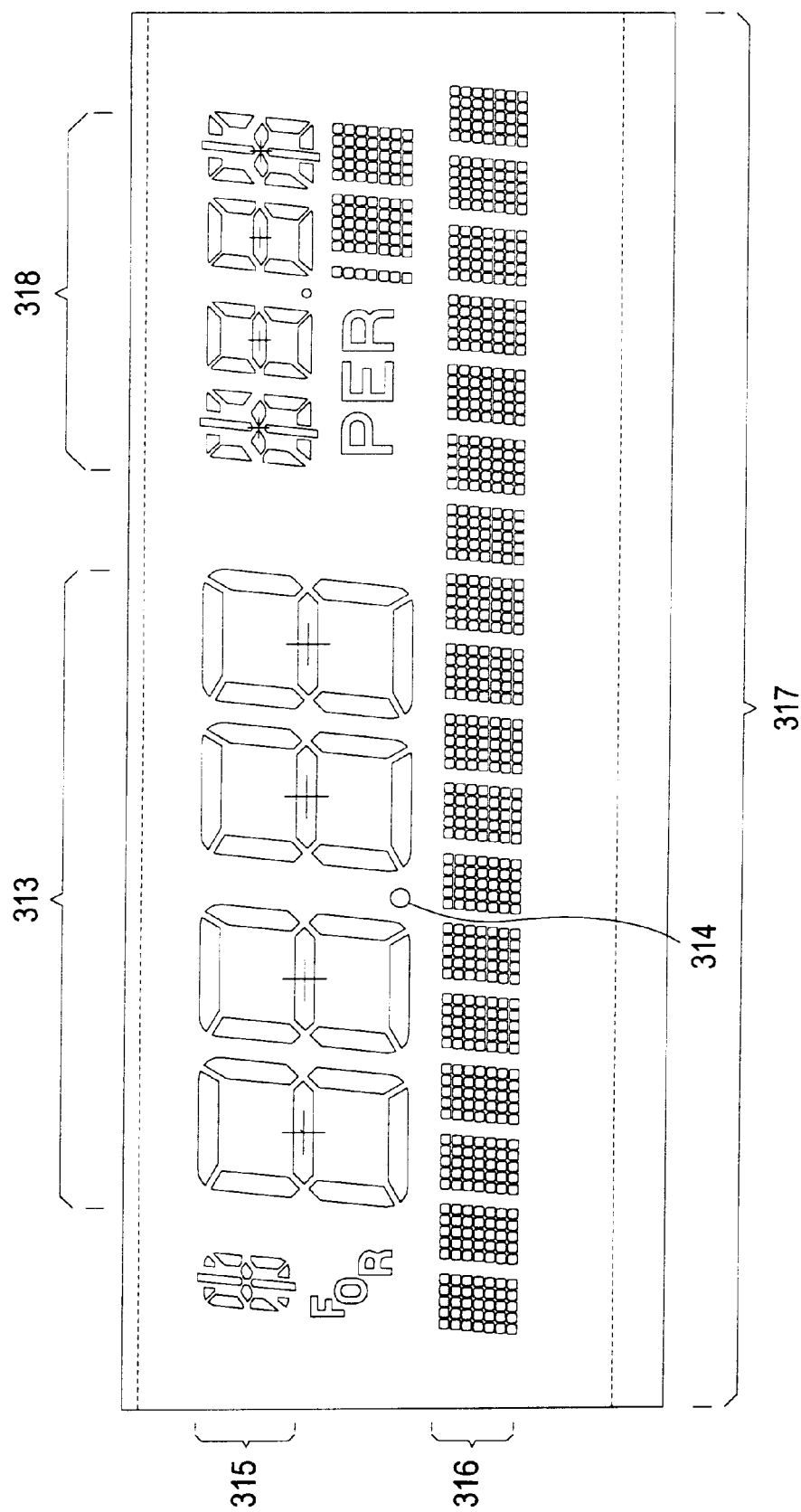

FIG. 16 illustrates a front view of the tag 20 shown in the previously-discussed figures, and FIG. 17 shows the details of the face of the LCD display. A printed circuit board or, preferably, a flex circuit carrying the electronic components for the tag 20 is concealed within the tag housing 311. The front wall of the housing forms a rectangular aperture for the display, preferably comprises liquid crystal display (LCD); however, other types of displays, such as light-emitting diode (LED) may be alternatively used. The LCD as illustrated includes four seven-segment characters 313, a decimal point 314, an eight-segment units identifier 315, and a "for" annunciator 316 for displaying prices for quantity purchases; an 18-character alpha-numeric display 317 (either 5×7 matrix or 14 or 16 segments) for product descriptions; and a zone 318 with a combination of characters to display cost per unit. An ASIC is used to translate the parallel data from the memory into conventional drive signals for the LCD display; however, alternate display drivers such as the Fuji FD2258 can be used. The display is shown to be of the LCD type, but LED's or other types of electronically controlled displays can be used. To seal the display window in the tag housing 311, a clear film may be bonded to the tag housing to cover the display window.

Alternate TAGs and TAG Holders

FIG. 18a illustrates a display tag arrangement for products which are displayed on racks rather than shelves. This type of display rack is commonly used for products which are packaged in blister packages. The rack includes multiple rods 330, each of which supports multiple packages. A package can be removed from the rod by simply sliding the package off the forward end of the rod.

In the arrangement of FIG. 18a, a rail 320 is mounted directly above the rods 330, and contains a separate display tag 20 for each of the rods 330. The rail 320 may be a standard four foot rail such as one of the rails described in connection with FIGS. 14, 15a, or 15b. The rail 320 is mounted to the gondola using brackets on each end of the rail 320 as in this embodiment there is a no shelf to which the rail 320 may be mounted.

Figure 18B:
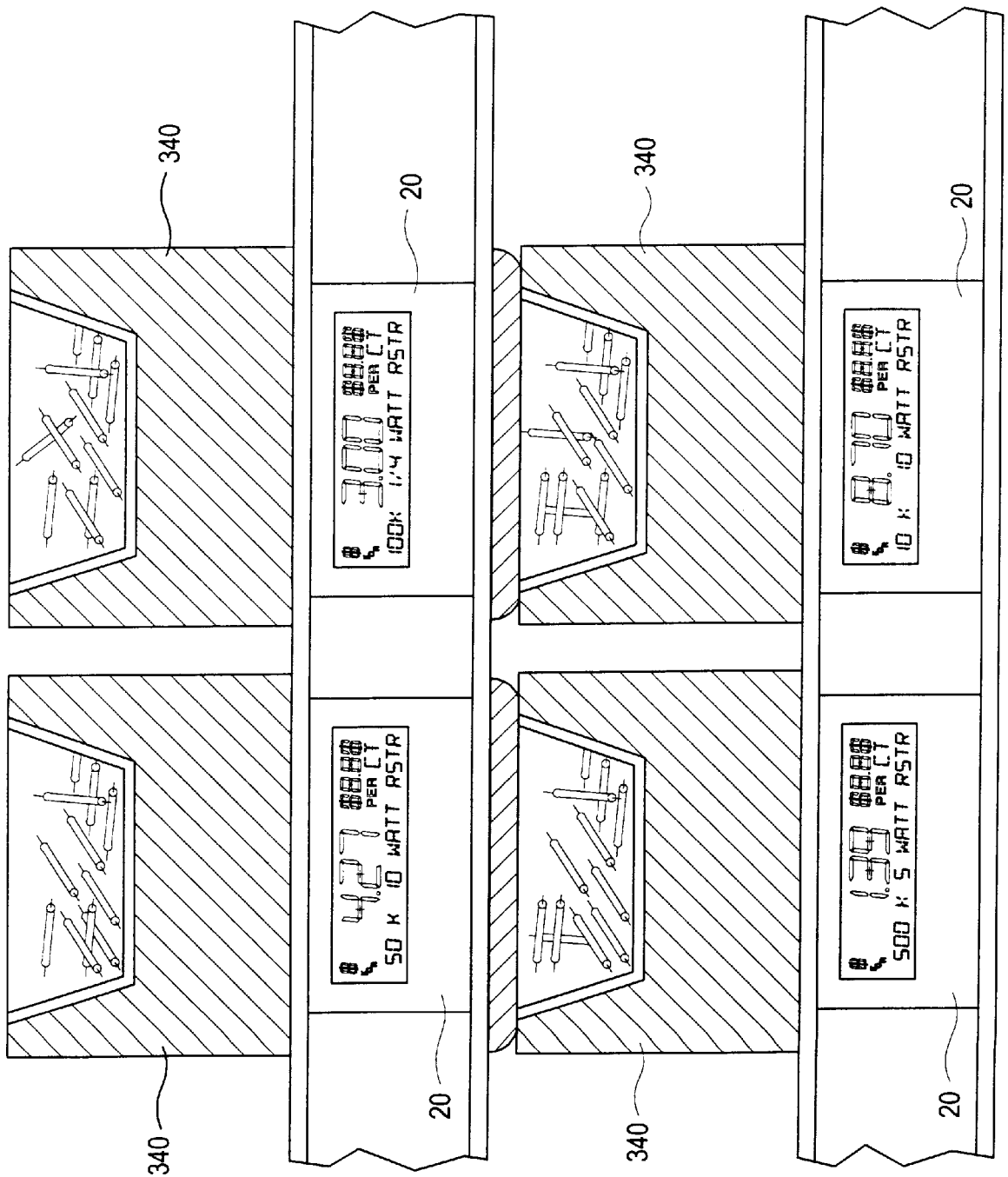
FIG. 18b is a front elevation of a display tag arrangement for multiple product bins in a warehouse.

FIG. 18b illustrates the use of the electronic display tag system of invention in a warehouse environment. Many warehouses contain numerous bins containing many different kinds of small articles which are difficult to identify from the markings on the articles themselves. FIG. 18b contains a diagrammatic illustration of four such bins 340. To identify the articles in the respective bins, a rail 320 is mounted directly beneath each row of bins, and contains a separate display tag for each bin. The rails described in connection with FIG. 18a may be employed in connection with FIG. 18b.

Flickering

The reflected or emitted light from a display with characteristics which convey product information can be modulated in an imperceptible way to transmit binary or coded information detectable to an electronic scanner. Referring now to FIG. 29, a LCD 3001 (156) of a given tag 20 displays information which is emitted or reflected from the LCD 3001 in the form of visible modulated light ("flicker") and also non-displayable light carrying binary or digital representation of data. A sensor 3002 in the form of a wand (for example, as described above with reference to FIG. 28) or scanner is positioned near the LCD 3001 receiving the light. The sensor 3002 in the hand-held scanner is coupled by a cable 3003 to an RF transceiver 3005. Alternatively, the scanner may be coupled using RF signals to the transceiver. The RF transceiver 3005 sends a signal to the second RF transceiver 3006. The transceiver 49 is coupled to the system controller 28 by cable 3007. The system controller 28 processes the information received by the sensor. Alternatively, the sensor 3002 may be directly coupled to the system controller 28. Although the below algorithms are described in terms of conveying bar code information to a sensor, it will be understood that any type of information can be conveyed in the manner described below. The system described can also be employed in a mode which completely eliminates the need for supplying and maintaining paper labels which display product or bar code information. In other words, the display tag may display all information electronically, in either human perceptible or sensor detectable form.

Figure 20A:
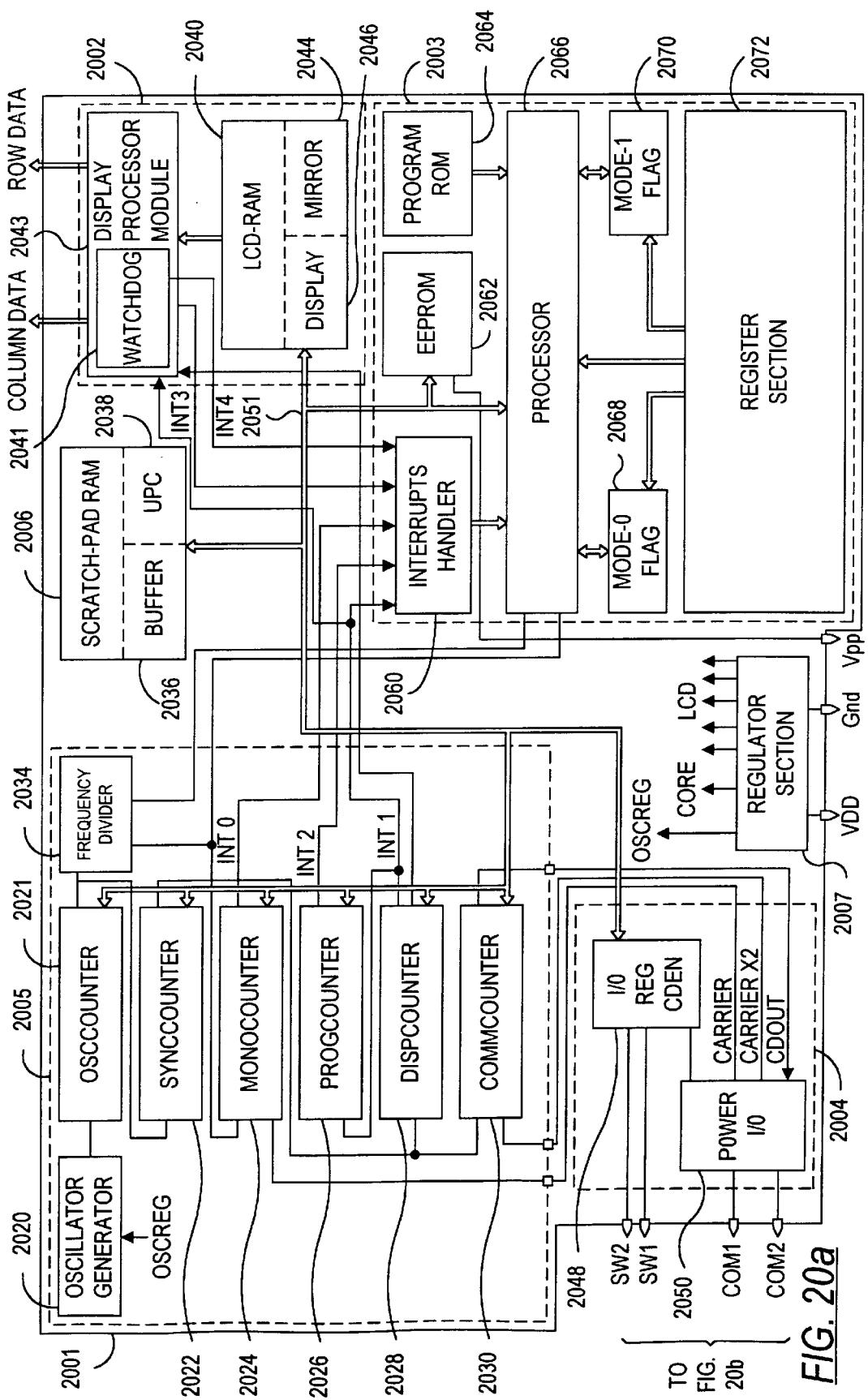
FIG. 20a is a functional block diagram of a part of the application specific integrated circuit (ASIC) according to principles of the present invention
Figure 30:
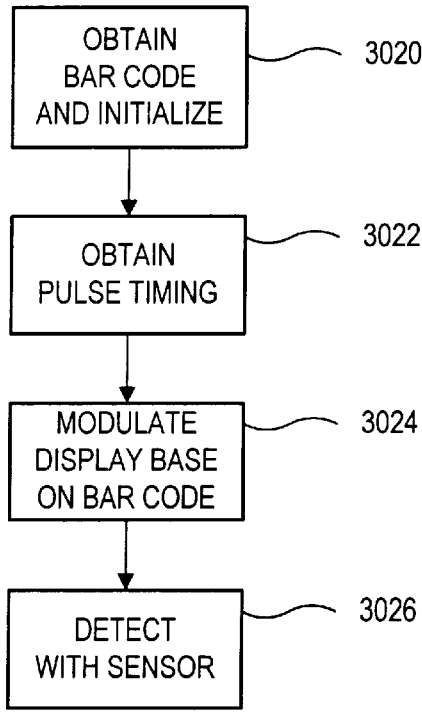
FIG. 30 is a flowchart describing the operation of the flickering display according to principles of the present invention.

Referring to FIG. 30, at step 3020, system initialization occurs when the system controller puts the tag 20 in flickering mode and the binary/digital or an analog version of information contained, for example, in a bar code of a product is determined and uploaded to the ASIC 2001. Next, at step 3022, this information is stored in the ASIC 2001 in the scratchpad RAM 2006 (FIG. 20*a*). This information will be used to modulate a multiplexer (MUX) (not shown) driving the LCD 3001 or pulse the display. At step 3024, the information is used by the ASIC 2001 to drive the LCD 3001 drivers to turn on and off the LCD 3001. The switching is sensed by the sensor 3002 which converts the on time to a 1 and the off time to a zero. This digital information is then converted by the system controller into a binary form equivalent to bar-code information. The switching occurs at a rate imperceptible to the human eye. As an alternative to this step, the frequency (either the mutiplex rate or frame/scan rate) at which the LCD 3001 is driven can be alternated between two frequency values which is detectable by the sensor 3002. This will lighten or darken the whole display. In another method, light and dark portions of the display are identified. The segments in a light area are scanned multiple times to keep them dark while the segments in a darker (more on) area are scanned less. This is then reversed and the net effect is the whole display becomes lighter than darker. In yet another alternative, the scanner may be set up to scan a dark area of the display multiple times and a light area of the display multiple times. Switching between these regions will appear as a slight variation of intensity at the photocell of the detector 3002. This variation would result in two different intensity levels and would represent a binary code equivalent to a bar-code. At step 3024, the detector 3002 scans the display in the way described in the previous step. Finally, the information is sent to the system controller at step 3026 where the information is recognized as the proper bar-code.

ASIC

Each tag of the present invention uses an application specific integrated circuit (ASIC) to perform its processing functions including driving the LCD, accepting data from the TAC and sending data to the TAC. Referring again to FIG. 20*a*, the counter section 2005 comprises an oscillator generator 2020. The oscillator generator 2020 produces a clock signal that directly or indirectly drives the CPU 2003, the LCD display controller 2002, the counter section 2005, and the scratch-pad RAM 2006. The output of the oscillator generator 2020 is input to an oscillator counter (osccounter) 2021. The osccounter 2021 is a 4-bit, divide-by-N, memory-mapped counter which is adjusted by the system firmware, as described below, to provide an output signal whose frequency is within a nominal design frequency range. The output of this counter clocks the CPU 2003 and is input to a synchronization counter (synccounter) 2022.

The synccounter 2022 is a 6-bit continuously running divide-by-N, memory-mapped counter. The duty cycle of the output waveform of this counter is 50 percent if N is even. The output of the synccounter 2022 is coupled to a program counter (progcounter) 2026. The progcounter 2026 is an 8-bit memory-mapped, write-only counter. The progcounter 2026 runs when its input is selected. The input to the progcounter 2026 is taken from the output of a display counter 2028, the output of the synccounter 2022, or the line carrier frequency from the I/O interface 2004. The input source is reset when the end of the count is reached. Only one source is selected at a time. The progcounter 2026 asserts an interrupt INT2 when it reaches its maximum value. The interrupt INT2 signals the end of a frame period in communications involving the UART.

The display counter (dispcounter) 2028 is a 6-bit continuously running divide-by-N counter which is memory-mapped and write-only. The display counter 2028 generates a clock signal which is used to drive the LCD display. The display counter produces an interrupt INT1 upon its expiration which signals a display processor module 2043 to load data from a LCD RAM 2040. INT1 is also coupled to the progcounter 2026 and can be divided down further by the system.

A monocounter 2024 is a divide-by-N counter which is memory mapped. The monocounter 2024 is used to generate an interrupt at the beginning of each frame period. Together with the INT2 interrupt, the INT0 interrupt is used with the CPU to test the setting of the osccounter 2021.

A frequency divider 2034 provides clock signals for the CPU and divides the osccounter output by 4 and by 2. The divide-by-four frequency drives the CPU 2003. For creating internal timing signals, the CPU also uses the divided-by-two signal.

Figure 20B:
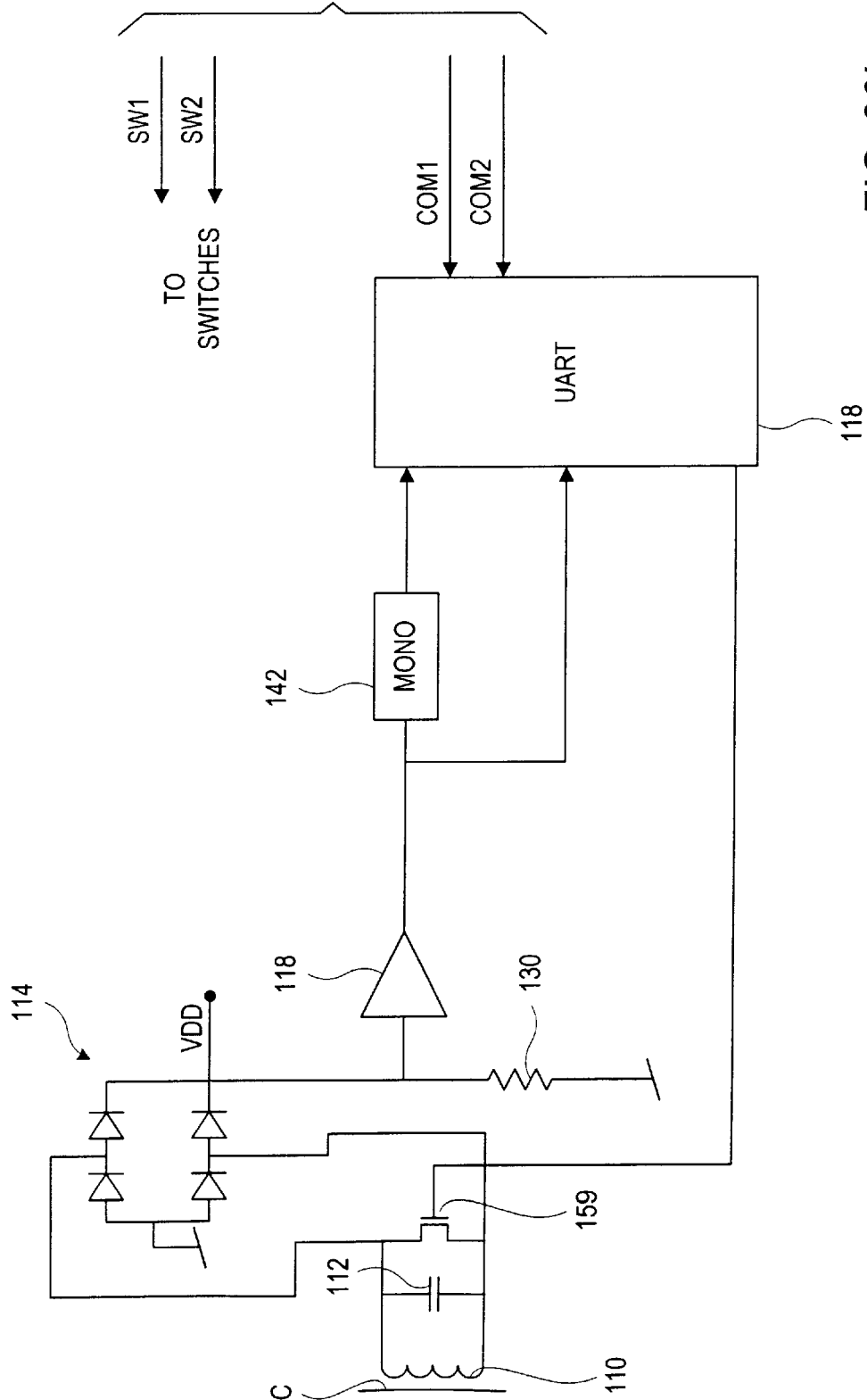
FIG. 20b is a functional block diagram of the application specific integrated circuit (ASIC) with power components according to principles of the present invention.

A communication counter (commcounter) 2030 is used to modulate data used in reverse communications. The commcounter 2030 is a 3-bit divide-by-N counter. When a value is loaded into the counter 2030 by the CPU 2003, the counter 2030 divides down, creating a frequency which is used to turn on and turn off JFETs, which, as mentioned above, can be located in a power I/O block 2050. Alternatively, the JFETs may be placed as shown in FIG. 20*b* outside of this block or, alternatively, as shown in FIGS. 19*a* and 19*b*.

The scratchpad RAM 2006 comprises buffers and registers 2036 which store data temporarily for use by the CPU 2003 and also store flags indicating operational parameters concerning the system. A memory map of this section (including buffers and flag registers) of memory is given in TABLES 3*a*–3*c*. A memory map showing the memory-mapped counter section and other registers is given in TABLE 4. The RAM 2006 also comprises a UPC code segment area 2038 which holds the UPC code for the product which is uploaded from the TAC (area controller).

The LCD display controller 2002 comprises the display processor module 2043. The display controller 2002 provides the ROW DATA and COLUMN DATA signals which drive the LCD display drivers. The ROW DATA and COLUMN DATA signals comprise data for display upon the LCD display. The display processor module 2043 also comprises a watchdog timer 2041. The watchdog timer 2041 is periodically refreshed by the CPU 2003. If the watchdog timer 2041 is not periodically refreshed, then an interrupt INT4 is sent to the CPU 2003. The interrupt INT4 resets the system. The display processor module 2041 is described in more detail below.

The LCD display controller 2002 also comprises the LCD RAM 2040. The LCD RAM 2040 comprises a display data section 2046 and a mirror data section 2044. The display data section 2046 includes data to be displayed on the LCD display. The mirror data section 2044 is used to temporarily store display data which has been previously uploaded by the CPU into the LCD RAM 2040. The CPU performs cyclic redundancy checks (CRC) of this data in the mirror section 2044 before the display data is loaded into the display data section 2046.

The CPU 2003 comprises an interrupts handler 2060 for the purpose of recognizing and prioritizing interrupts. Once this process is accomplished, the interrupts handler presents the results to a processor 2066. The CPU 2023 also comprises an EEPROM 2062. Advantageously, the EEPROM (or E²PROM) comprises a reliable non-volatile memory implemented in the ASIC (preferably using, although not necessarily standard ASIC cell design) in a cost effective manner. Heretofore, it was believed that E²PROM chips had to be provided separately from the ASIC, due to their relatively high current requirements. Other non-volatile components such as fusible links ("poly fuses") cannot be easily implemented into an ASIC because of the likelihood of damage to the ASIC during the "burning in" process. The EEPROM 2062 contains data representing a unique serial number for the TAG. This data is "burned into" the EEPROM 2062 during manufacturing. The embedded serial number is displayed upon the LCD display when requested by the user.

Additionally, the CPU 2003 comprises a program ROM 2064 which contains the software which operates the ASIC and drives the LCD drivers to display data on the LCD display. This software is described in greater detail below.

The CPU 2003 also comprises a processor 2066 which decodes opcodes from the program ROM 2064, conducts arithmetic operations, and generates control signals for use in all other portions of the ASIC. The CPU 2003 also includes a register section 2072. The register section 2072, as will be explained in greater detail below, comprises two groups of identical registers. Only one group of registers is active or selected by the processor 2066 at a given time. The particular register group chosen corresponds to one of two possible modes: mode-0 or mode-1. The particular group of registers is selected by having the processor set a mode-0 flag 2068 or a mode-1 flag 2070. In other words, the registers corresponding to mode-0 are chosen by setting the mode-0 flag 2068 while the registers corresponding to mode-1 are selected by setting the mode-1 flag 2070. The processor operates in mode-0 when executing the main program. On the other hand, the processor operates in mode-1 when executing a subroutine or interrupt handler. The function of the registers is explained in greater detail below.

The regulator section 2007 provides assured, steady voltages to the various components on the ASIC. The regulator section receives a DC voltage VDD and a grounding voltage GND. A separate unregulated voltage Vpp is used to program the EEPROM of the ASIC during manufacturing. The regulator section 2007 also outputs a regulated voltage OSCREG for use by the oscillator, core voltages for use by digital components throughout the ASIC, and a set of five LCD voltages for use by the LCD controller 2002. OSCREG is a 1.27 volts which does not change and can be relied on to provide a steady voltage to the oscillator.

The I/O interface 2004 comprises an I/O register 2048. The I/O register 2048 accepts signals from two buttons on the TAG. The signals produced when the button are pushed are SW1 and SW2. The data input by the I/O register is converted into parallel digital data for transport over the common data bus 2051. The I/O interface 2004 also comprises a power I/O section 2050. The power I/O section is coupled to the UART 144 (FIG. 20b) by the COM1 and COM2 lines. One purpose of the power I/O section is to accept data from the UART. The power I/O section is also used for transmitting data over COM1 and COM2 to the UART and, eventually, to the TAC. In this regard, the commcounter drives JFETs 159 (FIGS. 19a, 19b and 20b) within the power I/O section to modulate the signal sent over the COM1 and COM2 lines to the UART. Both COM1 and COM2 are connected to the 50 kHz carrier signal. The phase of the signals on COM1 and COM2 are 180 degrees out of phase. They are 180 degrees out of phase because they are taken obtained at opposing ends of the transformer. The power I/O section also receives the 50 kHz carrier signal (from COM1 and COM2) from the UART and transmits this signal to the monocounter over line CARRIER. The power I/O section also doubles the frequency of the carrier signal to drive the commcounter over line CARRIER×2.

Figure 21:
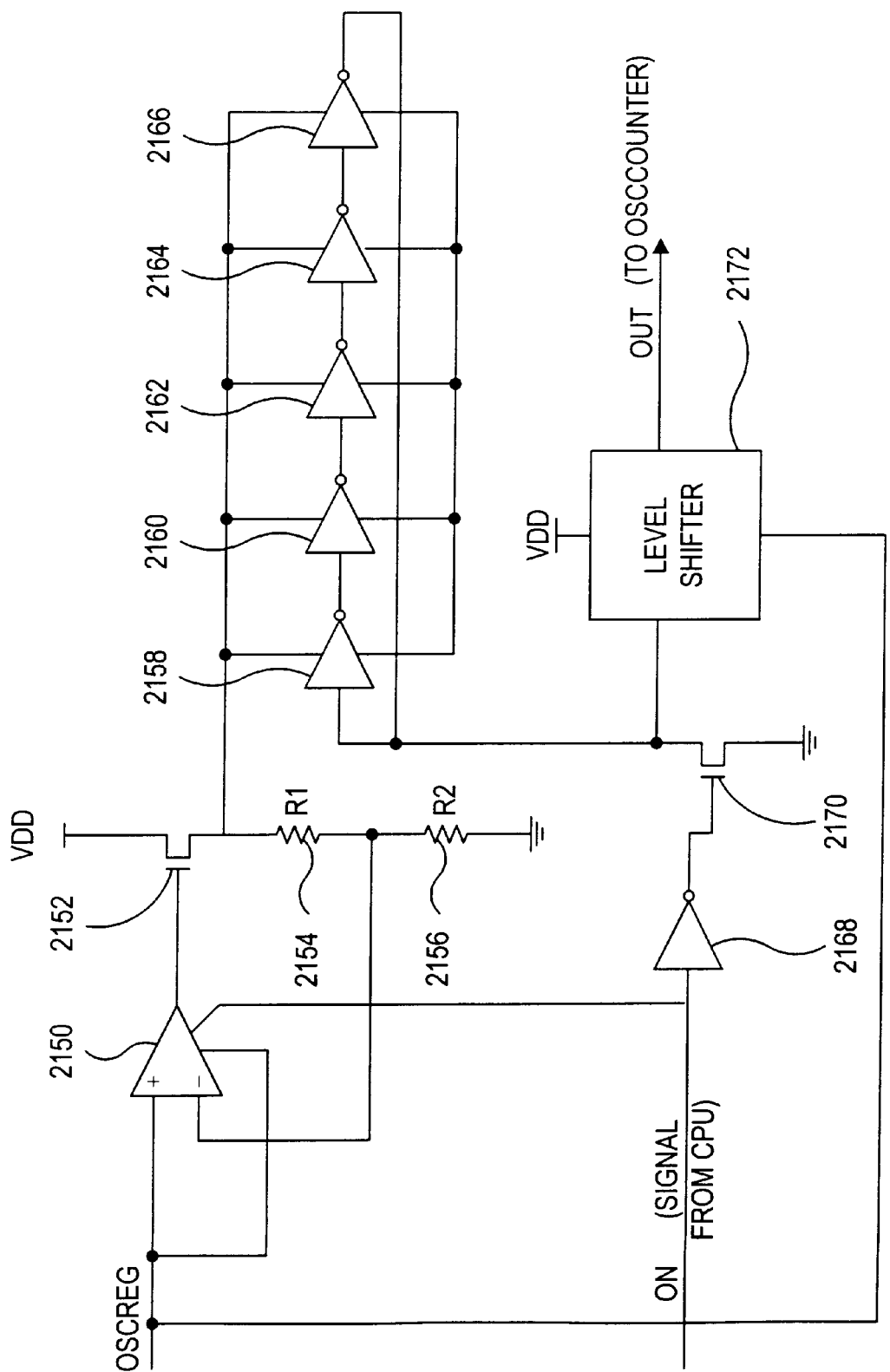
FIG. 21 is a circuit diagram of the oscillator generator of the ASIC according to principles of the present invention.

Referring now to FIG. 21, the LCD display controller is illustrated. Inverters 2158, 2160, 2162, 2164, and 2166 are connected serially. The output of the inverter 2166 is fed back and coupled to the input of the inverter 2158. This arrangement, as is known as a ring oscillator, creates a waveform passing through the serially connected inverters which oscillates at a frequency that is directly related to the total time delay present across the inverters 2158, 2160, 2162, 2164, and 2166. The frequency of the waveform through the inverters is adjusted by changing the individual delays of the inverters 2158, 2160, 2162, 2164, and 2166. The number of inverters must be an odd number. Although the delay can be of any value, the delay caused by these inverters is preferably selected so that the frequency is in the range of 22 to 49 MHz. In the case of the present invention, the frequency is 33 Mhz. Other frequency waveforms are obtained by using this waveform The delay is adjusted by choosing a component or component design having the desired delay.

The input to the first inverter 2158 will be a certain value, for example a 0. As this value traverses the inverters, a one is fed back to inverter 2158. The process repeats as the one is fed through the inverters, sending a logic zero back to the input of inverter 2158. Thus, the input to inverter 2158 oscillates at a frequency related to the total delay across all the inverters 2158, 2160, 2162, 2164, and 2166.

An operational amplifier 2150 is connected to the gate of a transistor 2152. The operational amplifier 2150 provides voltage regulation for the circuit. A resistor 2154 and a resistor 2156 provide feedback to the negative terminal of the operational amplifier 2150. The transistor 2152 drives the power supply leads of inverters 2158, 2160, 2162, 2164, and 2166 with a constant voltage. The positive terminal of the operational amplifier 2150 is driven by the voltage OSCREG which, as discussed previously, originates in the regulator section 2007 of the ASIC. In one illustrative embodiment, OSCREG was selected to be 1.24 volts, and resistors 2154 and 2156 were selected to have values of 12.5 K Ohms. These values produced 2.48 volts on the power leads of the inverters 2158, 2160, 2162, 2164, and 2166.

The input to inverter 2158 is coupled to a level shifter 2172. The purpose of the level shifter 2172 is to shift the magnitude of the oscillating waveform present at the input of the inverter 2158 to VDD. That is, the voltage waveform at the output of the level shifter 2172 will have a level that varies between 0 volts and VDD. The output of the level shifter is coupled to the osccounter 2021 in the counter section 2005 of the ASIC.

An inverter 2168 provides for control of the oscillator and has its output coupled to the gate of the transistor 2170. The input to the inverter is a signal ON ("signal from CPU") that is high upon power-up of the system and stays high thereafter. Therefore, when ON is high, it turns on the operational amplifier 2150, and is inverted by the inverter 2168 to turn off transistor 2170 which permits the frequency signal to be level shifted. Conversely, a low logic level of the signal ON turns off the operational amplifier 2150 and is inverted to turn on the transistor 2170, which prevents the oscillator waveform from being level shifted.

This configuration uses slightly more power than a crystal oscillator but is much smaller. Also, it saves cost because the configuration can be placed in a small area of the ASIC as opposed to using a costly external oscillator.

Figure 22A:
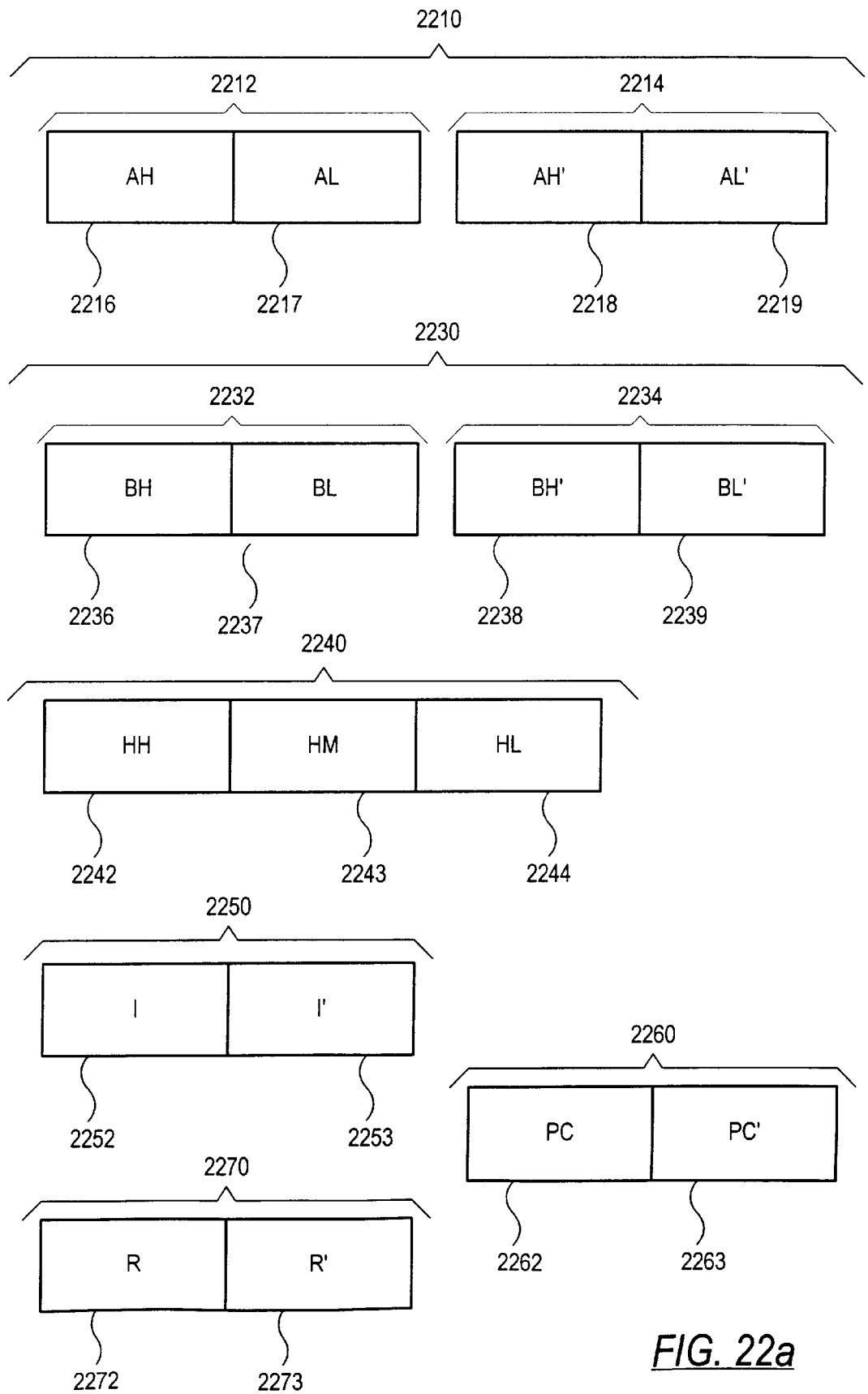
FIG. 22a is a block diagram of the register section of the ASIC according to principles of the present invention.

Referring now to FIG. 22a, the register section 2072 of the CPU 2003 will be described. As mentioned previously, the CPU 2003 operates in either mode-0 or mode-1. Also, as described above, the two modes represent whether the CPU is executing instructions from a main program section or from any of a plurality of subroutines or interrupt handlers. Mode-0 represents the primary mode and is used when the CPU is executing micro-instructions from the main program section. Mode-1 is the secondary mode and is entered when the CPU is executing a subroutine or an interrupt handler. The CPU sets the flags (2068 and 2070) representing modes-0 and mode-1. The modes communicate through an H register 2240. That is, the H register 2240 is accessible by the program in either mode. In particular, data needed by one of the modes is stored in the H register 2240. Since the other mode also has access to the H register, this data is useable by the other mode. Since two matching sets of registers are present, the execution of subroutines does not require the use of a stack.

The register section 2072 comprises a plurality of registers organized into register sets. Each of these register sets includes one or more registers of the first group, which are selected in mode-1 and one or more registers of the second group which are selected in mode-2 and are identified by like designations to the corresponding registers of the first group, with the suffix' (e.g., Alt', AL', BH', BL' etc.). An accumulator register set 2210 comprises an A register pair 2212 and an A' register pair 2214. The A register pair 2212 comprises 4-bit registers AH 2216 and AL 2217 while the A' register set 2214 comprises 4-bit registers AH' 2218 and AL' 2219.

A general purpose register set 2230 comprises a B register pair 2232 and a B' register pair 2234. The B register pair 2232 comprises 4-bit registers BH 2236 and BL 2237 while the B' register set 2234 comprises 4-bit registers BH' 2238 and BL' 2239. A counting register set 2250 comprises a 4-bit I register 2252 and a 4-bit I' register 2253. A RAM address register set 2270 comprises a 4-bit R register 2272 and a 4-bit R' register 2273. A program counter register set 2260 comprises a 4-bit PC register 2262 and a 4-bit PC' register 2263.

The A register pair 2212 performs operations when the CPU has been set to mode-0 while A' register pair 2214 performs operations in mode-1. The individual accumulator registers AH, AL, AH', and AL' store numerical data during most of the operations performed by the ALU. The results of arithmetic operations are placed into these registers after most ALU operations.

The BH register 2236 and BL register 2237 are two 4-bit general purpose registers. These registers are used by the CPU to store values of data and are used when the processor is operating in mode-0. The BH' register 2238 and BL' register 2239 are also 4-bit registers but are used when the processor is operating in mode-1. Both the BH and BL registers as well as the BH' and BL' registers are used to store data that is frequently used during program execution, thereby speeding program execution since the CPU does not have to perform a memory READ operation. These registers are used to store partial results of arithmetic operations if the accumulator is being used for a different arithmetic operation.

The R register 2272 and R' register 2273 are RAM address registers. Since the I/O is memory mapped, the R register 2272 and the R' register 2273 are also memory mapped. These registers are used by the CPU to hold the address of data which the CPU is reading or writing to memory.

The I register 2252 and I' register 2253 are counting registers. These registers are decremented by the CPU until their count reaches zero as needed during execution of the main program or subroutines.

The H register 2240 is used for communications between modes. The H-register is a 12 bit register comprising a 4-bit HH register 2242, a 4-bit HM register 2243, and a 4-bit HL register 2244. The H register 2242 is addressable by either mode. For example, while in mode-0, the primary mode, the program which is executing may want to pass data to a subroutine. To accomplish this task, data is sent to the H register 2240. Then, the CPU switches the mode to mode-1 upon the call to the subroutine. During execution, the subroutine has direct access to the H register 2240. The reverse of the above situation can also occur. That is, the subroutine can pass data into the H-register 2240 where the main program can have direct access to that data.

The PC register 2262 and PC' register 2263 contain the value of the program counter. Since the value of the program counter in either mode is always available, no storage of addresses is needed. The program counter always contains the address in memory of the next instruction (or portion of instruction) that will be fetched from memory. When the CPU is reset, the program counter is set to the first instruction to be executed. The program counter automatically increments itself after each use and in this way the stored program in memory is sequentially executed unless an instruction alters the sequence.

Figure 22B:
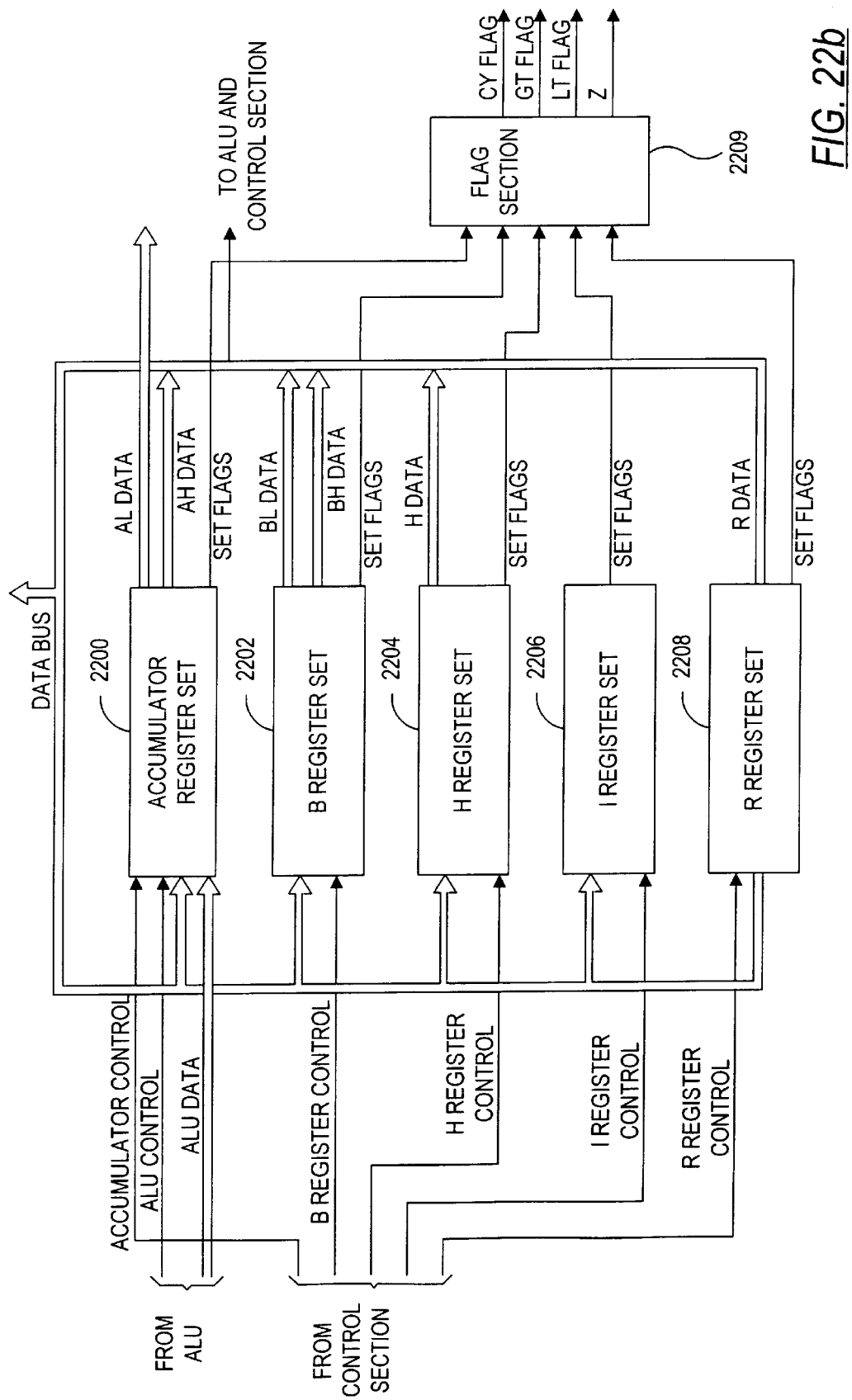
FIG. 22b is another block diagram of the register section of the CPU showing control and data connections according to principles of the present invention.

Referring now to FIG. 22b, the control section of the CPU provides control signals to the accumulator register set 2010, the B register set 2230, the H register 2240, the I register set 2250, and the R register set 2270. The control signals comprise accumulator control signals, B register control signals, H register control signals, I register control signals, and R register control signals. As is well known by those skilled in the art, each of these groups of signals comprise individual control signals which load, reset, rotate data, invert data, and shift data within the registers of the particular register section. Also in response to these control signals, data is placed from these registers onto the data bus. The data bus is connected to other components of the ASIC. The control signals also cause the registers to set flags. These flags indicate whether a carry has occurred (CY), whether the result from the operation is zero (Z) or greater (GT) or less than zero (LT). These flags are stored in a flag section 2209 of scratchpad RAM.

Figure 22C:
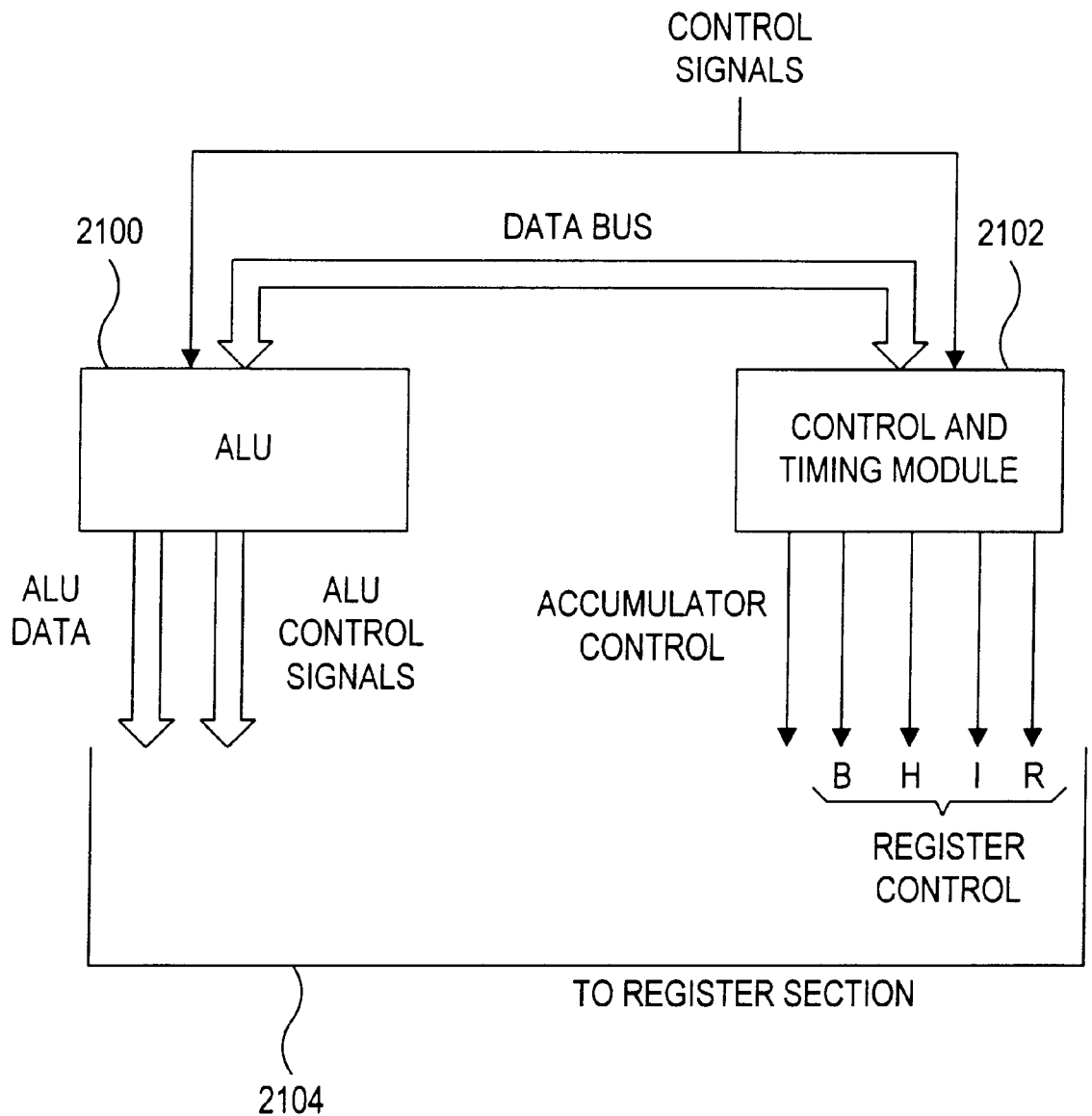
FIG. 22c is a block diagram of a register control portion of the processor of the ASIC according to principles of the present invention.

Referring now to FIG. 22c, the processor comprises an arithmetic logic unit (ALU) 2100 and control and timing module 2102. The function of the ALU 2100 is to perform the arithmetic and logical operations required by the processor. The design of ALUs is well-known to those skilled in the art. The ALU uses the accumulator (A) registers in the register section to store values used in computations. The function of the timing and control module 2102 is to fetch and decode instructions from the program memory and then to generate the necessary control signals required by the ALU and the register section for executing these instructions. As described, the processor can be manufactured economically and performs reliably based on its unique design.

The ALU 2100 is capable of performing a wide variety of arithmetic and logical operations. Decoded operands cause the ALU 2100 to perform operations on data input over the data bus. The functions that the ALU performs are controlled by the control signal input.

Figure 22D:
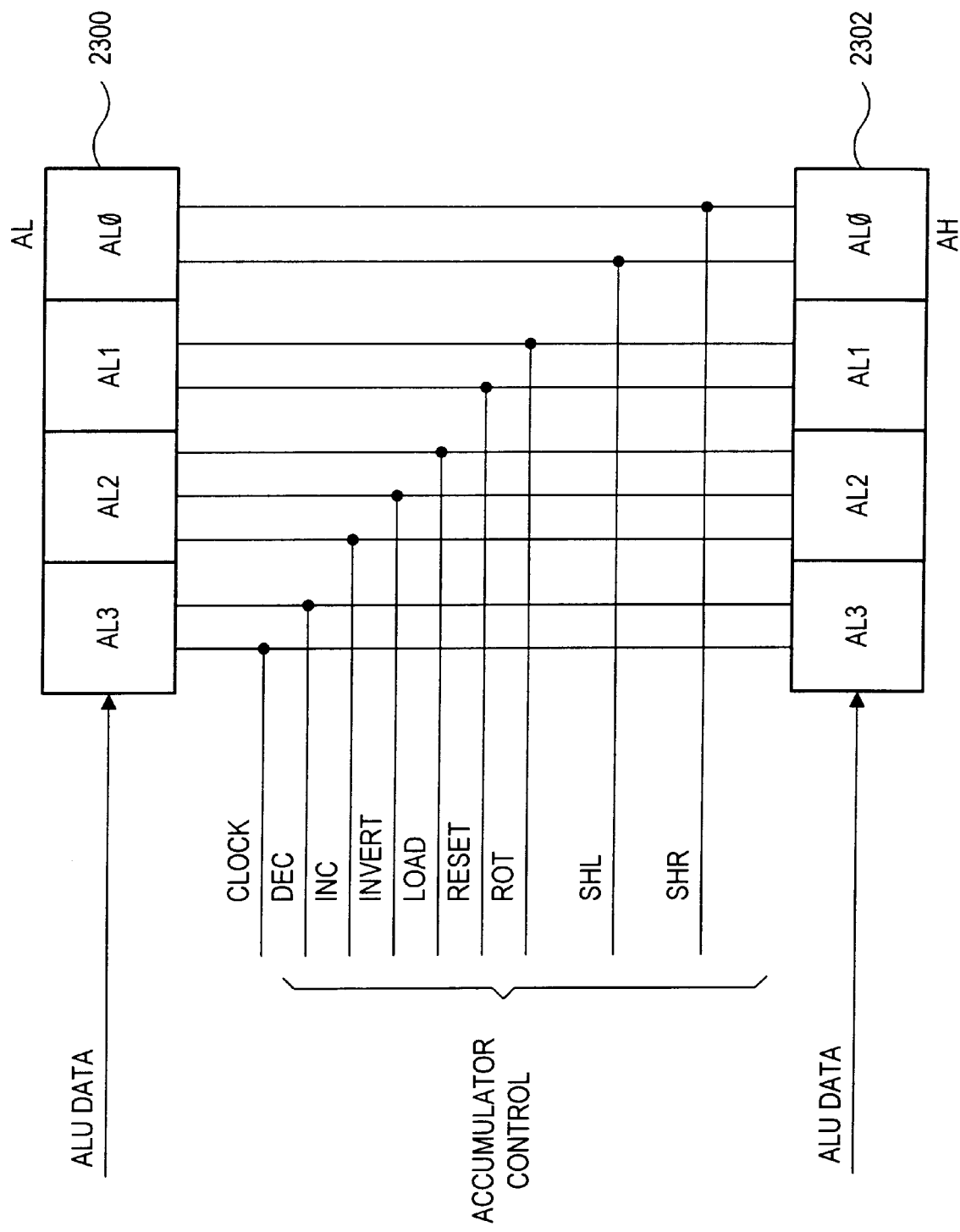
FIG. 22d is a block diagram of one pair of accumulator registers according to principles of the present invention.

Referring now to FIG. 22d, an accumulator register pair comprises a 4-bit AL register 2300 and a 4-bit AH register 2302. Each of these registers receive the accumulator control signals from the ALU which include signals to decrement the contents of the register (DEC), increment the contents of the register (INC), invert the contents of the register (INV), load data into the register (LOAD), reset the register (RESET), rotate the contents of the registers (ROT), shift the contents of the registers to the left (SHL), and shift the contents of the registers to the right (SHR). This list does not represent an exhaustive list of possible commands. To the contrary, other commands can be added which manipulate the contents of the registers as are known to those skilled in the art.

Figure 22E:
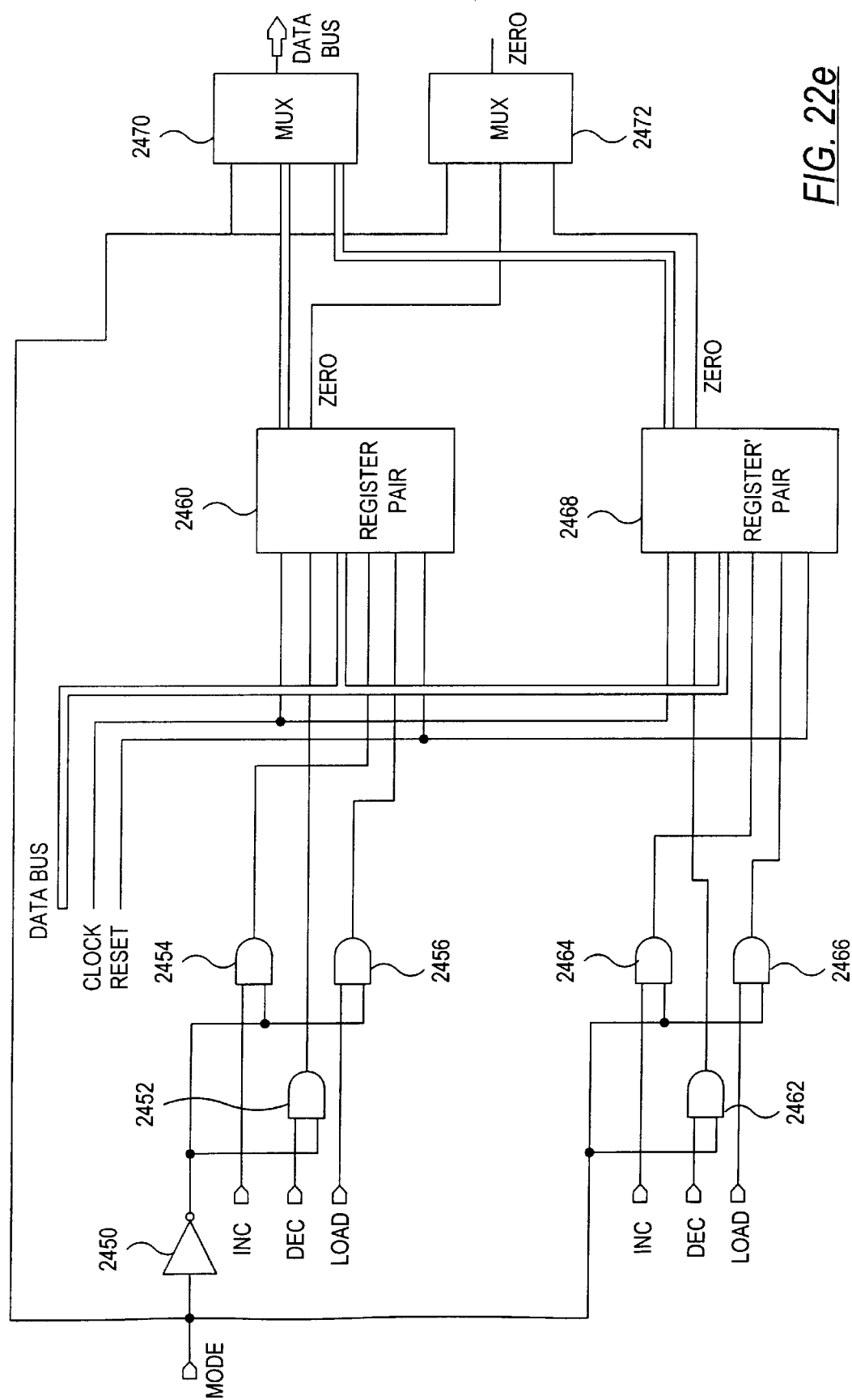
FIG. 22e is a block diagram of the register selection logic for a register pair according to principles of the present invention.

Referring now to FIG. 22e, the selection circuitry for a register set is illustrated. FIG. 22e illustrates the selection logic for the R register set 2270 which is used to select a register pair 2460 or a register' pair 2468. However, as will be described below, this circuitry can be easily modified for any of the register pairs. A signal MODE from the CPU selects a register pair (2272 or 2273). Specifically, if the processor is operating in mode-0, MODE is set by the CPU to be a logical zero, and this logical zero is inverted by an inverter 2450, which becomes a logic one at the output of the inverter. The logic one from the output of the inverter 2450 is applied to AND gates 2452, 2454, and 2456. The other inputs to these AND gates are signals to decrement the contents of the register (DEC), increment the contents of the register (INC) and load the register (LOAD). The DEC, INC, and LOAD signals originate from the control section of the CPU. The output signals of the AND gates 2452, 2454, and 2456 are applied to the register pair 2260 which causes the register to perform the specified operations.

If the processor is operating in mode-1, the MODE signal is set by the CPU to be a logical 1 and this signal is applied to AND gates 2462, 2464, and 2466, respectively. These AND gates also have as inputs the DEC, INC, and LOAD signals. Thus, the AND gates pass the DEC, INC, and LOAD signals and are applied to a register' pair 2468 when the signal MODE is a one. The register pair 2460 and register' pair 2468 also receive a clocking signal CLK (from the oscillator) and a reset signal RESET (from the control section of the CPU).

The data from either register pair 2460 or the register' pair 2468 is input to a multiplexer 2470 where the MODE signal selects data to be output to the DATA BUS. Also, the zero bits of both register pairs is input to a MUX 2472 where the zero bit is chosen by the MODE signal for output to other parts of the system.

The selection circuitry for the other registers is similar to the selection circuitry of the R register and can be varied by omitting parts of the control logic as needed. For example, if the register has no need to increment values, the circuitry for incrementing values (i.e., gates 2464 and 2454) would simply be omitted from FIG. 22e. Also, the register pair and register' pair may be a single register (e.g., the I register set).

Figures 23A, 23B, 23C, 23D, 23E:
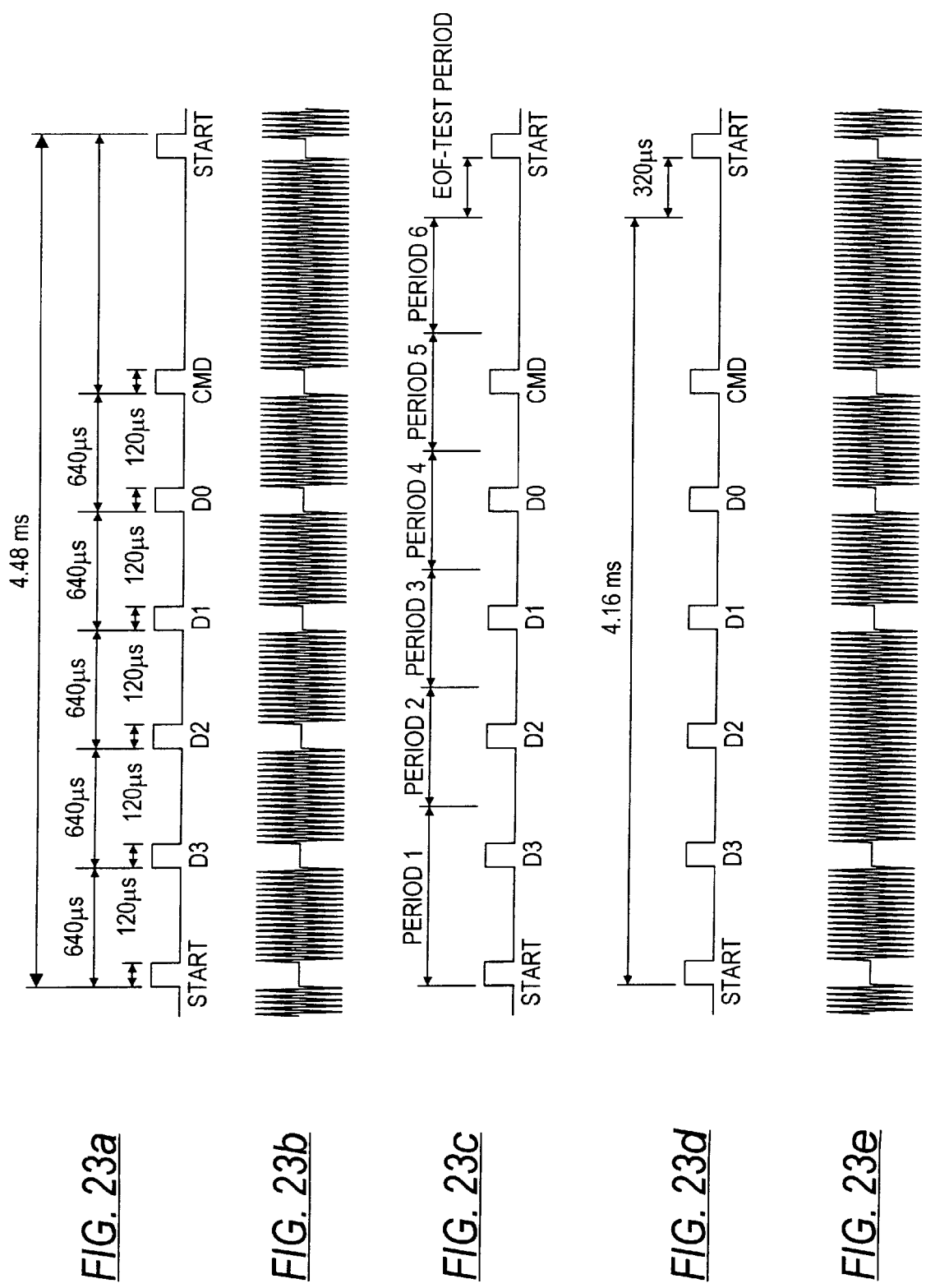
FIGS. 23a–23e are timing diagrams for TAC to TAG communications according to principles of the present invention.

The TAG-UART timing is illustrated in FIGS. 23a–d where a frame, e.g., the amount of time defined between the beginning of one START bit and the beginning of the next START bit, is divided into 6 periods (see e.g. FIG. 23c). These signals are associated with communications from the area controller to the TAG and from the TAG to the area controller. However, the following description is in terms of signals from the TAG to the area controller but it applies to signals from the area controller to the TAG as well. Preferably, this timing scheme is generated by the system controller 28. As shown in FIG. 23c, these periods are PERIOD1, PERIOD2, PERIOD3, PERIOD4, PERIOD5, and PERIOD6. FIG. 23a is a timing diagram which illustrates the six periods of time and shows when the monocounter 2024 receives a startbit START, data bits D3–D0, and a command bit CMD. These bits are received from the UART. The startbit START indicates the beginning of a frame, the bits D3–D0 are bits which comprise a command or data, and the command bit CMD is set when the D3–D0 bits represent a command and is set to a 0 when these bits represent data. In FIG. 23a, the bits received are all logical ones.

FIG. 23b represents the modulated carrier frequency as received by the TAG in the I/O interface 2004. The startbit START is used to initiate the program counter 2026 to count periods of time. START is always present and used for synchronization. The absence of a carrier signal indicates a logic one, while the absence of an interrupt from the monocounter 2024 indicates a logic zero. In the context of area controller to TAG communications, FIG. 23b illustrates a signal, including portions modulated at 50 kHz, transmitted from an area controller along conductors inductively coupled to tags. As can be seen from these signals, a digital "0" is indicated by the presence of a 50 kHz signal in FIG. 23b while a digital "1" is indicated by the absence of a 50 kHz signal. In this particular embodiment, FIG. 23b illustrates the transmission of a four-bit word consisting of four "1"s (bits D3–D0). Alternatively, FIG. 23e indicates the word 1011.

FIG. 23c illustrates the six time periods plus the EOF-test period. FIG. 23d illustrates an action process sequence where the period is not divided in six periods since action commands require one frame of time. During this time, the TAG will not accept data. The EOF period is not ignored and is used by the system to determine the accuracy of the internal oscillator.

The programs stored in the program ROM 2064 comprise a series of commands which are executed by the processor. The commands perform specific operations by setting the mode, setting and resetting flags, adjusting the program counter, and utilizing registers. These commands, in accordance with one embodiment of the invention, are summarized in TABLE 1 and described in detail below.

Referring to TABLE 1a, the commands include control commands which control specific attributes of the system. A RESET (RES) command sets the progcounter to 0 and the mode-0 flag to 1 (selecting mode 0). The NOP command does nothing but increment the appropriate program counter when the command is executed. Other commands include commands which wait for interrupt (WAIT), stop the oscillator (STOP), restart the watchdog timer (WATCH), enable and disable interrupts (EI and DI), reset various flags (RSF), enable and disable the display drivers (EDP and DDP), enable and disable the oscillator adjustment (EOSC and DOSC), and set the display speed high and low (DSPDH and DSPDL).

Referring to TABLE 1b, a group of JUMP commands (JZ, JNZ, JC, JNC, JTL, and JGT) jump to particular addresses upon obtaining the results of a particular test. For example, a particular JUMP command may test for a particular condition, then increment the program counter by a particular number if the condition is true.

The JUMP commands test flags. For example, one JUMP command tests the Z flag to see if that flag has been set (JZ). Another JUMP command jumps to a particular address if the Z flag has not been set (JNZ). The command tests the Z flag to see if the flag is not set. Other JUMP commands test the CY, GT, and LT flags.

Referring to TABLES 1c and 1d, the commands also include LOAD commands (LDAL and LDAH). For example, LOAD commands loads the AL or AH register with a particular 4-bit value. The PC is then incremented by 1. For example, a particular load commands loads the value 4 into the AL register (HEX opcode 24).

Referring to TABLES 1e and 1f, AND, OR, or XOR operations can be performed on the contents of other registers. For example, the AND AH command performs the AND operation between the contents of the AL register and the AH register and stores the results in the AL register. Similarly, the OR AH command performs the OR operation between the contents of the AL register and the AH register and stores the results in the AL register. The same operations can be performed with the contents of the B register and the H register.

Referring to TABLE 1f, compare (CMP) operations subtract the contents of a specified register or memory location. If the result is zero, the Z flag is set. If AL is greater than the other location, flag GT is set; if AL is less than the other location, the LT flag is set. The program counter is incremented by one after a CMP operation.

Referring to TABLE 1g, an ADC operation adds the contents of AL to the contents of another register and adds the carry flag CY. The result is stored in the AL register. If the result is zero, the Z flag is set. If there is a carry, then the carry bit is set. The program counter is incremented by one after the result of any ADC operation.

Referring to TABLE 1h, INC and DEC commands increment and decrement particular registers. The program counter is incremented by one after any of these operations. Referring to TABLEs 1i–1m, MOVE commands move the contents of one register to another register. The program counter is incremented by one after each MOVE command. Referring to TABLE 1m, SHIFT commands shift the A register right or left. In the case of a shift left, the bits in AH and AL are all shifted one place to the left and bit 7 is moved into the carry flag CY. In the case of a SHFTR (SRA) operation, the bits in the A register are all shifted to the right and bit 0 sets the carry flag CY. In the case of the ROTLA command, the A register is shifted left and b7 sets the CY carry flag.

The above commands are used to construct programs which reset and initialize the ASIC, synchronize clock signals on the ASIC, and allow the ASIC to interface with a UART.

Figure 24A:
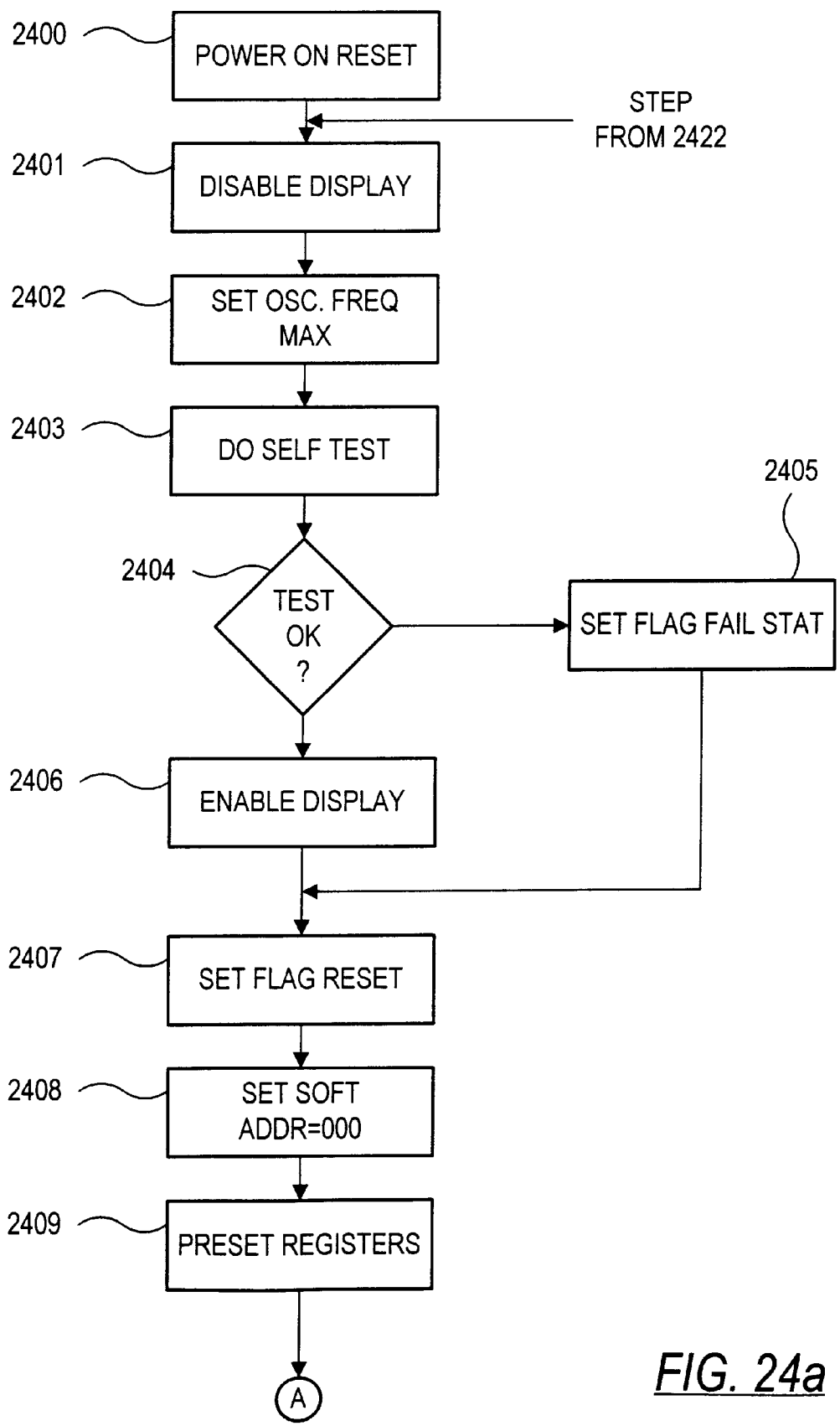
FIGS. 24a–24d illustrate a flowchart of the ASIC firmware according to principles of the present invention.

Referring now to FIG. 24a, a reset software process is executed after a power-on condition or after the TAG receives a reset action command communication. All RAM setup buffers and control registers are initialized to a known state and the self test is performed.

At step 2400 hard reset for the processor and logic circuits occurs. The internal reset detector in the power I/O section activates to reset the ASIC when the supply exceeds a threshold value. Next, at step 2401, the LCD drivers are disabled to indicate the start of the self test. The display control signal is connected to a probe test pad (used during die testing). Next, at step 2402, the osccounter is set for the maximum processor clock design limit. This tests logic delays and decreases self test time. Then, at step 2403 the self test is executed. The self test includes a test of the contents of the display RAM and scratchpad RAM read/write verification. Also, the ROM code is verified using a 16-bit checksum. Failures are accumulated over the entire test. In other words, many self tests are performed and the CPU tracks the results.

Next, at step 2404, the accumulated self test failures are checked. If no self test failures are discovered, the LCD display drivers are enabled at step 2406 and the probe test pad signal will change logic states. If self test failures were detected, then the status register flag, FAIL_STAT, is set at step 2405, which can be downloaded via TAG-to-TAC communication. In this case, the display drivers are not enabled.

At step 2407, the status register flag RESET_STAT is set to indicate that the TAG is not yet programmed. The register can be downloaded via TAG-to-TAC communication. At step 2408, the TAG's soft address is cleared to indicate that the product code has not been assigned and that the TAG may not be programmed. Then, at step 2409, the processor control registers and RAM buffers are initialized for software routine and communication direction.

Figure 24B:
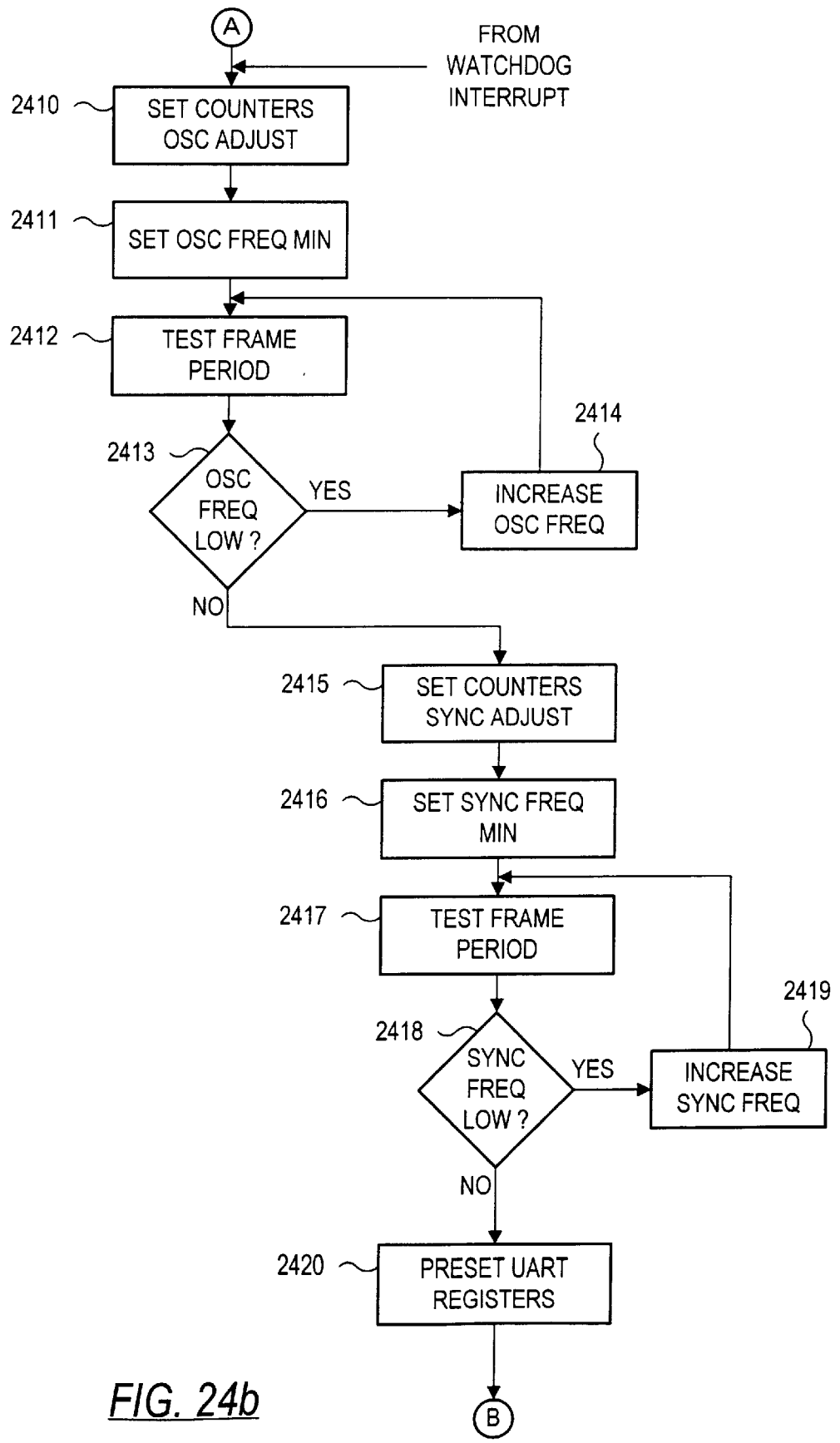

Turning to FIG. 24b, the Oscillator/Synchronization software process is executed after the reset process, the UART Process Unlock or out-of-range, or an interrupt (INT4) from the watchdog timer. The osccounter is adjusted, first, to the nominal design frequency range. The output of this counter provides the processor system clocks and the input to the synccounter. The synccounter is then adjusted to match the input carrier frequency of 50 kHz. The carrier frame period (4.48 ms) between start pulses is used for the test measurement reference for each counter setting.

At step 2410, the synccounter output is connected to the input of the progcounter. The counter values are preset to divide down the osccounter frequency. The osccounter is properly adjusted when the period of the progcounter output (INT2) equals the frame period. The monocounter is set to generate an interrupt (INT0) at the start of each frame period. This provides the test measurement reference to the processor. At step 2411, the oscillator counter value is set for the minimum output frequency. This is the initial adjustment starting reference value.

Next, at step 2412, the progcounter and the monocounter interrupts (INT2 and INT0) are used to test the setting of the osccounter. The test starts after an INT0 interrupt, which corresponds to the beginning of a frame. The test ends after a second INT0 interrupt, end of frame, or after an INT2 interrupt. At step 2413, if the monocounter interrupt (INT0) is detected prior to the progcounter interrupt (INT2), the osccounter frequency is low. Next at step 2414, the oscillator counter value is decreased which increases the frequency and execution continues at step 2412. If the progcounter interrupt (INT2) is detected prior to the monocounter interrupt (INT0), the oscillator adjustment is complete.

At step 2415, the synccounter output is connected to the progcounter input. The progcounter value is preset to divide down the synccounter frequency. The synccounter is properly adjusted when the period of the programmable counter output (INT2) equals the frame period. Next, at step 2416, the synccounter value is set for the minimum output frequency. This is the initial starting reference value. At step 2417, the progcounter and the monocounter interrupts (INT2 and INT0) are used to test the setting of the synccounter. The test starts after the INT0 interrupt, which corresponds to the beginning of a frame period. The test ends after a second INT2 interrupt, end of frame, or after an INT2 interrupt.

At step 2418, the system determines if the sync frequency is low. If the monocounter interrupt (INT0) is detected prior to the progcounter interrupt (INT2), the synchronization frequency is low. The synccounter value is decreased at step 2419 which increases the frequency. Then, execution continues at step 2417. If the programmable counter interrupt (INT2) is detected prior to the monocounter interrupt, the synccounter adjustment is complete.

Next, at step 2420, the progcounter value is preset for the UART PERIOD1 (see FIG. 23c) time frame. The monocounter interrupt (INT0) and display counter interrupt (INT1) are disabled. This inhibits communication for the first pass through the UART.

Figure 24C:
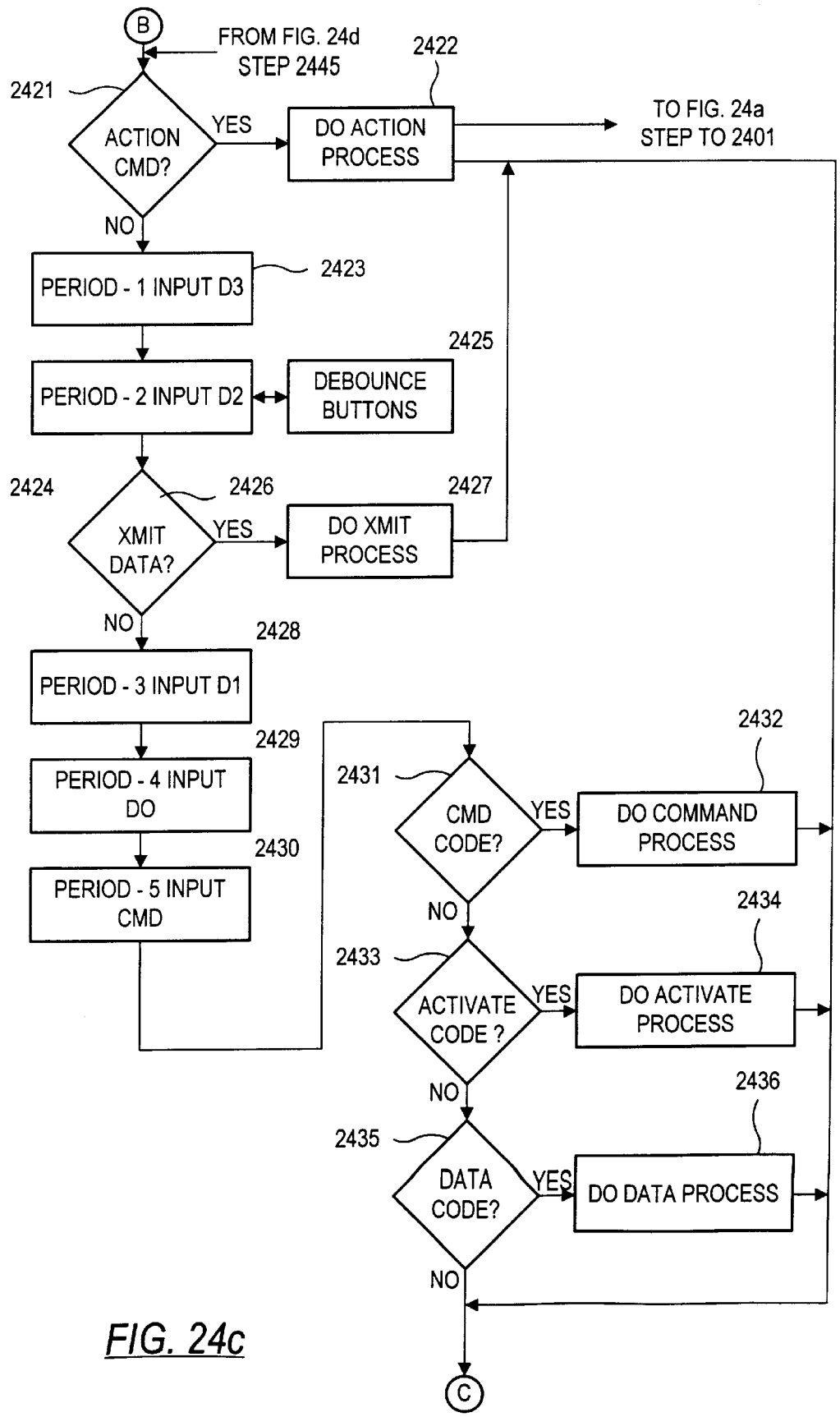
Figure 24D:
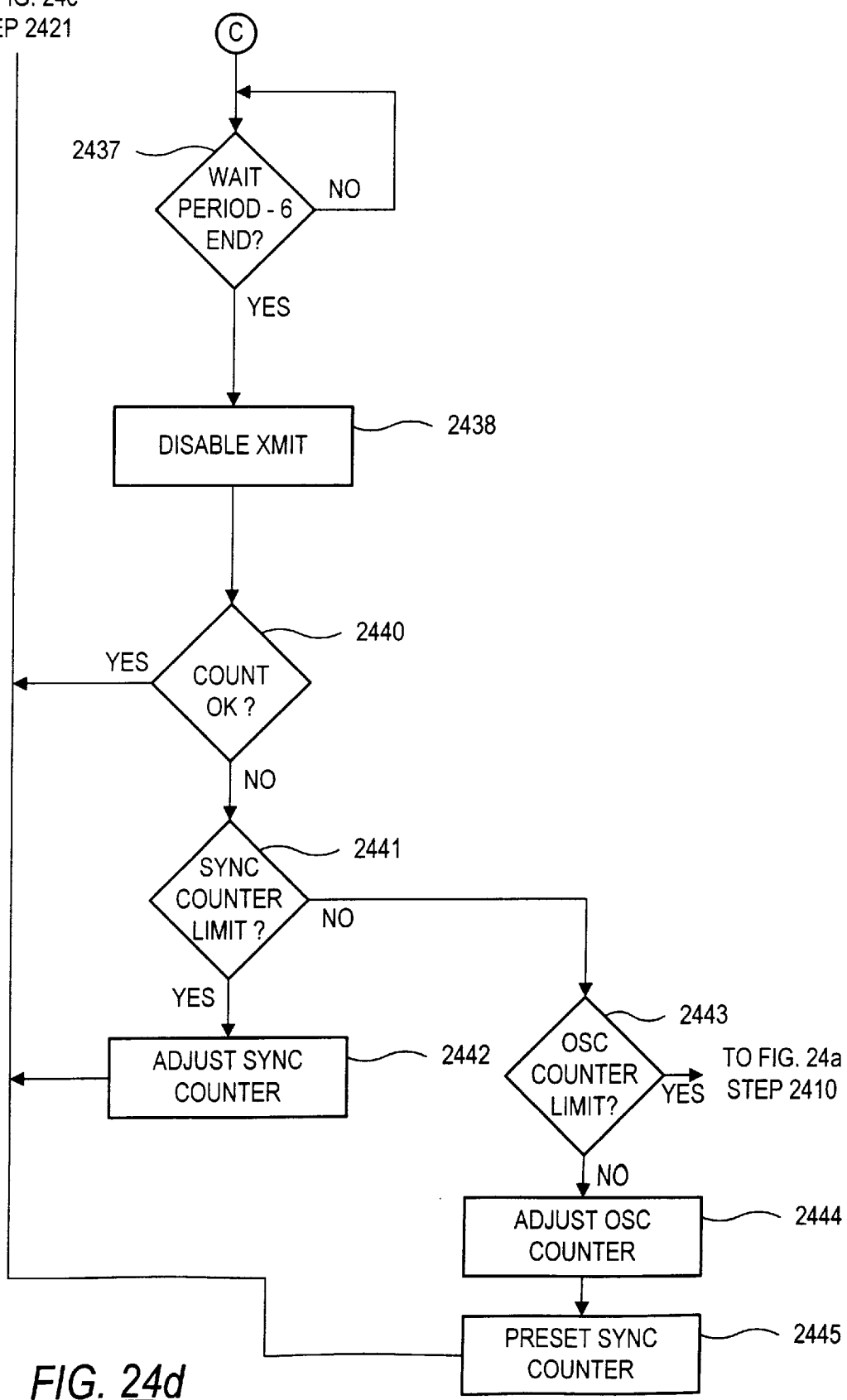

Turning to FIGS. 24c–24d, the UART software process follows the Oscillator/Synchronization process. The process runs in a continuous loop except for when carrier frame synchronization loss (unlock) is detected or when a reset command is received. This is detected by the CPU waiting for synchronization, and initiating an interupt when this does not occur. The UART process provides forward and reverse communication control, command and data processing, display functions, button input and debounce, and continuous carrier frame synchronization control.

At step 2421, the forward communication data buffer is tested for action level commands during PERIOD1 time. If valid, software control vectors to step 2422 where action process routines are executed. The UART communication routines are bypassed. If not valid, software continues at step 2423.

At step 2422, the action level commands initiate TAG operations which require multiple frame processing time. Command processing starts or continues during PERIOD1 of each frame. During PERIOD6, software returns to the main UART program at step 2437 for carrier frame synchronization measurements. The TAG will not accept new commands or data until the action process is complete and the ACK has been transmitted.

At step 2423, the forward communication data buffer is cleared and the monocounter interrupt (INT0) is enabled. If the INT0 interrupt is detected during the remainder of PERIOD1, the D3 bit is set. Next, at step 2424, at the start of PERIOD2, software vectors to the debounce buttons subroutine at step 2425. Software returns, during PERIOD2, prior to the D2 bit detection time.

At step 2425 the logic state of the TAG buttons are read and compared to their previous state. If no state change is detected, the debounce cycle counter is tested for the end of the debounce period. If the debounce period is complete, the button states are loaded into the button buffer. If the button state change is detected, the debounce counter is reset and the new state is used for the next compare cycle. Two buttons are present on the TAG. The left button is a logic zero, the right a logic one. With these buttons, store personnel can enter data into the system. For example, store personnel can enter reorder information via the buttons.

At step 2426, at the start of PERIOD3, reverse communication flags, for ACK and Dump transmission are tested. If valid, software vectors to step 2427. The remainder of the UART transmission routines are bypassed. If not valid, software vectors to step 2428.

At step 2427, the transmit process controls the reverse communication carrier impedance modulation registers. The transmit frequency is decoded and loaded into the Communication counter prior to transmit start. Four-bit words are transmitted at a one bit per frame rate. The commcounter is enabled, modulation on, for a logic one and disabled, modulation off, for a logic zero. Prior to PERIOD6 end, software returns to the main UART program at step 2437 for carrier frame synchronization (FIG. 24d).

At step 2428, if the monocounter interrupt (INT0) is detected, during the remainder of PERIOD3 the forward communication data buffer is set. At step 2429, if the monocounter interrupt INT0 is detected during PERIOD4, the forward communication data buffer D0 bit is set. At step 2430, if the monocounter interrupt INT0 is detected during PERIOD5, the control flag for the command process is set.

At step 2431, at the start of PERIOD6, a command process control flag located in the scratchpad RAM is tested. If valid, software vectors to step 2432. If not valid, software continues at step 2433. At step 2432, the forward communication command codes are processed during the remainder of PERIOD6. Short commands, such as service request, are completed during this time. All other commands that require multiple frames, forward data communication, or reverse communication are decoded. The command decode program vectors the software to the corresponding setup routines for register and control flag programming. The button buffer is processed when the NOP command is decoded. Prior to PERIOD6 end, software returns to the main UART program at step 2437 for carrier frame synchronization.

At step 2433, at the start of PERIOD6, an activate process control flag located in the scratchpad RAM is tested. If valid, software vectors to step 2434. If not valid, software vectors to step 2435. The activate process control flag is set via the command process program.

Next, at step 2434, the forward communication activate data codes are processed during the remainder of PERIOD6. Three types of activate codes are decoded including codes to activate if soft address equals zero, activate if soft address equals data codes, and activate unconditionally. No other commands will be processed until a valid activate. The TAG will deactivate if the activation is invalid. Prior to PERIOD6 end, software returns to step 2437 for carrier frame synchronization.

At step 2435, at the start of PERIOD6, the data process control flag located in the scratchpad RAM is tested. If the flag is valid, software vectors to step 2436. If not valid, software continues at step 2437.

At step 2436, the data process program controls the loading of forward communication data during the remainder of PERIOD6. The data is loaded into RAM locations, one nibble per frames defined by the command codes and the command process routine (at step 2432). Short commands, such as search and latch, are processed, and action data codes verified after data load is complete. Prior to PERIOD6 end, software vectors to the main UART program at step 2437 for carrier frame synchronization.

Turning now to FIG. 24d, at step 2437, all UART communication and command/data process programs are completed, or interrupted, and vectored to this program, prior to the end of PERIOD6. Software waits until PERIOD6 ends and then proceeds to the carrier frame synchronization routines. Synchronization is accomplished during the end-of-frame time period.

At step 2438, the commcounter output is disabled, and reverse communication terminated at the start of the period PERIOD-EOF, prior to frame synchronization. At step 2439, the monocounter (2024) interrupt (INT0) (see FIG. 20a) is enabled for detection of the next frame period strata and termination of the software PERIOD-EOF counter routine. The software counter routine continuously accumulates counts during the remainder of PERIOD-EOF, using the R-register. The counter stops when the INT0 interrupt is detected. The accumulated count provides a reference measurement of the output of the synccounter and the osccounter.

At step 2440, the PERIOD-EOF count is compared to the hard coded count range values. If the PERIOD-EOF count is within the range of values, the output of the synccounter is in tolerance and timing adjustment is not required. Software is then vectored to step 2421 for the action command test. If the count is not within the range of values, the software proceeds for adjustment of the synccounter and the osccounter.

Next, at step 2441, the synccounter value is compared to the hard coded range values. If the register value is within this range of values, the osccounter is operating within tolerance. Software then vectors to step 2442. If the register value is not within the range of values, the osccounter is operating out of tolerance and control proceeds to step 2443.

At step 2442, the synccounter value is incremented or decremented to decrease or increase the counter output frequency, according to the PERIOD-EOF count value. Software is then vectored to step 2421 for the action command test.

At step 2443, the osccounter is restricted for the number of adjustments made in one direction. The adjustment count value is maintained in the osccounter buffer. The buffer value is preset to the center range prior to UART entry and is incremented or decremented for each osccounter adjustment. The buffer value is compared to the hard-coded range values in the program ROM. If the buffer value is within the range values, the software vectors to step 2444. If the buffer value is not within the range values, carrier frame synchronization is lost (unlock). The software then vectors to step 2410 for resynchronization.

At step 2444, the osccounter is incremented or decremented, to decrease or increase the counter output frequency according to the PERIOD-EOF count value. Software then proceeds to step 2445. At step 2445, after the osccounter adjustment, the synccounter is preset to the hard-coded range value limit. If the osccounter output frequency was increased, the synccounter is preset to the high range value limit. If the osccounter output frequency was decreased, the synccounter is preset to the low range value limit. Software is then vectored to step 2421.

Figure 25A:
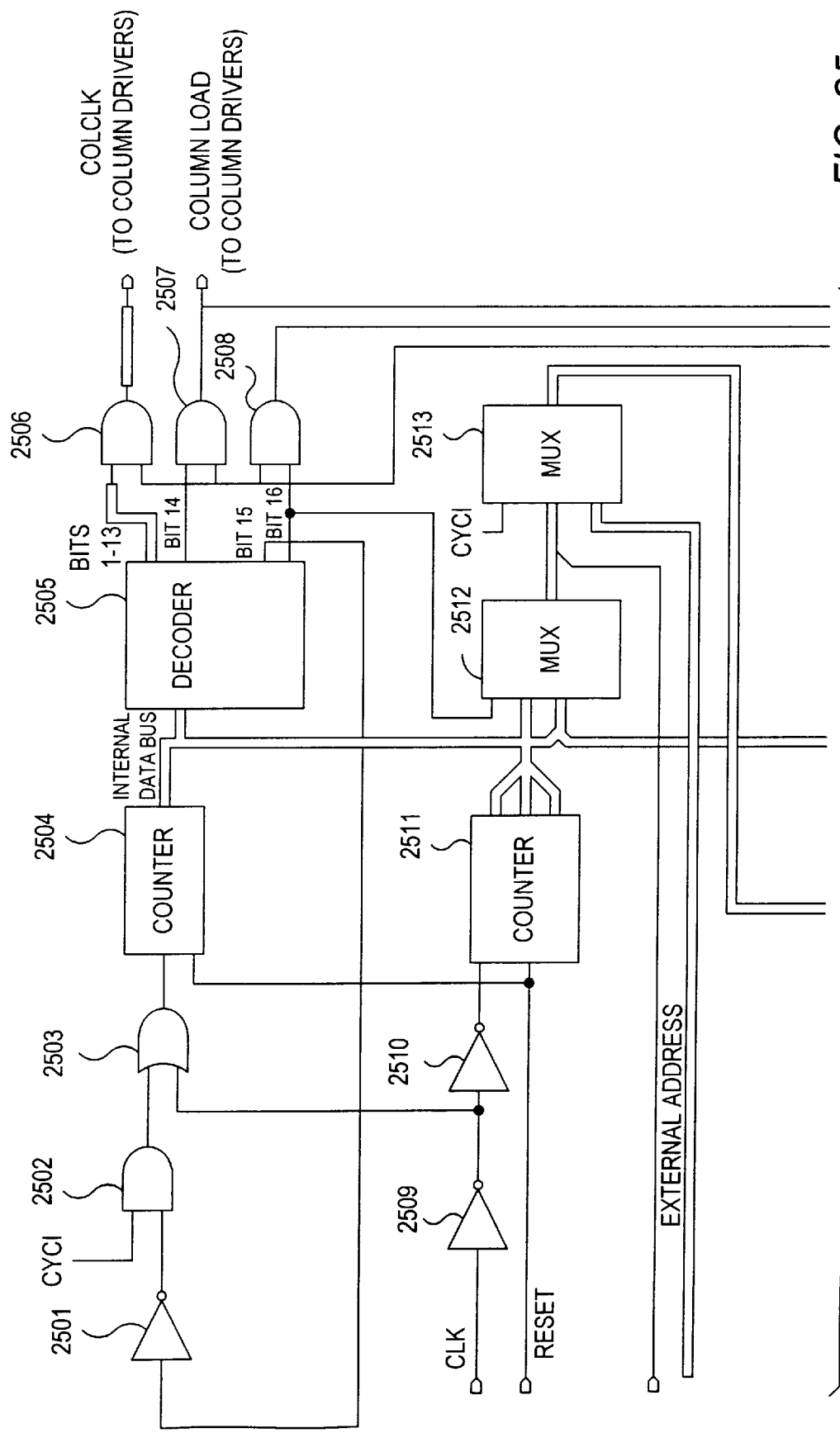
FIGS. 25a–25b are block diagrams of a display controller according to principles of the present invention.
Figure 25B:
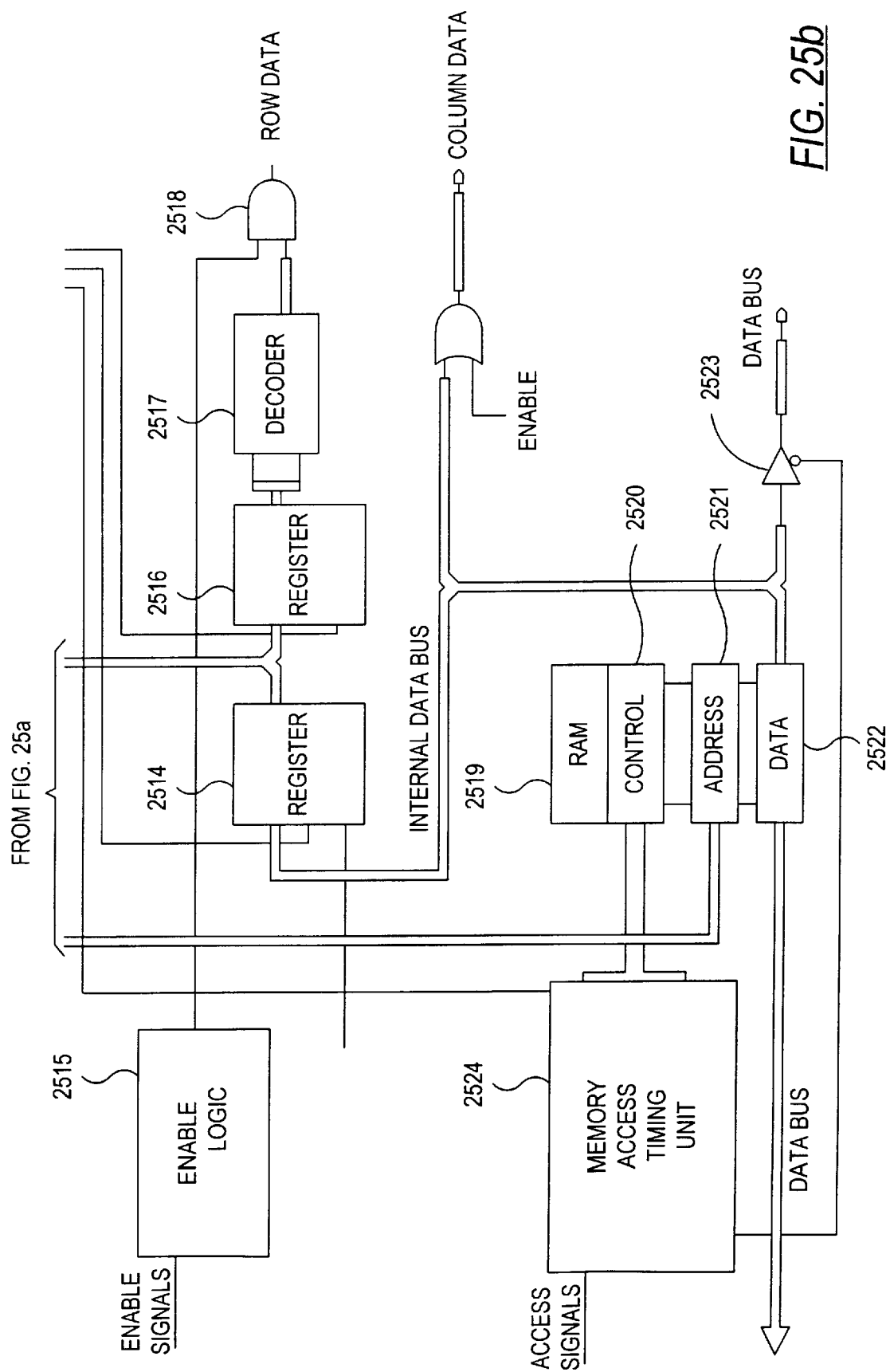

Referring now to FIGS. 25*a* and 25*b*, a RAM 2519 stores both row and column data for display on the LCD display. Enable and disable signals from the CPU 2003 activate a memory access timing unit 2524 which has the purpose of providing correctly timed READ and WRITE signals to the RAM as needed. Data is also brought to the RAM 2519 via the DATABUS.

The LCD display driver operates in two modes. In a first mode, data is loaded from the CPU into a data section 2522 of the RAM 2519. In this case, a CYC1 signal is set by the CPU to a 0. This disables a counter 2504. The CYC1 input also is input to a multiplexer 2513 which selects the outside address data. This address is applied to the RAM 2519, the proper READ or WRITE signals are generated, and data is read from or written to the RAM 2519.

In the second mode, the CPU sets the CYC1 signal to a 1. This enables the counter 2504 which begins to count. This count is output to a 4-to-16 decoder 2505 which enables 1 of 16 output lines. Each of these outputs is fed through AND gates 2506, 2507, and 2508 which have as their other input the CLK. The AND gate 2506 is actually 13 separate AND gates which provides clocking to 13 groups of output latches. Twelve of these output latch groups have four bits while one group has two bits for a total of 50 columns. Column data is fed to these latches one group at a time and clocked by the appropriate COCLK signal (which is 113 signals, one for each group). The data is loaded into the LCD drivers by the COLUMN LOAD signal. Thus, the RAM 2519 sends data in one group of 50 data bits to the column drivers simultaneously rather than in multiple groups of four bits. To an observer, the operation would appear to be that of a dual-port RAM.

Row data is also output. The MUX 2512 selects between row and column data and is enabled by bit 16 at the output of the 4-to-16 decoder 2505. This selects the row address from a counter 2511. This is applied to the RAM 2519. Row data is output which drives the row driver.

The data drives row data which drives the LCD 156 with a series of voltages. As is well known in the art, a DC voltage should not be applied to the segments of the LCD; all voltages, row and column, applied should average to zero volts. Referring now to FIG. 25*d*, the voltages applied to the rows vary between V4 and V0, with the middle voltage being V2. At time t1, the row voltage is driven to 5 volts while the column voltage is driven to 1.25 volts. At t2, the row goes to 2.5 volts while the column driving voltage stays at 1.25. This depletes the charge across the segment. At time t3, the row voltage goes to 0 volts, while the column voltage is 3.75 volts. This turns off the segment.

Figure 25C:
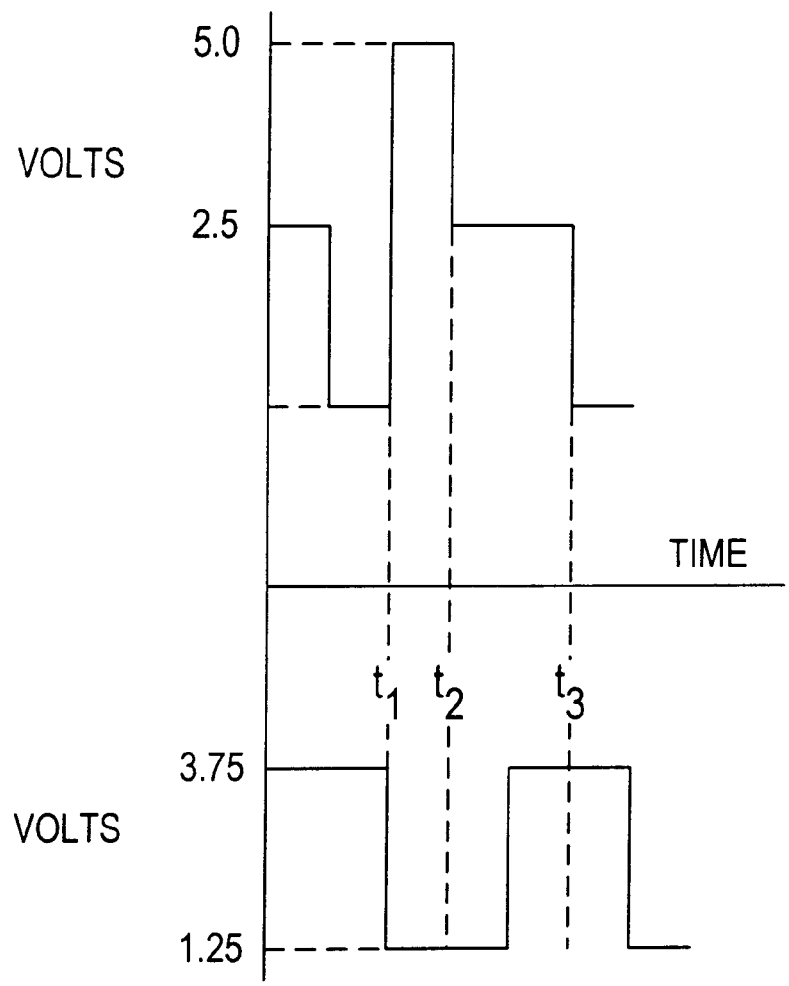
FIG. 25c is a timing diagram showing the relationship between the row and column voltages according to principles of the present invention.
Figure 25D:
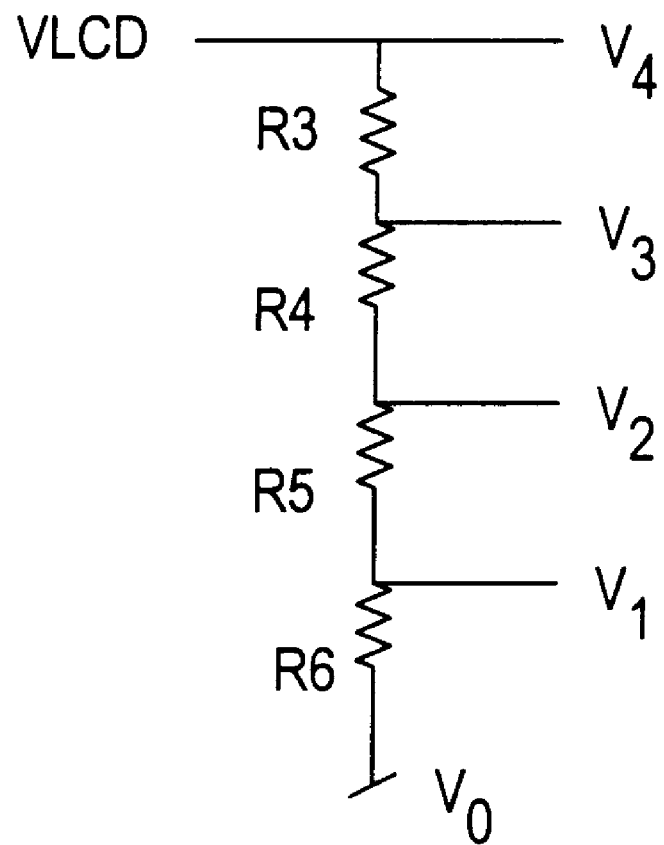
FIG. 25d is a circuit diagram used to produce voltages for driving row and column drivers according to principles of the present invention.

Referring now to FIG. 25*c*, these voltages are created by a resistor configuration where the values are selected as appropriate. Resisters R3, R4, R5, and R6 are serially connected to form a resistor tree. One end of R6 is coupled to a grounding voltage V0 while one end of R3 is coupled to a supply voltage Vlcd. The values of the resistors are chosen so that V0 is 0 volts, V1 is 1.25 volts, V2 is 2.5 volts, V3 is 3.75 volts, and V4 is 5 volts. Of course, the values of the resistors can be chosen to obtain any number of voltage values.

It is important to the present invention that 0 volts dc be applied to any LCD segment. This is achieved as follows. The voltage supplied by the row driver will average to be a certain value, for example, 2.5 volts. The average column voltage is adjusted to an average of 2.5 volts over the same interval. Then, the row and column voltages are applied to a segment of the LCD with the correct polarities such that the two voltages subtract from each other yielding 0 volts dc. In the present invention, the column voltage is adjusted (by switching its polarity) to yield the 0 volts dc.

Figure 25E:
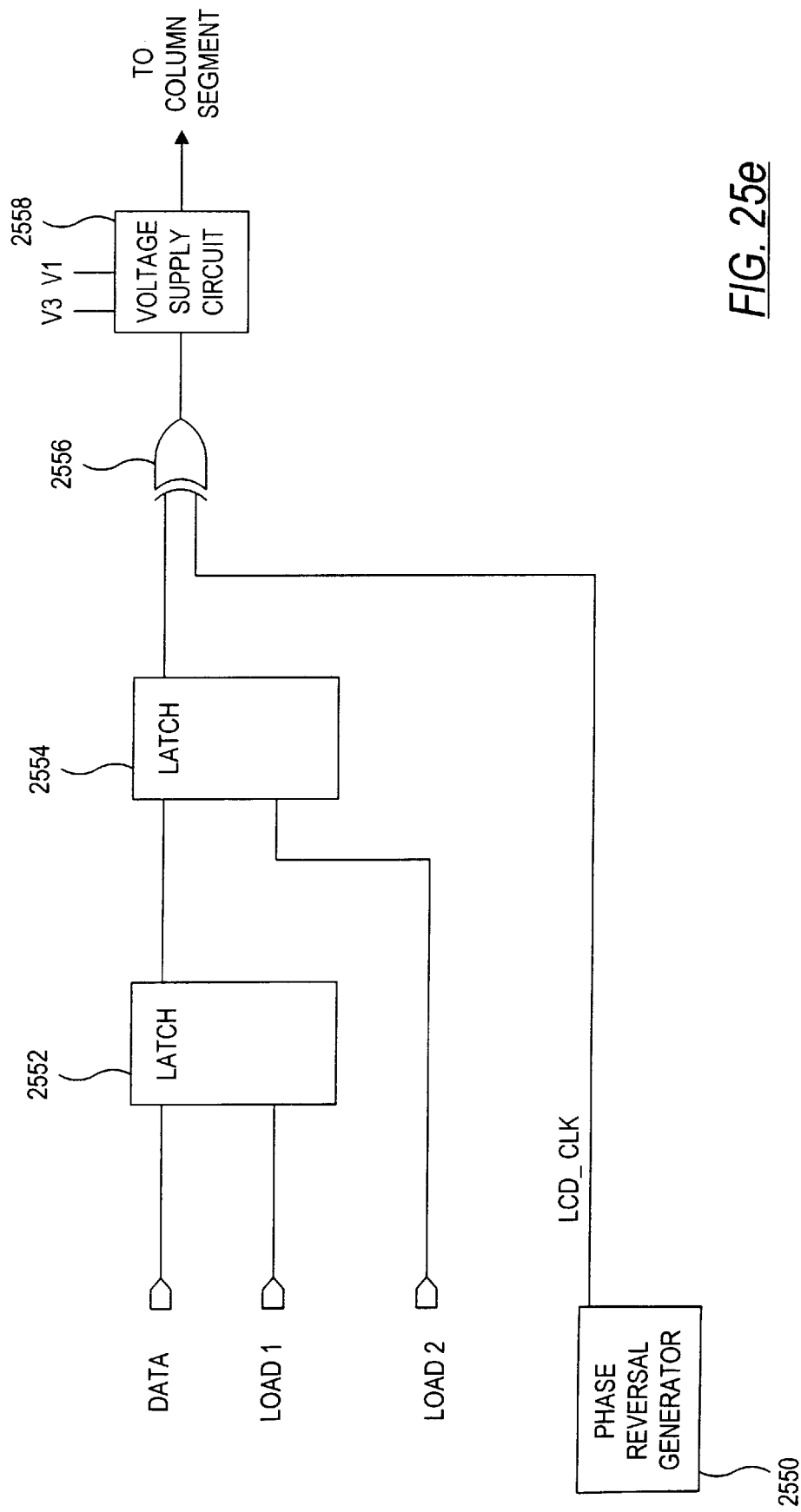
FIG. 25e shows the column driver according to principles of the present invention.

Referring now to FIG. 25*e*, the column driver comprises a master latch 2552 which is coupled to a slave latch 2554. The latches are loaded via the LOAD1 and LOAD2 signals which originate from the memory access timing unit 2524 (or the CPU) and are used to load column data over the signal line DATA. A phase reversal circuit 2550 is coupled to XOR gate 2556. The other input to gate 2556 is the output of the slave latch 2554. The phase reversal signal LCD_CLK inverts the signal at the output of the XOR gate 2556, every predetermined number of display cycles. The drive circuit 2558 is supplied with two voltages V3 and V1 which represent the logic one and zero voltage levels applied to the columns.

Figure 25F:
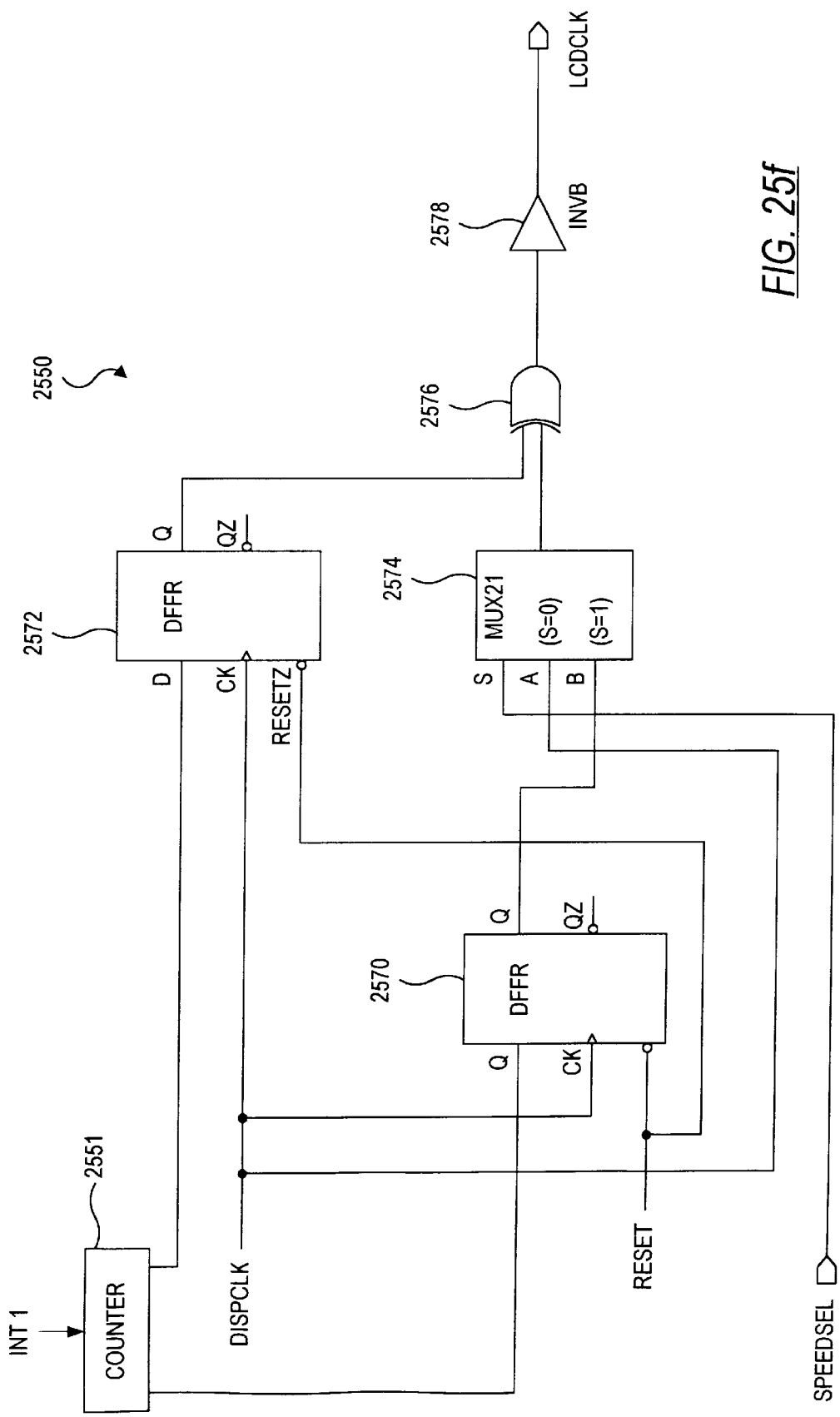
FIG. 25f shows the phase reversal generator circuit according to principles of the present invention.

Referring now to FIG. 25*f*, the phase reversal circuit 2550 circuit is described. A first latch 2570 receives the least significant count bit COUNT 0. Another latch 2572 receives the most significant count bit COUNT 4. The COUNT bits originate from a counter 2551 which is clocked by INT1. The clock signal from a system clock is used to clock the latches. A MUX 2574 uses the signal SPEEDSEL (from the CPU) to select either the DSPLYCLK or the output of the latch 2572. Thus, the phase reversal signal LCD_CLK toggles between one and zero as the count increments. As a result, the column signal is at first one polarity, and then the opposite polarity, then returns to the first polarity. SPEEDSEL toggles the LCD_CLK signal more quickly, if desired. For example, if COUNT4 has the effect of changing LCD_CLK every 8 cycles, asserting SPEEDSEL to 1 chooses DSPLYCLK which toggles LCD_CLK every other cycle.

Figure 25G:
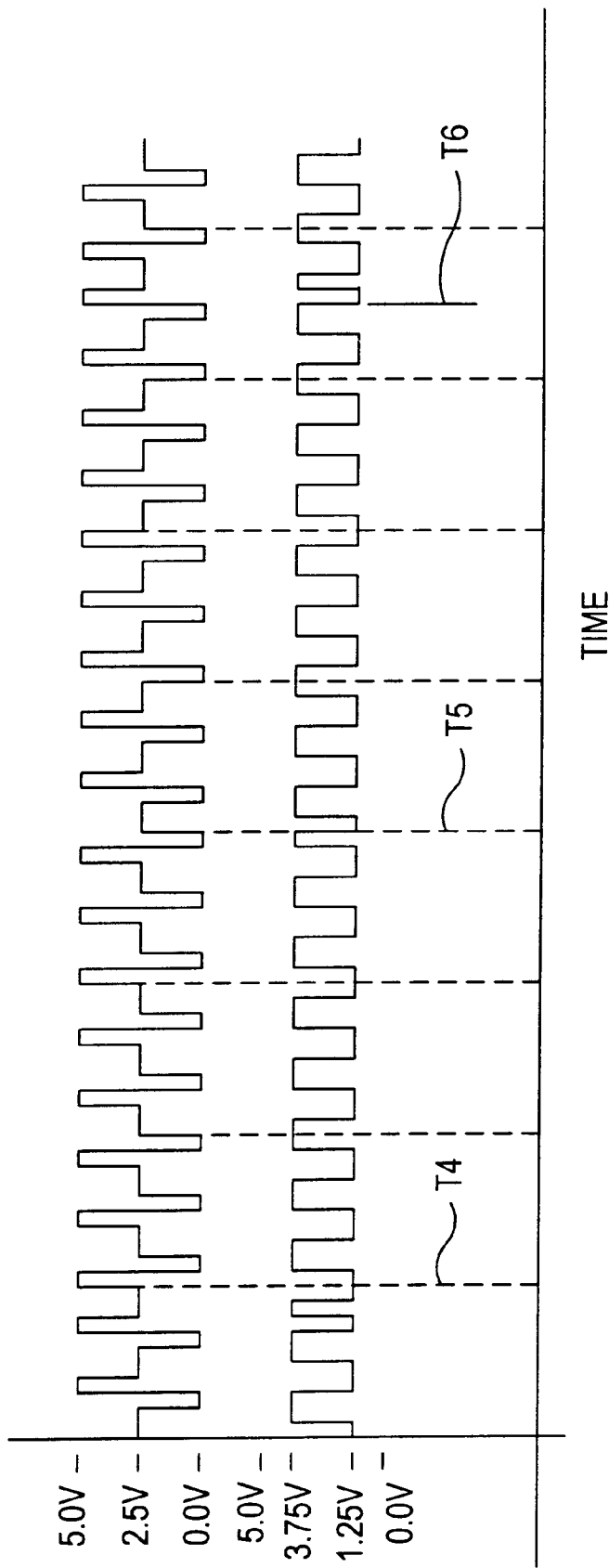
FIG. 25g shows a waveform diagram illustrating phase reversal according to principles of the present invention.

A waveform diagram illustrating the phase reversal operation is illustrated in FIG. 25*g*. Between t4 and t5 the polarity of the row waveform is shown at a first polarity The column waveform matches up to provide an average of 2.5 volts. At t5, the polarity switches (via signal LCD_CLK) and, as a consequence, the column waveform is adjusted appropriately to provide for an average of 2.5 volts over the period t5 to t6. At time t6, LCD_CLK fires again and the polarity returns the column signal to its original polarity.

Figure 26A:
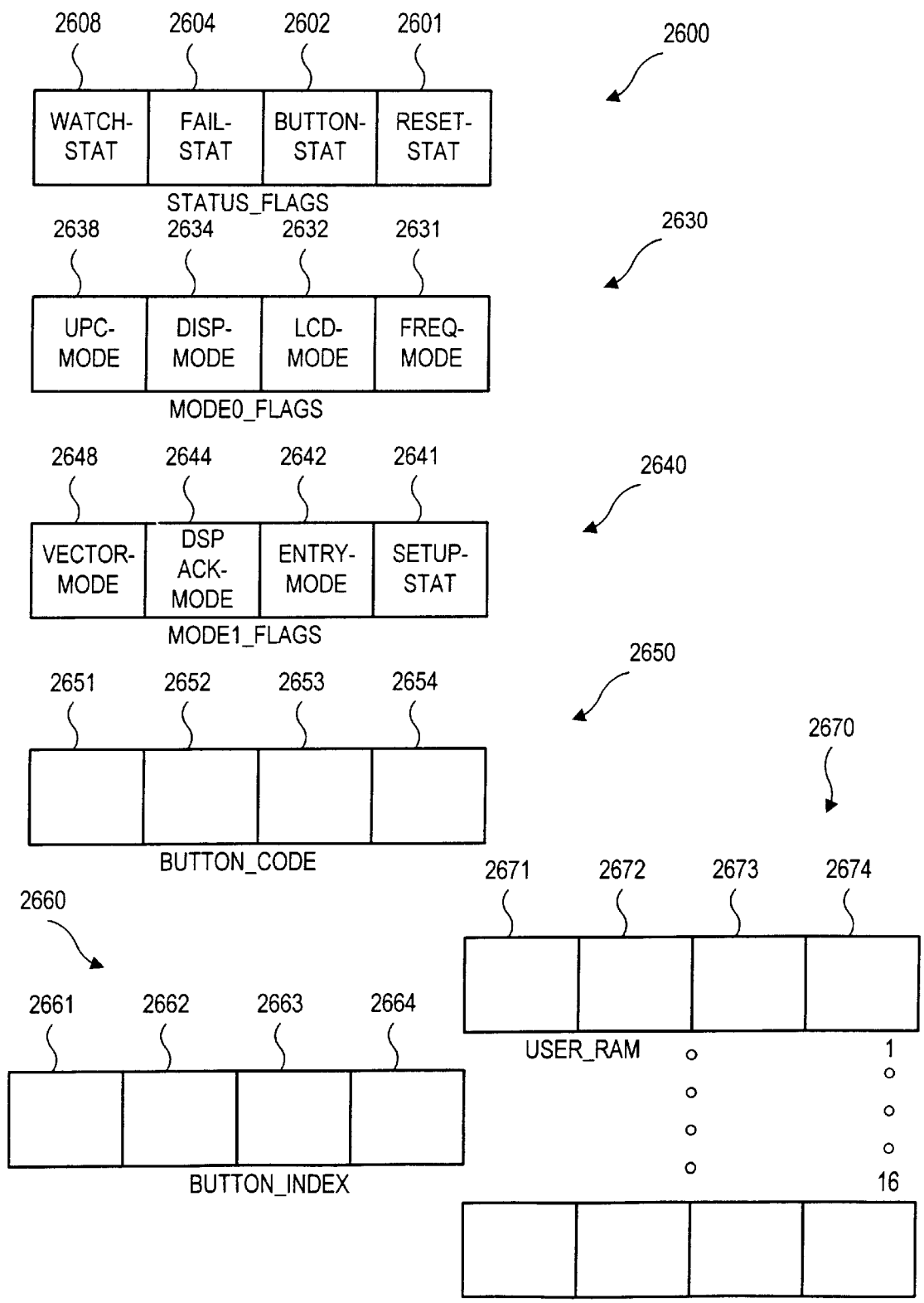
FIGS. 26a–26b are diagrams of the buffer section of the scratch pad RAM according to principles of the present invention.
Figure 26B:
Figure 26B:

Referring now to FIGS. 26a–b, a series of registers used by the ASIC includes a Status_Flags register 2600. The Status_Flags register includes a Reset_Stat bit 2601, a Button_Stat bit 2602, a Fail_Stat bit 2604, and a Watch_Stat bit 2608 ASIC includes a Status_Flags register 2600. A Mode0_Flags register 2630 includes a Freq_Mode bit 2631, a LCD_Mode bit 2632, a Disp_Mode bit 2634, and a UPC_Mode bit 2638. Finally, a Mode1_Flags register 2640 includes a Setup_stat bit 2641, a Entry_Mode bit 2642, a Dspack_Mode bit 2644, and Vector_Mode bit 2648. The function and settings for these registers and their associated bits is described below. The above registers are used for internal and external process control, operating mode selection, status indications, and data buffers. All are situated in the scratchpad RAM as are all soft and hard addresses. Additionally, TABLES 3a–3c provides the complete memory map for these registers as well as other buffers in the buffer section of the scratchpad RAM.

The Status_Flags register 2600 can be accessed externally and is a 4-bit read/write register. The register is programmed by the TAG to indicate various operating conditions. A TAG will acknowledge a service inquiry (SIQ command) if a bit flag is set. The register contents may be downloaded using DPS or Vector commands, or cleared by using the ACT_CLS or Vector commands.

The Reset_Stat (Bit1) 2601 is set during power-on initialization to indicate reset default state and zero Soft Address. This bit is also set if TAG Soft Address is programmed to zero and a SIQ command is received. This bit is cleared when the address is set to a non-zero value and the SIQ command is received. Another bit is the Button_Stat (Bit2) 2602 which is set if Entry_Mode is enabled and 1-bit button code entered and cleared after Entry_Mode disabled.

The Fail_Stat (Bit4) bit 2604 is set during reset initialization if not valid Self Test. This bit is cleared when fault condition corrected and TAG reset, or by ACT_CLS or Vector commands. The Watch_Stat (Bit8) bit 2608 is set upon a Watchdog timer interrupt. This may occur if the standard frame timing is disrupted (loss of start pulse) or by TAG failure. This bit is cleared by ACT_CLS or Vector commands.

The Mode0_Flags register 2630 is a 4-bit read/write register. The register bit flags are used to control the TAG's mode of operation. The register is cleared to the default state, during reset initialization and can be externally programmed using the ACT_MOD (Mode0_Flags simultaneously set) or Vector commands. The Freq_Mode (Bit1) 2631 is set for 40 kHz communication and cleared for 33 kHz TAG-to-TAC reverse communication frequency. The primary and default system frequency is 33 kHz. The frequency should be changed only if a TAG fails and continuously transmits. The frequency should be switched back to 33 kHz once the failed TAG is replaced. The Disp_Mode (Bit2) bit 2632 is set and cleared to enable and disable the TAG display. The LCD_Mode (Bit4) bit 2634 is set and cleared to select low/high display speed. This can be used in conjunction with Scan Ram and Display Counter programming to enhance LCD display performance, and can also be used to implement the "flicker" operation, as described above with reference to FIG. 29. The UPC_Mode (Bit8) bit 2638 is set and cleared to enable or disable the UPC display. The display will be modulated at a rate defined by the 128-bit pattern loaded into UPC Ram, when UPC_Mode and Disp_Mode flags are set (all LCD columns are set to one).

A Mode1_Flags register 2640 is also a 4-bit read/write register. The register bit flags are used to control the TAG's mode of operation. The register is cleared to a default state, during reset initialization, and can be externally programmed using the ACT_MOD (activate mode-0 flags register simultaneously set) or Vector commands.

The Mode1_Flags register 2642 includes the Setup_Mode bit 2641. If the accept button is pushed, the contents of the communication buffer will be loaded into the soft address buffers. If the reject button is pushed, the current soft address will not change. The TAG will clear the Setup Mode bit 2642 and remain active after the button push. The Button_Stat flag 2602, Button_Code and Button_Index registers are not affected.

The Entry_Mode bit 2642 is set to enable button entry (mode) and cleared to disable button entry. Entries are shifted left in the Button_Code register and may be read at any time by the DPS command. The Button_Stat bit 2602 is set and Button_Index register incremented for each entry, when entry mode is enabled.

The Dspack_mode bit 2644 is set to enable button push acknowledge by the display and cleared to disable button push acknowledge. The display will turn off when the button is pushed and turn-on again, when the button is released.

The Vector_mode bit 2648 is set to select vector common operation parameters via the Vector2 setup RAM and cleared to select operation parameters via the Vector1 setup RAM. This bit is also used to select Vector1 or Vector2 programming.

A Button_Code register 2650 is a 4-bit read/write register. The Button_Code register 2650 comprises bits 2651–54. The register is updated for each button entry when the entry-mode is enabled. Button entries and display acknowledge will be inhibited after the button index reaches four. This register is cleared when entry_mode is enabled or via the vector commands. The register contents may be downloaded at any time during the DPS or Vector Commands.

A Button_Index register 2660 is a 4-bit read/write register. The Button_Index register 2660 comprises bits 2661–64. The register is incremented after each button entry when entry_mode is enabled. Button entries and display acknowledge will be inhibited after four increments. The register is cleared when entry_mode is enabled or via the vector commands. The register contents may be downloaded at any time using the DPS or vector commands.

A user_RAM register 2670 is sixteen 4-bit read/write registers that can only be accessed via the vector commands and can be used for temporary data storage. Each user_RAM register comprises bits 2671–74. A Vector1_RAM 2680 (comprising bits 2681–84) and a Vector_2 Register 2690 (comprising bits 2691–94) are 4-bit read/write registers used to set the Vector1 and Vector2 command operational parameters.

In one embodiment of the invention, TAG commands are received from the TAC and consist of one 5-bit frame; 4-bit command code followed by the command/data flag. The most significant bit (MSB), of the command code, is sent first. The command/data flag is cleared, indicating a command frame. Following a command frame, data may be sent. The MSB, of the data frame, is sent first. The command/data flag is set to a one, indicating a data frame. Reverse communications from the TAG to the TAC are data and do not need to provide identification of the TAG because the TAC communicates and initiates communications with one TAG in a given time period. A complete listing of the commands available and their codes is given in TABLE 2. A summary of these commands is given below.

The TAG commands are divided into several groups. A NOP command group comprises a Nop command (null frame) which must be sent, continuously, during idol TAC-to-TAG communication. Also, at least three consecutive commands must be sent every 32-frames, during active periods, to allow for new TAG UART lock-in. The commands will not disrupt the communication process. After a NOP command, the TAG will process Disp_Mode, Setup_Mode and Entry_Mode.

ACTIVATE commands are used to establish communication with an addressable TAG, zero address TAG(s) or all TAGs. These commands are followed by three data frames (soft address). The most significant nibble of the soft address is sent first. Activated TAG(s) will transmit an ACK after the data frames. A TAG will not accept additional commands unless it is first activated.

A SERVICE command is used during the audit procedure to identify TAG(s) that require service. A TAG determines service status via the 4-bit Status_Flags register. The contents of this register may be downloaded, using the DPS command, to identify the type of service required. TAG(s) that require service will transmit an ACK after the command frame. TAGs that do not require service will de-activate.

SEARCH commands are used to quickly identify the soft address of multiple TAGs that require service. There are three commands which enable a binary search on the TAG's high, mid, or low soft address nibble. The commands are followed by one data frame (soft address). The TAG(s) will compare the received data to its soft address nibble and transmit an ACK, after the data frame, if the soft address is equal to, or greater than, the data value. All TAGs, previously activated, will remain active.

LATCH commands are used during the search procedure to de-activate certain TAG(s). There are two commands which can de-activate a TAG based on the soft address high or mid nibble. The commands are followed by one data frame (soft address). The TAG(s) will compare the received data to its soft address nibble and de-activate if the data value is greater than the soft address. No ACK is transmitted.

DUMP commands are used to download a TAG's status and Button Code and Index registers, CRC buffers, or Hard Address values to the TAC. The TAG will start transmission after the command frame and will not accept new commands or data until complete.

LOAD commands are used to upload data into a TAG's Mode and Communication buffers or Alternate Image ram. A maximum of 34-nibbles can be uploaded using the LOD_COM command. A maximum of 128-nibbles can be uploaded using the LOD_ALT command. The load command will be terminated if the data count exceeds the maximum limit or if the TAG receives another command. No ACK is transmitted.

When loading data, such as soft address, into the Communication buffer, the first two nibbles sent will be loaded into Mode0 and Mode1 buffers. The next three nibbles, soft address, will be loaded at the start of the Communication buffer. The most significant soft address nibble is sent first.

ACTION commands are used to initiate TAG operations. The minimum operation time is one frame. The TAG will not accept new commands or data until the operation is complete and the ACK has been transmitted. Multiple TAGs may perform operations at the same time.

The action commands include ACT_CRB which does a CRC on the Mode0, Mode1 and Communication buffers (34-nibbles) and places the results of the test in the CRC buffers. This command uses 22 frames. The ACT_CRD command performs a CRC on the Display high ram (128-nibbles) and place results in the CRC buffers and requires 43 frames. The ACT_CRV command performs a CRC on the RAM locations (128-nibbles maximum) defined by the contents of Vector1_Ram or Vector2_Ram and places the results of the test in the CRC buffers (3-nibbles/frame+1). The ACT_VCB command loads into the communication buffers data (32-nibbles maximum) from the RAM locations defined by the contents of Vector1_Ram or Vector2_Ram (8-nibbles/frame). The ACT_VWD command loads from the communication buffers data (32-nibbles maximum) into the RAM locations defined by the contents of Vector1_Ram or Vector2_Ram (8-nibbles/frame). The ACT_VST command loads from the communication buffers data (5-nibbles) into Vector1_Ram or Vector2_Ram (1-frame). The ACT_SFT command loads from the communication buffers data (3-nibbles) into the Soft Address buffers (1-frame). The ACT_PRG command loads the communication buffers data (5-nibbles) into the Hard Address registers (1-frame). The ACT_UPC command loads the communication buffers data (32-nibbles) into the UPC Code ram (1-frame). The ACT_DSP command loads the communication buffers data (2-nibbles) into the Display Counters (1-frame).

The Display Counter MSB includes two control bits; s7 for UPC output enable and s6 for display low memory. These control bits are write protected when using the ACT_DSP command. The ACT_MOD command loads from the Mode0 and Mode1 buffers data (2-nibbles) into the Mode0 and Mode1 registers. The TAG's mode-of-operation will not change until the Mode registers are loaded (1-frame). The ACT_SWP command swaps the data (128-nibbles) between the Display high and low ram locations (9-frame). The ACT_CLB command clears all Communication buffers (32-nibbles) to zero. Mode0 and Mode1 buffers are not effected (1-frame). The ACT_CLS command clears the Status_Flags register to zero and can be used to clear the self test (Fail_Stat) and watchdog interrupt (Watch_Stat) flags (1-frame). The ACT_RST command is used to reset to power-on state and initializes display, UPC ram, Mode registers, and Soft Address buffers to default values (approx. 3 seconds to recover). TAG will also run self test. No ACK is transmitted. The ACT_HRD command remains active if the data (5-nibbles) loaded into the Communication buffers equal the Hard Address. The ACK is not transmitted if not equal (1-frame). The Vdump or Vector Dump command is used to download data (128-nibbles maximum) from the ram locations defined by the contents of Vector1_Ram or Vector2_Ram. There is a 1-frame setup delay before download start. The TAG will not accept new commands or data until complete. The Vload or Vector Load command is used to upload data (128-nibbles maximum) into the ram locations defined by the contents of Vector1_Ram or Vector2_Ram. The command will be terminated if the TAG receives another command. After receiving the Vload command, the TAG requires a 1-frame setup delay prior to receiving the first data-frame. A zero data frame after the command is recommended.

Alternate ASIC Embodiments

FIGS. 19a and 19b are schematic diagrams of two different embodiments of the implementation for the electronic display tags 20 and the ASIC. Common reference numerals are used for common components in the two diagrams. The differences between the embodiments of FIGS. 19a and 19b concern the type of inductor 110 (or 110') utilized and the signal processing performed by a rectification circuit 114 (or 114'), a power supply circuit 116 and a signal conditioning circuit 118. Preferably, most of the circuits of the tag are realized as an application specific integrated circuit (ASIC)

161 (shown within the dotted line). The ASIC is further described in connection with FIG. 20a and some of the following figures of drawing, which are described below. Additionally, the rectification circuitry can be moved onto the ASIC.

Data sent to the display tag 20 via the conductor C is received by the display tag 20 using inductive coupling. A pick-up coil or inductor 110 (or 110') is located close enough to the conductor C to cause the changing electromagnetic field around the conductor C to induce a corresponding current in the inductor 110. This induced current provides the display tag 20 with both the necessary operating power and the data for the display without requiring any physical contact between the display tag 20 and the conductor C. The inductive coupling of both power and information signals to the tags eliminates the need for batteries in the tags and for physical contacts between the tags and the wire loop. This minimizes the cost of the tags, and also avoids problems caused by contact corrosion and electrostatic discharges.

The preferred embodiment of the pick-up coil 110 is a single coil with a full wave bridge rectifier as shown in FIG. 19a, but if desired two separate windings may be used, as an alternate way to achieve full wave rectification. The pick-up coil in the preferred embodiment can be implemented by winding 60 turns of #32 enameled wire in a channel molded into the outer periphery of the tag housing, as described in more detail in connection with FIGS. 14 and 15.

A capacitor 112 is connected in parallel with the inductor 110 to form a parallel tuned circuit that is responsive to a particular range of frequencies centered about the carrier frequency transmitted by the area controller. This resonant circuit maximizes voltage gain and significantly improves coupling efficiency.

In FIG. 19a, the current induced in the coil 110 is sent through a full-wave rectifier 114 to provide a positive input to a power supply circuit 116 and a signal conditioning circuit 118. The signal conditioning circuit 118 is preferably a Schmidt buffer which improves the rise and fall times and the signal-to-noise ratio of the signal from the coil 110. The circuit 118 can be implemented in the ASIC using standard cells or by using a commercially available buffer having hysteresis control.

In FIG. 19b, the induced current is produced in a pick-up coil formed by a center-tap inductor 110'. The ends of the inductor 110' are connected to a pair of rectifying diodes 114', 114" to provide a full-wave rectified positive signal for the circuit 118'. The diode 114" can be removed (replaced by a wire) for an operable half-wave rectified signal.

The power supply circuit 116' draws current from the center-tap of the inductor 110' and includes a voltage regulator 124 and a capacitor 126 at its output for providing operating power ($V_{dd}$) for the display tag 20. The power supply circuit 116' is connected to common (ground) for returning current through the diodes 114',114" to the inductor 110'.

In both FIGS. 19a and 19b, the output of the signal conditioning circuit 118 or 118' is pulse-extended using a monostable vibrator circuit 142. The output of the circuit 142 is monitored by a microcomputer (CPU) 146 for demodulating the data. A universal-asynchronous-receiver-transmitter (UART) 144 converts the sequential digital pulses from the circuit 142 into parallel format for use by the CPU 146, and vice-versa. An oscillator 147 provides an operating clock signal for the CPU 146. A manually adjustable trimming resistor 149 replaces the normally used crystal or ceramic resonator, but produces a much larger variation in oscillator frequency from tag to tag. This variation is compensated for by synchronizing the oscillator frequency to the carrier frequency, thereby permitting the use of an R-C oscillator and eliminating the cost and size of a crystal. In this instance, the oscillator cycles are counted during each half cycle, or multiple, of the rectified main primary frequency (50 kHz wave rectified to 100 kHz wave). This count is then used to generate internal frequencies that may be needed for communications. Alternatively, a software-based oscillator approach can be used as described in connection with FIG. 20 below.

Depending on the type of CPU 146 that is used, the buffer 118 (118'), the monostable vibrator circuit 142 and the UART 144 may not be required, since many microcomputers have input ports which can accommodate and process analog signals directly. With such microcomputers, the UART-related functions are implemented in software.

The microcomputer (CPU) 146 uses conventionally configured operating memory, including ROM 148 and RAM 150, and an LCD display memory 152, 154 for maintaining an assigned display set on an LCD display 156 and communicating with the area controller 31. The display 156 is preferably driven using a conventional two-row display driver circuit 158 controlled by the CPU 146.

To permit input signals to be manually generated at the tag, a pair of membrane switches 166 are accessible on the outside surface of the tag housing. Buffers 168, each having a conventional input pull-up resistor or current source, are connected to the switches 166, and the outputs of the buffers 168, are supplied to the CPU 146.

Use of low-power CMOS circuitry is preferred for the tags 20. This permits the power draw from the conductor C to be maintained under 15 milliwatts per tag. In a preferred embodiment, a custom CMOS integrated circuit (IC) mounted on a flex circuit (described later herein) contains all of the electronics except the display, the tuned circuit, the diodes 114, the capacitor 126 and the switches 166, and requires very little power to operate.

Returning to FIGS. 19a and 19b, the microcomputer 146 in the tag includes I/O buffers 160 and address store 162 for storing the display tag address. The microcomputer 146 stores the down-loaded address for the tag by writing the address to the I/O buffers 160. The ports on the other side of the buffers 160 are connected to the address store 162. In the event of a power failure, the address is preserved in the address store 162 for a certain period of time. If desired, alternative means of storage may be used.

If desired, as part of a multi-tiered power-backup system, a backup battery may be provided in the area controller 31 to maintain all the tags serviced by that controller in normal operation for a selected time interval following a power failure. At the end of that time interval, which is determined by the MPU 82 in the area controller, the MPU 82 generates a signal which causes the CPU 146 in each tag to turn off the tag display. All the address and product information remains stored in the tag memory, including the address store 162. This second stage of the power-failure mode of operation is continued for a specified period of time after which the data stored in each tag's RAM 148 and ROM 150 is erased, and only the tag addresses are preserved by the battery backup in the area controller. When the battery is exhausted, the address store 162 then preserves the addresses. In the event a tag is removed temporarily from a rail, the address store 162 will maintain the address for a few minutes so that it is not necessary to manually reprogram the tag when it is reinstalled, as long as the address is maintained. This multi-level approach provides extensive safeguards to a variety of power-failure conditions.

The TAG uses an application specific integrated circuit (ASIC) to perform its processing functions including driving the LCD, accepting data from the TAC and sending data to the TAC. Referring now to FIG. 20a, an ASIC 2001 comprises counter section 2005, LCD display controller 2002, central processing unit (CPU) 2003, scratch-pad RAM 2006, regulator section 2007, and I/O interface 2004. As will be explained in greater detail below, these elements communicate with each other over a communications link 2051 which includes a common data bus (DATABUS), dedicated data buses, and control signals. Referring now to FIG. 20b, the ASIC may also be comprised of a UART 144, a monostable vibrator circuit 142, signal conditioning circuit 118, resistor 119, JFET 159, and bridge 114. The operation of these elements was described in connection with FIGS. 19a and 19b above. The JFETs may also be placed in a power I/O block 2050 to be described below.

Software/Firmware Initialization

Referring now to FIG. 2 and also to FIG. 28, a preferred embodiment of a method for installation of a tag 20 will be described. During initial system installation only authorized personnel will have access to the display tag rails. Large retail stores typically have complete product location data in their databases, and thus the products in each area controller zone can be sorted in a sequence that enables the installer to walk down the aisle and activate the tags sequentially. This saves a significant amount of time.

Figure 28:
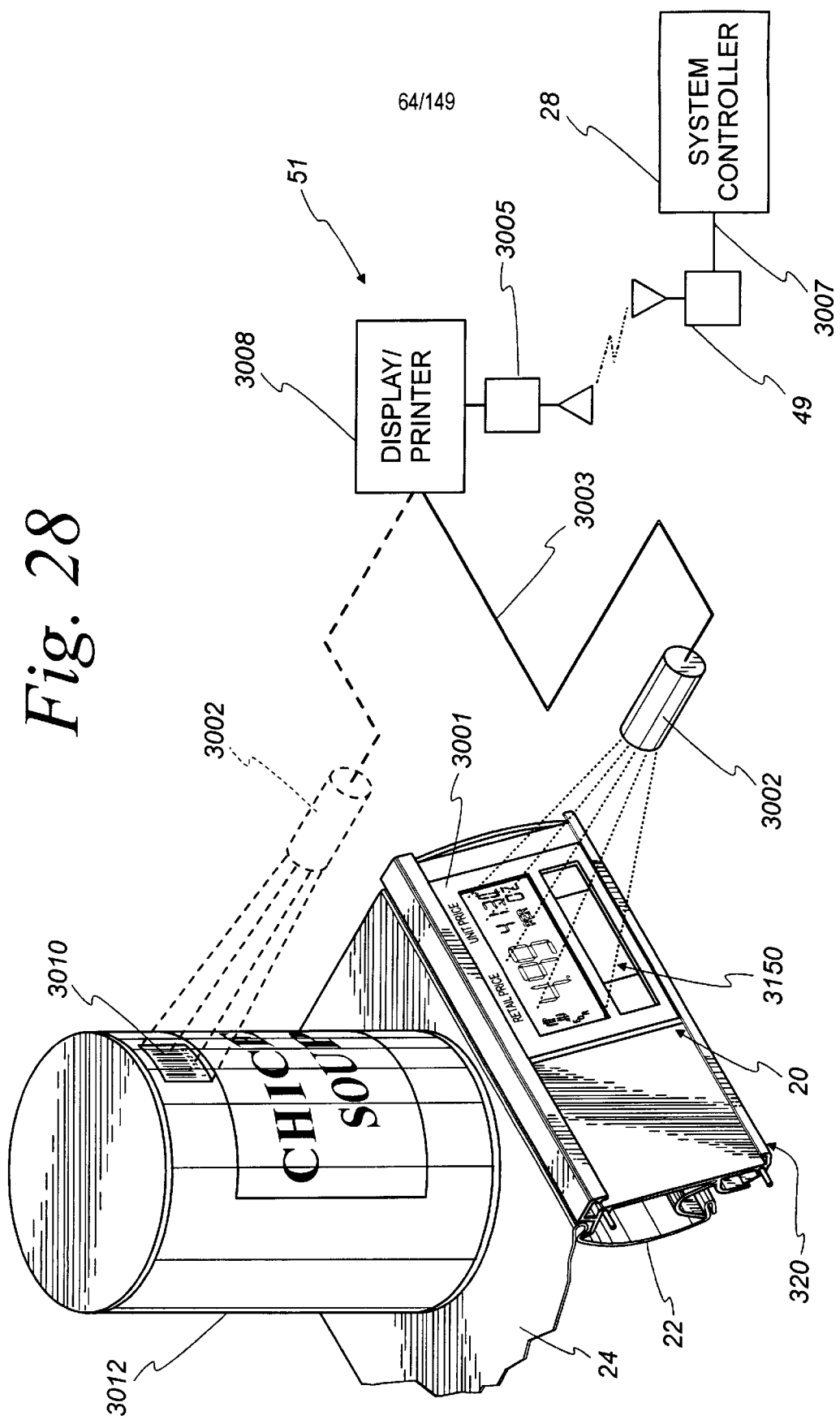
FIG. 28 is a diagram showing the use of a scanner/printer during the tag installation process.
Figure 29:
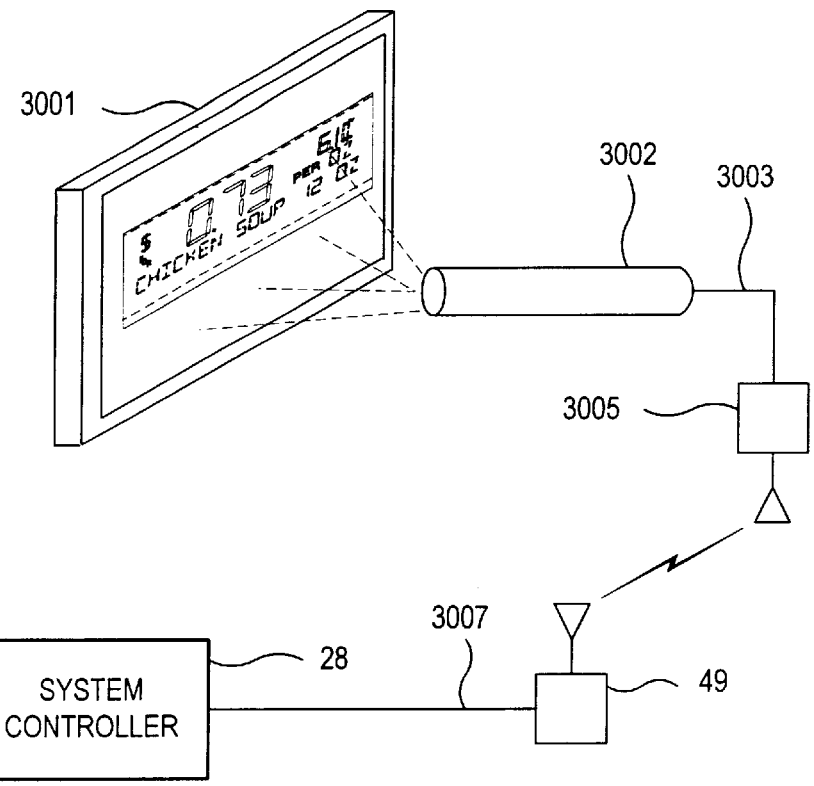
FIG. 29 is a block diagram showing the use of a flickering display according to principles of the present invention.

As shown in FIG. 28, the portable scanner or terminal 51 (also shown in FIG. 2) is utilized in this procedure. Initially, the installer logs onto the portable terminal 51 and selects a tag installation/programming mode. Next, the installer selects the identification number for the area controller 31 for the aisle or area he or she is working in. Preferably, upon installation of the system, the store computer 40 or system controller 28 will include a look-up table that corresponds each of the area controllers 31 to a text string describing the area of the store for which the area controller is positioned. For example, a text string such as "Aisle Three, South Side" may be used to describe the location of an area controller. Therefore, rather than requiring the installer to enter in an identification number for a particular area controller as described above, the installer will be able to select an area controller by scrolling through a menu listing the areas of the store corresponding to the area controllers.

Once the installer is logged onto the portable terminal and an area of the store is selected, referring briefly to FIG. 15b, a tag 20 is inserted into the rail 320 at point of the shelf where a particular product will be presented for sale. Thereupon, and referring to FIG. 28, the installer depresses a tag push-button switch 3150 on the front surface of the tag 20 (to be more fully described later herein below) to signal the area controller 31 and via the area controller 31, the system controller 28 that this tag is requesting service. An appropriate response from the system controller should next be observed on a display portion of the portable scanner 51. This display/printer portion is indicated diagrammatically at reference numeral 3008 in FIG. 28.

Next, the operator utilizes the handheld wand or sensor 3002 to scan the UPC portion 3010 of a product package 3012 in association with which the tag 20 is to be used. This information is sent to the system controller 28 via RF transceiver 3005 portion of the terminal 51 and RF transceiver 49 coupled to the system controller 28. The system controller in response to this information from the product package 3012 then searches for the pricing and other appropriate information for display by the tag. This pricing and other information is then sent to the tag, by way of the area controller 31 in accordance with the communication scheme described elsewhere herein. The user or installer then observes the product information displayed on the tag and on the display portion of the display/printer 3008 of the portable terminal and compares these two displays to the scanned item. At this point the installer is also able to select the type of product information displayed by the tag, such as cost per unit, cost per ounce, etc. Once all of these elements of information are configured and verified, the operator again presses the tag push-button 3150 to confirm and lock in the tag data from the system controller, effectively linking the display tag to the particular product.

Optionally, if desired, the printer portion of the display/printer 3008 with the portable terminal 51 can print an additional adhesive label for the tag, which the installer may then place on the shelf tag if desired. This label may include any desired information relevant to the product, including restocking codes or the like associated with the product.

In the preferred embodiment, it is possible to allow more than one display tag 20 to be linked to a single product. This would allow one tag to display a first type of pricing data such as price per unit (eg. "$1.25"), and the second tag to display a second type of pricing data such as price per multiple units (e.g. "3 for $3.00").

An alternate method of address programming for each tag 20 can be accomplished by entering the start-up mode. The installer starts at a specific location on an existing store "shelf map." The first address and associated product information data is generated by the system controller and fed to the area controllers for transmission to the display tags. This product information data appears on all the display tags running in the start-up mode. Referring again to FIGS. 19a and 19b, an installer then manually triggers a membrane switch 166 on the particular display tag which is to be identified by the first address, and which is to display the product information data associated with that address and the shelf product adjacent to it. When the switch is triggered, the CPU 146 captures the address and associated product information data and exits the start-up mode, thereby initiating the normal run mode in the display tag. In the normal run mode, the display tag will continuously display the product information data which is contained in the memory of the display tag until it receives an address which matches its stored address, at which time it will update the display in accordance with the information data immediately following the received address.

Upon exiting the start-up mode, the display tag sends a confirmation signal back to the system controller 28 via the conductor C and area controller 31 to inform the system controller that the first address has been captured by the appropriate tag. The system controller then sends the next address and associated product information data to the display tags. This new product information data is again displayed on all the tags that remain in the start-up mode. Visual inspection to make sure this adjacent shelf product agrees with the tag displayed information and manual triggering of successive display tags continues until all the display tags have captured addresses and display data. After any given display tag has captured an address during initialization, the system controller is able to update the information in that tag at any time.

Figure 27A:
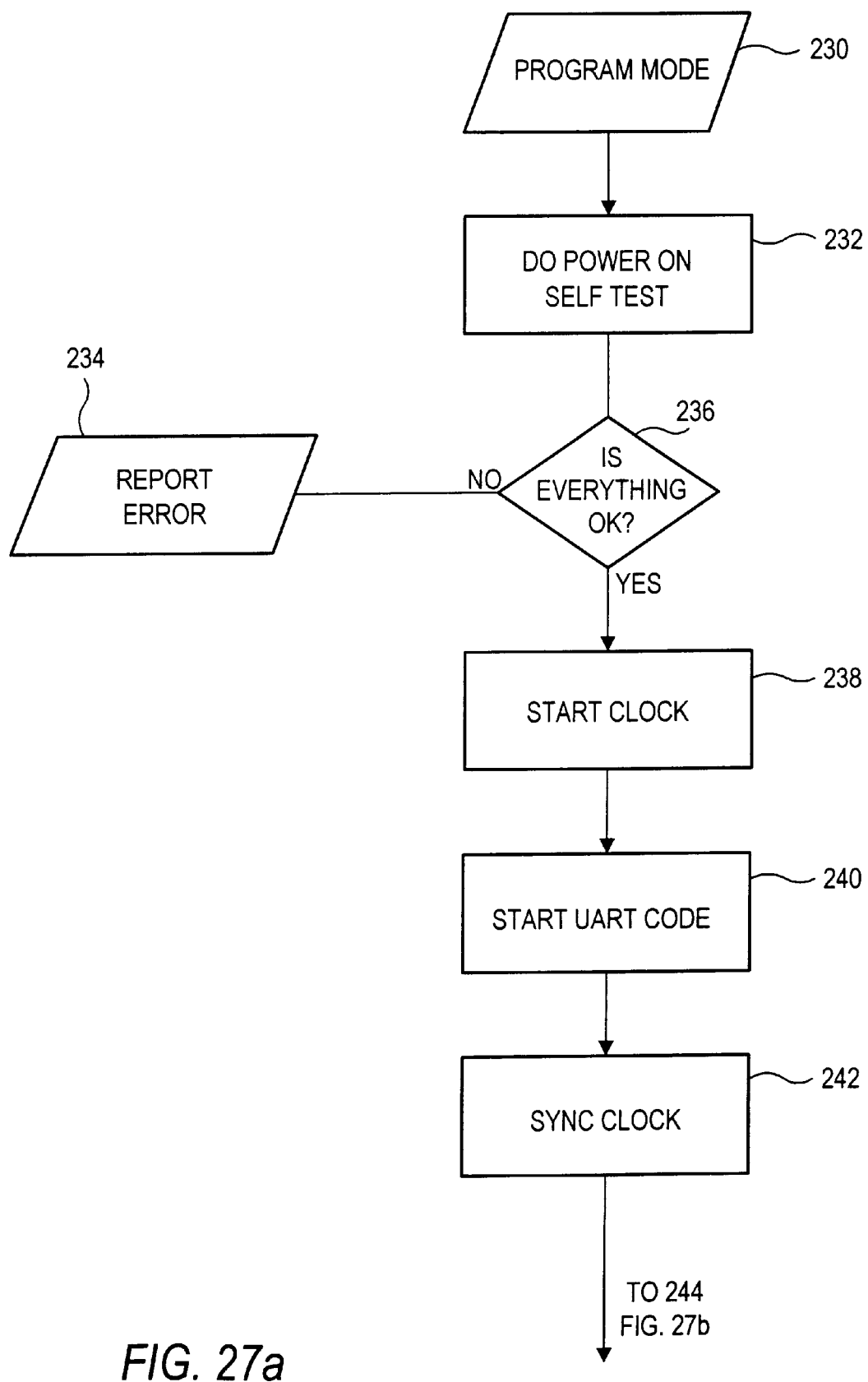
FIGS. 27a–27d are flow charts showing how the display tag of FIGS. 1 and 2 can be operated.
Figure 27B:
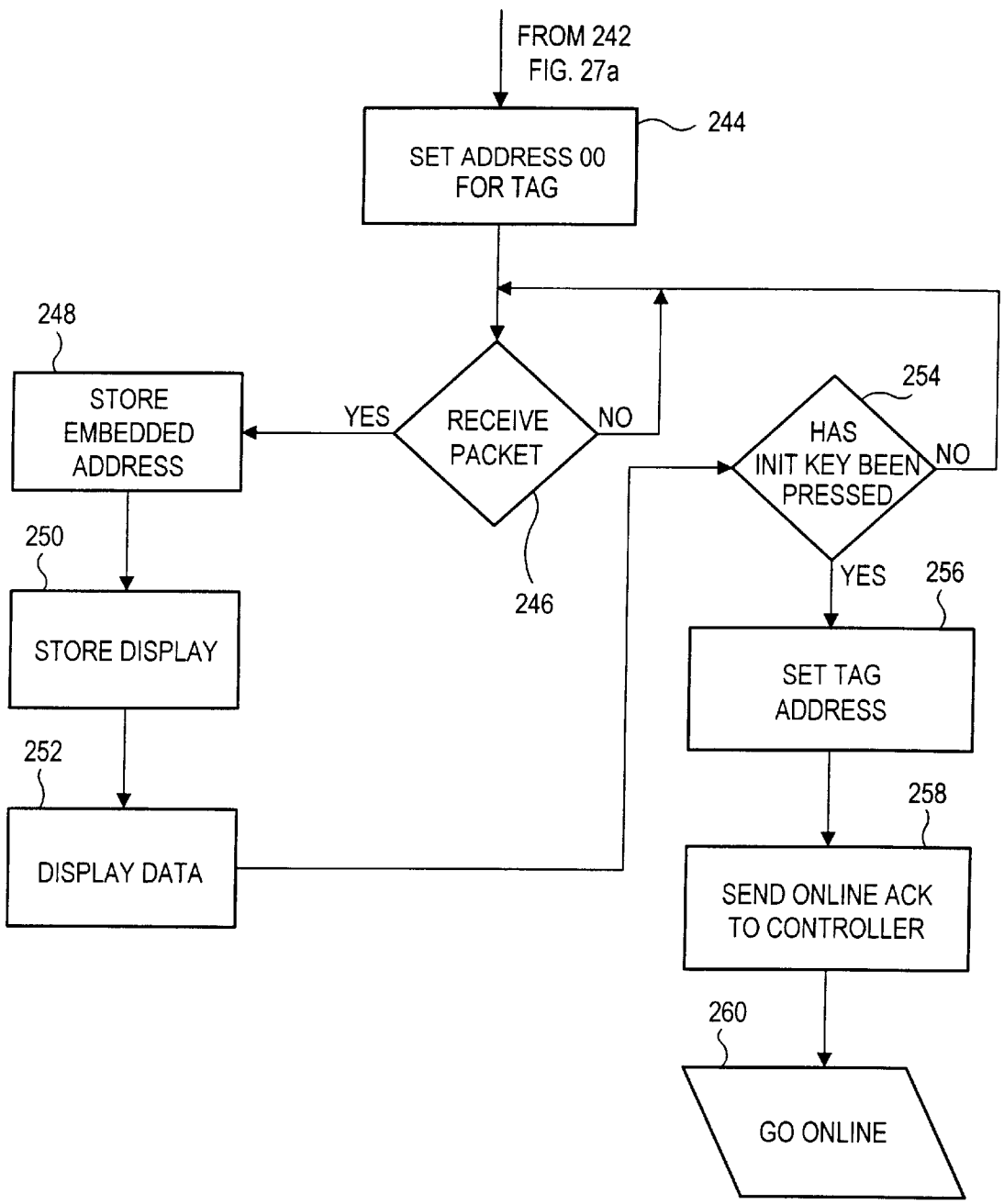

Referring now to FIGS. 27a–27b, a flow chart shows how, in an alternate embodiment, the display tag is programmed to initialize the tag with an address and to bring the tag "on-line". This programming mode starts at block 230 and proceeds to block 232 where the microprocessor in the tag performs a power-on self-test (block 232) involving memory and register checks. At block 236, a test is performed to determine if the self-test passed. If not, flow proceeds from block 236 to 234 where the tag reports the error to the system controller. If the self-test passes, flow proceeds from block 236 to block 238, 240 and 242 where UART is initialized and the tag's clock is adjusted and phase-synchronized to the frequency (50 kHz) sensed on the power signal carried by the conductor. From block 242, flow proceeds to block 244 where the tag temporarily assigns itself tag "00," so that it can receive the "Load All" command from the area controller for address initialization.

At block 246, the tag monitors the power signal on the conductor to determine whether or not the tag has received a data packet. If a packet is received, flow proceeds from block 246 to block 248 where the tag stores the embedded address. Within the packet is the product information. From block 248, flow proceeds to blocks 250 and 252 where the tag stores the information to be displayed and displays that information on the tag's visual display.

From block 252, flow proceeds to block 254. At block 254, the tag determines if the initialization key (switch) has been manually pressed. If not, flow returns to block 246 to continually look for a packet transmitted to this tag. From block 254, flow proceeds to block 256 in response to detecting that the initialization key switch has been manually pressed.

At block 256, the tag address received within the packet is adopted by the tag. From block 256, flow proceeds to block 258 where the tag goes on-line by sending an "Ack" communication to the area controller. At block 260, the tag is depicted as going on-line. This ends the program mode for initializing the tag.

Figure 27C:
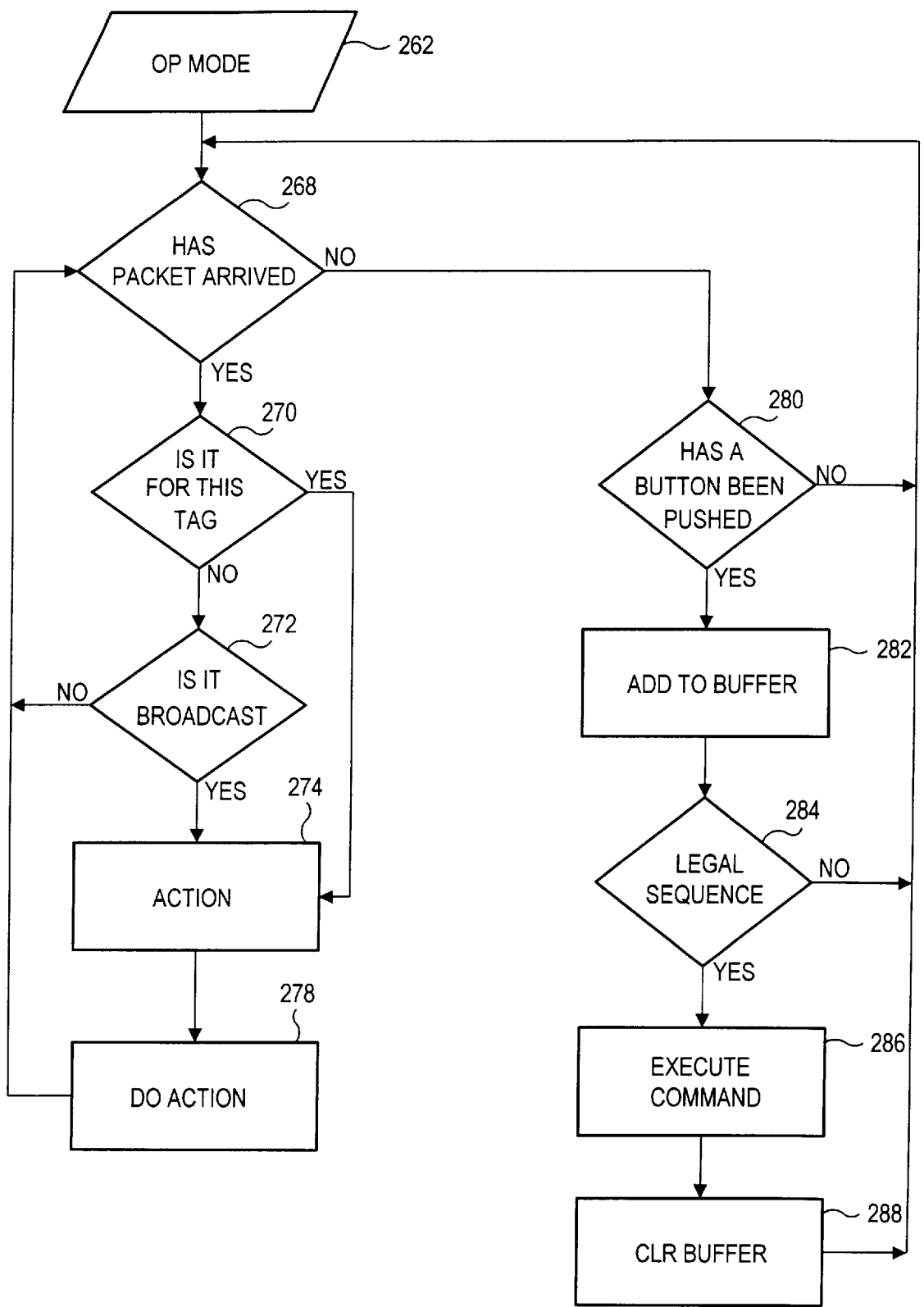

After initialization, the tag is ready for normal operation, which is depicted by the flow chart in FIG. 27c. This flow chart begins at block 262 and block 268 where the tag immediately begins monitoring the conductor to determine whether an information pack has arrived from the area controller. If such a packet has arrived, flow proceeds from block 268 to block 270 where the tag compares the address embedded in the information packet with the address of this tag to determine if the packet is for this tag. If it is not for this tag, the tag determines whether the packet represents a broadcast to all tags (such as "STORE IS CLOSING"), as depicted at block 272. If the information packet is for this tag, flow proceeds from block 270 to blocks 274 and 278 where the tag identifies and executes the necessary action associated with the received information packet.

From block 272, flow proceeds to blocks 274 and 278 if the packet is associated with a broadcast for all tags (the "All tags" command).

From block 268, flow proceeds to block 280 in response to the tag determining that a packet has not arrived over the conductor. At block 280, the tag performs a test to determine whether a manual button sequence has been entered. If such a sequence has not been entered, flow returns to block 268. If a manual button has been depressed, flow proceeds from block 280 to blocks 282 and 284 where the tag determines if the sequence is one of the valid sequences. If it is not a valid sequence, flow returns to block 268. If it is a valid sequence, flow proceeds from block 284 to block 286 where the command is executed. From block 286, flow proceeds to block 288 where the buffer is cleared and flow returns to block 268.

The sequences are binary numbers entered by depressing membrane switches representing "0" or "1". Valid sequences include binary sequences corresponding to requests for: resetting the tag; entering the cursor mode (FIG. 27c); verifying the status of the tag and verification codes. Clearing the software buffer which stores the binary digits entered through the switches occurs after a time-out.

Figure 27D:
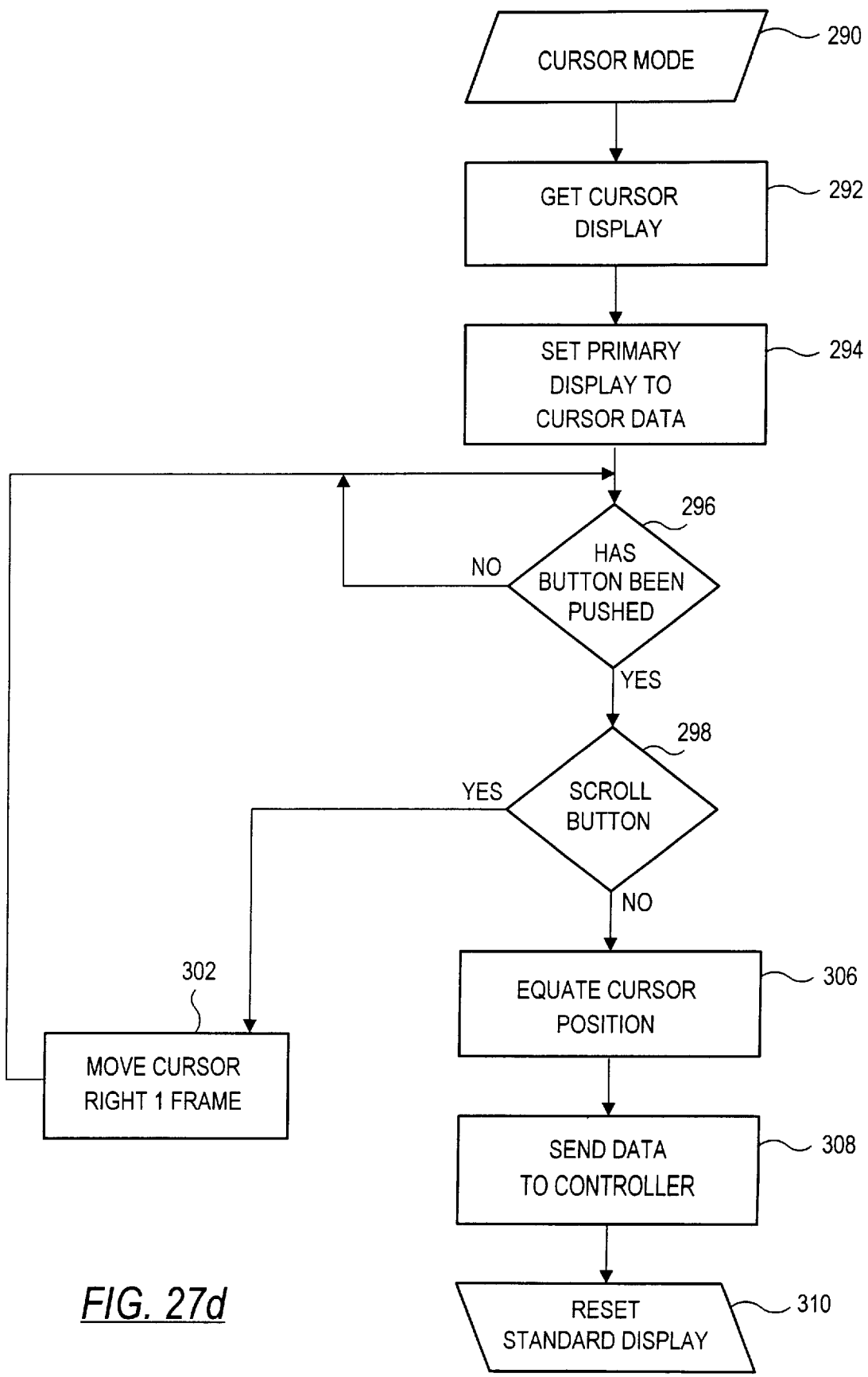

Turning now to FIG. 27d, a flow chart for implementing the cursor mode for the display tag is shown. This routine is executed in response to a valid manually-entered sequence.

The cursor mode begins at blocks 290, 292 and 294, where the tag sets up the display with a cursor position movable by one of the buttons, the scroll button. At blocks 296 and 298, the tag performs a test to determine whether a scroll button has been depressed. If so, flow proceeds to block 302 where the tag changes (or scrolls through) to the next cursor code position. From block 302, flow returns to blocks 296 and 298 where the tag performs yet another test to determine if the scroll button has been depressed. This continues with the display code position being changed with each depression of the scroll button (switch). When the other switch (the "select button") is depressed, the current cursor position is equated with a package (or function), as indicated at block 306. The current position of the cursor is returned to the area controller thereby selecting the associated data block. The area controller may optionally await a verification to be entered into the buttons on this tag before acting on selected data.

In summary, one membrane switch is used to select a displayed code and position the cursor to a selected display character position, and the other switch is used to terminate the cursor mode, selecting the last position of the cursor. Such an implementation is ideally used for reordering products and alerting the system controller as to the status of the product for the associated tag.

From block 306 flow proceeds to block 308 where the tag sends the set of selected codes to the area controller. At block 310, the tag resets the display.

Display Tag Verification

Referring again to FIG. 28, a preferred embodiment of a method for verifying the data of a display tag 20 will be described. As shown in FIG. 28, the portable scanner or terminal 51 (also shown in FIG. 2) is utilized in this procedure. Initially, the installer logs onto the portable terminal 51 and selects a tag verification mode. Next, the installer depresses a tag push-button switch 3150 on the front surface of the tag 20 to signal the area controller 31 and in turn the system controller 28 that this tag is requesting service. The system controller 28 will then refer to the internal tag and item databases 502, 504 (see FIG. 5b) to display the product information corresponding to the tag requesting service on the display portion 3008 of the portable scanner 51. By referring to this displayed product information, the store personnel will be able to verify that the display tag 20 is positioned under the correct product and will be able to verify that the information displayed is correct.

In the tag verification mode, the store personnel may alternatively scan the product's UPC portion 3010 (barcode label) with the handheld wand or sensor 3002 first, rather than depressing a tag's push-button. When a product's UPC 3010 is scanned in the tag verification mode, the system controller 28 will then refer to the internal tag and item databases 502, 504 (see FIG. 5b) to display the product information corresponding to the product on the display portion 3008 of the portable scanner, and will also cause the area controller 31 to command the display tag or tags associated with the product to blink their displays on and off. Accordingly, this allows the store personnel to verify that the system controller 28 contains correct information for the product and allows the store personnel to verify (by looking for the blinking tags) that the display tag or display tags associated with the product are positioned properly and are displaying the proper information.

Additional Operation Modes Additional modes of operation for the system (in addition to the tag installation mode and the tag verification mode) include: product order mode, where the store personnel will be able to reorder products using the portable RF terminal 51 by scanning the product or by depressing a push button of a tag associated with the product, and then by using the user interface of the portable RF terminal to instruct the store computer 40 how much of the product to order; a facing mode, where the store personnel will be able to scan a product or depress a push button of a tag associated with the product, and the display portion 3008 of the portable RF terminal 51 will display the facing arrangements for that product; a restock mode, where store personnel will be able to scan a product or depress a push button of a tag associated with the product, and the tag will then blink its display on and off so as to alert the stock boy to restock that item, and once restocked, the stock boy may again depress the push button of the associated tag so that it stops blinking.

TAGs: Connection to Rails

Figure 14:
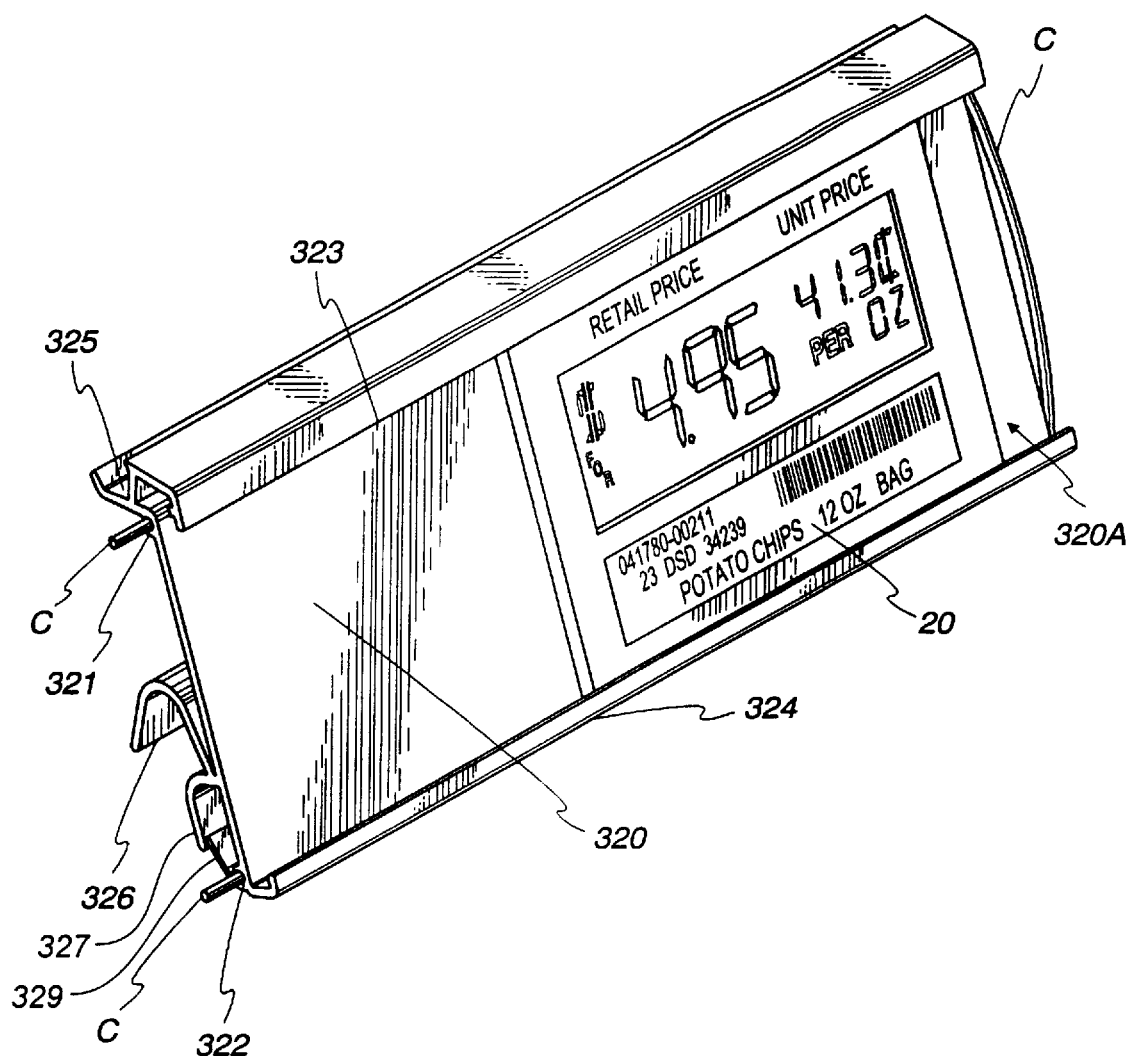
FIG. 14 is a front perspective view of a tag mounted to an auxiliary rail.

As described above, the present invention comprises a plurality of tags which can be coupled to the rails of shelves. FIG. 14 is a perspective view of a tag 20 within an auxiliary rail 320. FIG. 15a is a side view of an auxiliary rail 320 mounted to a shelf rail 22 on the front of a shelf 24. These figures illustrate an arrangement for mounting the display tags 20 on a conventional shelf 24 which includes a depending shelf rail 22 formed as an integral part of the shelf. As seen in FIG. 15a, the auxiliary rail 320 is snapped into the shelf rail 22 and extends continuously along the full length of the shelf for receiving both the display tags 20 and the conductor C. Members 326a, 326a, and 329 are co-extruded.

The auxiliary rail 320 is designed so that the display tag 20 and the conductor C may be snapped into place anywhere along the length of the rail. Preferably, conductor C comprises double-coated, solder-strippable magnet wire. The coated conductor C is mounted in two narrow channels 321 and 322 formed near the top and bottom of the rear wall of the rail 320. Preferably, the conductor C is pre-installed in the auxiliary rail 320. The tag 20 is received in a wide channel 320a formed in the front side of the rail 320. The tag is recessed inside, and held in place by, a pair of flanges 323 and 324 so that the tag does not protrude from the rail. The arrangement is such that the upper and lower portions of the coil 110 of the tag 20 are parallel to, and as close as possible to, the conductor C in the channels 321, 322. The upper flange 323 is flared outwardly at a slight angle so that it can be bent upwardly and outwardly and form a pivot for installation and removal of tags from the front of the rail. A pair of rearwardly projection flanges 325 and 326 hold the rail 320 in place on the shelf rail 22. An additional flange 327 is engaged by a co-extruded projection 329 so as to overlie and protect conductor C in channel 322, and to form a "clip" for optionally holding a paper tag 331.

As shown in the perspective view of the tag of FIG. 14, a single conductor C is snapped into the top channel 321 of the rail 320, spans the length of the store shelf, and then loops to the bottom channel 322 of the rail 320 and spans the length of the shelf rail again. Alternate phasing of vertically adjacent shelves, as described above in connection with FIG. 8, minimizes cross talk between adjacent conductors along the shelves and avoids any significant radiation of signals (e.g., EMI) from the entire system or susceptibility from other sources. In similar fashion, adjacent sections of shelves and even adjacent aisles could be pleased to reduce EMI.

As shown in the cross-section of the tag 20 in FIG. 15a, a pick-up coil 110 is wound around the periphery of the tag. When the display tag is attached to the rail 320, the coil segments located in the top and bottom portions of the tag 20 are in close proximity to the two segments of the conductor C on the rear side of the rail 320. Thus, the coil is electromagnetically coupled to both segments of the conductor C. Each shelf 24 has its own branch distribution loop, mounted on the rear side of an extruded plastic auxiliary rail 320 that snaps onto the front of a standard shelf.

FIG. 15b is an end view of an alternate embodiment of a rail 320 for mounting display tags 20 of the type described above with reference to FIGS. 36a–b on a shelf 24 which includes a depending rail 22 (FIGS. 15a and 39b) formed as an integral part of the shelf. The auxiliary rail 320 is snapped into the shelf rail 22 and extends continuously along the full length of a shelf 24 for receiving both the display tags 20 and the branch loop.

The auxiliary rail $320^1$ as shown in FIG. 15b is designed so that the display tags 20 and a conductor C that forms the branch loop may be snapped into place on the shelf rail 22. A curved rib 323a extends across a major portion of the space behind the upper flange 323 so as to form a spring element that can be deflected by pressing a tag upwardly behind the flange 323; the rib 323a then exerts a biasing pressure on the inserted tag to hold it in place on the auxiliary rail 320. A hollow core 320b on the rear side of the auxiliary rail $320^1$ snaps into the open recess formed on the front of a standard shelf rail 22 to hold the auxiliary rail $320^1$ in place on the shelf rail 22. The rail $320^1$ of FIG. 15b also has modified channels 321, 322 for accommodating a flat conductor C. An additional clip-like element $327^1$ may hold a paper tag. Further details of features of the rail 320 are shown in FIGS. $15b,^1$ and $15b,^2$. Elements 326a, 326b, 326c, and 326d are co-extruded.

Figure 15C:
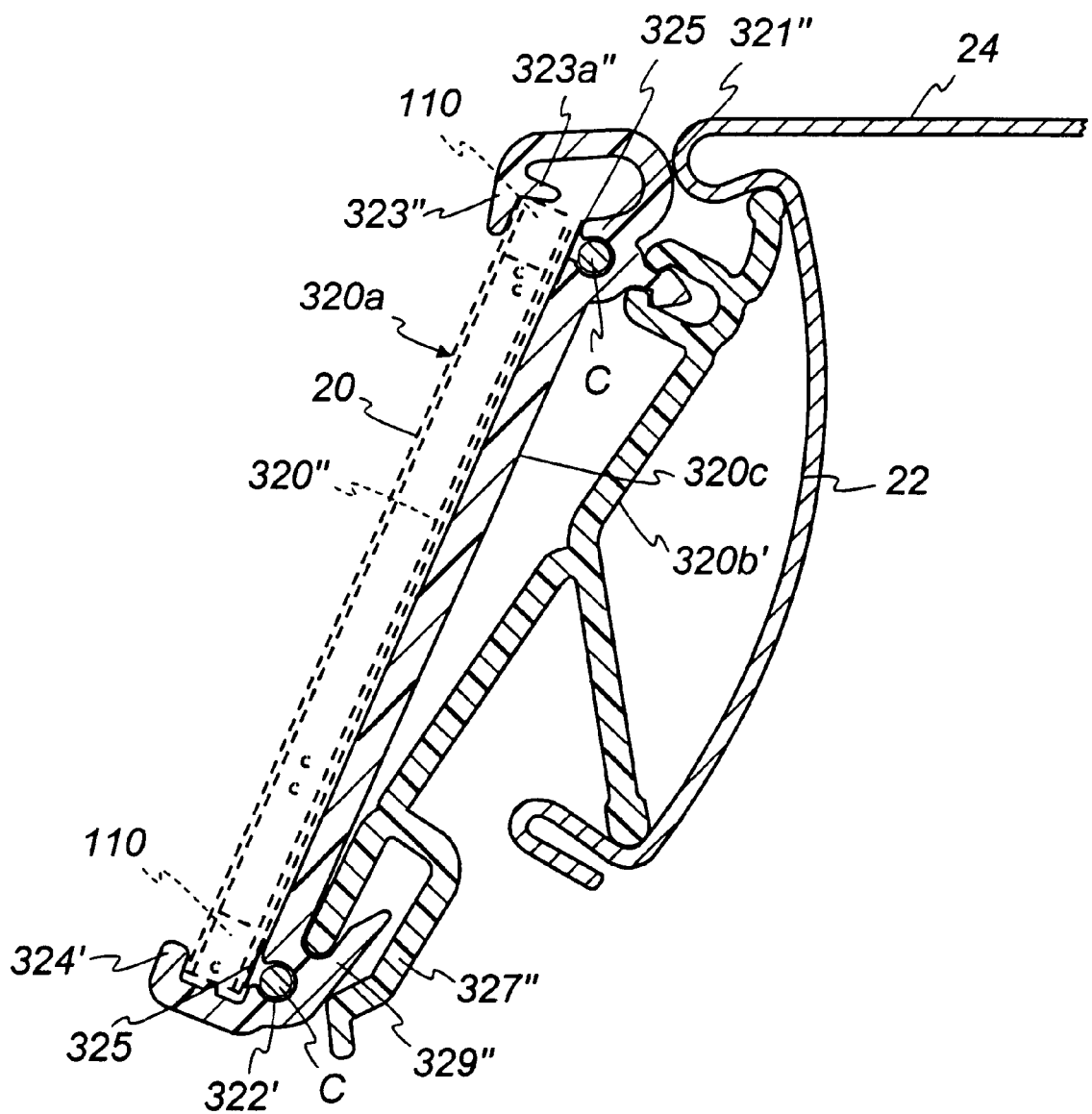
FIG. 15c is a side sectional view of a two-piece alternate embodiment of an auxiliary rail.

FIG. 15c illustrates a two-piece auxiliary rail 320", which has a first piece $320b^1$ which snap-engages the shelf rail 22 and a second piece 320c which snaps into the first piece $320b^1$. It will be noted that the channels $321^1$, $322^1$ for the shelf conductor C are formed in the front surface of the piece 320c, thereby placing the conductor C closer to the portions of coil 110 at the top and bottom of tag 20 for enhanced coupling. Multiple faces can be attached to the front surface. Elements 321a and 321b are co-extruded.

Figure 15D:
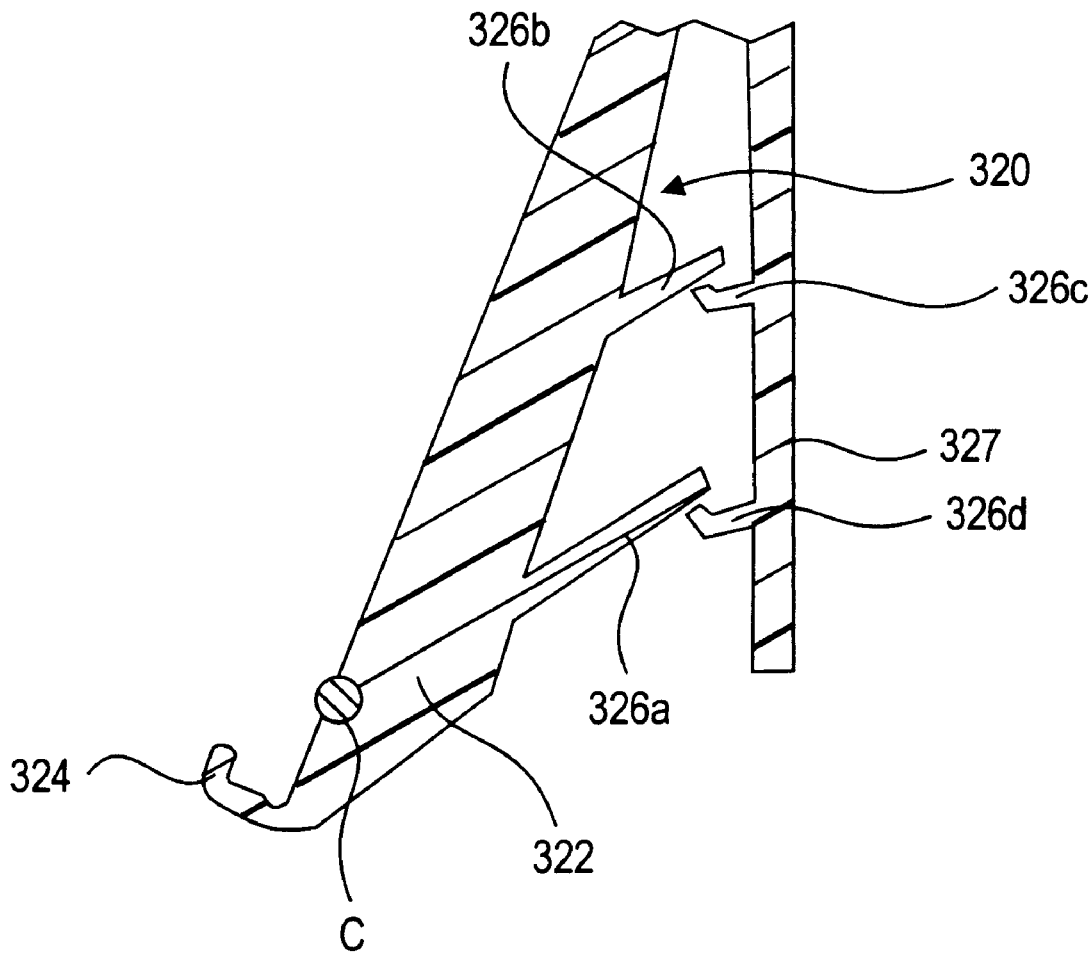
FIG. 15d illustrates a portion of another auxiliary rail.

FIG. 15d illustrates yet another embodiment of the rail systems. In this embodiment, the channel holding the conductor C has been moved to the front of the rail. All other parts have been described previously with the other embodiments.

COMPONENT CONNECTIONS

Figure 37:
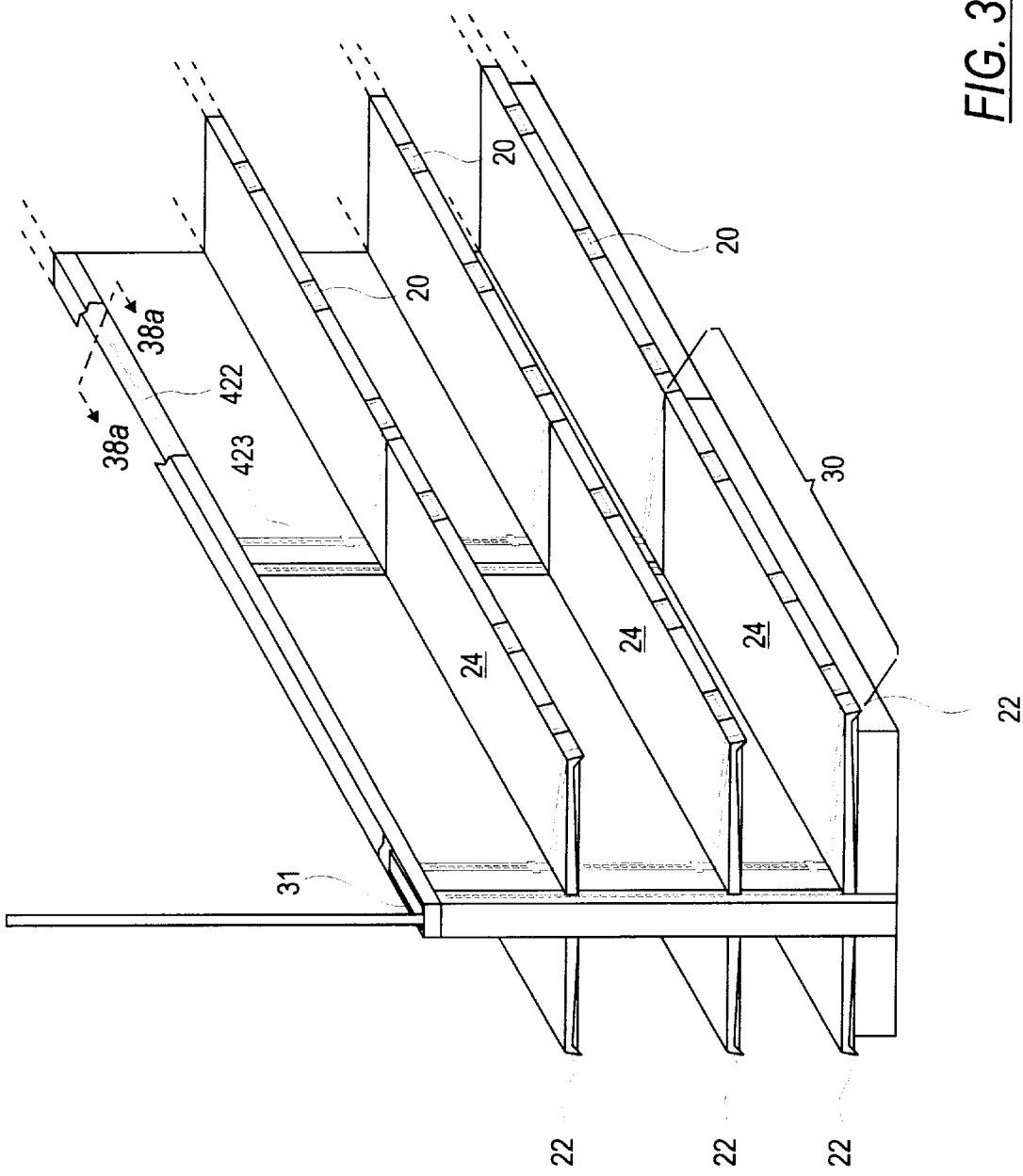
FIG. 37 is an enlarged view of a portion of FIG. 1.

FIG. 37 depicts part of a retail store including a product information display system arranged according to one embodiment of the present invention. Each area controller 31 supplies both power and control signals to its display tags 20 via a single main distribution loop and numerous branch distribution loops. As described above, the area controller 31 also monitors the display tags and receives signals generated by the tags, such as service requests and acknowledgment signals. Each area controller 31 is contained in an enclosed housing which is mounted on one of the gondolas 30 on which the shelves are mounted. Although the gondolas 30 in FIG. 37 are illustrated with only three shelves on each side, a gondola typically has about twelve shelves (six on each side) (see e.g., FIG. 39a), with an average of about six tags per shelf, or 72 tags per gondola. A single area controller typically services about 12 to 15 gondolas.

Connectors—System Controller to TACs

Figure 38B:
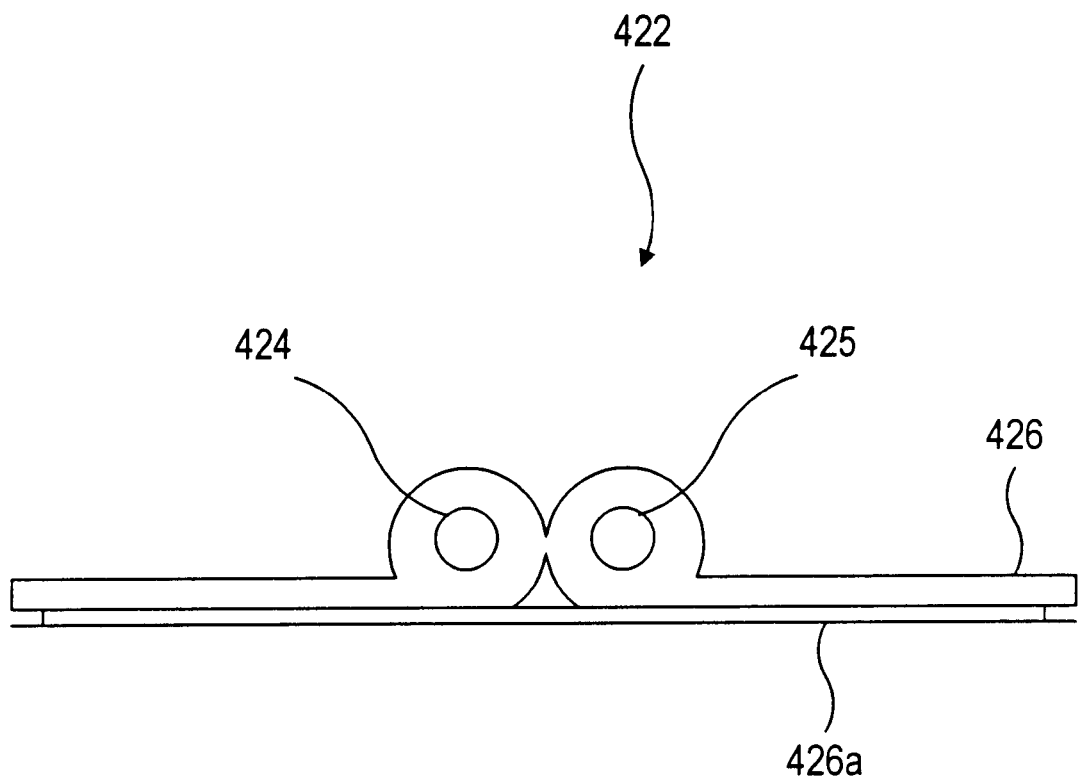
FIG. 38b is an enlarged section of an alternative embodiment of a stringer taken generally along line 38a—38a in FIG. 37.
Figure 38C:
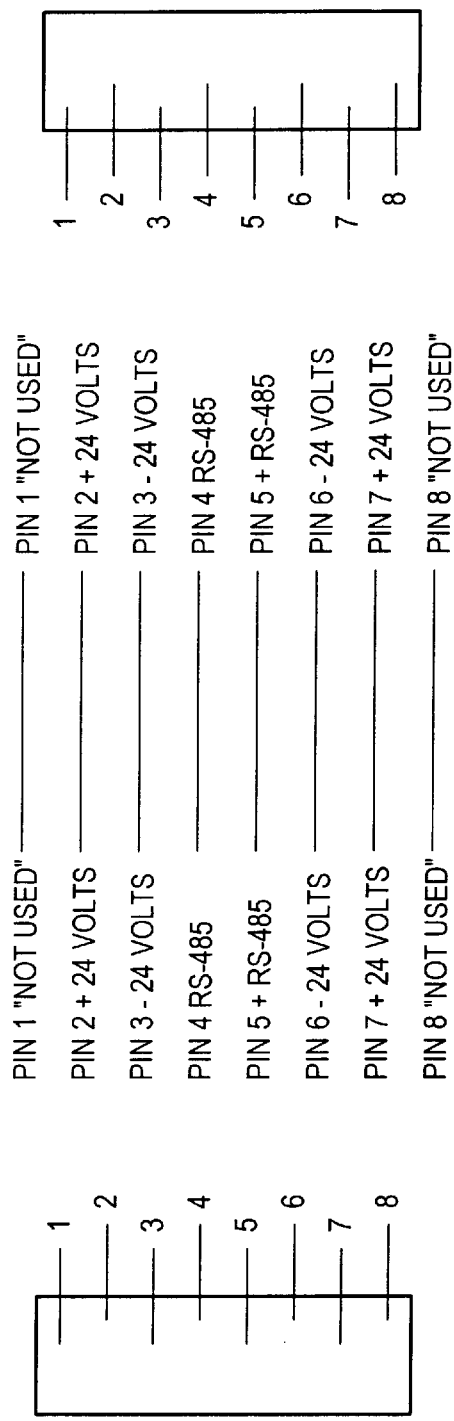
FIG. 38c shows cable and pin connections used to connect system controller to an area controller.

FIG. 38c shows cable and pin connections used to connect system controller 28 to an area controller 31. As shown in FIG. 38c, the cable may comprise an eight (8) conductor telephone type cable for transferring power and data signals to/from the system controller 28. The cable includes six (6) power lines, namely three (3) lines at +24 volts and three (3) lines at −24 volts. The cable also includes three (3) RS-485 data lines provided at positive and negative voltage. Two lines of the cable are not presently used. The system controller 28 end of the cable is connected through an RJ-11 connector to the output of a power and data distribution circuit 64, and the area controller 31 end of the cable is connected through an RJ-11 connector to the area controller 31. The RJ-11 connectors may be commercially available parts, such as AMP Part No. 5-554739-3 available from. Alternately, other connectors may be used.

Figure 38D:
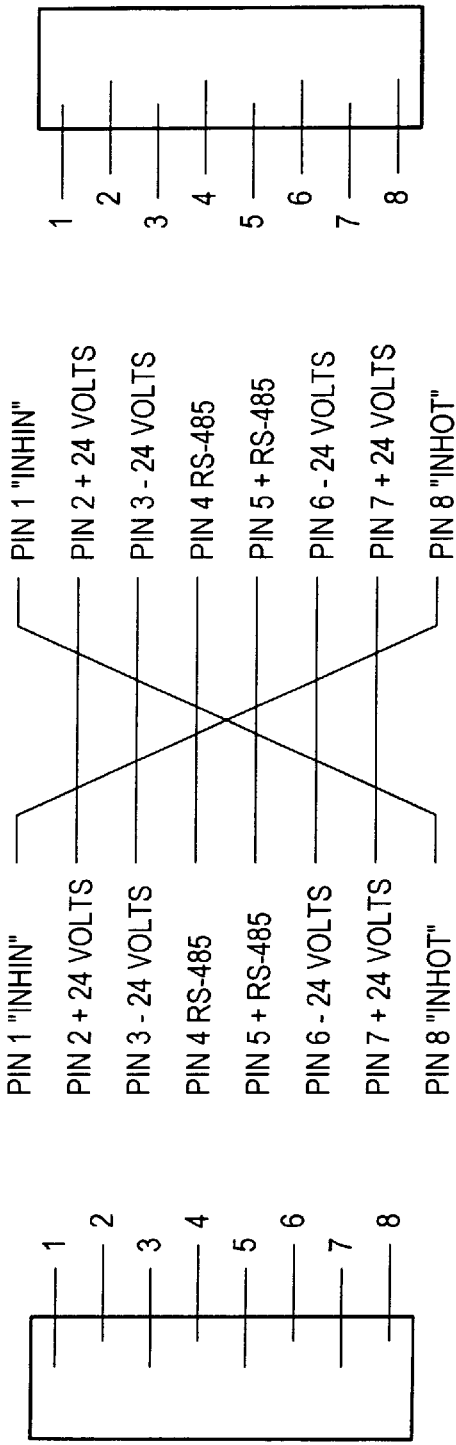
FIG. 38d shows cable and pin connections used to connect two area controllers.

FIG. 38d shows cable and pin connections used to connect two area controllers 31. As shown in FIG. 38d, the cable is virtually identical to the cable of FIG. 38c, with the exception that pins 1 and 8 are crossed. The pins are crossed for master/slave or primary/back-up control of the area controllers 31, so that only one of the two area controllers is active at any given time. These pins provide the Inhibit Out (INHOT) signal from one area controller 31 to the Inhibit In (INHIN) signal on the next area controller 31 to disable the back-up area controller 31. As with the cable of FIG. 38c, the end connectors may be comprised of the same commercially available part.

Connectors—TACs to Junction Boxes

The main distribution loop connected to each area controller 31 is formed by a series arrangement of three standard modules, a first module called the "transfer module" or "stringer" 422, a second module called the "coupling module" or "riser" 423, and a third module called a shelf and rail coupling module 4300.

FIG. 38a illustrates a cross-sectional view of the first or transfer module 422 also known as a stringer according to one embodiment. This stringer 422 is simply a pair of parallel wires 424 and 425 encased in a dielectric strip 426. The dielectric 426 has a typical thickness of about 0.010–0.015 inches. Ridges 425a on one of the wires 425 aid in distinguishing the two wires to help ensure the correct polarization during installation. The wires 424 and 425 are positioned close to each other in an effort to increase field cancellation which reduces inductance, and consequently reduces the impedance of the system. To facilitate the separation of wires 424 and 425 from each other, the portion 422a joining the two wires is made to be thin, for example, 0.012 inches thick, T. This "ripcord" construction facilitates easy separation of the conductors during installation and the joining of the wires to connectors. The wires 424 and 425 are 14 AWG copper wire having a diameter, D, of 0.064 inches.

FIG. 38b illustrates another embodiment of the stringer 422 wherein the wires 424 and 425 are 14 gauge solid copper wire covered and joined together by a dielectric 426. The dielectric surrounding each wire preferably has a thickness of about 0.015 to 0.020 inch to protect the system from electrostatic discharges. The dielectric provides mechanical protection and yet is thin so that the fields the wires 424 and 425 will cancel with each other. If desired, the flat side of the strip 426 may be coated with an adhesive 426a, protected until installation by a releasable backing, to facilitate application of the strip to the top of a gondola 30. The dielectric strip 426 containing the two wires 424, 425 can be manufactured in large quantities at a low cost by a conventional extrusion process. The distance between the wires 424, 425 is preferably minimized to reduce inductance. For example, when the wire is 14 AWG multi-strand wire, the center-to-center spacing of the wires may be 0.094 inch.

Connectors—Stringer to Riser

Figure 41A:
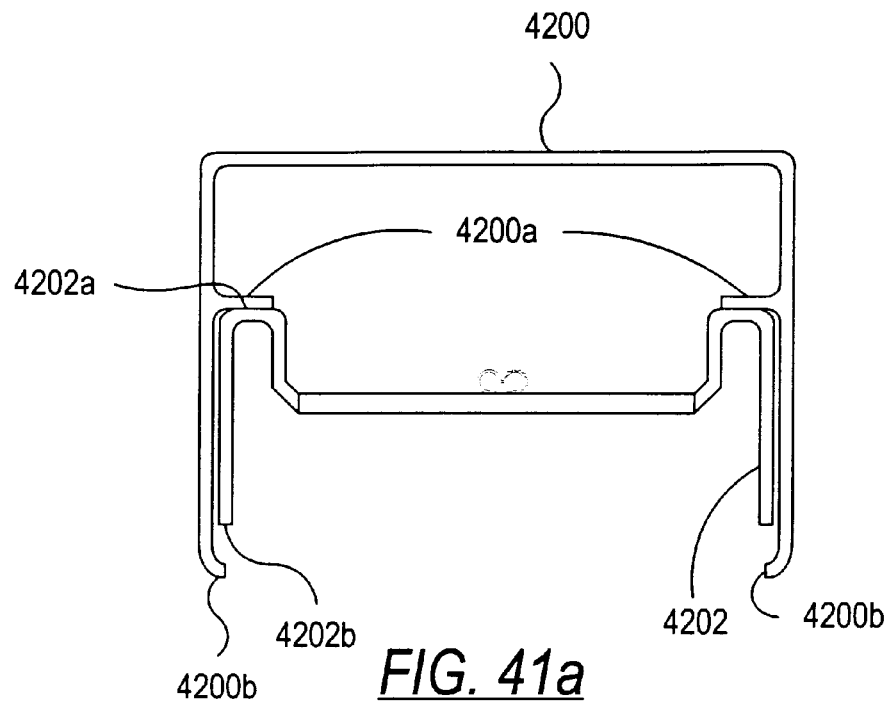
FIGS. 41a and 41b are two sectional views of portions of a gondola cover.
Figure 41B:
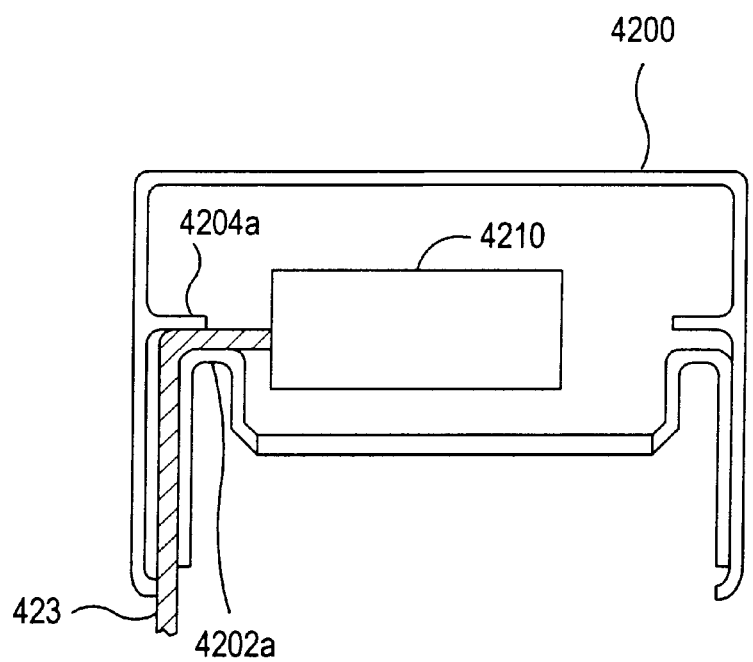

One embodiment for connecting the stringer 422 and the riser 423 can be understood by referring to FIGS. 41a–41j. FIG. 41a shows an end view of a typical top rail 4202 of a gondola and is typically made of steel. The top rail 4202 terminates with flanges 4202b. A gondola cover 4200 has a pair of flanges 4200a that are positioned in opposition to ridges 4202a of the top gondola rail 4202. The gondola cover 4200 also comprises latch flanges 4200b designed to snap over the edges 4202b on the top gondola rail thereby securing the gondola cover 4200 to the top of the gondola. The gondola cover 4200 is constructed from a non-conductive material such as a plastic that provides a degree of flexibility and resiliency that permits it to snap over and engage the edges along the top of the gondola and over the riser 423 as seen in FIG. 41b.

Figure 41C:
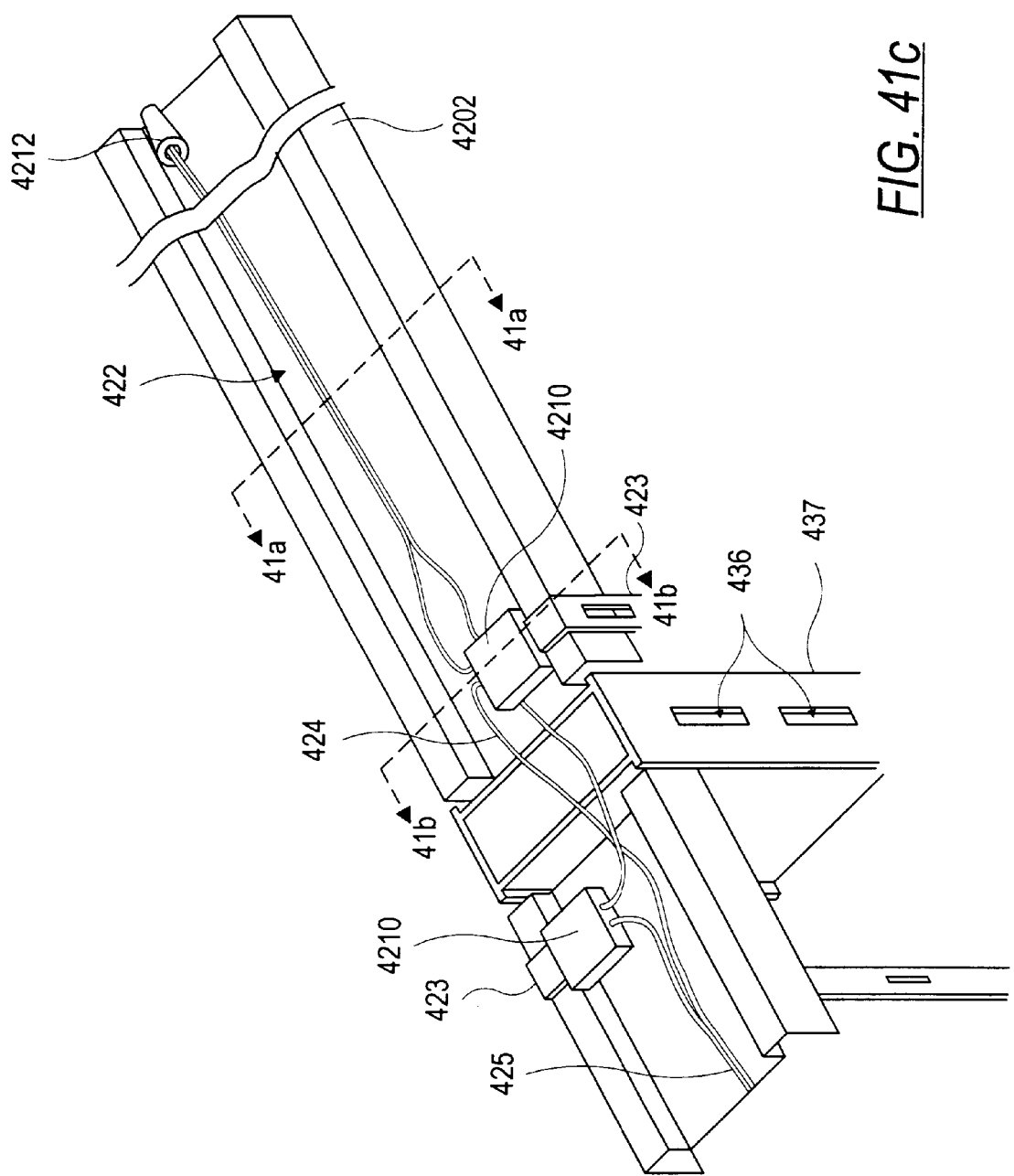
FIG. 41c is a perspective view of the top portion of a gondola illustrating one embodiment of the connection of a stringer to a riser.
Figure 41D:
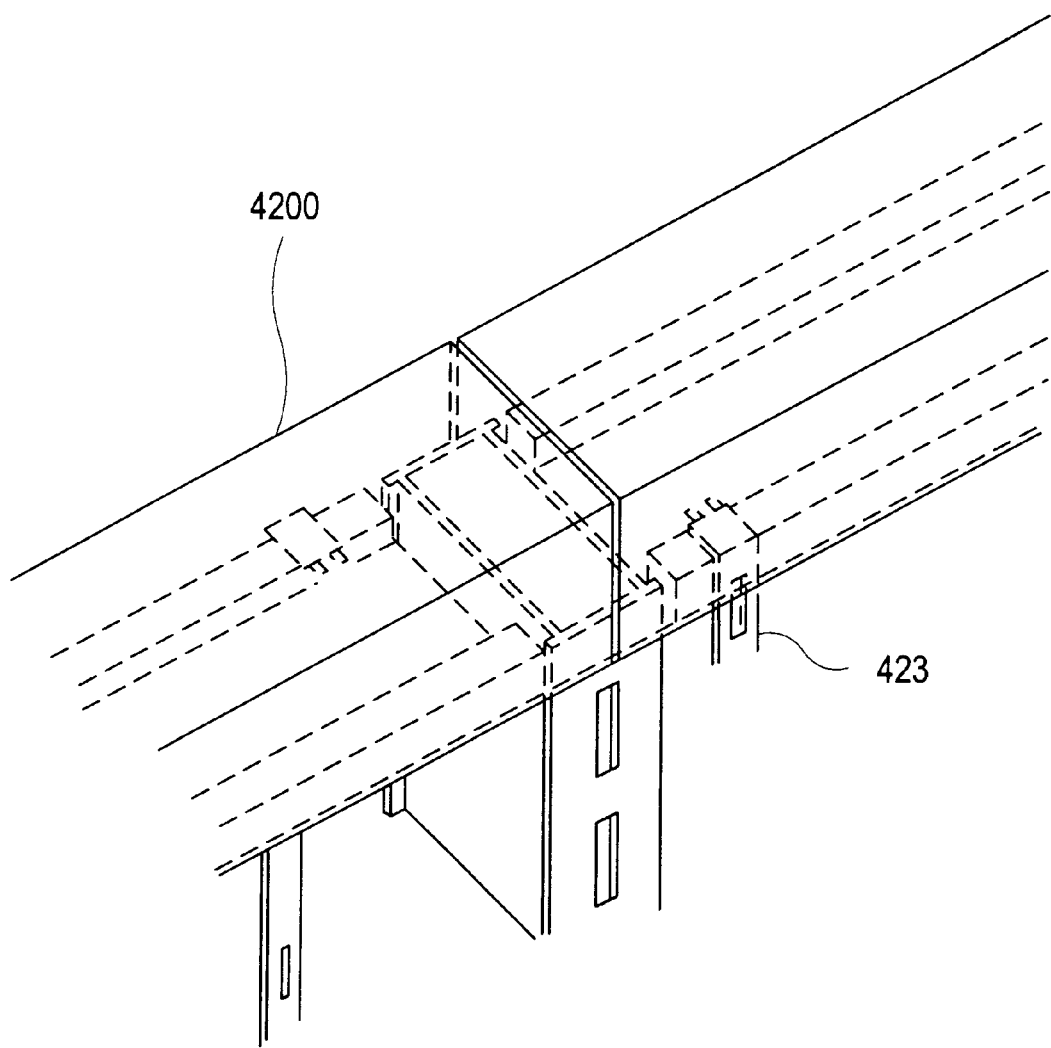
FIG. 41d is a perspective view of a gondola cover enclosing the top portion of a riser.
Figure 41I:
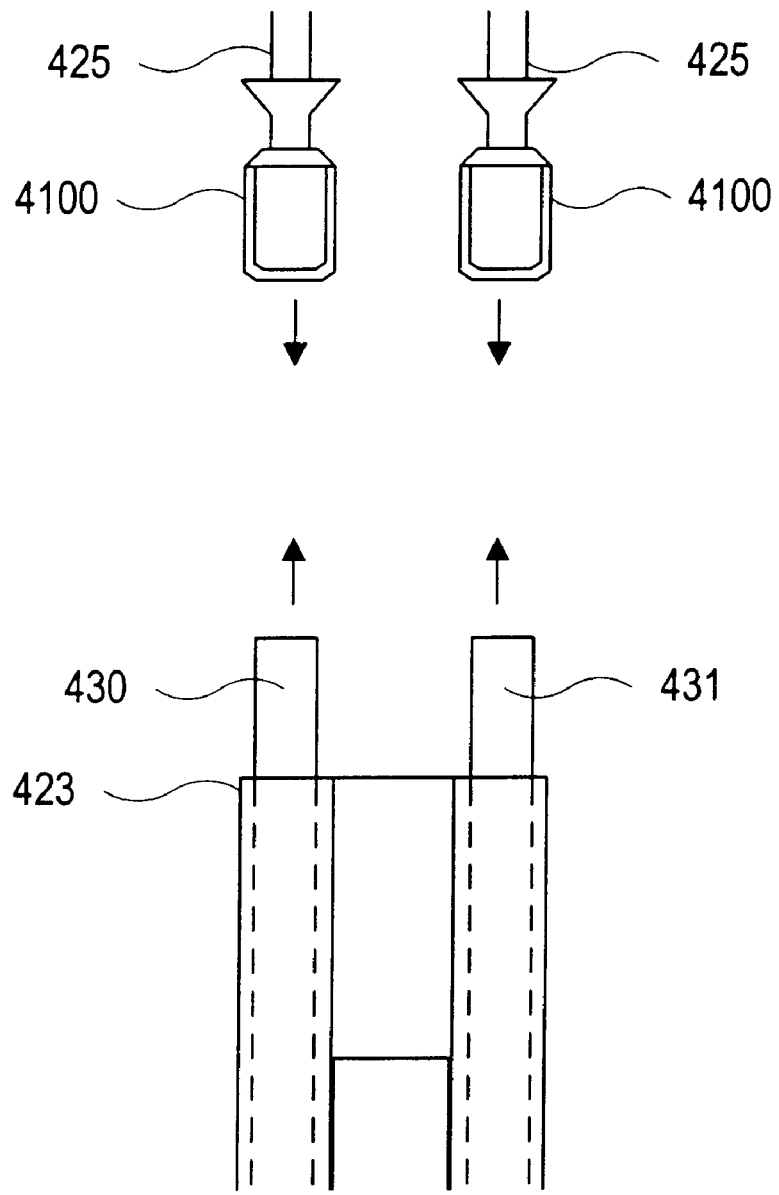
FIG. 41i is a perspective view of a connector box.

FIG. 41c illustrates the coupling of the riser and the stringer wires via a connector box 4210. A single stringer 422 runs along top rail 4202 and the two stringer wires 424 and 425 are electrically coupled at the end of a row of gondolas by stripping away the dielectric from each and fastening them together using a wire nut 4212. The last user 423 in an aisle may alternatively be used to make this end connection. One stringer wire 425 is used to connect all the risers on one side of the gondola via connector boxes 4210 and the other stringer wire 424 is used to connect all the risers on the other side of the gondola via connector boxes 4210. As seen in FIG. 41c, the risers 423 and the connector boxes 4210 are arranged so that they are positioned near the same edge of a gondola when looking at each side of a gondola. As shown in FIG. 41c, the risers are positioned near the left side of each gondola face. Alternatively, the risers could be positioned near the right side of each gondola face. By arranging the risers in the same position when viewed head on, the number of parts in the distribution system can be reduced. This will become more apparent after the shelf and rail distribution loops are discussed in more detail in connection with FIGS. 43a–43d. Briefly, such an arrangement permits a single shelf and rail distribution loop be used on all gondola facings, whether they all be right-handed or left-handed loops. FIG. 41d is similar to that of FIG. 41c illustrating, however, the gondola cover 4200 in place.

The connector boxes 4210 are illustrated in more detail in FIGS. 41e and 41f. FIG. 41e is a perspective view and FIG. 41f is a side cross-sectional view, respectively, of a connector box 4210. As seen in FIG. 41f, a conductor and springs 4210c are employed to electrically connect a stringer wire to a conductor of a riser 423. The conductor 4210b and springs 4210c are maintained within a plastic polyamide molding 4210a. One example of such a connector box is part number 810/02/NZ available from Weco of Kirkland, Quebec, Canada.

Referring to FIGS. 41g and 41h, a side view and a top view of the connection of a riser 423 and a stringer 422 using a connector box 4210 are shown. A portion, about ¼ inch, of the dielectric around one of the conductors 424, 425 of the stringer 422 is stripped away. For example, the conductor 425 is cut exposing ends 425a and 425b and the dielectric is striped away from the ends. The ends 425a and 425b are then inserted into holes in one end of the connector box 4210 and aligned holes in the conductor 4210b. The ends 425a and 425b push past the springs 4210c which then resist their removal. The conductors 430 and 431 are inserted into similar holes in the other end of the connector box 4210 and of conductor 4210b and past similar springs 4210c thereby coupling ends 425a and 425b to the riser 423, that is, the riser 423 is coupled in series with conductors 425 of the stringer 422. The connector box 4210 is of the locking type in the sense that once a conductor is inserted into the connector box, the wire is locked in and can not be pulled out. Such a locking system improves the reliability of the system.

FIG. 41j illustrates the coupling of a riser 423 in series with a stringer wire 425 using quick connect connectors 4100. The quick connect connectors 4100 may be, for example, Ultra-Fast Fully Insulated FASTON Receptacles available from AMP Inc. The quick connect connectors 4100 are attached to the ends of stringer wire 425. The conductors 430 and 431 of the riser and then inserted into the quick connect connectors 4100. In this manner, a riser 423 and a stringer wire 425 may be connected in series without the use of a connector box 4210.

Figure 42A:
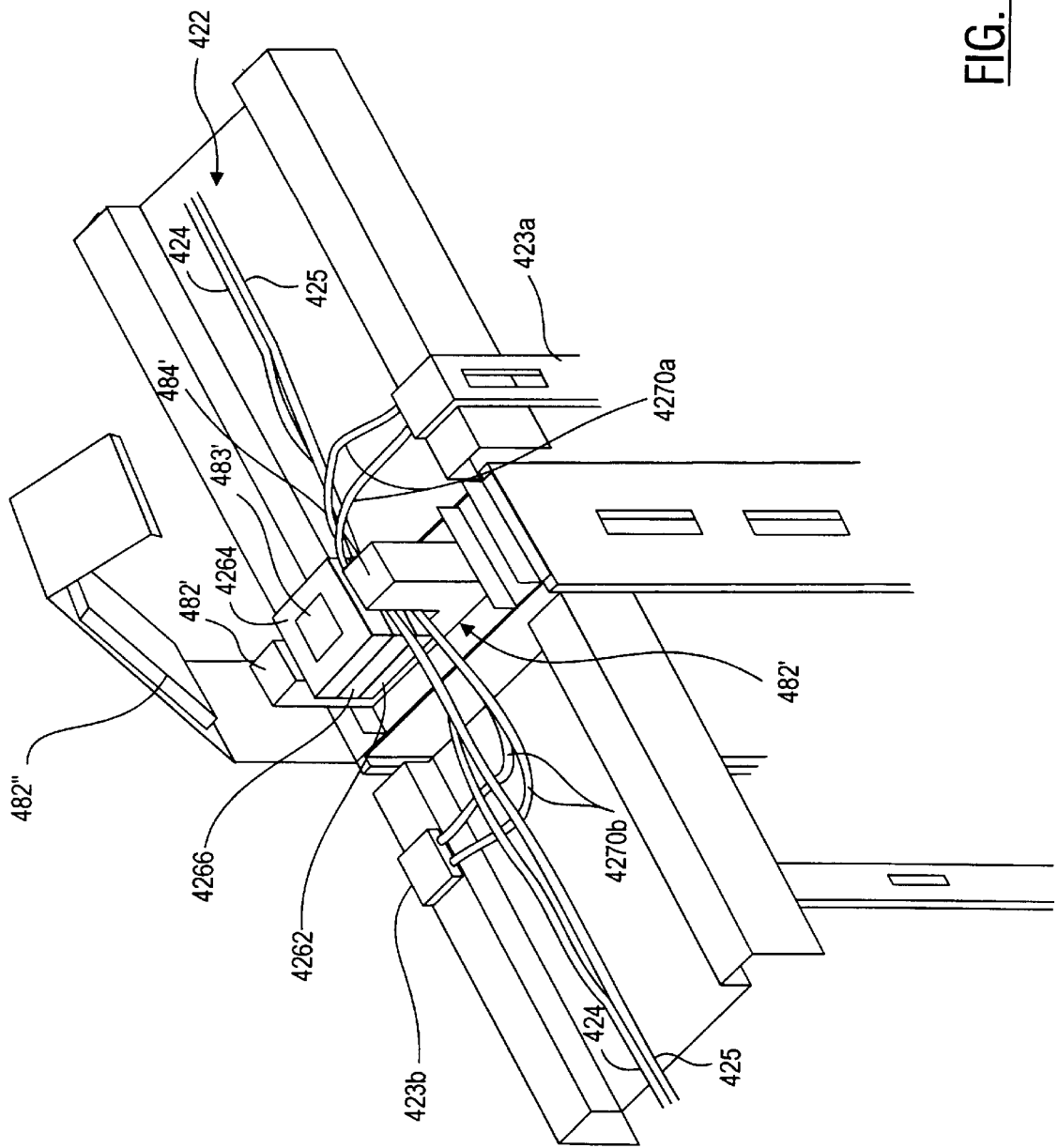
FIG. 42a is a perspective view of an inductive coupling of risers to a stringer.

FIG. 42a is a perspective view of an inductive coupling of risers 423a,b to a stringer 422. In this embodiment, the conductors 430,431 of risers 423a,b are electrically connected to each other by respective wires 4270a,b. Wire 4270a connects conductors 430a,431a (not visible in FIG. 42a) of riser 423a and wire 4270b connects conductors 430b,431b (not visible in FIG. 42a) of riser 423b. Wire 4270a is looped in a bobbin 4262 (FIG. 42b) and wire 4270b is looped in bobbin 4264 (FIG. 42c). A third bobbin 4266 (FIG. 42d) accommodates wires 424,425 of stringer 422. As may be observed by comparing FIGS. 42b, 42c and 42d, bobbins 4262, 4264 and 4266 are substantially similar in structure, each including a generally rectangular hollow inner core ($4262_i$, $4264_i$ and $4266_i$, respectively) and a generally rectangular outer core ($4262_o$, $4264_o$ and $4266_o$, respectively). Gaps 4263, 4265 and 4267 are provided in respective outer cores $4262_o$, $4264_o$ and $4266_o$ for receiving respective riser wires 4270a,b or stringer wires 424,425.

Figure 42B:
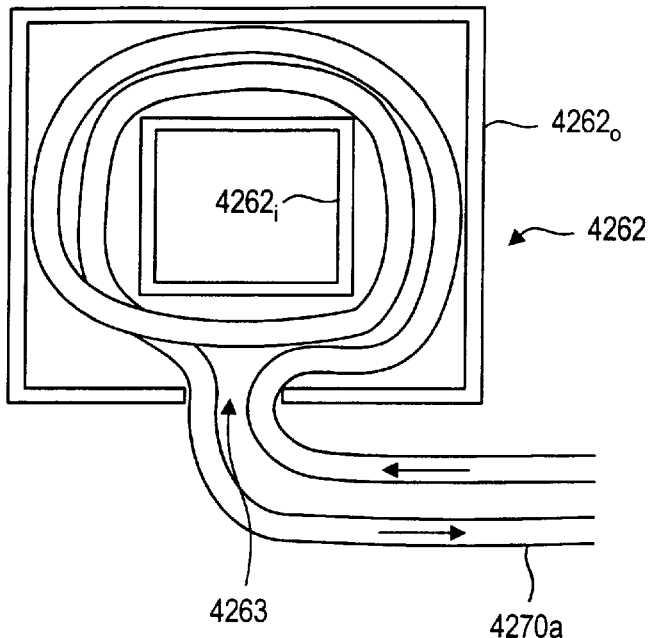
FIGS. 42b and 42c are top cross-sectional views of stringer wires within a bobbin.
Figure 42C:
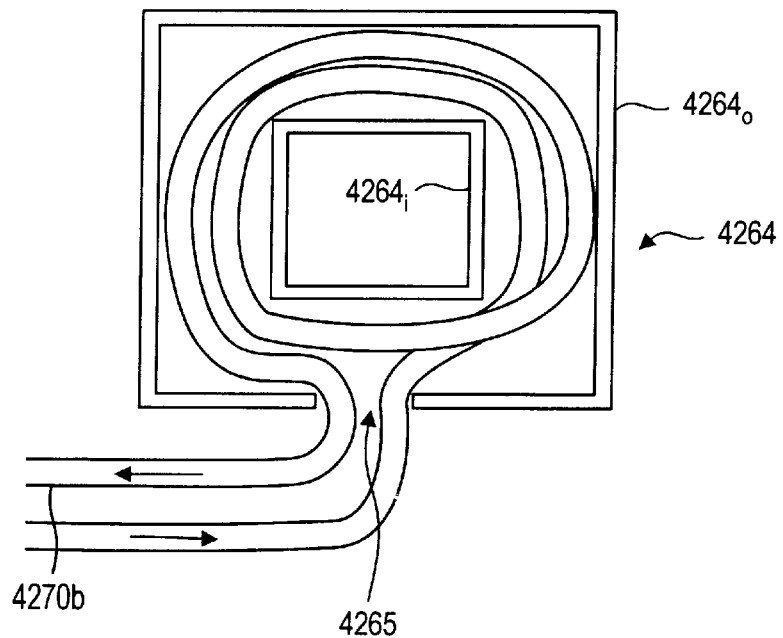
Figure 42D:
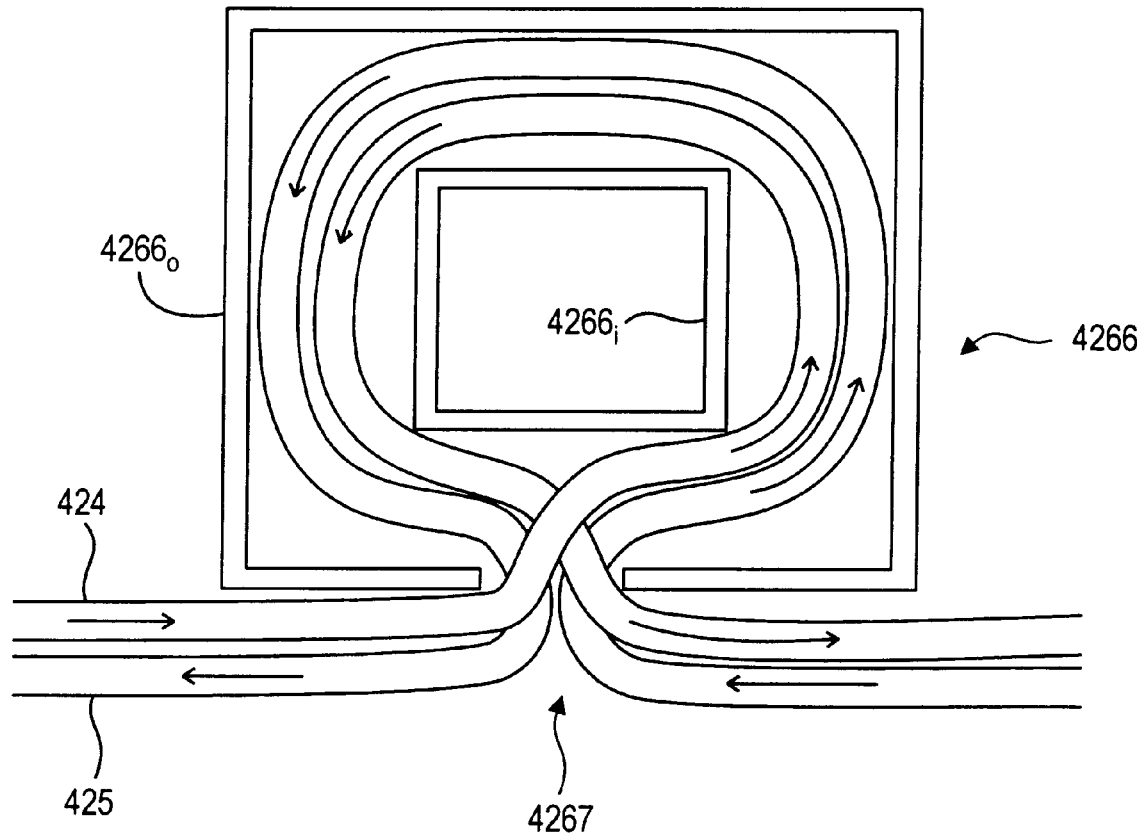
FIG. 42d is a top cross-sectional view of stringer wires within a bobbin.

In FIGS. 42b and 42c, there is depicted a single loop of wires 4270a,b within respective bobbins 4262, 4264. In FIG. 42d, there is depicted two current loops, consisting of wires 424 and 425 looped within bobbin 4266 in a manner such that the current flowing within each wire is flowing in the same direction within the bobbin 4266, e.g., counter-clockwise in the illustrated embodiment. It will be appreciated, however, that the number and manner of looping wires in FIGS. 42b, 42c and 42d is exemplary only. The number of loops of wires 4270a,b or 424,425 within respective bobbins 4262, 4264 or 4266 may be varied to adjust the inductive coupling ratios of risers 423a,b to stringer 422, as will be described hereinafter.

Returning now to FIG. 42a, bobbins 4262, 4264 and 4266 are stacked together and inserted within an "E" shaped portion 482' of a two-piece high-perm magnetic core, e.g., a 5000 perm ferrite core. A second, flat piece (not shown in FIG. 42a) of the magnetic core is then positioned above the "E" shaped portion 482', in generally the same manner described in relation to FIGS. 44a and 44b. "E" shaped portion 482' includes a middle arm 483' and two outer arms 482',484'. Bobbins 4262, 4264 and 4266 are stacked together, in any order, and inserted within the "E" shaped portion 482' such that they fit around the middle arm 483' and between the two outer arms 482',484'.

When electrical current is carried in stringer wires 424, 425 (in bobbin 4266), corresponding currents (and associated voltages) are induced in riser wires 4270a,b (in bobbins 4262, 4264) by inductive coupling. The currents and voltages induced in the respective riser wires 4270a,b is dependent both on the number of turns of riser wires 4270a,b in bobbins 4262, 4264 and on the number of turns of stringer wires 424,425 in bobbin 4266. More specifically, the magnitude of induced current in respective riser wires 4270a,b (in amps, A) will be generally equal to the magnitude of stringer current times the number of stringer turns in bobbin 4266 (in amps-turns, AT) divided by the number of turns (T) of riser wires 4270a,b in respective bobbins 4262,4264. Similarly, the magnitude of induced voltage in riser wires 4270a,b (in volts, V) will be generally equal to the magnitude of stringer voltage times the magnitude of stringer current (in volts-amps, VA) divided by the magnitude of induced current in the respective riser wires 4270a,b (in amps, A). For example, if stringer 422 has an induced voltage of 30 volts and a current of 3 amps, carried around 2 turns as shown in FIG. 42d, then it would have a amps-turns value of 6 AT and a volts-amps value of 90 VA. Assuming that riser wires 4270a,b are looped once (e.g., 1 T) within respective bobbins 4262, 4264, then they will carry an induced current of 6 amps (6 AT/1 T) and an induced voltage of 15 V (90 VA/6 A).

One of the advantageous features of the inductive coupling approach heretofore described is that it permits an operator, installer, or technician to adjust the ratios of current and voltage between the stringer 422 and risers 423a,b with relative ease, by adjusting the turns ratios between the wires in the respective bobbins 4262, 4264 and 4266. For example, an operator may desire to adjust the current and voltage in the risers without having to adjust the voltage or current in the stringer wire. Such an approach can be beneficial in achieving compliance with UL's SELV standards. For example, for a stringer voltage of 30 volts and current of 3 amps, carried around 2 turns, as in the example above, the operator may change the number of loops within riser bobbin 4262 or 4264 from one to two, in which case the riser wires 4270a,b will carry an induced current of 3 amps (6 AT/2 T) and an induced voltage of 30 V (90 VA/3 A). Similarly, if riser bobbins 4262 or 4264 are provided with three current loops, the induced current will be 2 amps (6 AT/3 T) and the induced voltage will be 45 volts (90 VA /2 A). It will be appreciated that the number of turns in riser bobbins 4262 and 4264 may differ from each other, if it is desired to induce different voltages and currents in the respective riser wires 4270a,b.

Connectors—Junction Boxes to Floor

Figure 39A:
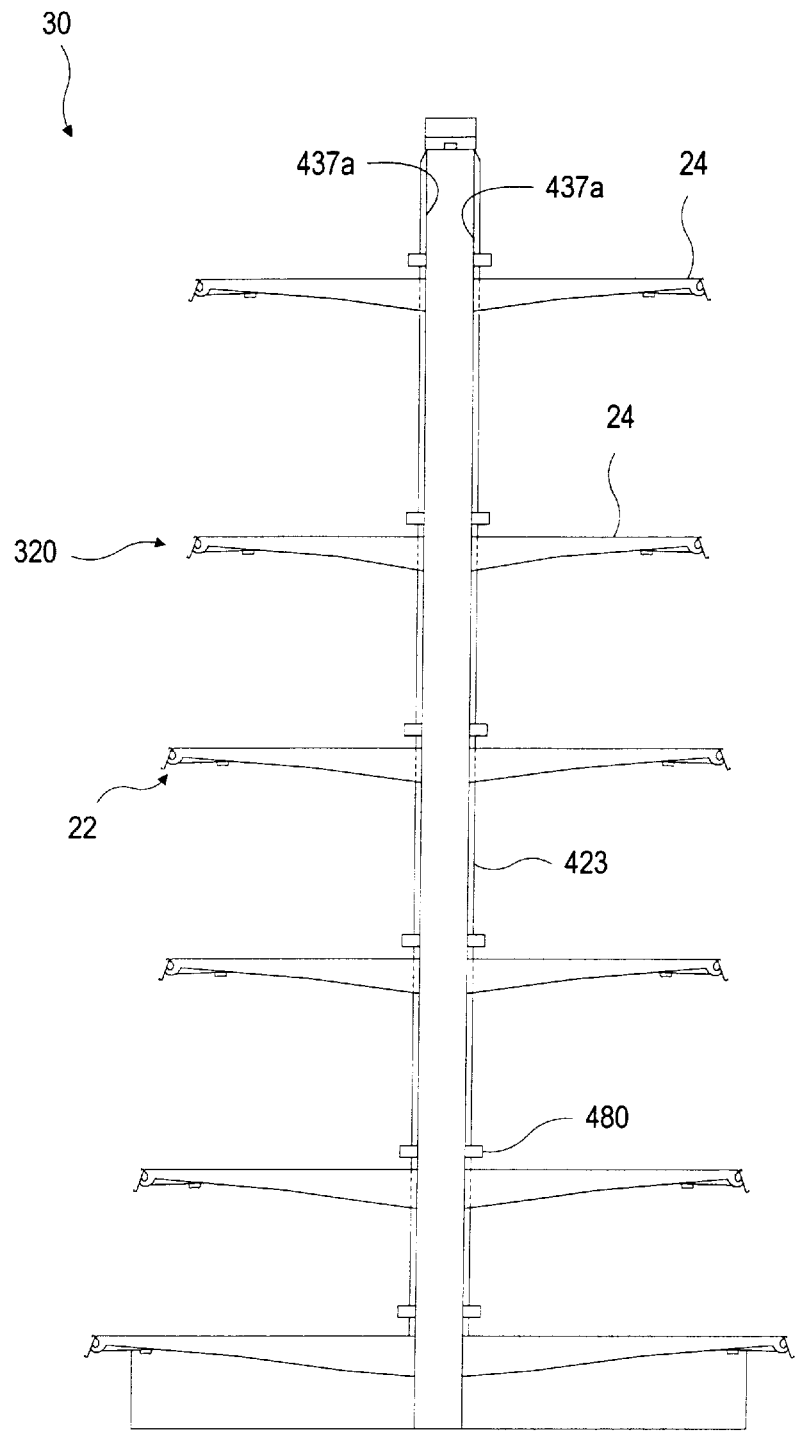
FIG. 39a is an enlarged end view of one of the gondolas illustrated in FIGS. 1 and 37.
Figure 39B:
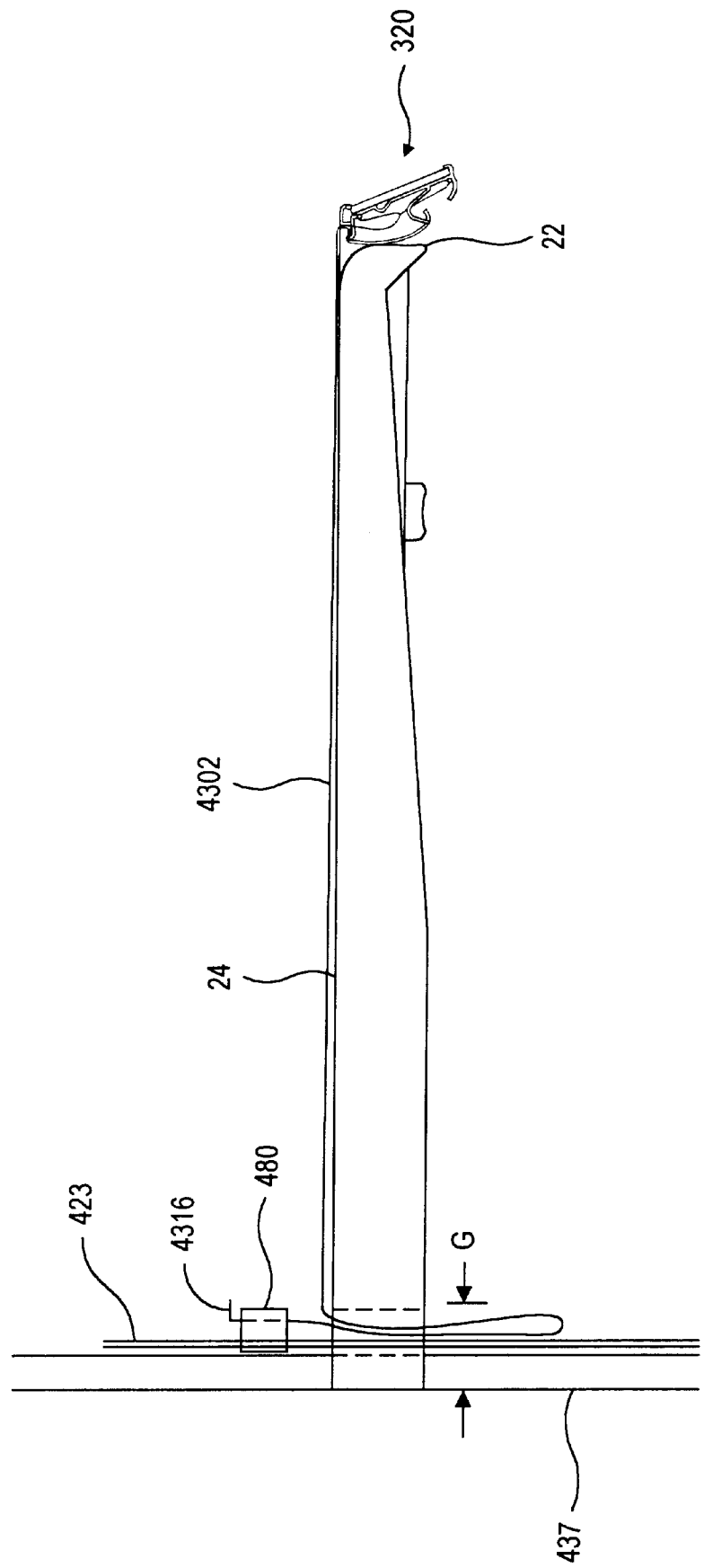
FIG. 39b is an enlarged end elevation of one of the shelves in the system of FIG. 1.

FIG. 39a is an enlarged end elevation of one of the gondolas like those illustrated in FIGS. 1 and 37 while FIG. 39b is an enlarged end elevation of one of the shelves.

Turning to FIG. 39a the riser 423 used to form the main distribution loop extends vertically along one end of each side of the gondola. A single riser 423 is used to distribute power and control signals to all the shelves on one side of a section of a gondola which is typically 4 feet wide. The risers 423 run behind the shelves 24 and in front of the back of the gondola 437a which is typically perforated board.

Shelf and Rail Distribution Loop

Referring to FIGS. 43a and 43b, a shelf and rail distribution loop 4300 is illustrated. Loop 4300 comprises a shelf conductor 4302 and a rail conductor C. The conductor C is held in the auxiliary rail 320 as described above in connection with FIG. 15a'. The shelf conductor 4302 is designed to be run across the top of a shelf of a gondola from the front of the shelf to the back of the gondola to the vicinity where the riser is located.

Figure 43C:
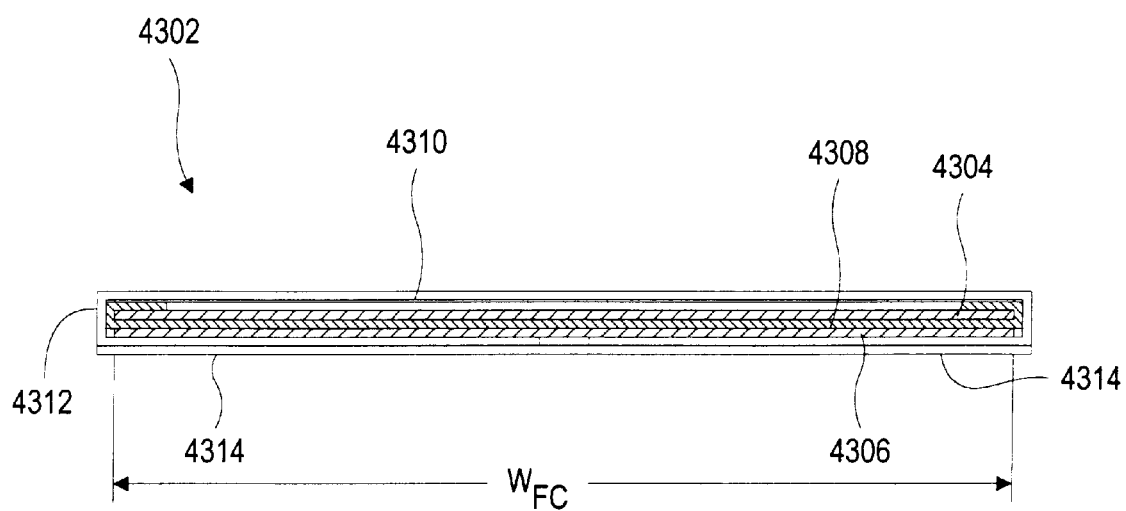

A cross-section of the shelf conductor 4302 is shown in FIG. 43c. The shelf conductor 4302 comprises a pair of copper foil flat conductors 4304 and 4306 measuring about 0.004 inches thick and having a width, $W_{FC}$, of about 0.4 inches. The conductors 4304 and 4306 are insulated from each other using vinyl tape 4308 having a thickness of about four (4) to five (5) mils wrapped around the top conductor 4304 as shown in FIG. 43c. A thin sheet of polyester film 4310 measuring 0.001 inches thick is applied to the top of the tape 4308. The entire assembly is then wrapped with another layer of vinyl tape 4312. The film 4310 assists in separating the tape 4312 from the rest of the conductor assembly so that electrical connections can be made. The vinyl tape 4308 and 4312 may be, for example, vinyl ape #471 available from 3M of Minneapolis, Minn. or an equivalent. A transfer adhesive may then be applied to the bottom portion 4314 of the tape 4312 to aid in securing the shelf conductor 4302 to the top of a shelf 24 as shown in FIG. 39b.

The color of the vinyl tape is preferably chosen to match the color of the gondola shelves so that the shelf conductor 4302 blends in with the shelf, does not distract shoppers from displays or products, and is aesthetically pleasing. Additionally the color of the auxiliary rails, gondola covers 4200, risers 423, and other component are preferably selected to be aesthetically pleasing and non-distracting.

Referring to FIG. 43a, one end of the shelf conductor 4302 is electrically and mechanical coupled to a stamped "C" shaped terminal 4316. The "C" terminal 4316 electrically connects the two flat conductors 4304 and 4306 thereby completing one end of the shelf and rail distribution loop. This "C" terminal 4316 is then sprayed with a dielectric material to electrically insulate it.

As seen in FIG. 39b, the shelf conductor 4302 is magnetically coupled to the riser 423 by a magnetic coupler 480 positioned in the vicinity of the "C" terminal 4316. The flat structure of the "C" terminal 4316 and the flat structure of the riser conductors 430 and 431 enhances the magnetic coupling between the riser loop and the shelf and rail loop. This arrangement employing the magnetic coupler 480 thereby inductively couples the shelf and rail distribution loop 4300 to the riser 423.

Returning to FIG. 43a, at other end of the shelf conductor 4302, the flat conductors 4304 and 4306 are electrically coupled to opposite ends of the rail conductor C by removing appropriate portions of the vinyl tape 4308 and 4312 and film 4310 of the shelf conductor 4302 and the dielectric covering of conductor C so that one end $C_{E1}$ of the conductor C may be soldered to one of the flat conductors 4304 and the other end $C_{E2}$ of the conductor C may be soldered the other flat conductor 4306.

Figure 43D:
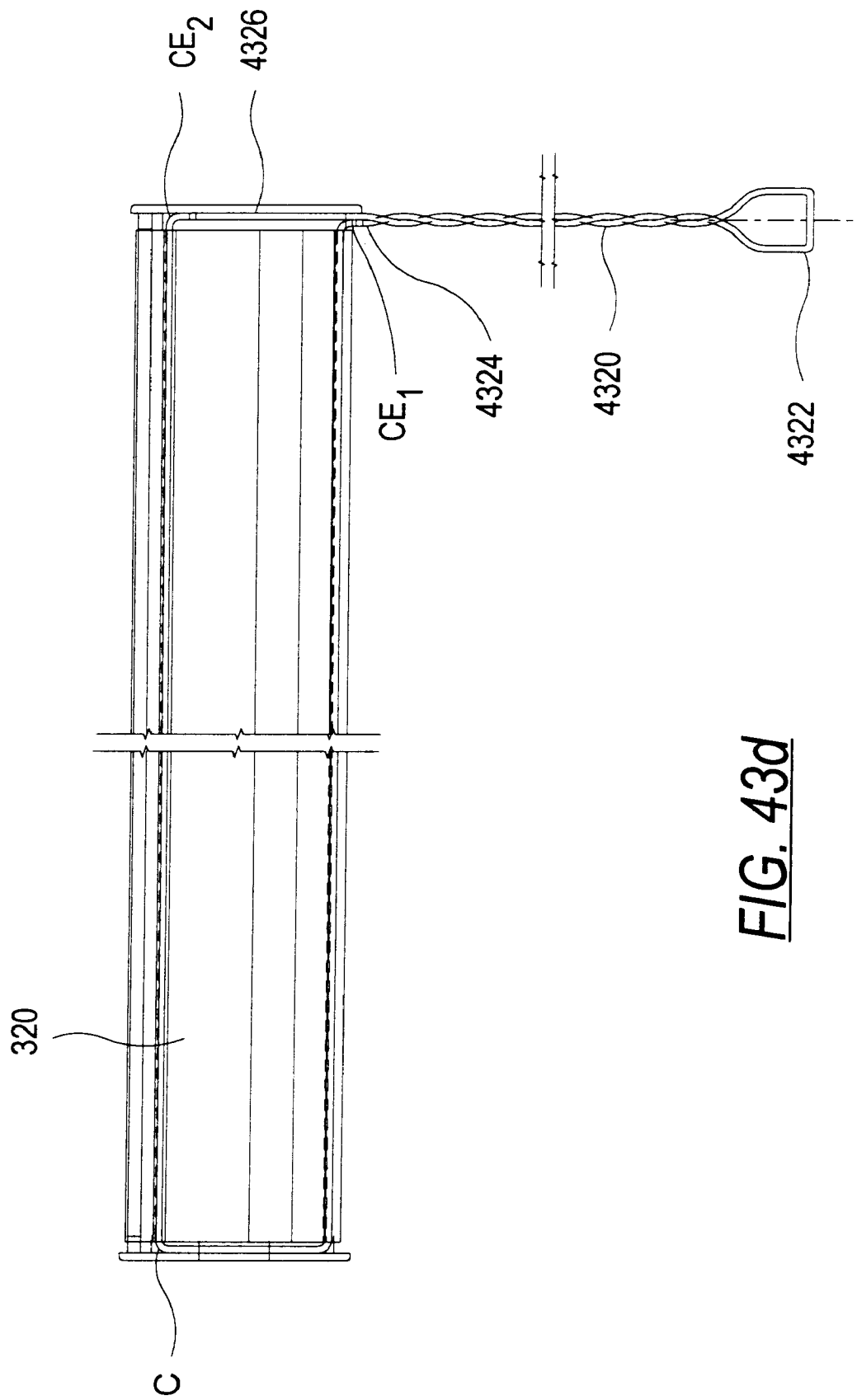
FIG. 43d is an alternate embodiment of a shelf and rail loop.

FIG. 43d is the same as FIG. 43a with a twisted pair conductor 4320 substituted for the flat shelf conductor 4302. One end of the twisted pair conductor 4320 is formed in the shaped of a loop 4322. One end $C_{E1}$ of the conductor C is electrically connected to one of the twisted pair wires 4324 and the other end $C_{E2}$ of the conductor C is electrically connected to the other twisted pair wire 4326. These electrical connections may be accomplished by, for example, stripping away the dielectric covering that normally covers the conductor C and the wires 4324 and 4326 and soldering the ends together. Alternatively, a single wire formed into a loop is used to form both the twisted pair conductor 4320 and the conductor C of the auxiliary rail. Use of a single wire embodiment simplifies fabrication. The twisted pair conductor 4320 is designed to be run underneath a shelf of a gondola in an appropriate protective channel, as opposed to on top of a shelf as was the case for the shelf conductor 4302 of FIG. 43a.

Figures 43E, 43F:
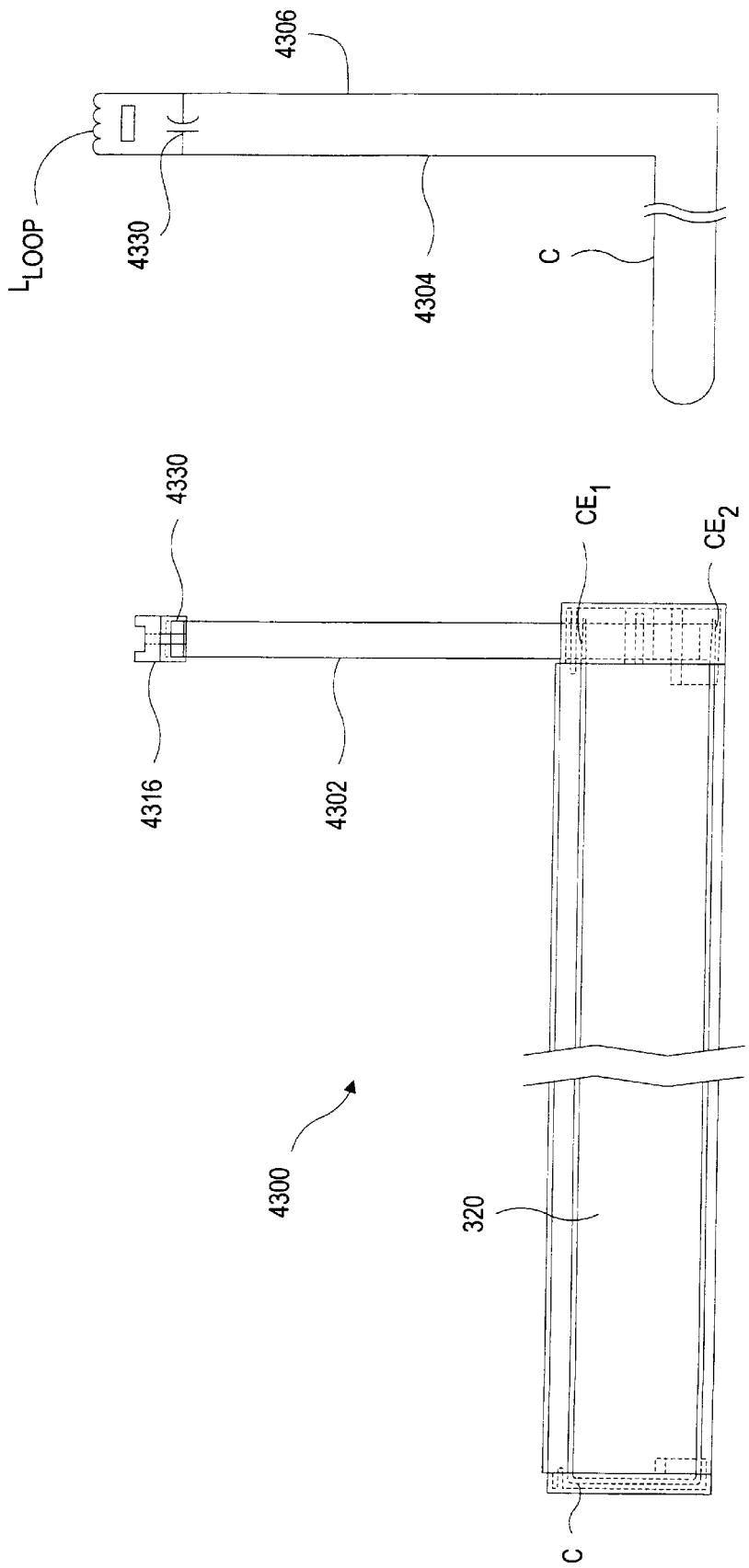
FIGS. 43e and 43f illustrate the addition of a capacitor in parallel with a rail conductor.

FIG. 43e is the same as FIG. 43a except that a capacitor 4330 is connected in parallel with the shelf and rail distribution loop across the "C" terminal 4316. This is shown schematically in FIG. 43f. The capacitor 4330 is added to improve energy transfer between the riser and the shelf and rail distribution loop. The impedance in the loop is affected by the length of the conductor C and the number of tags inductively coupled to the conductor C. According to one embodiment, capacitor 4330 has the same value as capacitor 434 described above in connection with FIGS. 40a, 40d and 40e, i.e., a value of 0.82 $\mu$Fd. Capacitor 4330 is of the stacked film type (or type PPS). The benefits of using capacitors in the shelf and rail distribution loop are discussed in the section entitled "Impedance Reduction and Reduction of Effects of Impedance" for example in connection with FIGS. 47–48b.

Figure 44A:
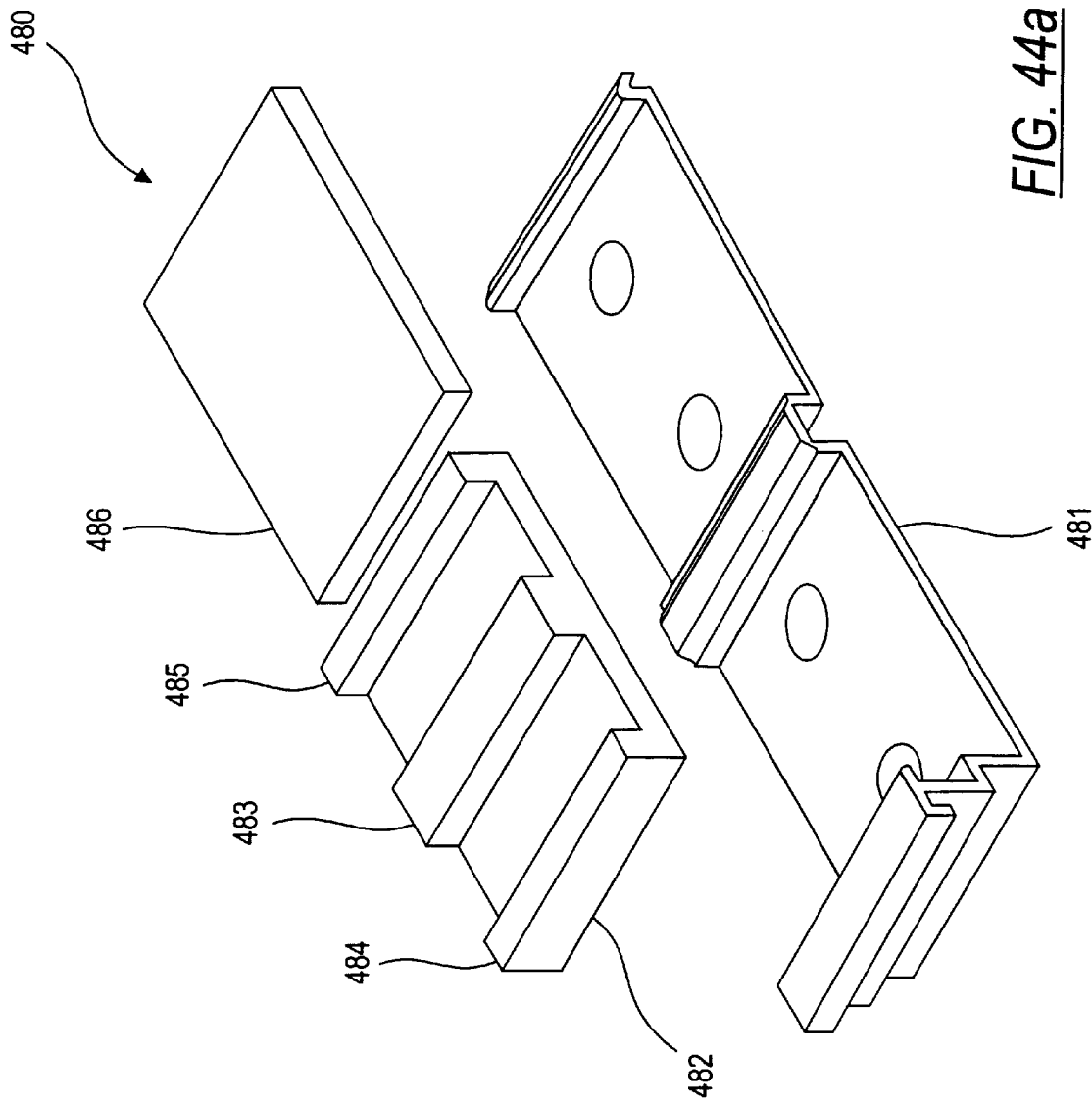
FIG. 44a is an exploded perspective view of one of the magnetic core units used to form the magnetic coupling between the wiring on one of the shelf and rail loops and one of the vertical risers according to one embodiment.

Referring to FIG. 44a, a two-piece magnetic core 480 is then clamped against opposite sides of the two flat elements, and fastened together by a hinged dielectric casing 481 attached to the two parts of the core. One part of the magnetic core 480 is an E-shaped piece 482 in which the middle arm 483 of the E is dimensioned to fit into and extend through the registered rectangular holes in the riser 423 and the "C" terminal 4316 of conductor 4302 or the loop 4322 of conductor 4320. The other two arms 484 and 485 of the E extend along the outside edges of the conductors.

Figure 44B:
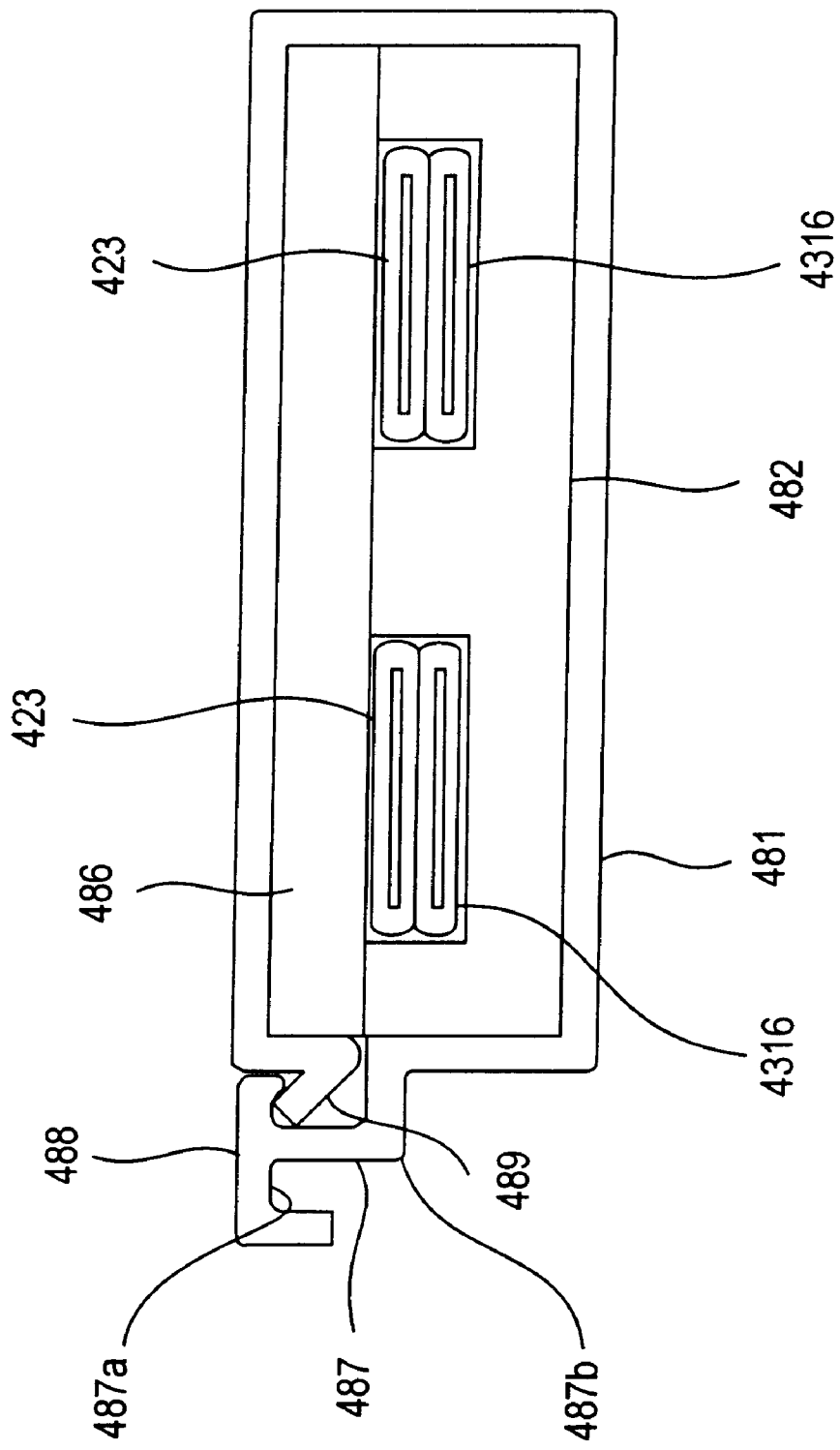
FIG. 44b is an end elevation of the module of FIG. 44a, after the module has been closed around the two pairs of connectors that complete a magnetic coupling.
Figure 44C:
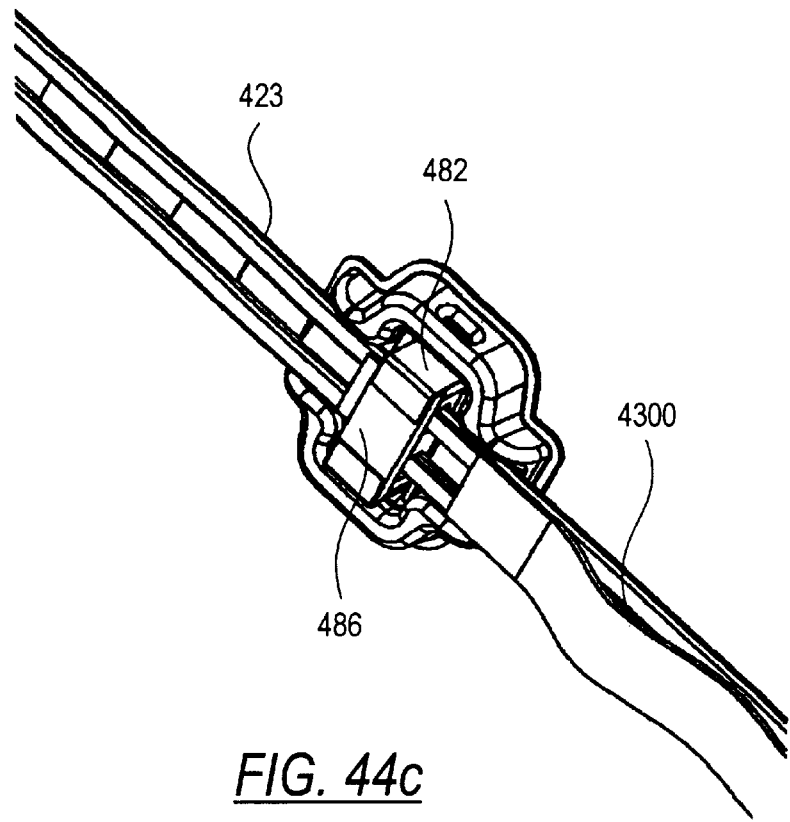
Figure 44D:
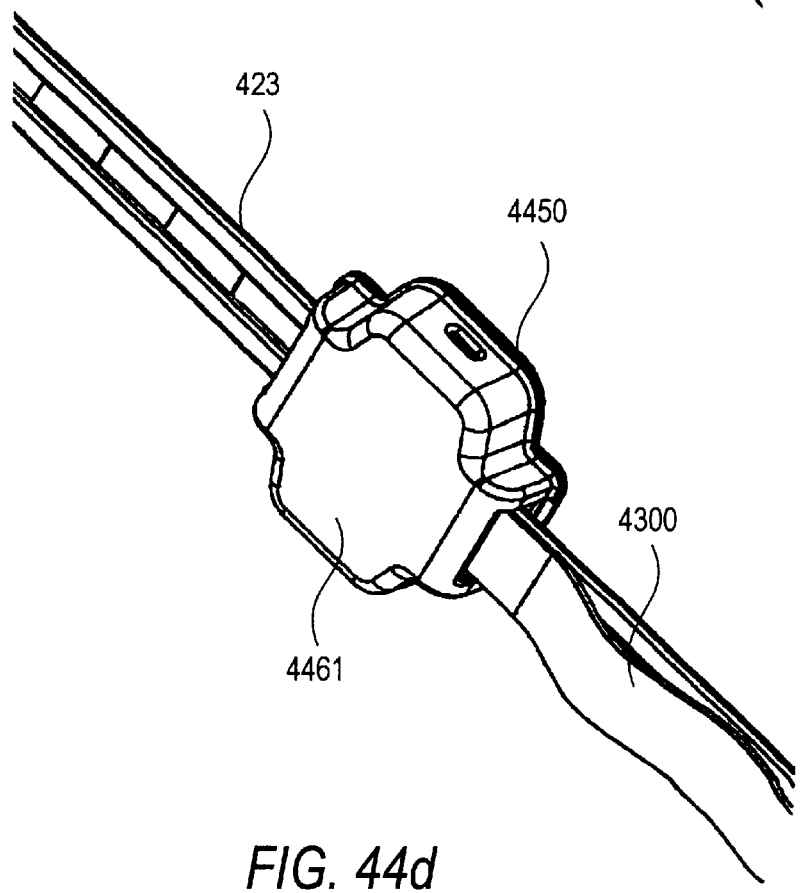

The second part of the magnetic core 480 is a straight piece 486 which closes the open side of the E when the two pieces 482 and 486 are brought together. The resulting core completely surrounds the two conductors in both the riser 423 and the shelf conductor, as can be seen in FIG. 44b, and also fills the common central opening formed by the registered hole 435 and the hole in the "C" terminal 4316. Thus, current flow in either the riser 423 or the shelf and rail distribution loop will induce a corresponding current flow in the other loop through the magnetic coupling. While FIG. 44b illustrates an embodiment utilizing a "C" terminal 4316 as shown in, e.g., FIG. 43a, it will be understood that this magnetic coupler may also be used with the twisted pair conductor 4320 and loop 4322 shown in FIG. 43d. The energy transfer through the magnetic coupling is highly efficient, e.g., as high as 95%. The magnetic material of the core is chosen to make the efficiency high and is typically 5K $\mu$ ferrite.

To hold the two pieces of the magnetic core together, with the two flat elements 473 and 423 sandwiched between the core pieces 482 and 486, the hinged dielectric case 481 for the core pieces includes a latch that snaps closed as the two core pieces are brought into engagement with each other. Specifically, a channel 487 with an inturned lip 488 formed on one free end of the housing flexes outwardly as it is forced past an angled lip 489 on the other free end of the housing. When the edges of the two lips 488 and 489 clear each other, the outer lip 488 snaps into the groove formed by the inner angled lip 489. This snap-action latch enables an installer to quickly and easily assemble the magnetic couplings that join the numerous branch loops to the various risers 423 in the main loop. If the shelves are re-arranged at a later time, the core module can be easily unlatched, re-located, and re-latched. The tip of a screwdriver inserted in channel 487a and pivoted about ridge 487b may be used to aid in unlatching the core module. The two core pieces 482 and 486 are preferably pre-attached to their hinged case 481 by adhesive bonding or mechanical latch configurations so that the two core pieces and their case can be handled as a single part during assembly and dis-assembly of the magnetic coupling.

Figure 44E:
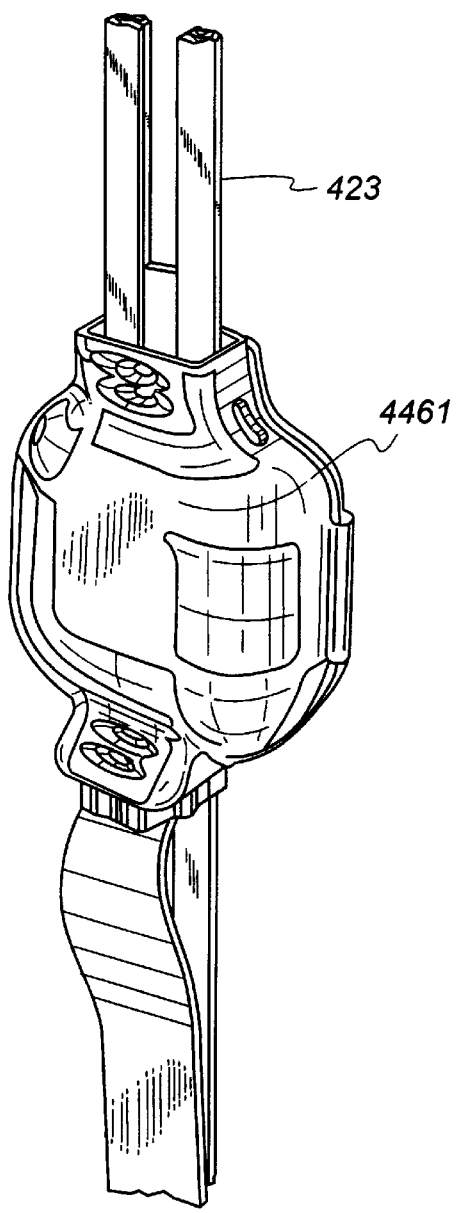
Figure 44F:
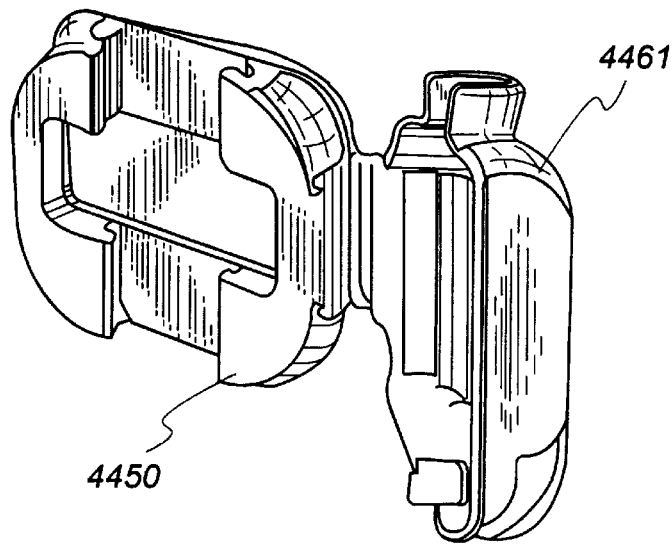
Figure 44G:
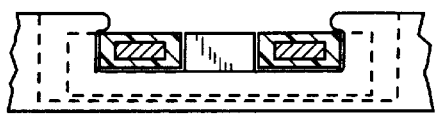

FIGS. 44e–44g illustrate a magnetic coupler with a thermoformed base 4450 and cover 4461. The remaining parts of this coupler and its operation are similar to FIGS. 44a and 44b. Preferably, the coupler of FIGS. 44c–g is used to connect a shelf conductor 4302 of a shelf loop 4300 to a riser 423.

The system wiring can be installed in a number of different ways using a number of different parts. In a first "free-form" method, described previously, a wire, taped to the top surface of a shelving section, couples the tags on rail to a magnetic coupler which is attached to a standard shelving upright. In all "free form" embodiments, the wire position is not dependent on the position of the shelving. In an alternate "free-form" embodiment, a telescoping conduit with a pivoting I-core can be used. In a second "snap-and-click" method, a plug can be used. In an additional "snap-and-click" embodiment, which includes an additional indexing method, automatic disconnect of power to the shelf is provided when the shelf is removed.

The second "free-form" coupling arrangement is illustrated in FIGS. 39n–39r and 39t.

Referring now to FIGS. 39n–39q and 39t, a coupler assembly 4166 comprises an E-core 4170 which is housed in a plastic plug 4184. The plug 4184 also contains a receiving member 4176. Plastic plates 4174a and 4174b hold a swiveling plastic plate 4182 between each other. The swiveling plate 4182 contains an I-core 4178 and a protruding member 4180. The swiveling member 4182 rotates about the center of a keyhole 4172. FIG. 39n shows the assembly in the closed position as shipped from the factory. FIGS. 39o and 39p show the assembly in the open position prepared for attchment to the riser. Finally, FIG. 39q shows the assembly in the closed position and connected to a riser 4190. The purpose of the receiving member 4176 is to latch the protruding member 4180 when the assembly 4166 is in the closed position. This provides the closure of the two magnetic cores so that power and signals flow between the sections. FIG. 39t shows the tool (shown in detail in FIG. 39j) along with the entire shelving system.

Figure 39C:
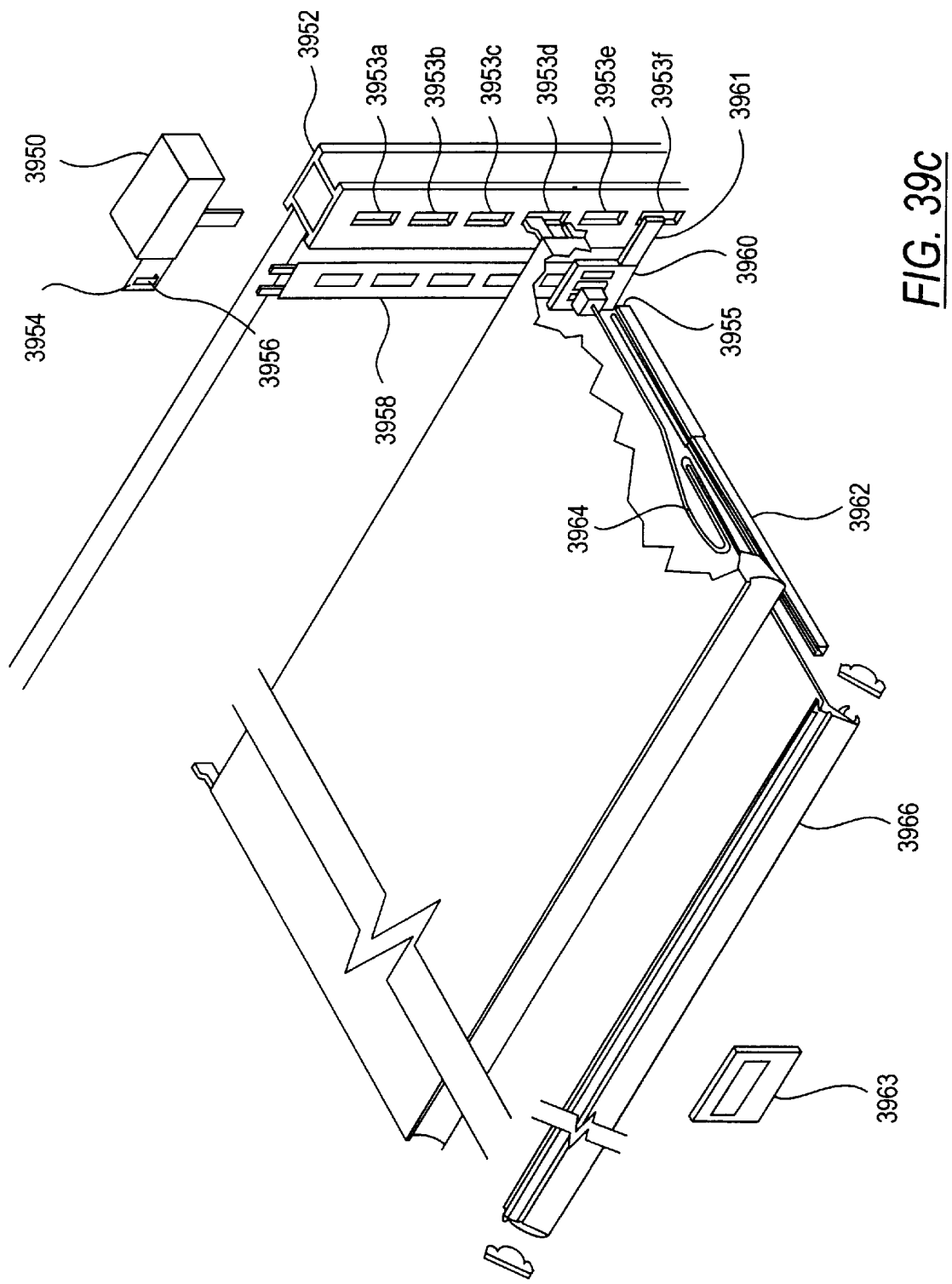
FIG. 39c is an illutration of the shelving and coupler attachment arrangement.
Figure 39D:
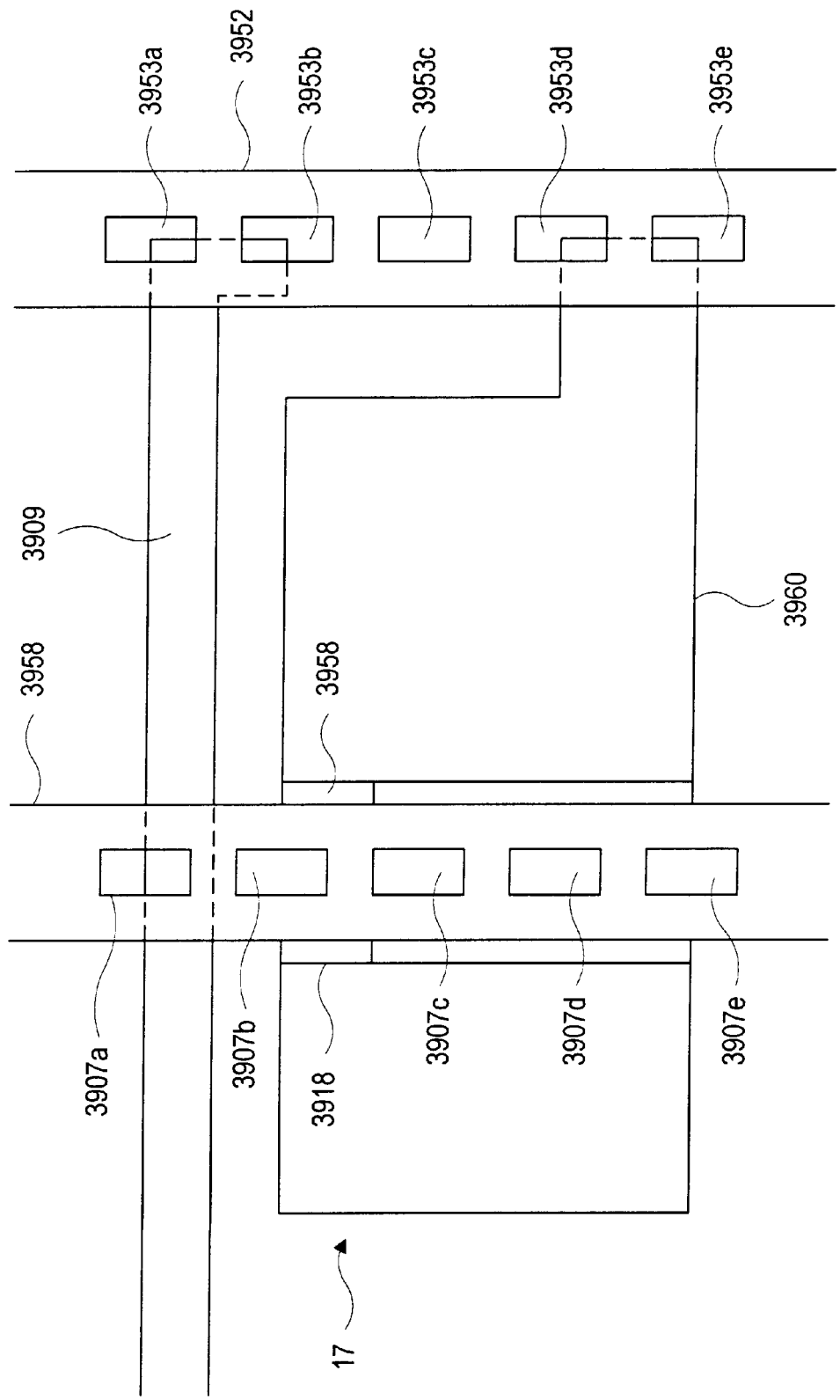
FIG. 39d is a side view of a coupler and riser attatchment arrangement.
Figure 39E:
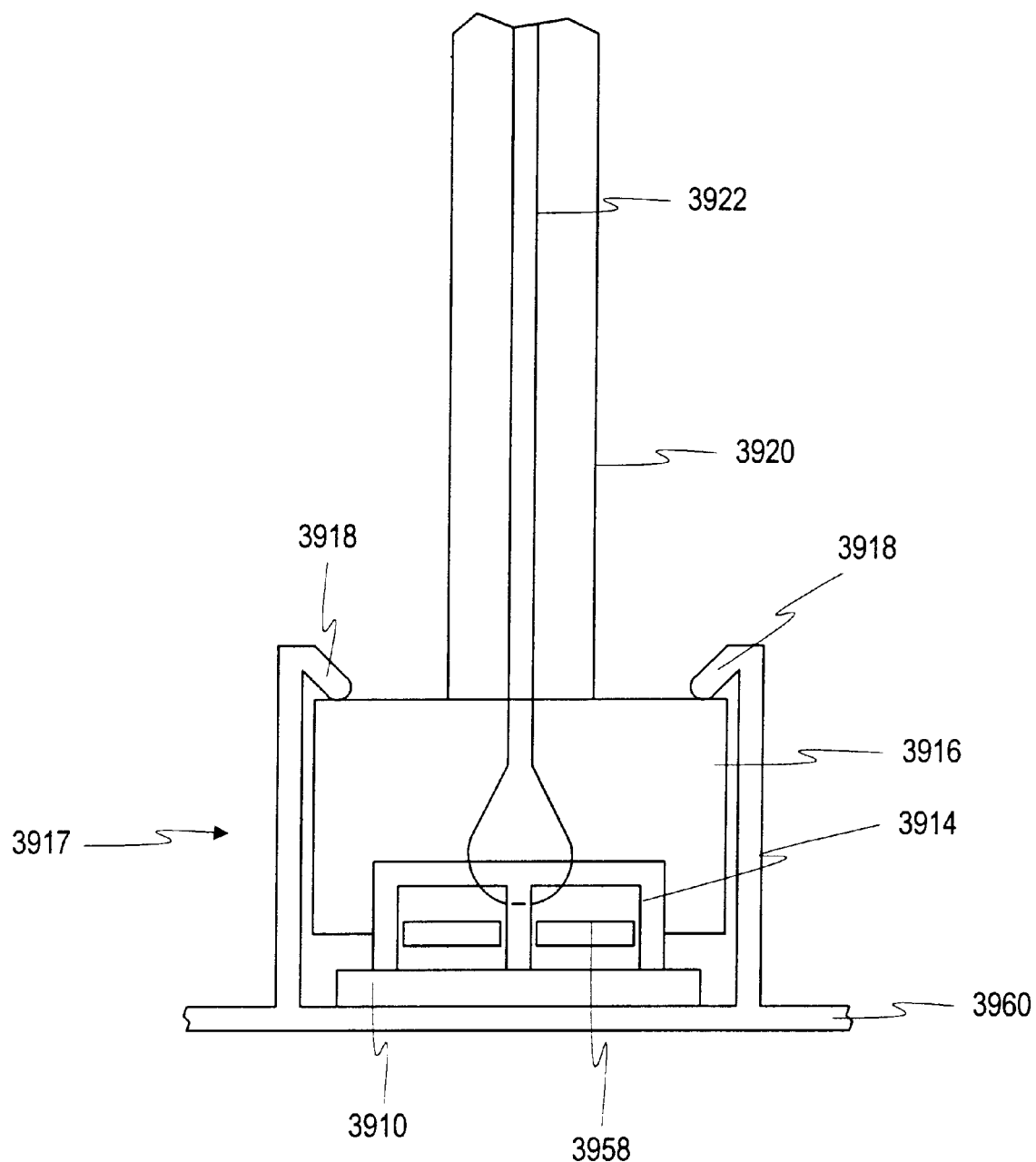
FIG. 39e is an illustartion of one attachment arrangement.
Figure 39G:
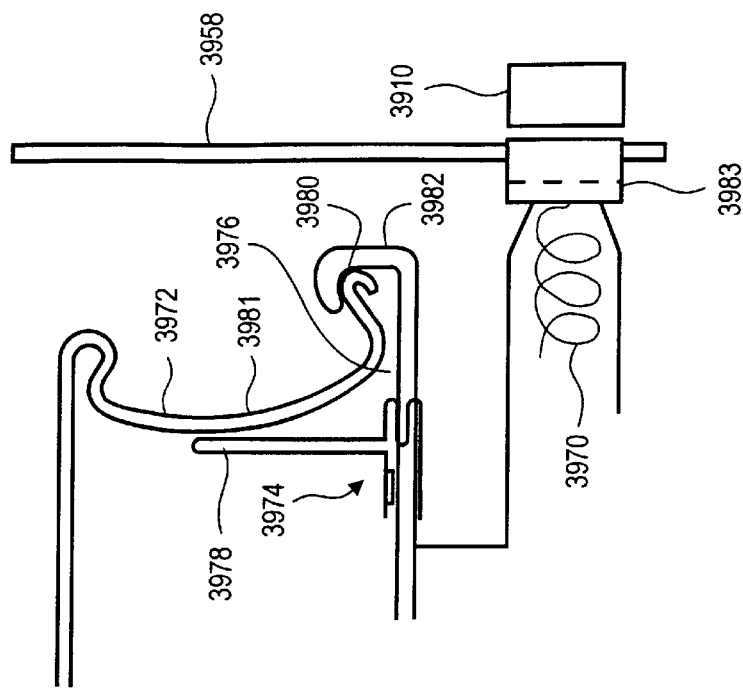
FIG. 39g shows one type of shelving and attachment arrangement with the attachment complete.
Figure 39F:
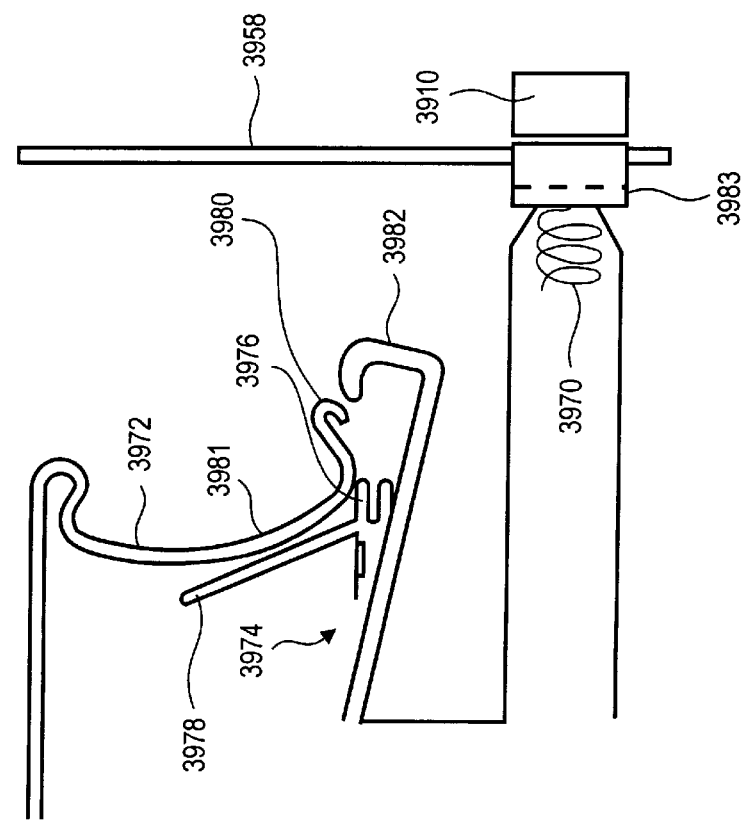
FIG. 39f is an illustartion of one type of shelving attachment arrangement with the attachment incomplete.
Figure 39I:
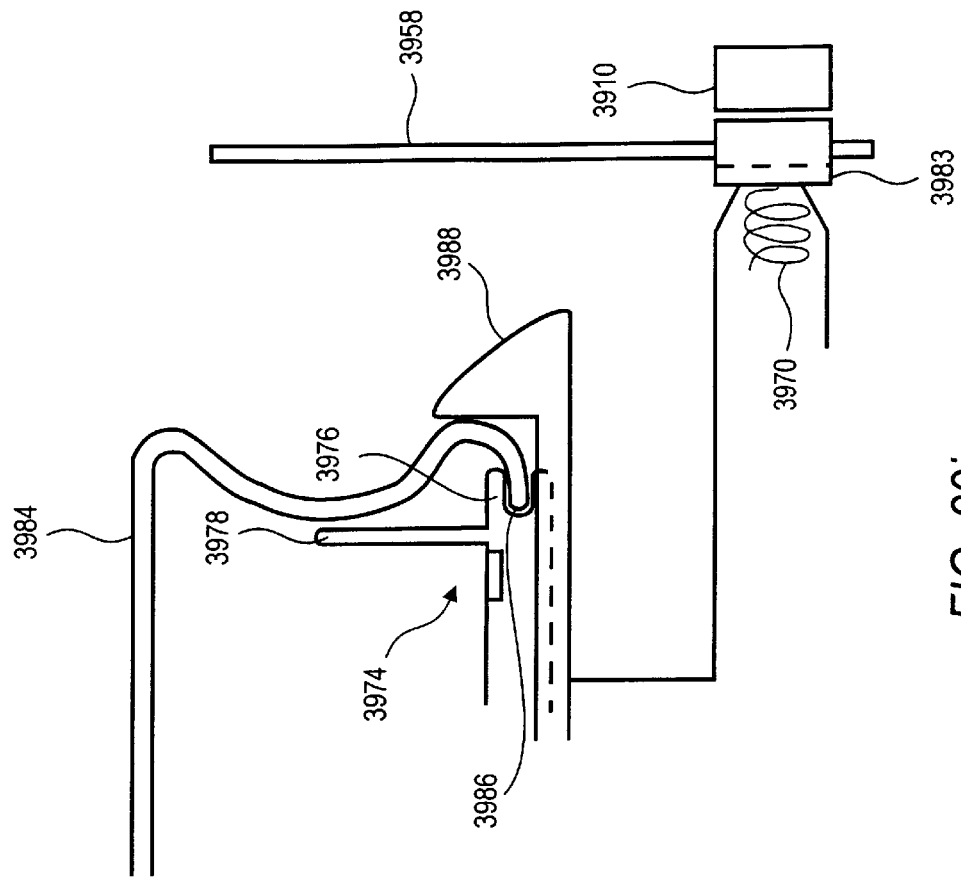
FIG. 39i shows the type of shelving and attachment arrangement with the attachment complete.
Figure 39H:
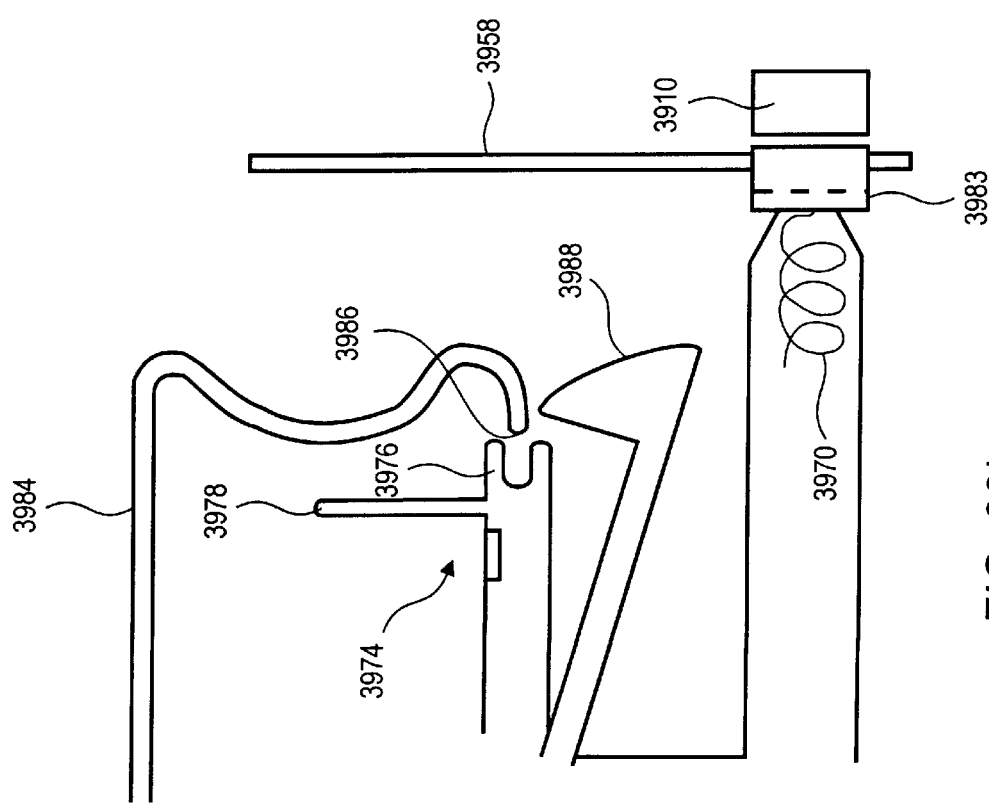
FIG. 39h shows one type of shelving and attachment arrangement with the attachment incomplete.
Figure 39K:
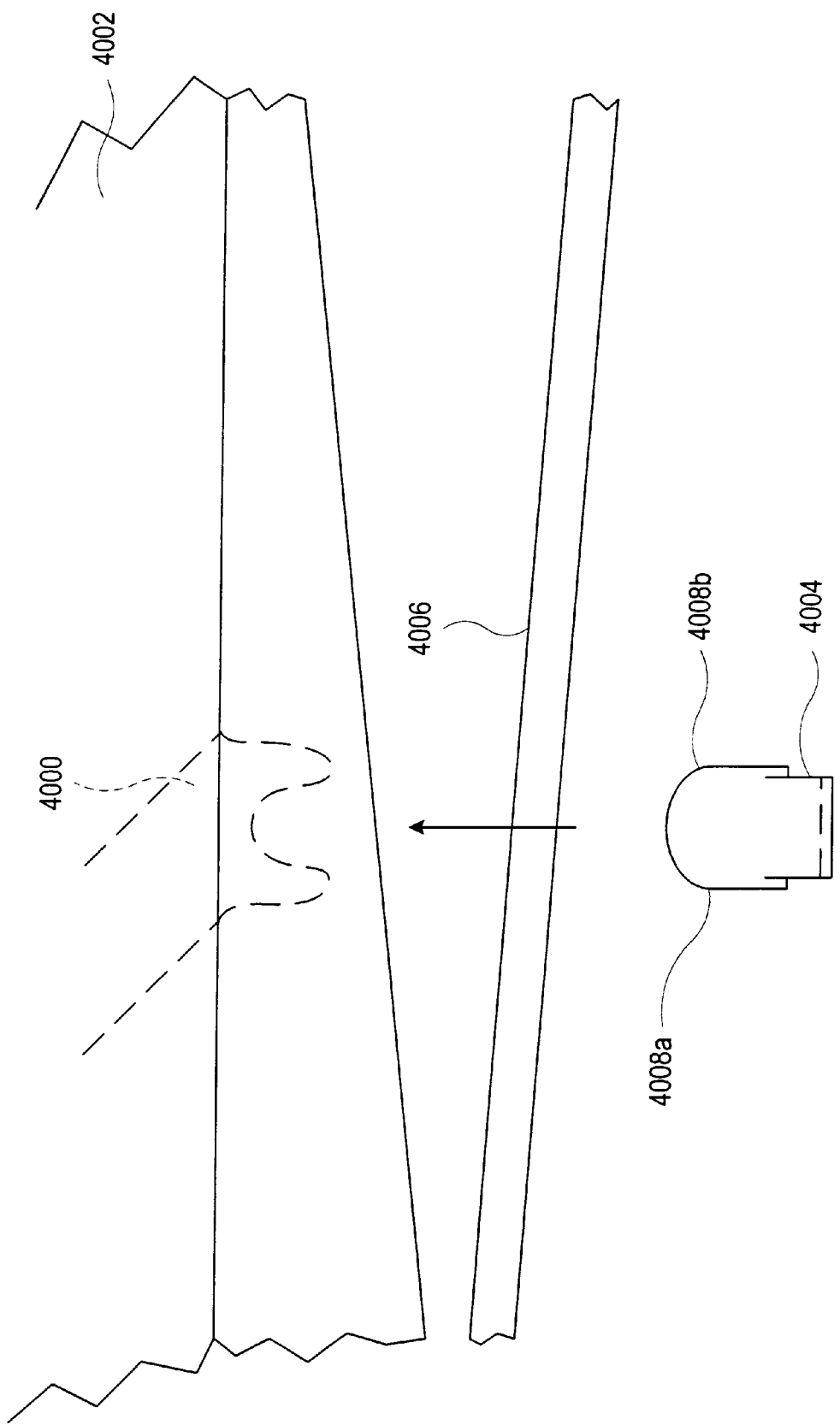
FIG. 39k shows a center clip arrangement.
Figure 39I:
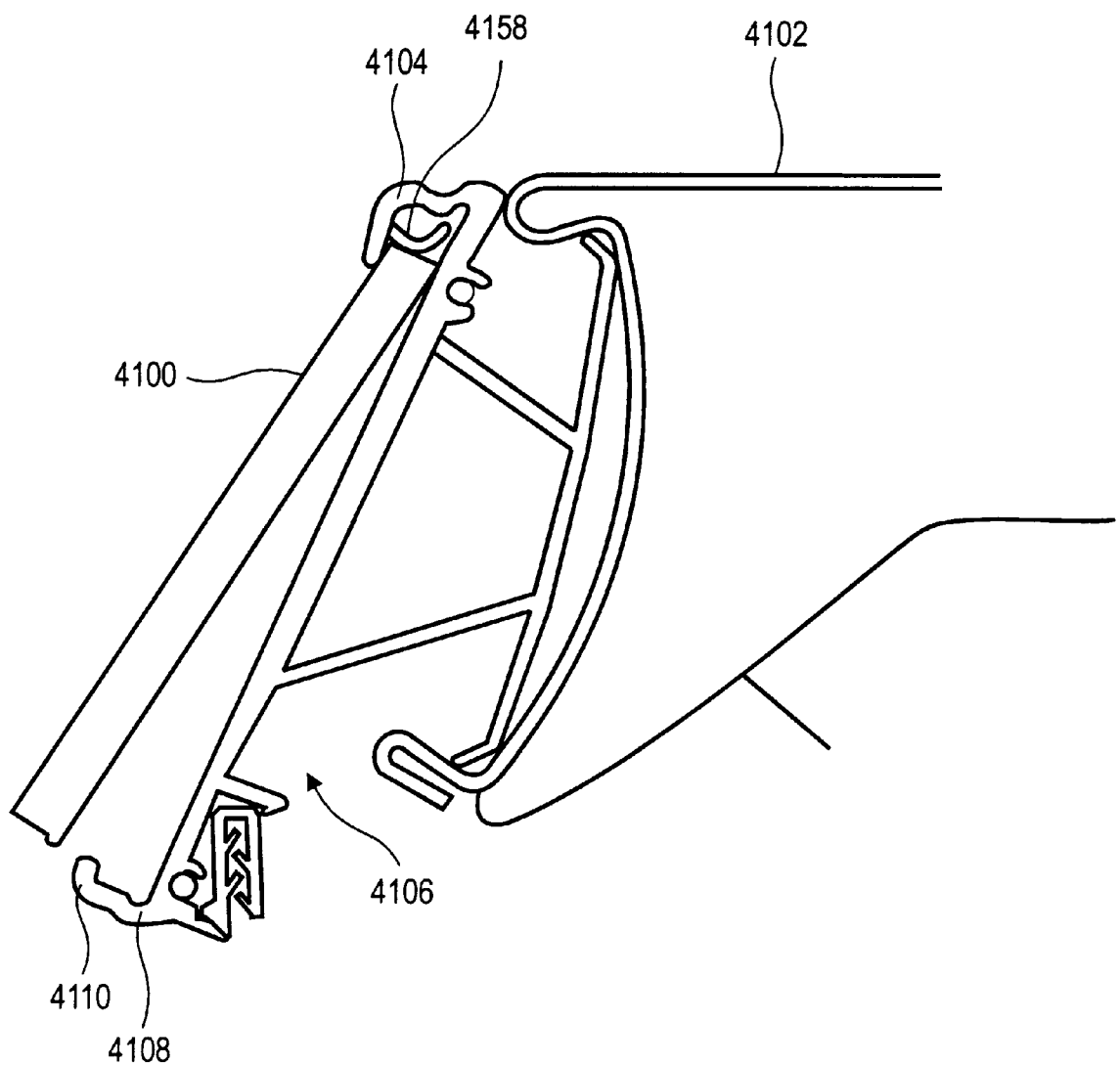
Figure 39M:
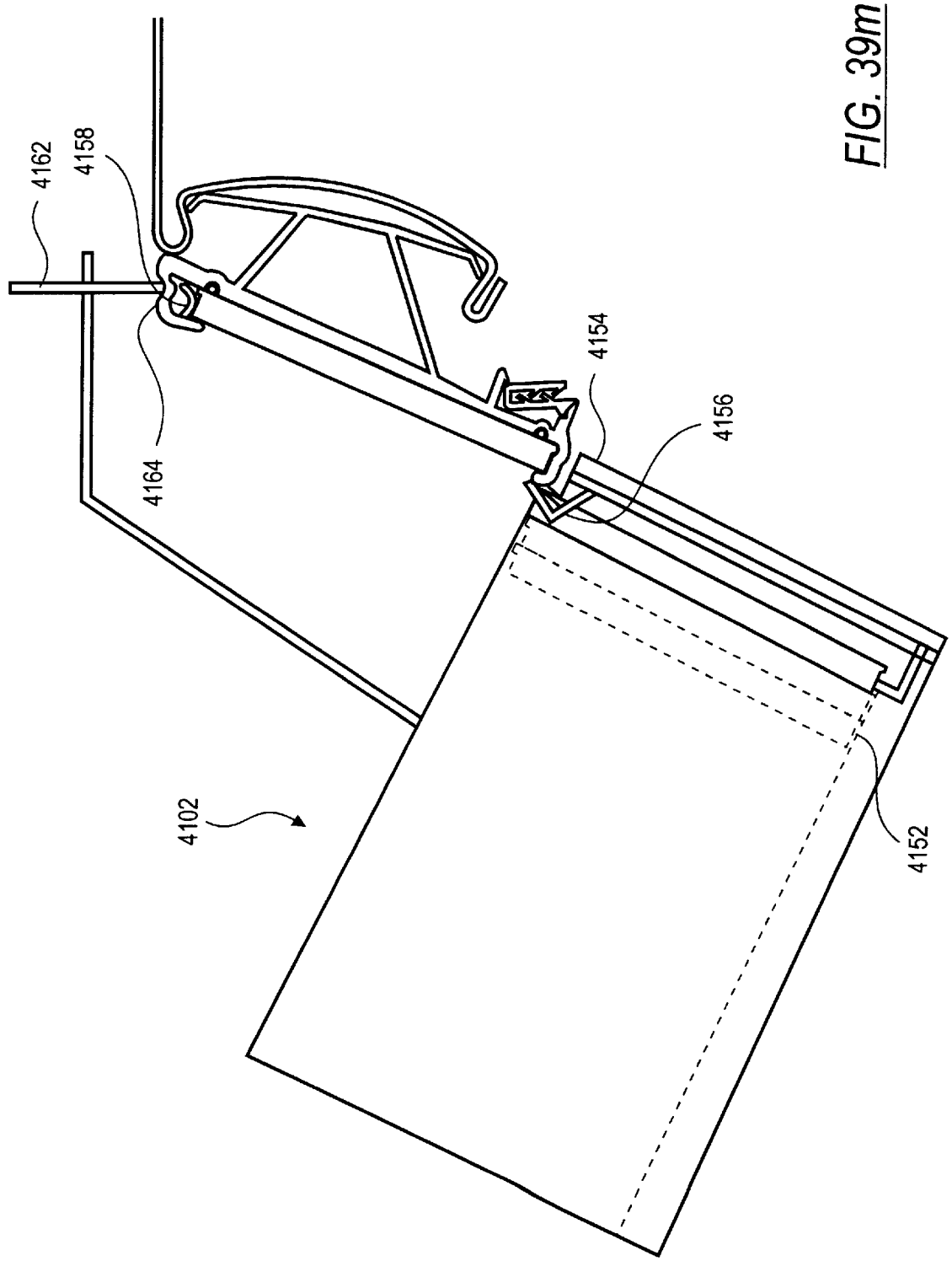
FIG. 39m shows a magazine tag loader.
Figure 39R:
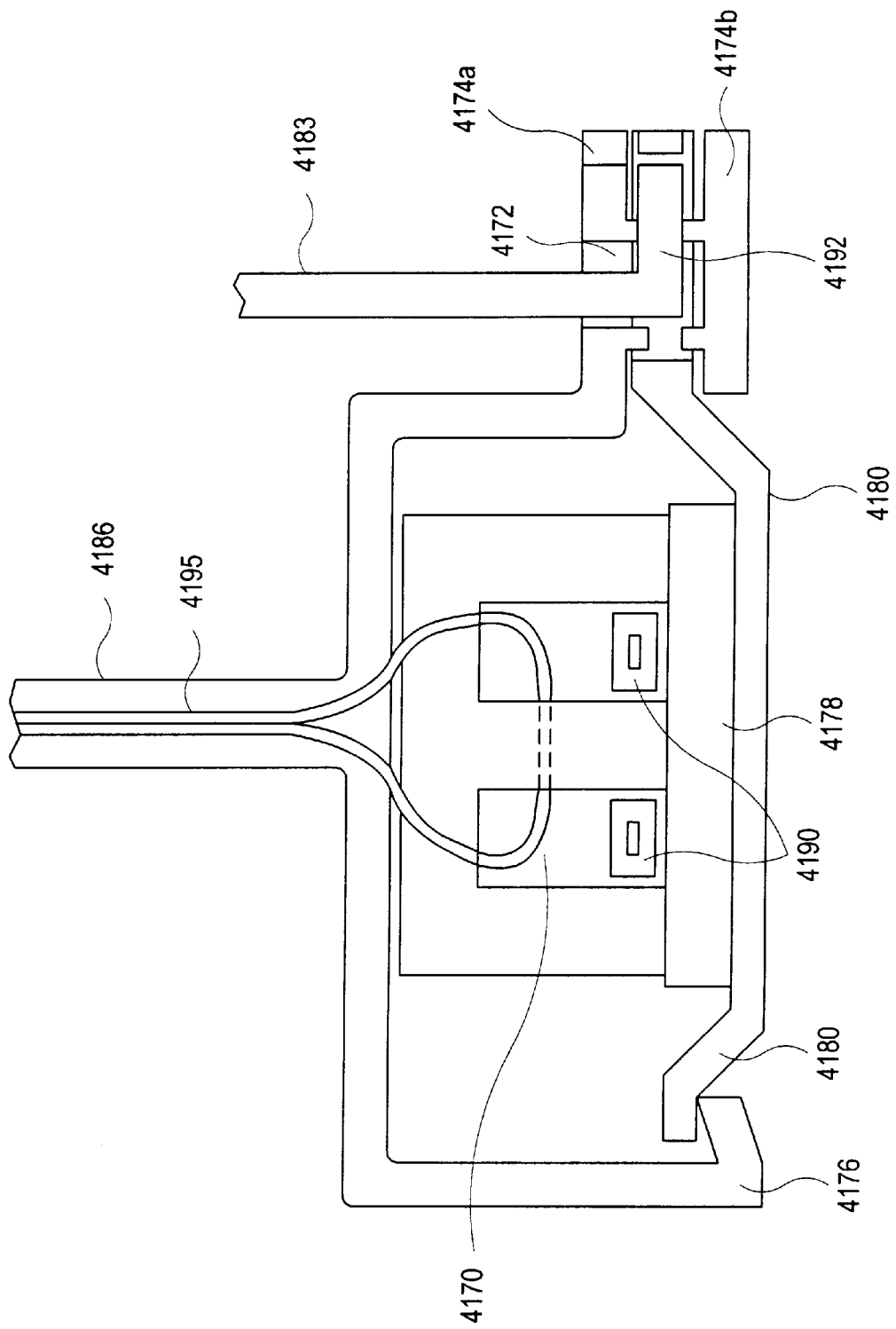
FIG. 39r is a cross sectional view of the E-core and I-core coupler arrangement when turned into the open position.

A cross-sectional view of coupler assembly in the closed position (with the riser attached) is shown in reference to FIG. 39r. A twisted pair wire 4195 is threaded through the interior of the telescoping conduit 4186 and coupled to the E-core 4170. As shown, to open the assemble, the tool 4183 is rotated which turns the swiveling plate 4182 holding the I-core 4178 one hundred eighty degrees.

The coupler assembly is connected as follows. The installer receives the closed part from the factory (see FIG. 39n). A locking end-cap is installed on the shelf face on the side with the telescoping conduit. A long keyed tool 4183 (see FIG. 39j) is inserted into the key slot 4172 and turned thus rotating the I-core 4178 and swiveling member 4182 into the open position. The key slot 4172 locks the tool 4183 in the coupler 4166 so that it can be removed when it is fully closed. This gives the installer a positive feedback so that he knows the coupler is properly installed. A guide on the tool helps to hold it and the telescoping conduit 4186 into proximity. The coupler 4166 is attached at the end of a very simple and inexpensive extruded 2-piece telescoping conduit 4186. A plastic-injection-molded design is used for the rotating members of the coupler 4166. A single piece magnetic wire is used throughout the rail and conduit 4186 and is twisted in the section inside the telescoping conduit 4186. No wire expansion occurs inside the conduit 4186. The conduit 4186 with tool 4183 are positioned under the shelf. No articles from the shelf need be moved. The end of the coupler with the E-core is installed in a hole in a riser 4190 and the handle 4194 on the tube is turned. The turning motion pivots the plate 4182 with the I-core 4178 into position and the protruding member 4180 is coupled to the receiving member 4176. This also locks the back of the telescoping conduit 4186 to the riser 4190 to hold the coupler 4166 (with the conduit) in position. This action results in a length of the twisted pair wire being exposed at the shelf edge. After the tool 4183 is removed, this excess length of twisted pair wire is folded so that it will fit in the space between the front of the steel shelf and the back of the rail. The end of the rail is inserted into the recess in the endcap and the rest of the rail is snapped into place on the shelf face. A second endcap is installed on the other end of the rail and locks into place.

As mentioned above, a unique tool is used to push the telescoping conduit into place. Referring now to FIG. 39j, the tool comprises a bent end 4192 for insertion into the keyhole 4172 and a gripping handle 4194 for gripping the tool as well as for turning the tool. The tool can be easily constructed using a piece of stiff wire.

The "plug" method of the second embodiment is now described. Referring now to FIG. 39c, a junction box 3950 is attached at the end of an upright 3952. The upright 3952 is a standard upright used in shelving having a hollow interior and containing a series of holes 3953a–f. The junction box 3950 also comprises a pair of arms 3954 having hooks 3956. The arms 3954 extend parallel to and under the top part of a shelving section (not shown). The purpose of the arms 3954 and hooks 3956 is to hold a riser 3958.

A magnetic coupler 3960 is attached to the upright 3952 at hole 3953f with fingers 3961. The fingers 3961 of the coupler 3960 are of suitable dimensions such that they do not fill the entire hole 3953f. A telescoping conduit 3962 with wire 3964 extends from a rail 3966. The purpose of the conduit 3962 is to supply a path for the wire 3964 from the rail 3966 to the coupler 3960. As will be described in greater detail below, the end of telescoping conduit 3962 is coupled to the magnetic coupler 3960. Alternatively, as will be described in greater detail below, the wire can be installed without using the conduit.

The end 3955 of the telescoping conduit 3962 comprises a plug 3960. The plug 3916 contains an E-core 3914 and is secured to the magnetic coupler 3960 and/or the upright 3952. In one embodiment, three fingers 3965a–3965c are placed and fit into the E-core of the coupler.

Referring now to FIGS. 39d and 39e, the riser 3958 extends past the top of a shelf 3909. The coupler 3960 is attached to the upright 3952 via holes 3953d and 3953e. The plug 3916 attaches to the coupler 3960 and is held in place by latches 3918 of a plastic receptacle 3917 of the coupler 3960.

The telescoping conduit 3962 is hollow and contains a twisted pair wire 3922. The lug 3916 holding the E-core 3914 is pressed into position by a special tool (described below ith reference to FIG. 39s) through a hole 3907c of the riser 3958 to surround the riser 3958. The combination of the plug (with the E-core), and the riser 3958 rests against the core 3910 of the coupler 3960. As the combination of plug 3916 (with the E-core) is pushed into the receptacle 3917, the latches 3918 are pushed outward. When the plug 3916 clears the members 3918, the members 3918 snap back securing the combination to the coupler 3960.

An important feature of the present invention is that the holes 3907a–3907e of the riser 3958 align (within a very small tolerance) with the holes 3953a–3953f of the upright 3952. Because of this alignment, an installer can, with certainty, use a standard tool to push the plug (with the E-core) into place thereby completing the connection of the tags to the magnetic coupler. The holes 3907a–3907f of the riser 3958 are of the same dimensions (within a tolerance) as the holes 3953a–3953f of the upright 3952. The riser 3958 and the upright 3952 are exactly aligned and are indexed relative to each other. The indexing is accomplished because the junction box plugs into the top of the upright at a known position. Because of this known relationship, the riser 3958 will be positioned at a known location relative to the arms 3954. This results in the riser holes being in a known location relative to the upright holes. In other words, the exact position of the riser, shelving section, and other parts of the shelving system are known with great precision with respect to each other. Thus, installation can occur with great precision and ease since no uncertainties exist with respect to the locations of the parts of the shelving system.

The automatic shelf removal embodiment is now described. Referring now to FIGS. 39f and 39g, an installer slides a latching section 3982 until the latching section 3982 hits an end 3980 of a common type of shelving section 3972. Since the assembly can not be pushed in a downward direction (due to fingers 4204a and b of the tool being attached to the upright), section 3982 is forced downward. A wing 3978 then flexes backward. When latching section 3982 clears the front lip of the end 3980 and touches point 3981, wing 3978 hits point 3981 and is deflected backward putting the wing under tension. When latching section 3982 clears the end 3980, latching section 3982 pops upward. The spring tension 3978 of a spring 3970 is applied against point 3981 as the installer removes the tool locking latching section 3982 to end 3980. This transfer of force holds an E-core 3983 in place against a riser 3958.

Referring now to FIGS. 39h and 39i, another type of shelving section is shown in use With the present invention. A tool slides the assembly toward the riser. An end section 3988 contacts a hooked end section 3986. The leading face of end section 3988 applies downward force to the assembly. Since the tool used by the installer does not allow downward movement of the assembly, the force moves the end section 3988 in a downward direction. The end section 3988 clears finger 3976. Spring tension forces the end section 3988 to snap into position. Finger 3976 is now locked into the shelving section at hooked end section 3986 and is held in place. In this type of shelving, wing 3978 places no role. For both types of shelving, the shelf is removed by pivoting the rear of the shelf upward. This action disconnects the E-core 3983 from the end 3980 and does not damage or tear any of the wiring or wiring connections in the system.

The wire in the telescoping conduit can be of a variety of types. In a first type, the wire is wound into a loop. As the telescoping conduit extends, the wire uncoils. In the second type of wire, the wire is folded like an accordion. As the telescoping conduit extends, the wire decompresses and extends lengthwise. In the third type of wire, the wire is laid out in a ribbon fold. As the telescoping conduit extends, the wire unfolds lengthwise. Other types of wire expansion techniques, as are known in the art, can also be used.

The telescoping conduit is attached to and pivots with the rail. In other words, the telescoping conduit and rail are not locked or fixed in an L-type configuration. Pivoting is preferred for ease of shipping the parts. Shipping large, cumbersome L-shaped sections is more difficult than shipping pivoting sections which can be folded into straight configurations.

Figure 39S:
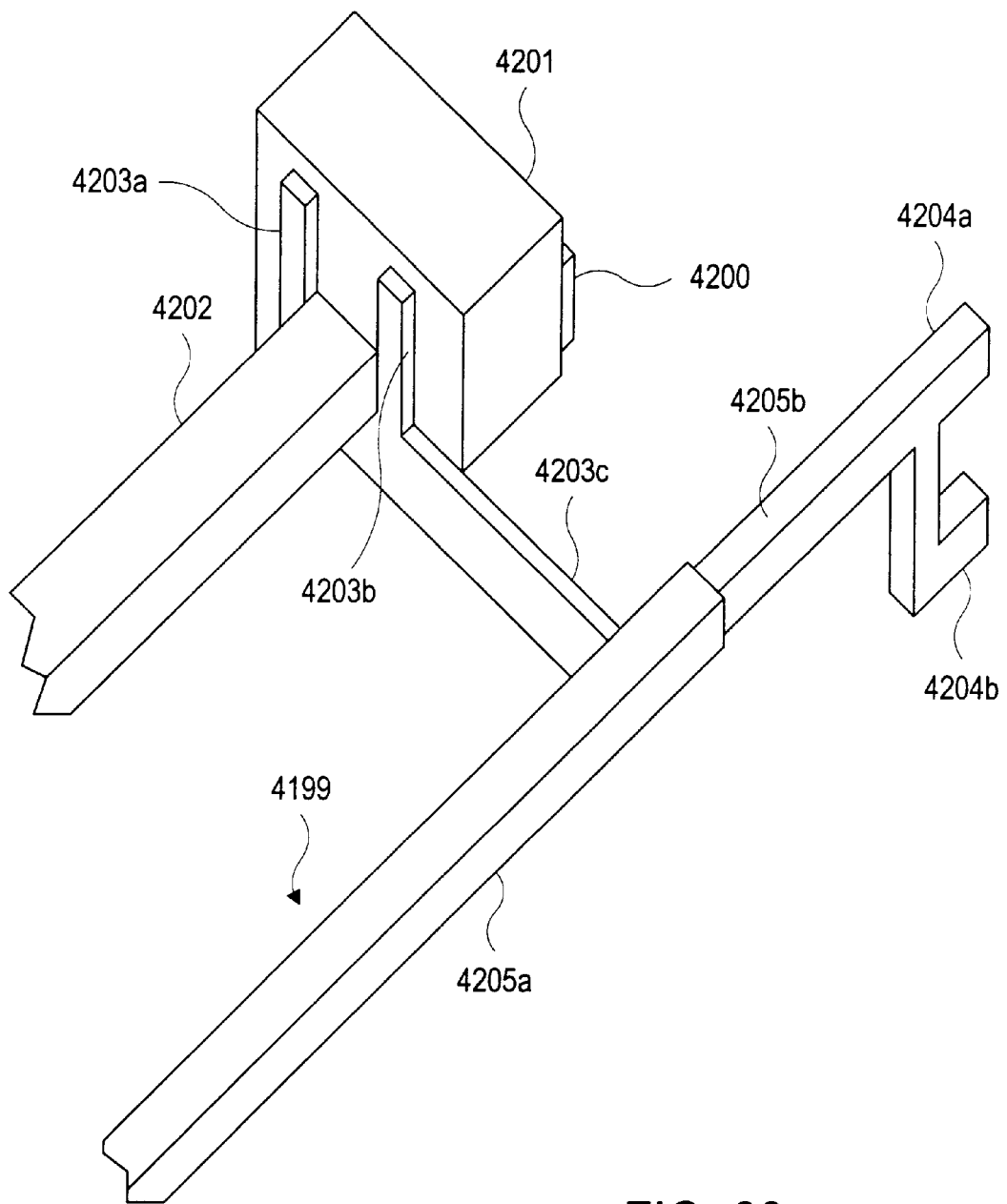
FIG. 39s is an alternate embodiment of the tool.

Referring now to FIG. 39s, a tool 4199 is used to install a plug 4201 with an E-core 4200 which is coupled to a telescoping conduit 4202. The plug 4202 is held in place via an arm 4203c having a pair of holding posts 4203a and 4203b. The arm 4203c is coupled to a slider 4205a which fits over rod 4205b. An installer pushes the slider 4205a over the rod 4205b to move the plug down the rod. Additionally, the installer places the rod 4205b into holes in the upright. Specifically, position prongs 4204a and 4204b are placed into holes in the upright. Because of the known spacing relationships in the system, the installation of the telescoping conduit is easily accomplished.

A center clip can be used if needed to prevent the telescoping conduit from being torn out. Referring now to FIG. 39k, a shelving section 4002 comprises a metal conduit 4000 which is located underneath the shelving section 4002. The center clip 4004 is pushed upward and holds the telescoping conduit 4006. The clip 4004 has members 4008a and 4008b which click and secure the clip in place as they clear the edges of metal conduit 4000. The clip is placed in a gap at the end of the metal conduit 4000, the metal conduit 4000 being open at the ends of the shelving section 4002.

Because of the large number of tags (15,000 to 20,000 in a typical store), there is a need to be able to install these tags as quickly and efficiently as possible. A magazine loader is used to place the tags in the rails. Referring now to FIG. 39l, a tag 4100 is pushed upward into a top channel 4104 of a rail 4106 which is coupled to a shelf 4102. After being pushed upward into the top channel 4104, the tag 4100 is pushed inward toward the rail and falling into a bottom channel 4108 of the rail 4106.

Referring now to FIG. 39m, a magazine loader 4150 contains a plurality of tags 4152. The loader lifts the tags 4152. At the end of this movement, a stop 4154 causes a lift plate 4156 to pivot forward. This moves the bottom of a tag 4152 into position. Since the top of the tag is under compression, because of the rail spring, the tag 4152 slips off the lift plate 4156 and the rail spring 4158 pushes the tag down into position in the rail. The magazine is at an angle that is greater than the rail so that the top of the tag is aimed at the back of the rail face. The magazine loader 4150 is coupled to the rail by arm 4160 which has a wheel 4162 which moves along the rail in a notch 4164. Thus, the magazine loader can be quickly and easily moved along the rail. Tags are shipped in a magazine from the factory. Installer fatigue is reduced because the roller and the speed of tag installation is increased because magazine loader is electrically powered.

Thus, a telescoping conduit can be installed easily and without removing articles from the shelves of stores. The installation can be accomplished easily resulting in enormous labor savings over currently available systems. Additionally, using at least one of the methods above, automatic power disconnect is accomplished when the shelf is removed.

ENHANCING SYSTEM PERFORMANCE

One goal of the present invention is to provide a low cost, practical electronic display system. Another goal is to provide a system that operates in compliance with UL 1950, "Safety for Information Technology, Including Electrical Business Equipment, § 2.3, SELV" (safe-extra-low-voltage) maximum levels of 60 volts dc or 42.4 volts peak (which is quivalent to 30 volts RMS) or equivalent parameters as outlined in this standard. A system in compliance with SELV standards is exempted from UL requirements which apply to higher voltage systems such as 120 VAC household current. This can greatly simplify system construction, eliminating the need for 120 VAC rated conductors (e.g. wire in conduit or equivalent), junction boxes, and execution of wiring and wire connections by licensed electricians. Rather, as indicated elsewhere herein, much of the system wiring can be accomplished with eight conductor telephone-type cable and modular connectors such as RJ-11 type or the like. However, given Ohm's law in its simplest form, reducing the voltage used to drive the conductors that are inductively coupled to the individual display tags causes a problem in that, all else equal, reducing the drive voltage will lower the current in the conductors, which reduces the power available to drive the tags. On the positive side, if a system can made be made to operate using an SELV and consequently, less power, such a system has the added benefits of more easily complying with FCC and other radiation regulations as there would be less energy that can be radiated.

One reason complying with SELV standards is difficult is that loads according to the present invention appear to the area controllers to be series loads. Such a configuration is beneficial because this configuration guarantees that the same current flows to all tags and thus, the power/current to all the sections and tags is balanced. Accordingly problems which arise with parallel-arranged configurations are avoided, such as where different parallel loops have different impedance resulting in different amounts of current being driven in each loop. However, because all of the loads in the system according to the present invention are in series and thus add in series, impedance management and reduction is important in order to meet SELV standards.

Embodiments of the present invention address the goal of complying with SELV standards by using a number of strategies, such as reducing the power needed to drive each tag; improving the coupling efficiency between the various conductors in the system and between the rail conductors and individual tags; and reducing the impedance of the system. One method of reducing the current demand placed on an individual area controller is to simply reduce the number of tags driven by each area controller and compensate by adding more area controllers. However, this method has limitations in that adding an unlimited number of area controllers to a store's display system makes the system more expensive in terms of components, added wiring, and higher installation costs. Thus a goal is to provide a system that complies with SELV regulations while optimizing the number of tags that can be driven by a single area controller.

Figure 45A:
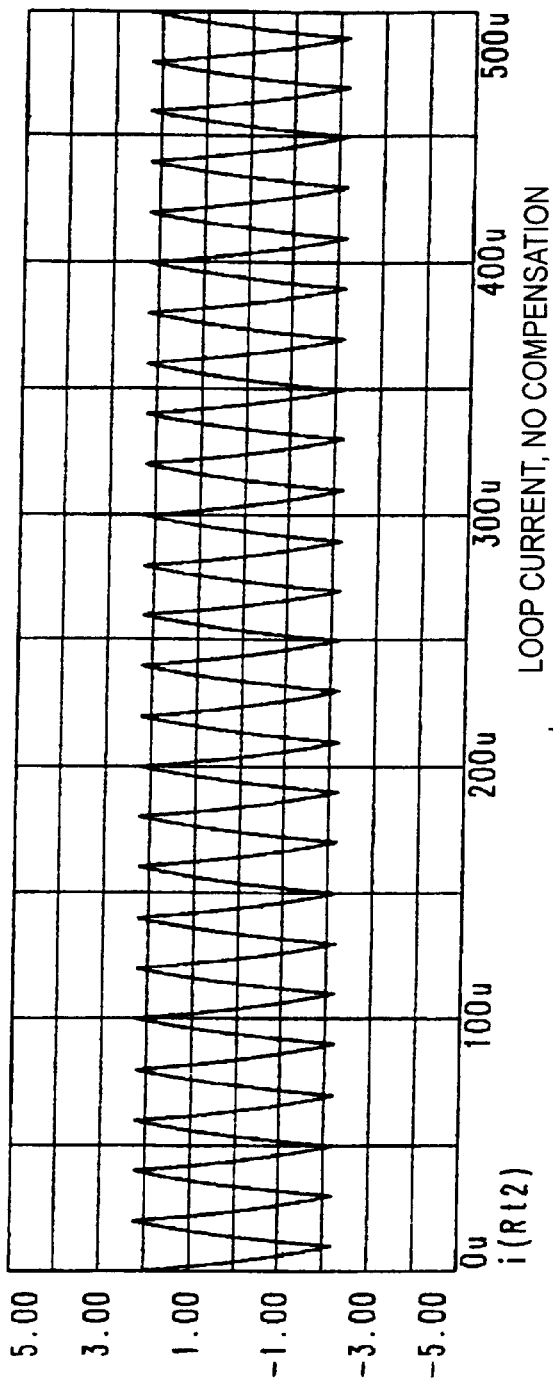
FIG. 45a depicts the current waveform circulating in a main distribution loop for a system in which capacitors have not been added in series with the system's risers.
Figure 45B:
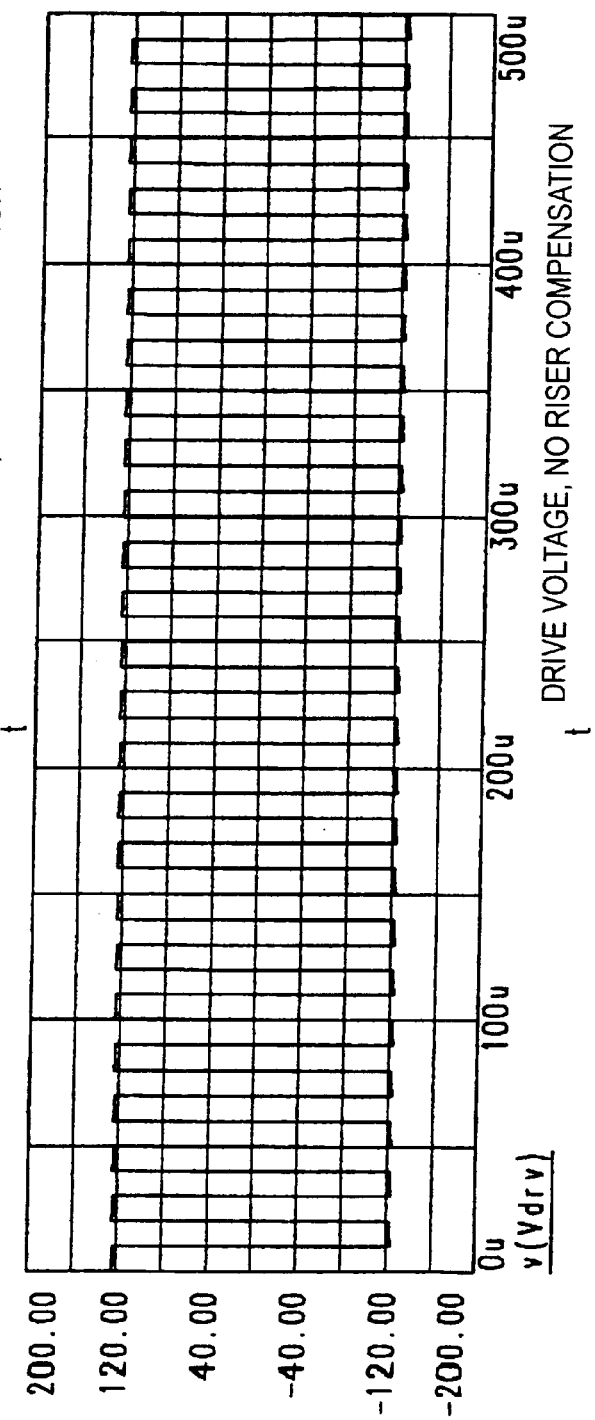
Figure 46A:
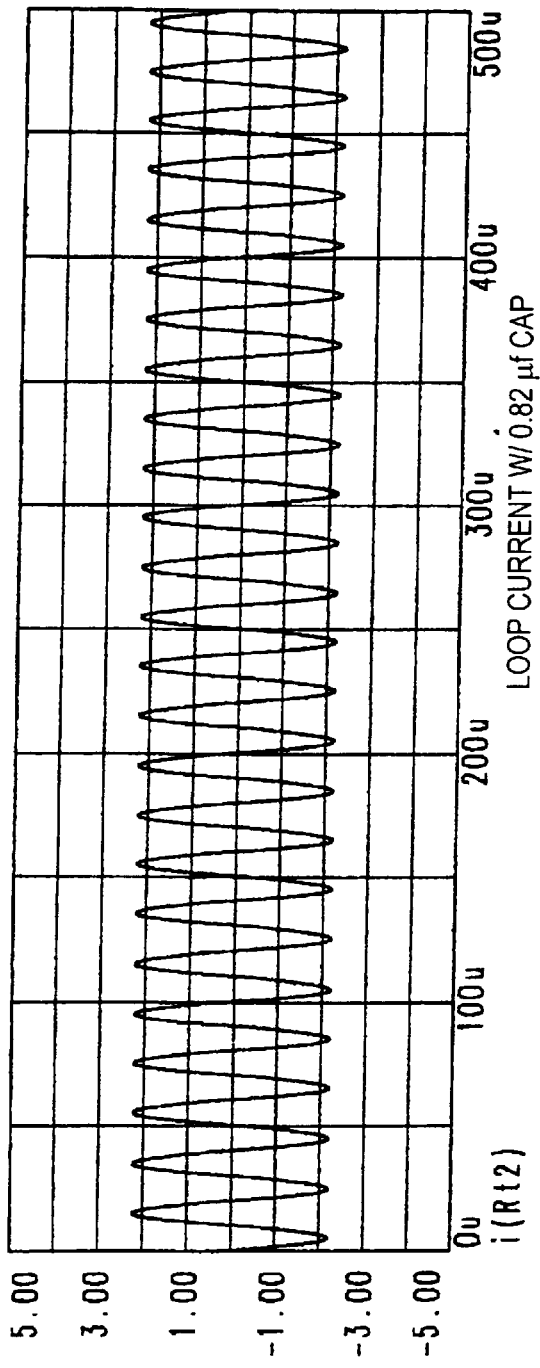
FIG. 46a depicts the current waveform circulating in a main distribution loop for a system in which capacitors have been added in series with the system's risers.
Figure 46B:
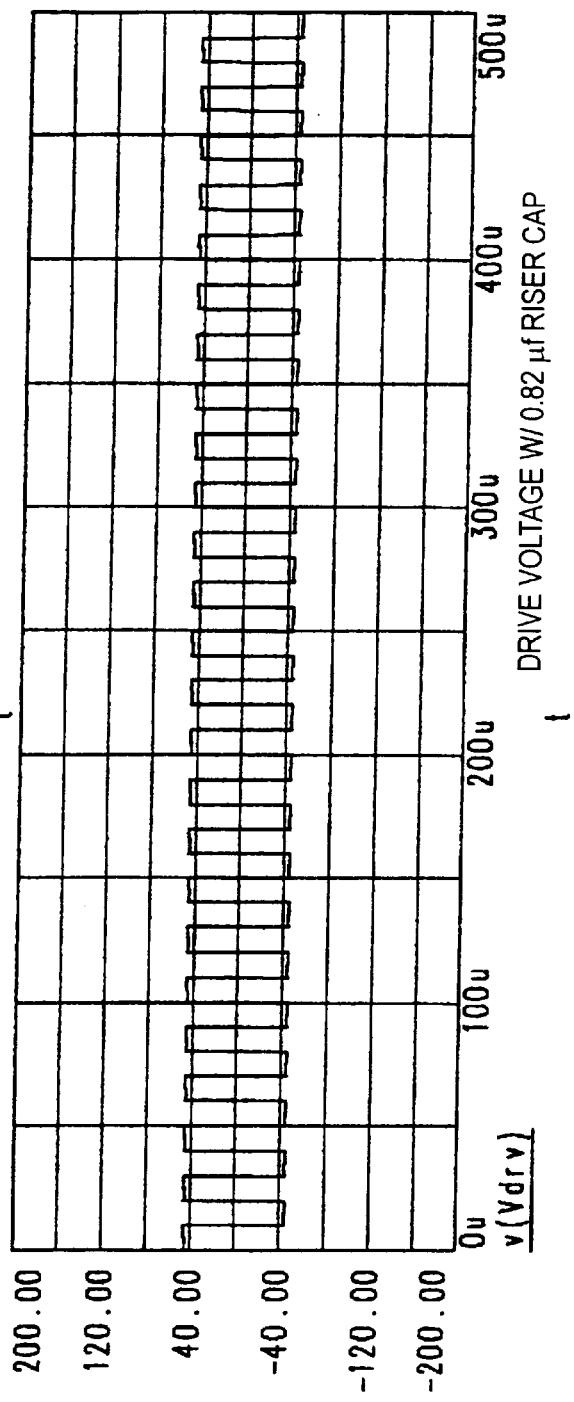

FIG. 45a depicts the current circulating in a main distribution loop (stringers and risers) for a system in which capacitors have not been added in series with the system's risers. The current waveform has a distorted triangular shape at 1.56 RMS amps. FIG. 45b depicts the drive voltage waveform that is needed to generate the current waveform depicted in FIG. 45a. The voltage waveform of FIG. 45b is a square wave at 124 RMS volts. When capacitors are added in series in the risers of a system (as will be described below), the waveforms depicted in FIGS. 46a and 46b are produced. FIG. 46a depicts the current circulating in a main distribution loop for a system in which capacitors having values of 0.82 $\mu$F have been added in series with the system's risers. The current waveform has a sinusoidal shape at 1.57 RMS amps. FIG. 46b depicts the drive voltage waveform that is needed to generate the current waveform depicted in FIG. 46a. The voltage waveform of FIG. 46b is a square wave at 45.1 RMS volts. Accordingly, the drive voltage can be reduced by approximately 63.6% when capacitors are added in series with risers in a system. The results of FIGS. 45 and 46 are based on an area controller having 10 stringers, 20 risers, 140 shelves and 980 tags coupled thereto. While the drive voltage of FIG. 46b of 45.1 RMS volts is slightly above the SELV of 42 RMS volts, a reduction in the load being driven by an area controller can be made to satisfy SELV.

The negative effects of impedance on power consumption are reduced by employing capacitors in the risers 423 and/or the shelf and rail distribution loops. Examples of the use of such capacitors can be seen in reference to FIGS. 40a, 40f, and 43e. Also, capacitors are used in the tags to improve coupling efficiency.

The relationship between the current provided where the drive voltage, $V_{DRIVE}$, is limited can be understood with reference to the formula (1) $V_{DRIVE} = iR + 1/L \int (i\,dt) + C\,di/dt$, wherein i is current, R is resistance, L is inductance, and C is capacitance. Given that (2) i=A sin 2πft., where f is frequency, substituting into formula (1) yields (3) $V_{DRIVE}$= cos 2πft. (−A/2πfL+A2πf).

With respect to the use of a capacitor in a shelf and rail distribution loop (as shown for example at 806 in FIG. 10b), the insertion of the capacitor into the loop provides the benefit of allowing the loop to be driven with a square voltage wave signal that results in a near sinusoidal current. The resulting sinusoidal current improves the functioning of the reverse communication scheme. Additionally, the insertion of the capacitor reduces radiation and eliminates higher order harmonics by shaping the current signal to more closely resemble a sine wave and less like a square wave.

Capacitors are used by balance the impedance seen on the line thereby aiding in the transfer of power from the conductors to the tags and back from the tags to the area controllers. In effect, the capacitance and inductance is thereby distributed producing individual sections or sub-loops of a single area controller loop that resonate at 50 kHz. As these sections or sub-loops all resonate at approximately 50 kHz, they can be added in series without adverse effect because of the low "Q" of the sections. Given that the "Q" is so low, the expected negative resonant circuit effects are not a dominant factor. The resulting improved performance of low impedance and resulting lower drive voltage is achieved despite the heretofore common conception that one could not drive a resonant circuit into another resonant circuit effectively. Despite this conception, according to embodiments of the present invention, many resonant circuits are stringed together. Impedance is added to the system of the present invention by each riser added in series, each magnetic coupler coupling the risers to each shelf and rail loop with some accompanying leakage inductance, and each shelf and rail loop. For example, each riser and each shelf and rail loop adds about 2 $\mu$H of inductance. Accordingly, a riser having five associated shelves has a total of about 12 $\mu$H of inductance which resonates with a 0.82 $\mu$F capacitor at about 50 kHz. However, in actual application, the number of shelves per riser varies between about two to eight shelves; and therefore, the total impedance correspondingly varies. In one embodiment, the capacitive value is determined based on the typical number of shelves per riser expected.

The optimal value of a capacitor placed in a riser and/or in a rail can be calculated using the formula $C = 1/[4\pi^2 L f_r^2]$ wherein C is capacitance, L is inductance, and $f_r$ is resonant frequency.

Impedance is also reduced by employing large diameter wires. To further reduce the power losses, the resistance of the power distribution system preferably uses 14–16 AWG copper wires or equivalent cross-section wires throughout the area controller to tag distribution system.

Where practical, flat conductors are used to lower inductance. The larger surface area of flat wires as compared to round wires contributes to lower inductance. For example, according to one embodiment flat conductors 4304 and 4306 are used in the shelf conductor 4302. See FIG. 43c. Also flat conductors 430 and 431 are employed in the riser 423. Using flat conductors in the riser provides the added benefit of facilitating the insertion of the risers between the back of the shelves and the gondola supporting member by making the riser thinner. See FIG. 39b. Likewise, employing flat conductors 4304 and 4306 in the shelf conductor 4302 enhances field cancellation which in turn reduces inductance and stray radiation.

Inductance is also reduced by minimizing the area in the loops (i.e., the stringers, risers and rail loops). Generally speaking, the bigger of a loop formed by a conductor, the greater the inductance in that loop. According to an embodiment of the present invention, the area is reduced in the rail conductor spanning a typical four foot shelf by reducing the separation between the sections of the rail conductor in an auxiliary rail to about 1.4 inches. Furthermore, the area between the conductors on a shelf is further minimized by employing flat conductors 4304 and 4306 of the shelf conductor 4302 spaced only minimally apart by only a thin piece of vinyl tape having a thickness of about four (4) to five (5) mils. See FIG. 43c. Alternatively, the area between the conductors is reduced by twisting the wires about each other as in FIG. 43d. Similarly, employing closely spaced parallel wires to limit or minimize the areas of these loops in the stringers and risers while limiting their length optimally helps, or flat wires, or even twisted pairs (all as more fully described elsewhere herein).

Furthermore, the display system according to the present invention is able to achieve a practical low cost system having low inductance even though a single conductor loop emerging from an area controller contains many sub-loops (e.g., each rail, each riser, each stringer) connected in series. While inductance could be reduced by adding sub-loops in parallel, the present invention's approach of adding sub-loops in series has the benefit of providing a system that can be easily balanced without having to use exotic means which would be required to balance a system having loops arranged in parallel.

Inductance is also reduced by optimizing the number of turns in each tag's coil and the gauge of the wire used in the coil. In general, the bigger the tag's resonant capacitor, the more current that circulates and the greater the resistive losses present in the tag. The number of turns and the gauge of wire used in the coil is optimized to minimize the current circulating in the tag, thus reducing resistive losses which increase with increased current.

Additionally, power losses can be reduced further by employing a stacked film Panasonic type PPS capacitors (available from Panasonic of Japan which has a sales office in Elgin, Illinois) or similar low ESR designs for use in resonant circuits. This capacitor is used as resonant capacitor 112 in FIGS. 19a and 20b. Other applications include use in the riser or as the shelf conductor 4302 or "pigtail" capacitor. Two separate capacitors are used. The capacitor promotes coupling efficiency and reduces leakage inductances. Additionally, this PPS capacitor has significantly lower losses such as resistive heat dissipation losses than ordinary ceramic capacitors. This PPS capacitor has a low equivalent series resistance (ERS).

Inductance losses are additionally reduced by employing the magnetic coupler described in FIGS. 44a–44b having a core using 5,000 perm material. In general, the higher the perm, the lower the leakage.

Finally, the conductors employed in conjunction with the system of the present invention are designed to reduce the degree to which eddy currents are produced. For example, the conductors are designed are reduced the production of eddy currents in the steel shelves on top of which shelf conductors (e.g., conductors 4302 of FIG. 43a and twisted wire pairs 4320 of FIG. 43d) directly mounted. As discussed above, one manner in which eddy currents are reduced is by arranging conductor pairs so that their fields cancel each other. Furthermore, use of the auxiliary rail and mounting the rail conductors on front surface of the auxiliary rails reduces eddy currents by increasing the distance between the rail conductor and the steel shelves.

Additionally, a transformer can be added between the stringer and riser as shown in FIGS. 42b–d. This lowers the voltage across the stringer but increases voltage across the risers. The risers, being a series load, divide the voltage down.

STRATEGIES FOR REDUCING VOLTAGE

The present invention provides several strategies for lowering voltage and improving the current waveform. These strategies include adding a capacitor at the bottom or the top of each riser; adding a capacitor at the bottom or top of each riser plus making a rail capacitor resonate at the third harmonic; adding a capacitor to the area controller resonant at 50 kHz; and adding a capacitor to the area controller, resonant at 50 kHz, and adding another capacitor (also with a resonant frequency of 50 kHz) to the rail distribution loop.

Riser Capacitors

Figure 40A:
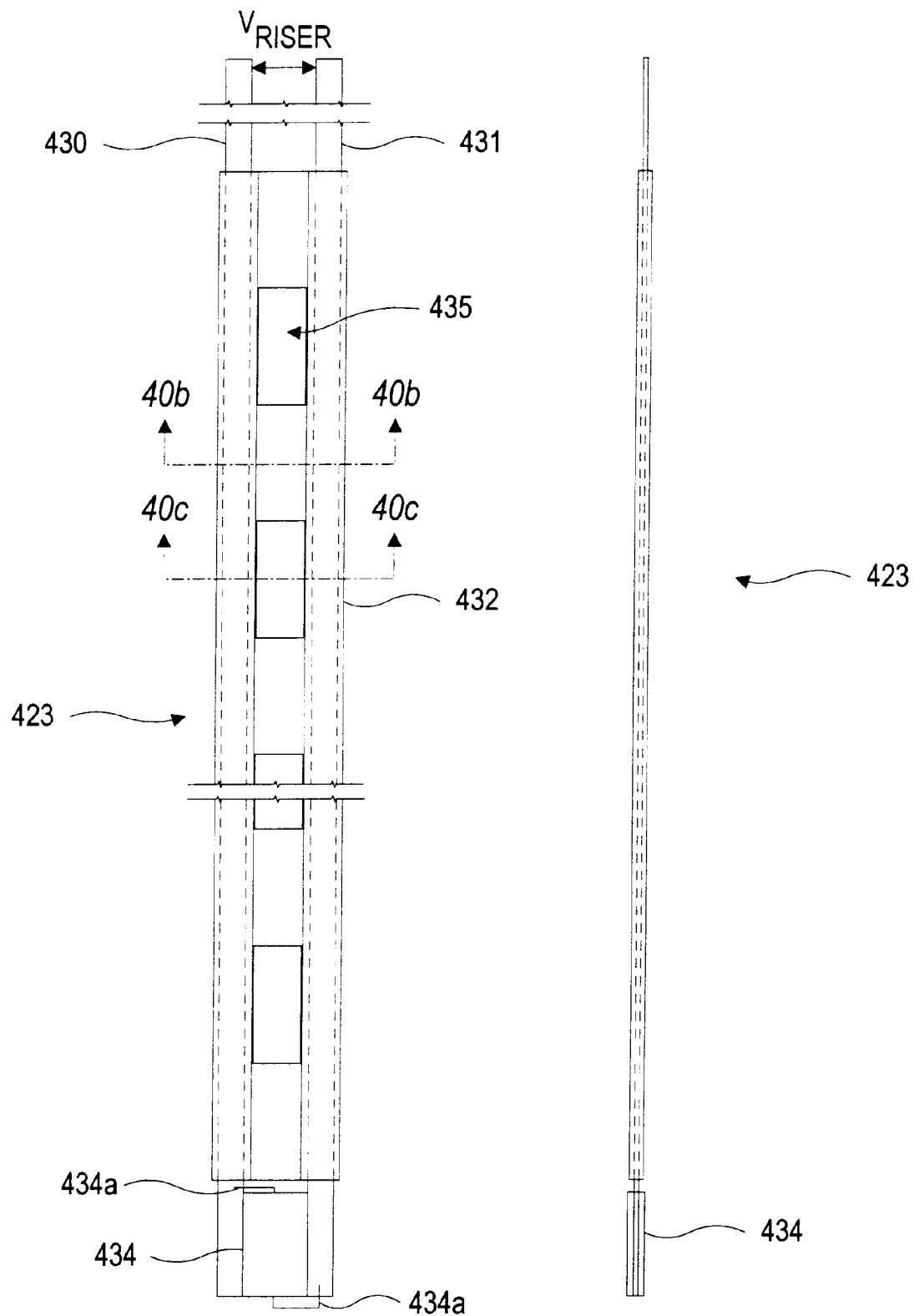
FIG. 40a is a front view and FIG. 40a' is a side view of a riser.
Figure 40B:
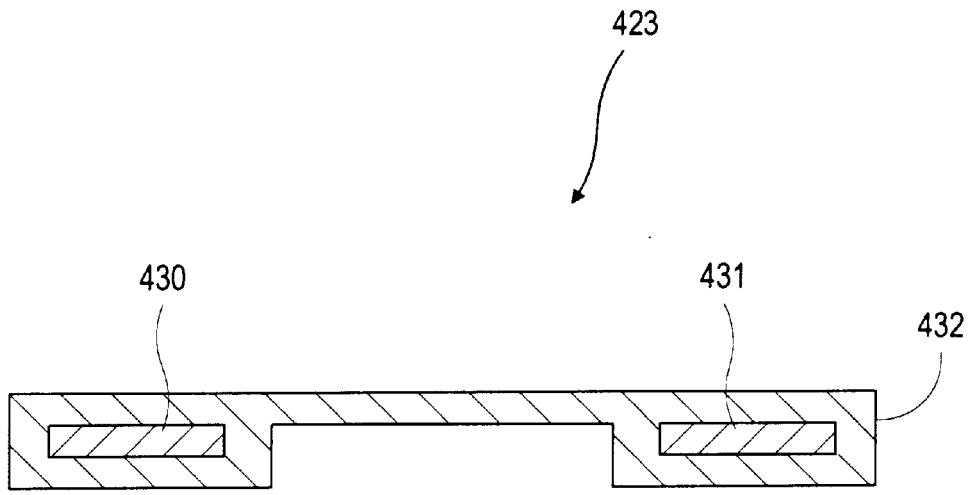
Figure 40C:
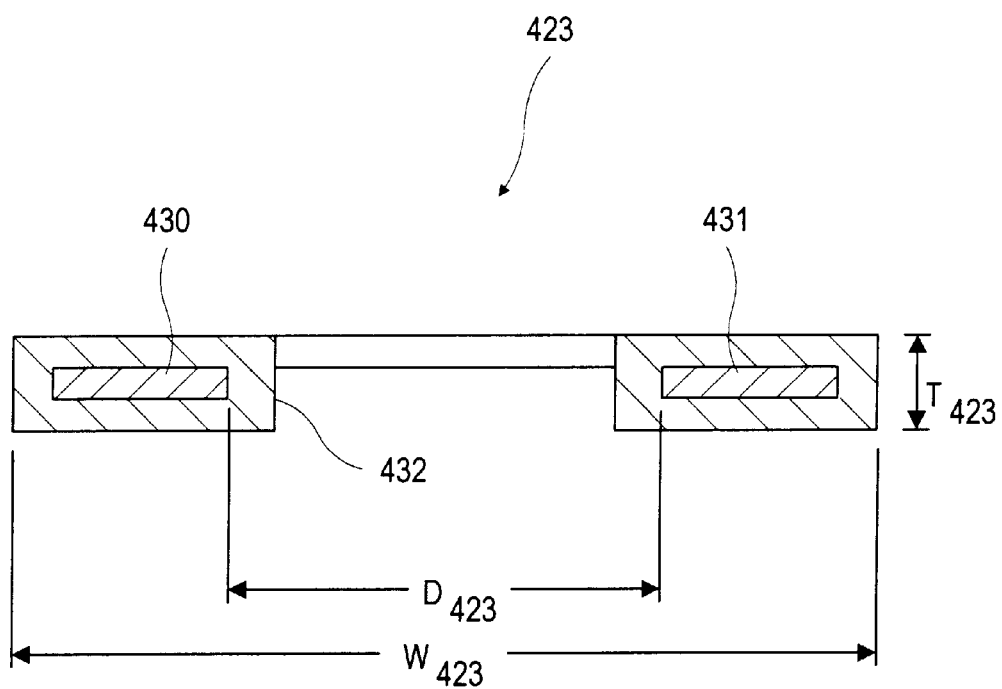

The first strategy for reducing voltage and improving the current waveform is now described. FIG. 40a is a front view of a riser 423 and FIG. 40a' is a side view of the riser 423. FIGS. 40b and 40c are cross-sectional views of the riser 423 of FIG. 40a taken generally along lines 40b—40b and 40c—40c, respectively. Each riser 423 comprises a pair of parallel conductors 430 and 431 electrically connected at the lower end to form a U-shaped segment of the main distribution loop. As in the case of the stringer 422, the conductors 430, 431 in the riser 423 are encased in a dielectric strip 432 which covers the outside surface of each conductor 430, 431 with a dielectric thickness of at least 0.015 to 0.020 inches to protect the system from electrostatic discharges and mechanical impact which could otherwise lead to shorts or exposed wires.

To facilitate installation of the riser 423 in the 0.25-inch gap, G, that normally exists behind the shelves on a gondola (see FIG. 39b), the conductors 430, 431 (see FIGS. 40a–40c) are preferably in the form of thin flat strips of copper, e.g., 0.110 inch by 0.020 inch. Use of flat conductors also aids in the reduction of inductance. These strips are contained in channels of an extruded dielectric strip 432 having a total thickness, $T_{423}$, of 0.060 inch (FIG. 40c). The riser 423 has a width, $W_{423}$, of 0.545 inches. The conductors 430 and 431 are spaced apart from each other by a distance $D_{423}$ of approximately 0.275 inches (or a center to center distance of 0.40 inches).

In order to facilitate coupling of the conductors 430 and 431 to the shelf and rail distribution loops, rectangular holes 435 are formed in the central web of the dielectric strip 432, at regular intervals along the length of the strip. As will be described in detail below, these holes 435 are used to receive a snap-on magnetic core module that couples the riser and shelf distribution loops. The center-to-center spacing of the holes 435 along the length of the strip is preferably the same as that of the shelf-mounting holes 436 in the shelf-support column 437 on the gondola (FIG. 41c), so that a hole 435 will always be located close to the rear edge of a shelf, regardless of where the shelf is mounted on the gondola. The riser 423 may be prefabricated in different lengths to match the dimensions of gondolas of varying heights.

As shown in FIG. 40a, the leads 434a of a capacitor 434 are connected across the two conductors 430, 431 at the lower end of the strip 432. This use of the capacitor in connection with the riser is referred to as riser compensation. This capacitor 434 is employed to reduce the voltage induced across the riser, $V_{riser}$, and the value of the capacitor 434 is selected to minimize $V_{riser}$. $V_{riser}$ is minimized by selecting the value of the capacitor 434 so as to make he riser (with an average number of shelf and rail loops and tags coupled thereto) approximately resonant at the primary excitation frequency which is 50 kHz according to an embodiment of the present invention. Thus the riser compensation decreases the drive voltage requirement of the power distribution system via resonant tuning. A resonant circuit has the lowest impedance and the maximum power transfer. Accordingly, by making the riser loop resonant, these beneficial characteristics are obtained.

Figure 40D:
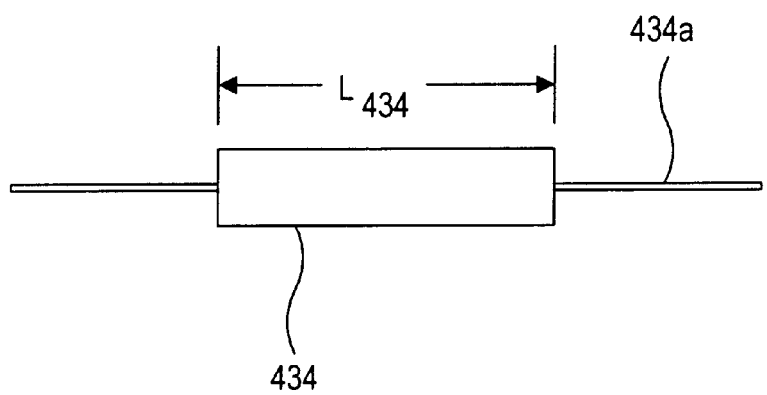
Figure 40E:
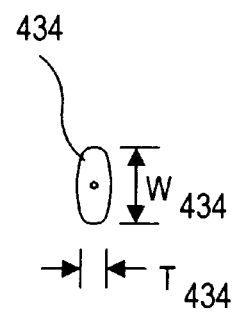

FIG. 40d illustrates a front view and FIG. 40e illustrates an end view of capacitor 434 according to one embodiment. The capacitor has a length, $L_{434}$, of 2.0 inches, a width, $W_{434}$, of 0.33 inches, and a thickness, $T_{434}$, of 0.15 inches. According to one embodiment, the capacitor 434 may be of the staked film or PPS type and has a value of 0.82 $\mu$Fd. The value of 0.82 $\mu$Fd is selected on the basis of a riser connected to six (6) rails which is a typical number of shelves on each side of a gondola. The combination of a riser and six rails has about 12 $\mu$H of inductance. While in actual application some risers will have more than six shelves (e.g., eight shelves) and some will have less than six shelves (e.g., four shelves), because the loops are added in series, on average, there will be six shelves and the loop will remain approximately resonant.

Figure 40F:
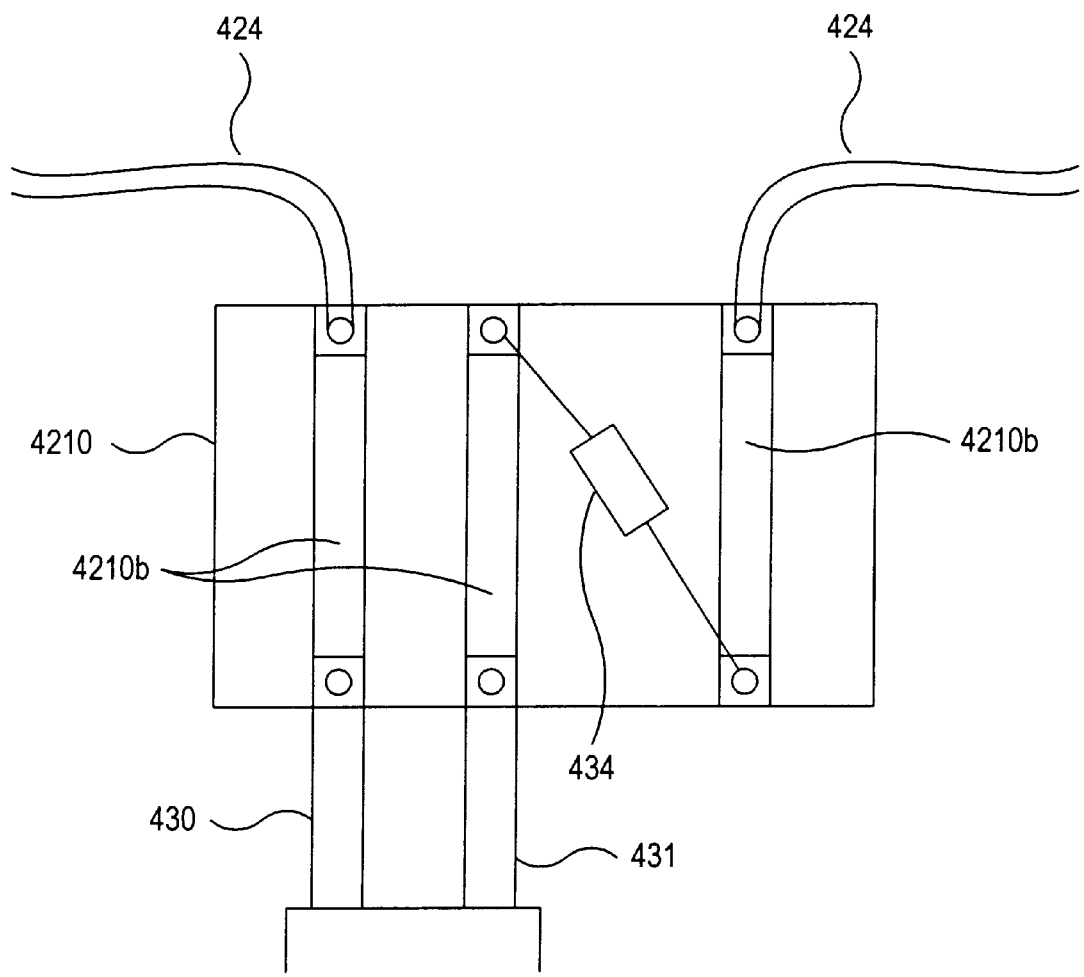

Instead of placing the capacitor 434 at the bottom of the riser as shown in FIGS. 40a and 40a', the capacitor 434 may alternatively be connected in series near the top of the riser. As shown in FIG. 40f, a six port connector box 4210 is used to connect a stringer wire 424 in series with a riser 423 having conductors 430 and 431. The capacitor 434 is connected in series by connecting it across two of the ports of the connector box 4210 thereby connecting one of the riser conductors 431 with one end of the stringer wire 425. A four port configuration of this connection box is described in more detail below. See e.g., FIGS. 41e–41h. As seen in FIGS. 40g and 40g', where the capacitor 434 is inserted at the top of the riser 423, a conductive strip 439 is used to connect the riser conductors 430 and 431 at the bottom of the riser. In either embodiment, a heat shrink boot coated on the inside with an adhesive is applied over the capacitor 434, the lead wires 434a, and soldered connections to the riser wires to electrically insulate this portion of the circuit. The heat shrink boot may be, for example, an EPS200 heat shrink tubing available from 3M of Minneapolis, Minn. Other methods, such as overmolding or laminating could be used.

Rail Capacitors Tuned to Third Harmonic

Figure 47:
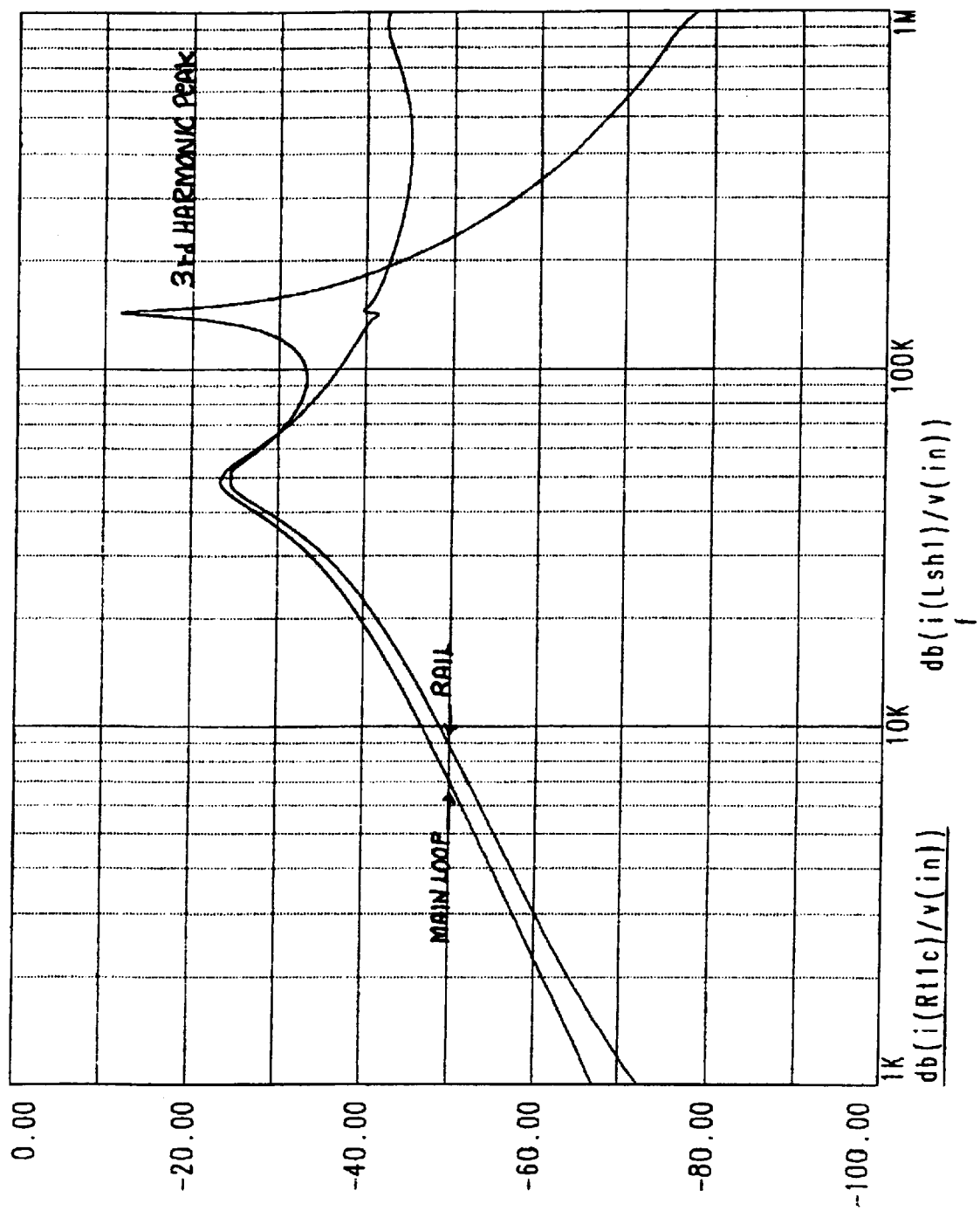
FIG. 47 shows the frequency response of the primary power distribution loop and the frequency response of the compensated rail loops.
Figure 48A:
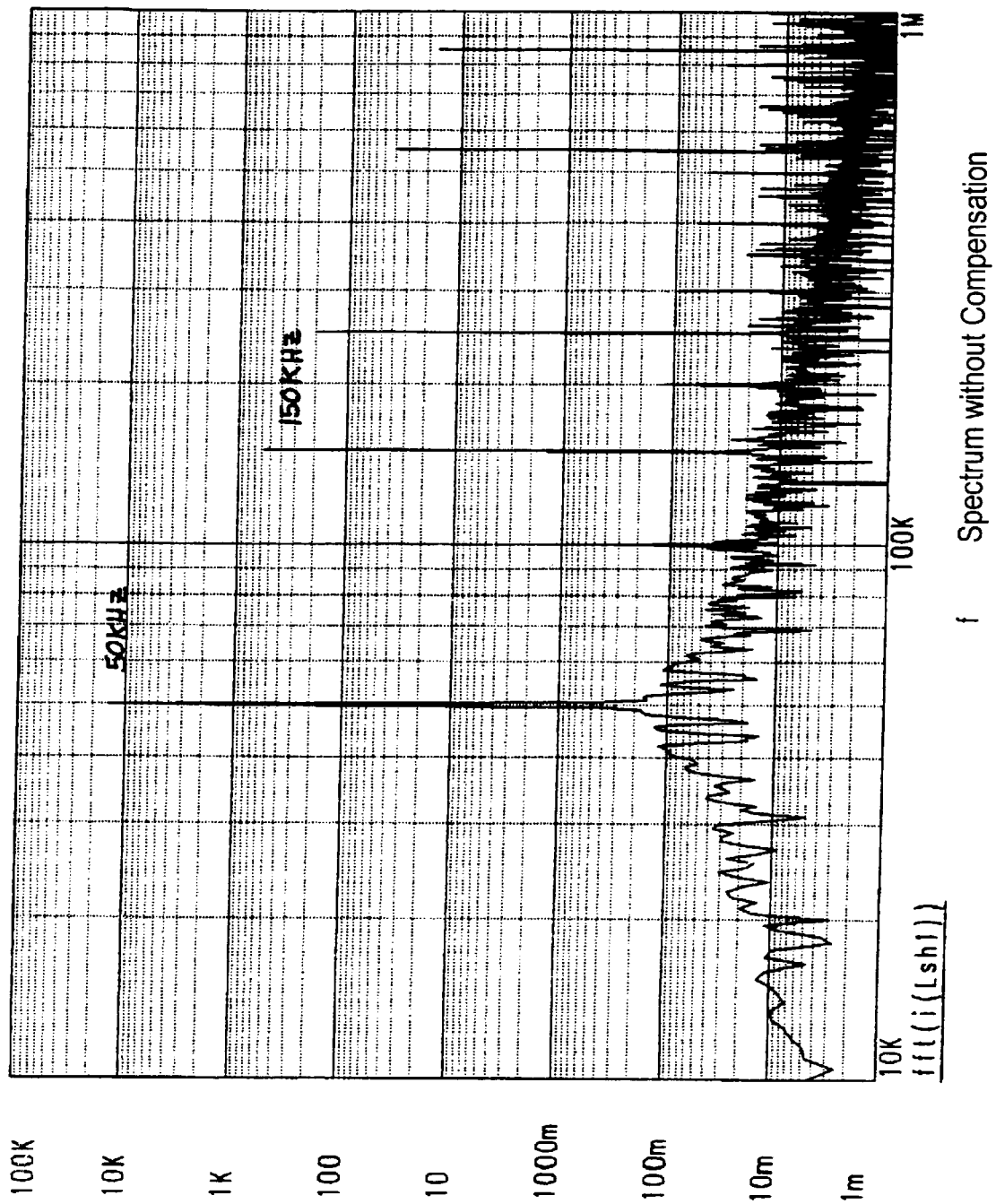
FIG. 48a shows the frequency spectrum of the current waveform in a shelf and rail loop not compensated with the addition of a capacitor.
Figure 48B:
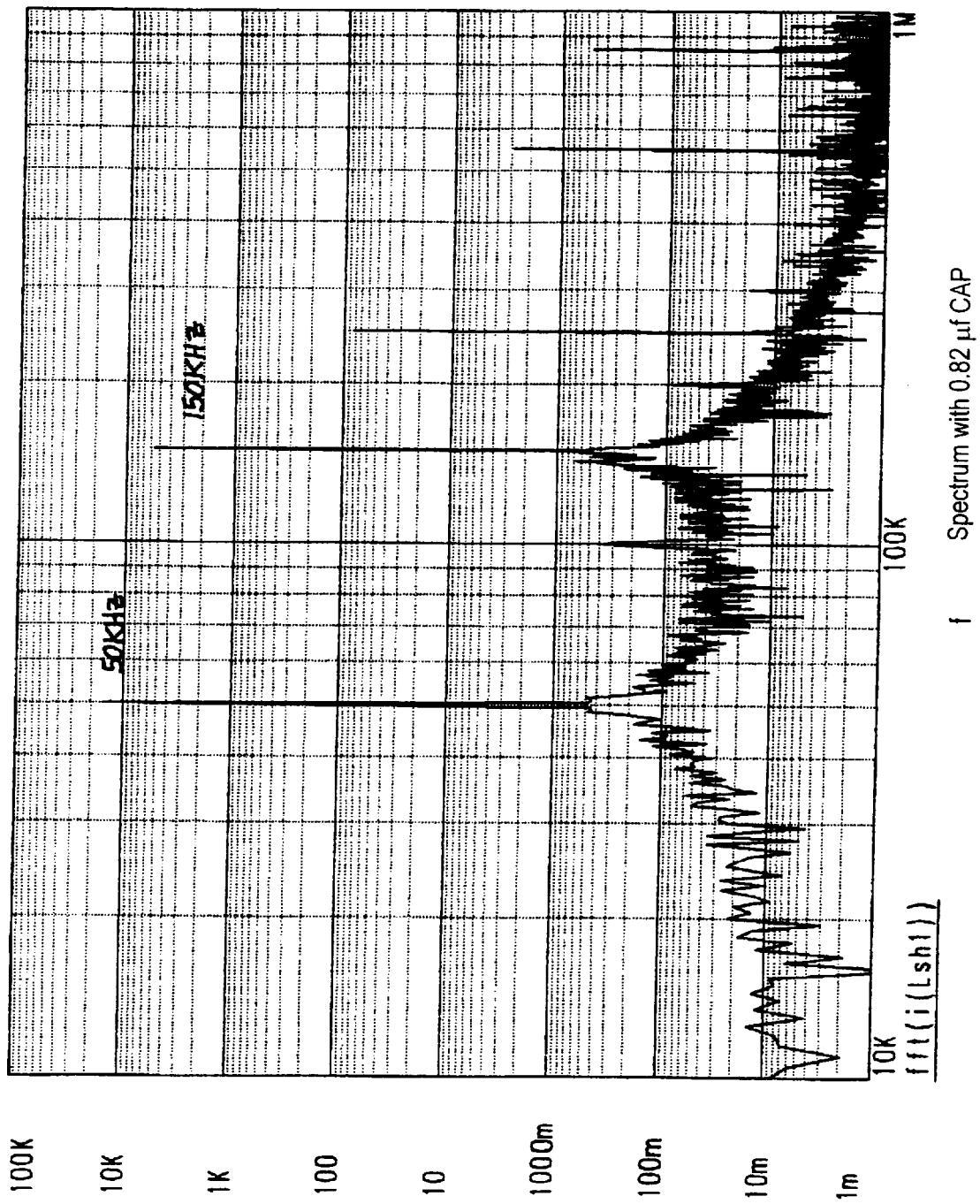
FIG. 48b shows the frequency spectrum of the current waveform in a shelf and rail loop compensated with the addition of a capacitor.

Adding capacitors in parallel with the transformers of the shelf and rail loops increases the efficiency of the power distribution system via a third harmonic peaking method. The capacitor value is selected for a resonant power boost at the third harmonic (150 kHz) of the primary excitation frequency (50 kHz) according to an embodiment of the present invention. The third harmonic power component which would otherwise be dissipated in the main system is transferred to the tag loads. FIG. 47 shows the frequency response of the primary power distribution loop (stringers and risers) and the frequency response of the compensated rail loops. The shelf and rail loops are compensated by the addition of 0.82 $\mu$F capacitors across the secondaries (shelf/rail loop transformers). The primary loop is resonant at 50 kHz and the shelf and rail loop is resonant at 150 kHz (third harmonic). FIG. 48a shows the frequency spectrum of the current waveform in a shelf and rail loop not compensated with the addition of a capacitor. The primary 50 kHz component to 150 kHz harmonic component ratio is approximately 28 db. FIG. 48b shows the frequency spectrum of the current waveform in a shelf and fail loop compensated with the addition of a capacitor. The primary component to 150 kHz harmonic component ratio is approximately 8.3 db. Accordingly, the harmonic component is 19.7 db higher in a system with rail compensation then without rail compensation. These results are based on a area controller having 10 stringers, 20 risers, 140 shelves, and 980 tags coupled thereto. Using the above system, the following results were obtained:

| Simulation #1 (without rail compensation): | | | |
| --- | --- | --- | --- |
| B + Regulator = 46.000 | DC | volts | |
| Drive Voltage = 44.920 | RMS | volts | |
| Drive Current = 1.555 | RMS | amps | |
| Tag Voltage = 5.653 | DC | volts | |
| Tag Power = 25.77 m | DC | watts | |
| Simulation #2 (with 0.82 $\mu$F rail compensation): | | | |
| B + Regulator = 40.600 | DC | volts | (decreased by 11.74%) |
| Drive Voltage = 39.661 | RMS | volts | (decreased by 11.71%) |
| Drive Current = 1.3685 | RMS | amps | (decreased by 12.03%) |
| Tag Voltage = 5.670 | DC | volts | |
| Tag Power = 25.93 m | DC | watts | |

The value of the capacitor used in the rail conductor is selected to make the rail conductor resonant at the third harmonic of the carrier signal which is 150 kHz. It was discover that a substantial amount of energy was being lost at the third harmonic. Accordingly, the capacitor is added to make the loop resonant at the third harmonic. As a result, it has been found that the insertion of the capacitor in the rail saves a substantial amount of energy Adding Capacitance at the Area Controller Alternatively, instead of distributing the capacitors in the rails and risers, all of the capacitance may be added in one location such as at the area controller as indicated at 802 in FIG. 10b. According to this embodiment, the area controller could monitor the inductance seen on an individual loop as indicated at 804 in FIG. 10b. Logic and switching means are provided in the area controller so that the area controller would switch with internal capacitors so that their value would resonate with the measured inductance at 50 kHz. This selection program could be run occasionally for audit purposes or when a shelving section was reconfigured. Based on the total inductance in a loop, a sufficient amount of capacitance such as a sufficiently large capacitor could be added in the loop such as at the area controller to balance the loop. Alternatively, a multi-tapped or other form of variable capacitor 803 and associated switching and logic control (included in block 804) could be added to an area controller, as shown in FIG. 10a. The area controller could measure the inductance of a loop and then using the multi-tapped capacitor add the appropriate amount of capacitance to the loop so as to create resonance at 50 kHz. Such an embodiment has the advantage of permitting the great deal of flexibility in accommodating loops having different numbers of risers, shelves, and tags associated with each loop. Additionally, the area controller could be programmed to periodically measure the capacitance and inductance on each loop, making appropriate adjustments to balance the loops as needed. Alternatively, the area controller may be provided with means such as a switch or button that causes the area controller to measure the capacitance and inductance and then make appropriate adjustments to balance the loop. Such a button could be pressed, for example, after the system configuration is altered for the associated loop such as by adding or removing shelves or tags to the loop. Such a system permits the performance to be optimized even after the system is reconfigured.

According to one embodiment as shown in FIG. 10b, a variable capacitor 803 such as a capacitor ladder or multi-tap capacitor is employed within a TAC 31 to automatically tune a "loop" section, i.e., a section defined by one stringer 422. When the inductance of the stringer/riser has been determined, the TAC (e.g. at block 804) can select the value of the variable capacitor to achieve resonance at the desired resonance frequency, e.g., 50 kHz. Such a configuration is combined with the inductive stringer/riser coupling described above in connection with FIGS. 42a and 42b to allow the turns ratio to be adjusted to lower the voltage in the stringer. Only one type of stringer bobbin and one type of riser bobbin would be used so that the bobbins could be assembled during manufacturing. Additionally, each shelf and rail loop 4300 would include a capacitor for compensation such as that described above in connection with FIGS. 43e and 43f to make a shelf and rail loop having an average number of tags resonant at 50 kHz. No riser compensation would be employed, i.e., capacitors would not be coupled in series with the risers, according to this embodiment.

Field cancellation is utilized to minimize impedance and lower voltage. For example, the stringer 422 wires are conducting in opposite directions (see, e.g., FIG. 38b). This is also true for the flat conductors 4304 and 4306 of the shelf conductor 4302 of FIG. 43c and the twisted pair wires 4324, 4326 of FIG. 43d. As can be determined using the right hand rule, the fields in the conductors oppose each other in the middle between conductors and consequently cancel out. Field cancellation reduces inductance. Field cancellation is also beneficial in that its reduces stray radiation, thereby reducing fields that could otherwise couple to nearby electrically conductive surfaces (such as the shelves and other metal portions of the gondola) inducing eddy currents which would result in losses of power. The field cancellation is also beneficial in reducing the magnetic coupling to magnetic materials such as steel which could provide a shunt effect that increases inductance by effectively increasing the permeability of part of the magnetic path. Field cancellation also reduces extraneous radiation. To increase field cancellation, pairs of conductors such as the stringer wires 424 and 425 and the flat conductors 4303 and 4306 were designed to be close to each other.

Adding Capacitance at the Area Controller and Rail Capacitors Tuned to Third Harmonic This strategy is identical to the strategy of adding capacitance to the area controller but makes adds a capacitor at the rail resonant at 50 kHz. Accordingly, a capacitor 4330 has the same value as capacitor 434 described above in connection with FIGS. 40a, 40d and 40e, i.e., a value of 0.82 µFd. Capacitor 4330 is of the stacked film type.

When a display tag 20 is attached to the auxiliary rail 320, a pick-up coil on the tag is in close proximity to the two parallel runs of the conductor C on the rear side of the auxiliary rail 320. Thus, the pick-up coil is electromagnetically coupled to both segments of the conductor C. The conductor C is snapped into the top channel 321 of the auxiliary rail 320, spans the length of the store shelf 24, and then loops to the bottom channel 322 of the auxiliary rail 320 and spans the length of the shelf rail again. Alternate phasing of the conductors C on vertically adjacent shelves (as shown for example in FIG. 8) minimizes cross talk between adjacent conductors along the shelves and causes field cancellation which avoids any significant radiation of signals from the entire system or susceptibility from other sources. Alternate phasing may be accomplished, for example, using the twisted pair configuration of FIG. 43d by employing an even number of twists on every other shelf and an odd number of twists on the intervening shelves. For example, the twisted conductors 4320 may be manufactured all with the same number of twists. Then an installer may simply add another twist to conductors positioned on every other shelf.

The modular construction of this invention permits large display tag systems to be assembled from only a few different types of prefabricated modules. The principal modules are the stringer and the risers that make up the main distribution loop, the connectors, and the shelf and rail distribution loop with the magnetic core module. Mass production of this relatively small number of modules reduces the overall cost of the display tag system, and significantly shortens the time required for installation. Moreover, the resulting system is highly reliable and relatively maintenance-free because of the small number of electrical contacts subject to corrosion. The system is also largely immune from damage from electrostatic discharges because all vulnerable portions of the system are enclosed in protective casings. Finally, this system provides virtually unlimited flexibility for the owner to re-locate any desired section of the display or storage facility with only minimal additional work to disconnect and re-connect the display system. Furthermore, when all magnetic couplings are used, re-arrangement of shelves and gondolas can be made without disrupting the parts of the system that are not being moved by disconnecting and reconnecting the appropriate connections. When a portion of the system is disconnected, for example when a gondola is being moved, SELV levels are present in the remaining system. Likewise, the present system is advantageous because information need not be lost during a system reconfiguration as everything is stored in memory, e.g., the system controller maintains the information related to each product and the tags maintain at least their hard addresses. Thus the system does not need to be re-programmed after a reconfiguration of a store's gondola layout but rather the system may be quickly and automatically re-initialized.

The tags have been designed to reduce the amount of power that is needed while maintaining the cost of the tags at an affordable level. Some of the reduction in power demand has been achieved by the ASIC design and by the impedance modulation scheme used for reverse communication both as described above. The impedance modulation reverse communication scheme according to the present invention contributes to load and power demand reduction and stability which in turn contributes to drive voltage reduction. Employing a separate tag transmitter for reverse communication requires several times the power required for normal display operation, and requires that the power levels provided to tags be high enough to satisfy the power requirements of the transmitter all the time even when the reverse communication transmitter is not in use. During normal display operation, the excess power is Zener regulated and is essentially wasted. The magnitude of the system efficiency is becomes apparent when it recognized that reverse communication is only performed during a small percent of the time of system is operation, with the standard operation being the simply display of information by the tags.

Conversely, the reverse communication scheme of the present invention is much more efficient as the tags do not employ separate transmitters and the power levels of the conductors driving the tags are maintained only at the level needed to drive the display operation and not the higher levels that would be required to drive separate reverse communication transmitters. Rather, the only power that is needed for reverse communication according to an embodiment of the present invention is the nominal power needed to turn on and off a single transistor.

Additionally the turns/inductance, capacitance and type of tag resonant capacitor have been optimized to minimize the circulating current and losses in the tags. This optimization in turn minimizes the system losses. Most of the losses occur as resistive losses in the tag coil. The tag resonant coil component values are optimized to minimize the needed drive voltage while providing a specific voltage and current to the tag ASIC. As a result of this optimization, circulating current has been reduced from about 120 mA to about 42 mA.

Using a Zener regulator to shunt out extra power drives up the load which in turn requires the drive voltage to be increased, a result contrary to the goal of complying with SELV standards. Accordingly, the system according to the present invention uses a Zener to regulate an optimized resonant tag circuit. However, it is recognized that a series regulator could be used in the tags. Nonetheless, it is preferred to use a Zener to regulate an optimized resonant tag circuit because using a series regulator would increase costs and would be difficult to implement in CMOS.

The preferred tags used in the present invention utilize an air core transformer. To improve coupling efficiency between the conductor and tag, the distance between the tag's transformer and the conductor can be reduced by running the rail conductor along the front side of the auxiliary rail and placing the tag against the front side of the rail. Alternatively or additionally a thermoform tag construction may be employed to make the back of the tag flange thinner so that the tag's coil will be closer to the rail conductors. By designing both the tag and the rail so as to place the tag's coil and the rail's conductor as close as possible to each other, coupling efficiency is greatly improved as coupling efficiency is inversely proportional to the square of the separation distance.

Employing flat conductors in the risers 423 and the shelf conductors 4302 including the flat "C" terminal 4316 improves the coupling efficiency between the riser 423 and the shelf conductor 4302. For example, according to one embodiment flat conductors 4304 and 4306 are used in the shelf conductor 4302. See FIG. 43c. Likewise, a high perm material is preferably used in the magnetic coupler to improve the coupling efficiency.

Magnetic Coupler

As shown in FIGS. 49–54, a magnetic coupler 5010 of the present invention comprises a "E" core member 5012, an "I" core member 5014, a base 5016 for retaining the "E" core member 5012, and a shuttle 5018 for retaining the "I" core member 5014. The base 5016 includes a lattice 5026 and a cover 5028. In a preferred embodiment, a copper conductor 5017 is fitted within the slots of the "E" core 5012. The conductor 5017 retains the "E" core 5012 within the base 5016. The shuttle 5018 receives the "I" core 5014, and is slidingly connected to the base 5016. The shuttle 5018 may slide from an open position to a closed position, and its reciprocation is guided by the flanges 5027 of the base 5016.

Figure 49:
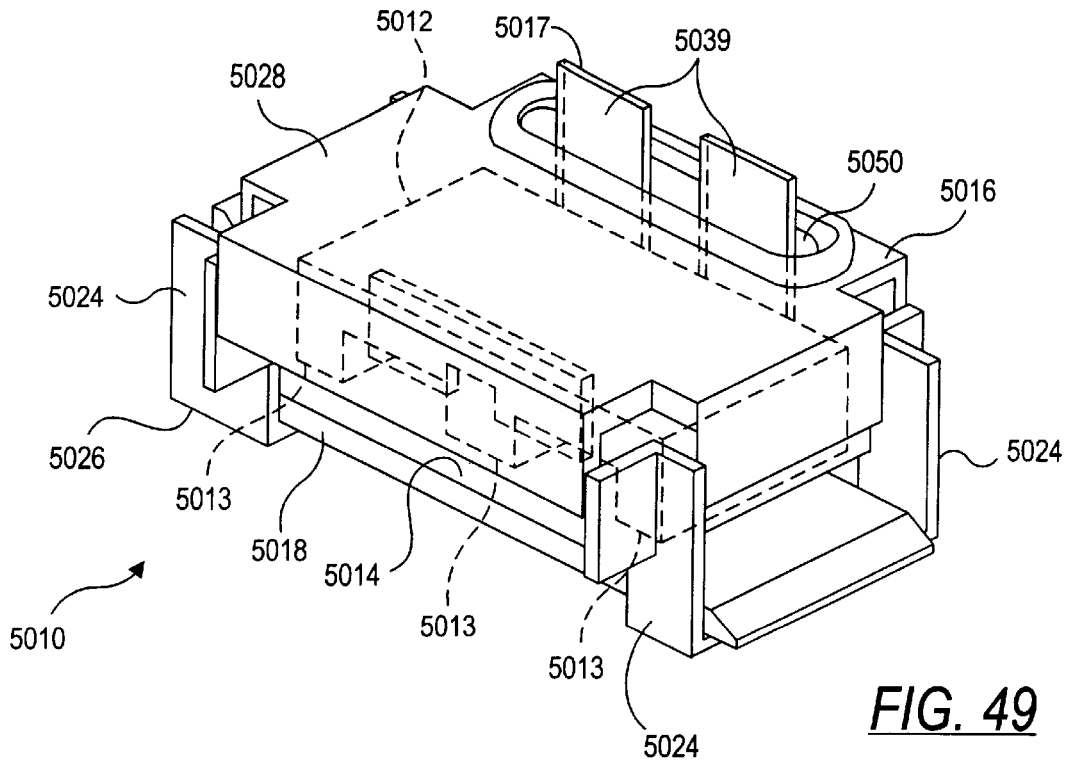
FIG. 49 is a perspective view of the coupler of the present invention, shown in the closed position, and a conductor.
Figure 51:
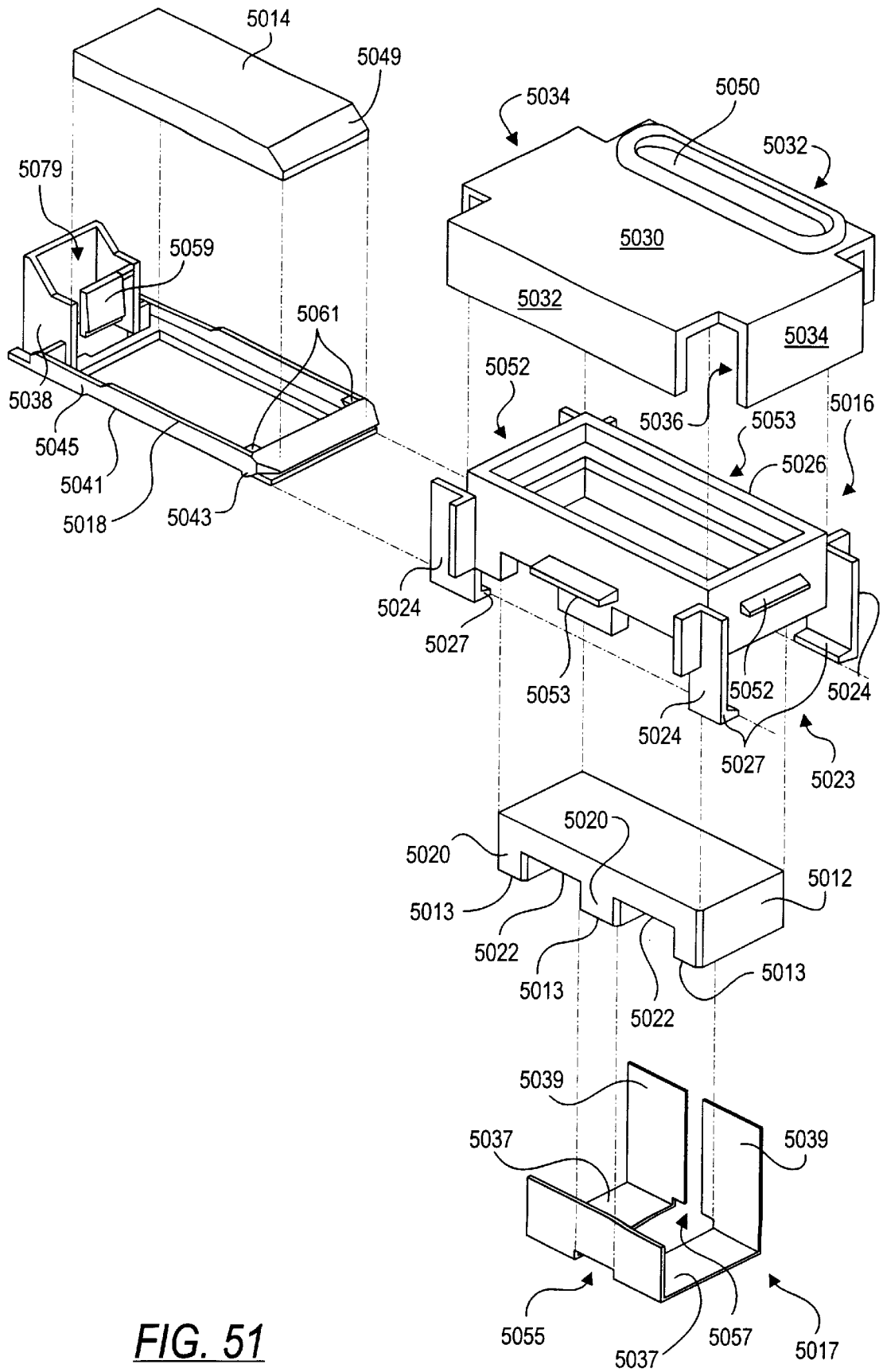

The "E" core member 5012 and "I" core member 5014 are formed of magnetic material to increase the induction efficiency between the electrical conductors. The "E" core member 5012 is preferably "E" shaped in profile, having three prongs 5020. Each prong 5020 has a mating surfaces 5013 which faces the shuttle 5018, as shown in FIG. 49. The prongs 5020 also define a pair of slots 5022 (FIG. 51). Copper conductor 5017 has a pair of parallel arms 5037 which fit within the slots 5022 of the "E" core. Each arm 5037 terminates in a flange 5039 which passes through the slot 5050 of the cover 5028. Conductor 5017 further has a pair of generally rectangular cut-outs 5055 and 5057. Although the conductor 5017 is described herein as copper, those skilled in the art will appreciate that the conductor 5017 may be made of any electrically conductive material.

"I" core member 5014 is generally rectangular in profile. However, the coupler of the present invention may use other shaped core members in place of the "I" core 5014. For example, a second "E" core member may be used in place of the "I" core 5014 without departing from the scope of the present invention.

As shown best in FIG. 51, the base 5016 is comprised of a lattice 5026 and a cover 5028. The lattice 5026 receives the "E" core member 5012, and includes four parallel extensions 5024. Lattice 5026 further includes a pair of tabs 5052 extending along its ends, and a second pair of tabs 5053 extending along its sides. The "E" core is received by the lattice 5026, and copper conductor 5017 is then placed around the lattice 5026. Cut-outs 5055 and 5057 fit around the tabs 5053, thereby retaining the conductor 5017 and the "E" core 5012 within in the lattice 5026. Base 5016 further has a set of four extensions 5024 extending generally perpendicular to the base 5016 from each corner. Each extension 5024 terminates in an inwardly-extending flange 5027, and the flanges 5027 together comprise a guide 5023.

Cover 5028 includes a generally rectangular plate 5030, a pair generally rectangular panels side panels 5032, and a pair of generally rectangular end panels 5034. The panels 5032, 5034 are oriented generally perpendicular to the plate 5030. Each end panel 5034 has a finger 5036 which is shaped to latch over a respective tab 5052 of the lattice 5026. In this manner, the cover 5028 receives and retains the lattice 5026 between the panels 5032, 5034. Cover 5028 further includes a longitudinal cut-out 5050 through which the flanges 5039 of the conductor 5017 may pass.

Shuttle 5018 is generally rectangular in top view and is shaped to receive the "I" core member 5014. Shuttle 5018 has a flexible clip 5059 with an angled surface to retain the "I" core within the shuttle. Shuttle 5018 also includes a leg 5038, as well as a front ramp 5043 and a rear ramp 5045 located along its top edge 5041. The front ramp 5043 and rear ramp 5045 are raised surfaces that extend forwardly of the top edge 5041. The front ramp 5043 is adjacent the front edge of the shuttle, and the rear ramp 5045 is adjacent the rear edge of the shuttle.

Figure 50:
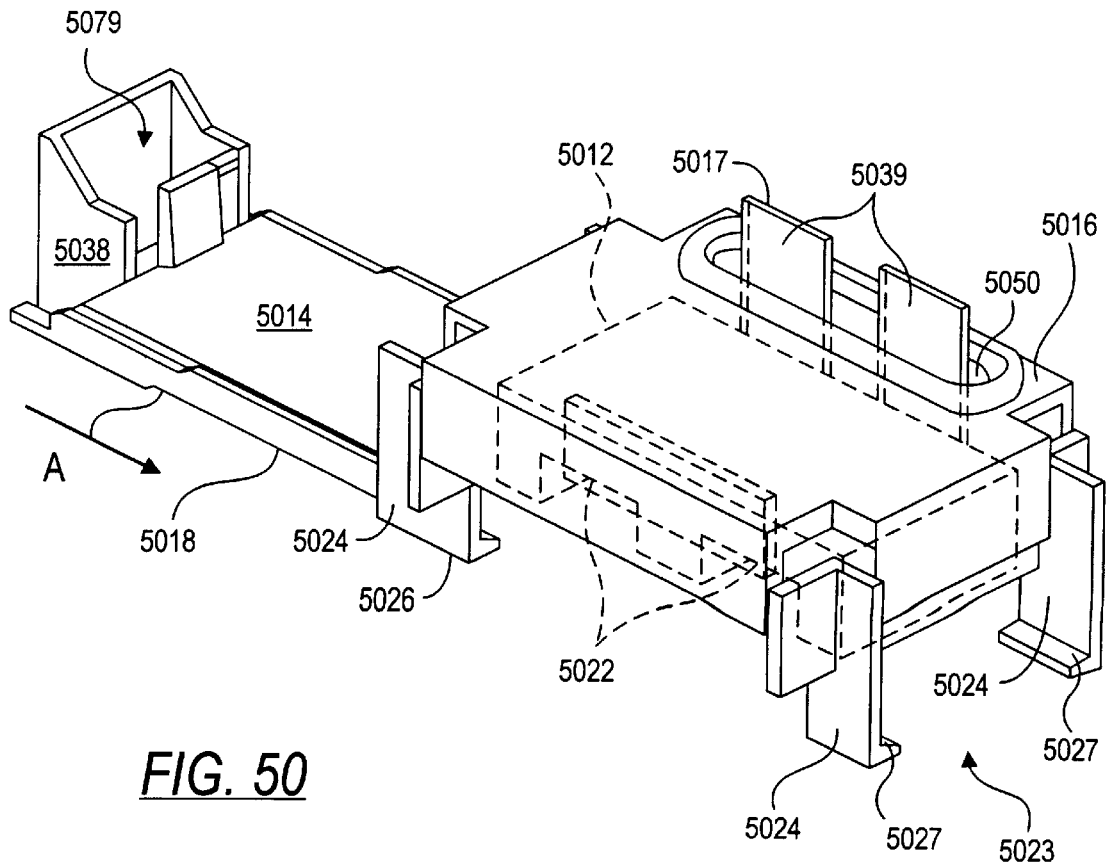

As shown in FIG. 49 and FIG. 50, when fully assembled the magnetic coupler 5010 of the present invention comprises the shuttle 5018 slidably mounted to the base 5016. The shuttle 5018 is received within the flanges 5027 of the extensions 5024. Thus, as the shuttle translates with the respect to the base 5016, the inwardly-extending flanges 5027 together comprise a guide 5023 to direct the translation of the shuttle 5018. Lower support flanges 5065 (FIG. 52) helps to retain the shuttle 5018 within the base, and guides the translation of the shuttle 5018.

FIG. 50 shows the magnetic coupler 5010 in its open position. The sliding path of the shuttle 5018 from the open position to the closed position is indicated by the arrow A in FIG. 50. When in the open position, the slots 5022 are not covered by the "I" core member, and when the coupler is in the closed position the slots are covered by the "I" core. Leg 5038 of the shuttle 5018 limits the translation of the shuttle 5018 to the right as shown in FIG. 49. Leg 5038 extends generally perpendicularly to the path of the shuttle. The extensions 5024 also extend in a direction generally perpendicular to the shuttle path.

Figure 53:
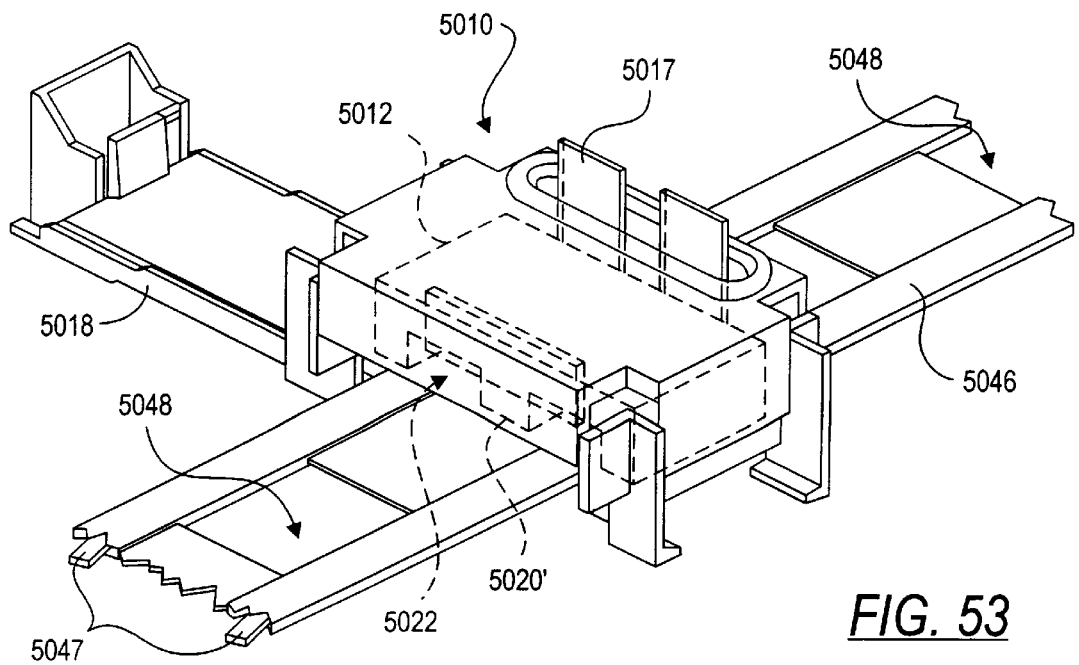

As shown in FIG. 53, the present invention preferably is used with a rail member 5046 having an electrical conductor 5047 contained therein. The rail member 5046 has a plurality of slots 5048 to receive central prong 5020' of the "E" core 5012. In this manner the conductor 5047 and the conductor 5017 may be magnetically coupled by the coupler 5010. Once the "E" core is located in the desired position, the shuttle 5018 may be moved to the closed position. For example, a worker using the coupler of the present invention may locate the coupler, by feel, such that the central prong 5020 fits within an associated slot 5048.

While retaining the coupler in this position, the worker may then easily slide the shuttle 5018 to the closed position using only a single hand. Thus, the present invention provides for a coupler that can be easily located and operated with only a single hand.

Figure 52:
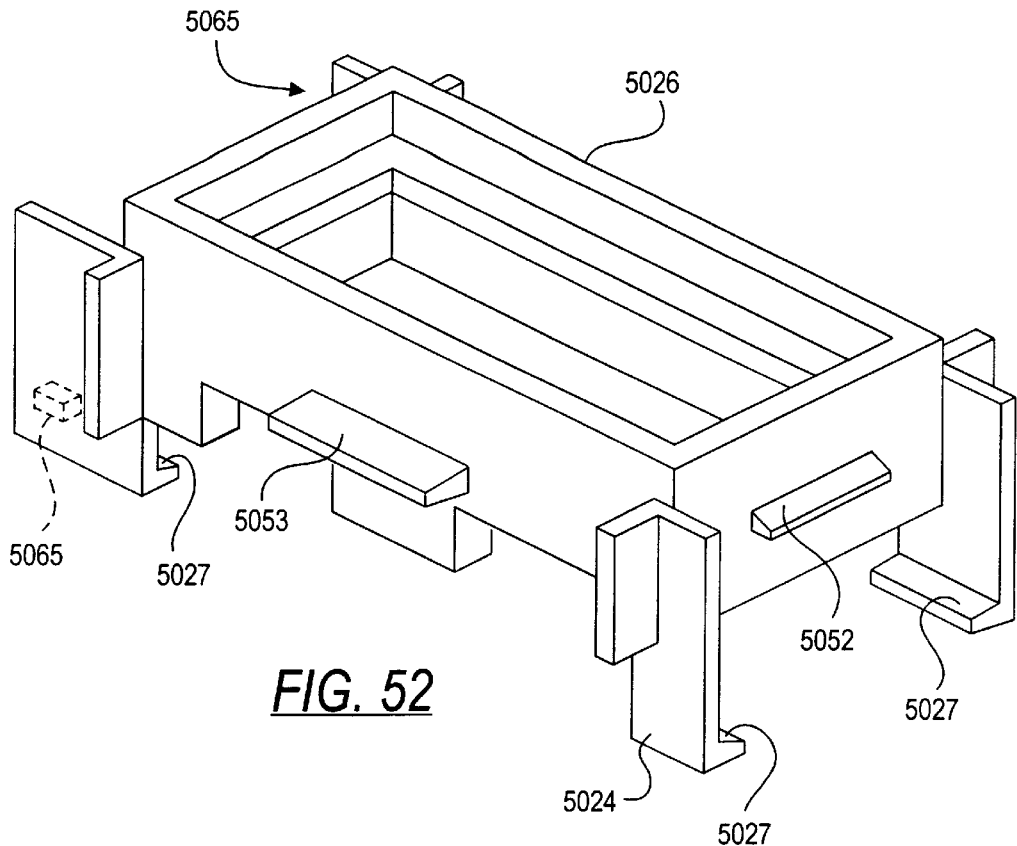

When shuttle 5018 is shifted to the closed position, the front ramp 5043 and rear ramp 5045 contact the respective flanges 5027 as the shuttle nears the closed position. Due to the increased width of the ramps, the shuttle 5018 is frictionally engaged by the lattice 5026. Also, the "E" core 5012 and "I" core 5014 are pressed into intimate contact due to the interference fit between the ramps 5043, 5045 and the flanges 5027. In this manner, an improved connection between the E core and I core is maintained. The shuttle 5018 may be uncoupled from the lattice 5026 by inserting a screwdriver or other appropriately shaped tool into the slot 5079 of the shuttle 5018. By working the screwdriver back and forth, the shuttle can be loosened and moved to the open position. The coupler 5010 may then be removed from the rail member 5046, and the conductors thereby uncoupled. Additionally, the front ramp 5043 acts so as to retain the shuttle 5018 within the base 5016 when the shuttle 5018 is in the open position. When in the open position, the front ramp 5043 is wedged between flanges 5027 and a lower support flanges 5065 (FIG. 52). The front ramps 5043, flanges 5027 and lower support flanges 5065 cooperate so as to keep the shuttle from falling out of the base 5016.

Additionally, when the coupler 5010 is moved from an open position as shown in FIG. 50 to the closed position as shown in FIG. 49, the movement of the "I" core member 5014 across the prongs 5020 of the "E" core member 5012 effectively removes debris from the mating surfaces 5013. Beveled surface 5045 of the "I" core 5014 acts so as to prevent the shuttle 5018 from becoming jammed as it traverses the "E" core. Cleaning the cores gives the resultant connection good balance and uniformity.

Figure 54:
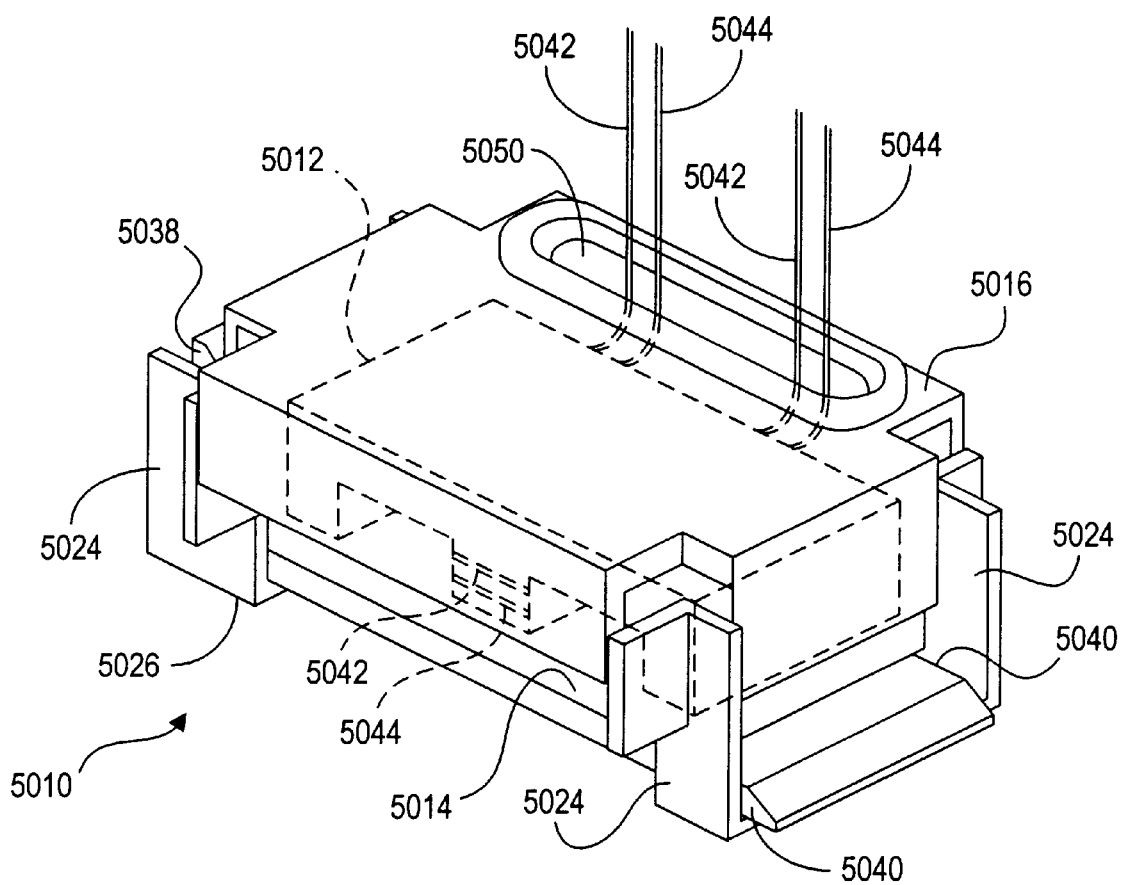

While the invention should be useful in any application in which it is desired to magnetically couple a pair of conductors, it may be particularly useful in coupling loops to provide one or two-way communication between one or more terminals. Furthermore, although the invention is illustrated using a copper conductor and a rail member, it is to be understood that the coupler of the present invention may be used to couple a pair of loose wires, as is illustrated in FIG. 54. Alternately, the coupler 5010 may be useful in coupling a loose wire to the copper conductor 5017, or in coupling a loose wire to the rail member 5046. The magnetic coupler 5010 of the present invention may be used to couple, for example, branch distribution loops to main distribution loops. However, those skilled in the art will appreciate that the coupler 5010 may be used at any point where conductor coupling is desired.

While the invention has been illustrated and described herein with reference to specific embodiments, the invention is not limited thereto. Those skilled in the art may devise various changes, alternatives and modifications without departing from the scope of the invention, as defined by the claims.

We claim:

1. An article information display system associated with an establishment having multiple display or storage areas, comprising:

a controller;

a distribution loop coupled to the controller and extending along the multiple display or storage areas;

a plurality of electronically controllable information display tags mounted adjacent the article display or storage areas and inductively coupled to the distribution loop for receiving information and power from the controller;

a portable terminal including a scanner and a display;

wherein each display tag displays information regarding a product associated therewith;

wherein the controller is programmed to operate in a plurality of modes including a display tag verification mode in which information displayed on at least one display tag can be checked; and wherein during the display tag verification mode, and in response to receipt of information identifying a product scanned by the portable terminal, the controller retrieves from a database display information regarding the scanned product, communicates the retrieved display information to the portable terminal such that the retrieved display information is displayed on the display of the portable terminal, and communicates a signal via the distribution loop to at least one display tag associated with the scanned product, which signal causes the display of the at least one display tag to blink.

2. The system of claim 1, wherein the controller includes RF transceiver means and the portable terminal includes RF transceiver means.

3. An article information display system associated with an establishment having multiple article display or storage areas comprising:

a controller;

a distribution loop coupled to the controller and extending along the multiple display or storage areas;

a plurality of electronically controllable information display tags mounted adjacent the article display or storage areas and inductively coupled to the distribution loop for receiving information and power from the controller;

a portable terminal including a display;

wherein each display tag displays information regarding a product associated therewith;

wherein the controller is programmed to operate in a plurality of modes including a display tag verification mode in which information displayed on at least one display tag can be checked; and wherein during the display tag verification mode, and in response to receipt of a service request signal from a display tag, the controller retrieves from a database display information associated with the requesting display tag and communicates the retrieved display information to the portable terminal such that the retrieved display information is displayed on the display of the portable terminal.

4. The system of claim 3, wherein the display tag includes a switch which when activated effects delivery of the service request signal to the controller.

5. The system of claim 3, wherein the controller includes RF transceiver means and the portable terminal includes RF transceiver means.

6. An article information display system associated with an establishment having multiple article display or storage areas comprising:

a controller;

a distribution loop coupled to the controller and extending along the multiple display or storage areas;

a plurality of electronically controllable information display tags mounted adjacent the article display or storage areas and inductively coupled to the distribution loop for receiving information and power from the controller;

a portable terminal including a display and a scanner, the portable terminal including means for wireless communication with the controller;

wherein the controller includes means for wireless communication with the portable terminal;

wherein the controller is programmed to operate in a plurality of modes including a display tag installation mode in which display information for each tag can be set; and wherein during the display tag installation mode, and in response to receipt of a service request signal from a display tag and receipt of product identifying information from the portable terminal, the controller retrieves from a database display information associated with the identified product, communicates the retrieved display information to the portable terminal such that the retrieved display information is displayed on the display of the portable terminal, and communicates the retrieved display information to the requesting display tag such that the retrieved display information is displayed by the requesting display tag.

7. An article information display system associated with an establishment having multiple display or storage areas, comprising:

a controller;

a plurality of electronically controllable information display tags mounted adjacent the article display or storage areas, each display tag operable for communication with the controller;

a portable terminal including a scanner and a display;

wherein each display tag displays information regarding a product associated therewith;

wherein the controller is programmed to operate in a plurality of modes including a display tag verification mode in which information displayed on at least one display tag can be checked; and wherein during the display tag verification mode, and in response to receipt of information identifying a product scanned by the portable terminal, the controller retrieves from a database display information regarding the scanned product, communicates the retrieved display information to the portable terminal such that the retrieved display information is displayed on the display of the portable terminal, and communicates a signal to at least one display tag associated with the scanned product, which signal causes the display of the at least one display tag to blink.

8. An article information display system associated with an establishment having multiple article display or storage areas comprising:

a controller;

a plurality of electronically controllable information display tags mounted adjacent the article display or storage areas, each display tag operable for communication with the controller;

a portable terminal including a display;

wherein each display tag displays information regarding a product associated therewith;

wherein the controller is programmed to operate in a plurality of modes including a display tag verification mode in which information displayed on at least one display tag can be checked; and wherein during the display tag verification mode, and in response to receipt of a service request signal from a display tag, the controller retrieves from a database display information associated with the requesting display tag and communicates the retrieved display information to the portable terminal such that the retrieved display information is displayed on the display of the portable terminal.

9. An article information display system associated with an establishment having multiple article display or storage areas comprising:

a controller;

a distribution loop coupled to the controller and extending along the multiple display or storage areas;

a plurality of electronically controllable information display tags mounted adjacent the article display or storage areas, each display tag operable for communication with the controller;

a portable terminal including a display and a scanner;

wherein the controller is programmed to operate in a plurality of modes including a display tag installation mode in which display information for each tag can be set; and wherein during the display tag installation mode, and in response to receipt of a service request signal from a display tag and receipt of product identifying information from the portable terminal, the controller retrieves from a database display information associated with the identified product, communicates the retrieved display information to the portable terminal such that the retrieved display information is displayed on the display of the portable terminal, and communicates the retrieved display information to the requesting display tag such that the retrieved display information is displayed by the requesting display tag.

* * * * *